United States Patent
O'Quinn et al.

(10) Patent No.: US 12,377,551 B1
(45) Date of Patent: Aug. 5, 2025

(54) METHOD AND SYSTEM FOR VENEER SHEET PORTION STACKING AND UNSTACKING

(71) Applicant: Boise Cascade Company, Boise, ID (US)

(72) Inventors: Neill O'Quinn, Alexandria, LA (US); David Bolton, Lena, LA (US); Jude Richard Peek, Pineville, LA (US); Curtis Fennell, Boyce, LA (US)

(73) Assignee: Boise Cascade Company, Boise, ID (US)

( * ) Notice: Subject to any disclaimer, the term of this patent is extended or adjusted under 35 U.S.C. 154(b) by 9 days.

(21) Appl. No.: 18/489,732

(22) Filed: Oct. 18, 2023

Related U.S. Application Data

(63) Continuation-in-part of application No. 17/513,416, filed on Oct. 28, 2021, now abandoned, which is a
(Continued)

(51) Int. Cl.
*G06T 7/62* (2017.01)
*B07C 5/10* (2006.01)
(Continued)

(52) U.S. Cl.
CPC ............... *B25J 9/1697* (2013.01); *B07C 5/10* (2013.01); *B65G 60/00* (2013.01); *G06T 1/0014* (2013.01);
(Continued)

(58) Field of Classification Search
CPC . B25J 9/1697; G06T 7/62; G06T 7/66; B07C 5/10; B07C 5/34; B07C 2501/0063
(Continued)

(56) References Cited

U.S. PATENT DOCUMENTS 3,566,937 A 3/1971 Erickson
3,606,942 A 9/1971 Daniels
(Continued)

FOREIGN PATENT DOCUMENTS

CA 2907295 4/2016
CN 108362702 8/2018
(Continued)

OTHER PUBLICATIONS

Conners et al., "Machine vision technology for the forest products industry," 1997, IEEE, Computer, vol. 30, No. 7, pp. 43-48. (Year: 1997).
(Continued)

*Primary Examiner* — Terrell H Matthews
(74) *Attorney, Agent, or Firm* — Hawley Troxell; Philip McKay

(57) ABSTRACT

A method and system for stacking and unstacking of veneer includes using one or more veneer analysis systems to collect dimensions and quality data associated with the veneer being used to create a stack of veneer. In addition, location data for the veneer in the stack of veneer is recorded. The dimensions data, the quality data, and the location data for all the veneer in a stack of veneer is then combined into a stack of veneer profile data. The stack of veneer profile data is then correlated to the stack of veneer and stored in a database. Consequently, the location, quality, and dimensions data of the veneer making up the stack of veneer is known so that an accurate determination can be made of the volume, surface area and quality of veneer in the stack. In another example, 3D laser profiling is used to identify a veneer sheet portion that is at the top of a stack of veneer sheet portions so that the veneer sheet portion at the top of the stack can be identified and removed from the stack during unstacking.

23 Claims, 47 Drawing Sheets
(13 of 47 Drawing Sheet(s) Filed in Color)

Related U.S. Application Data continuation-in-part of application No. 17/230,474, filed on Apr. 14, 2021, now abandoned.

(51) Int. Cl.

| | | |
|---|---|---|
| *B25J 9/16* | (2006.01) | |
| *B65G 60/00* | (2006.01) | |
| *G06T 1/00* | (2006.01) | |
| *G06T 7/66* | (2017.01) | |

(52) U.S. Cl.
CPC .................. *G06T 7/62* (2017.01); *G06T 7/66* (2017.01); *B07C 2501/0063* (2013.01); *B65G 2201/0217* (2013.01); *B65G 2201/022* (2013.01)

(58) Field of Classification Search
USPC .......................................................... 209/518
See application file for complete search history.

(56) References Cited

U.S. PATENT DOCUMENTS

| | | | |
|---|---|---|---|
| 4,421,983 A | 12/1983 | Fogle et al. | |
| 4,614,555 A | 9/1986 | Smith et al. | |
| 4,630,424 A | 12/1986 | Eberle et al. | |
| 4,641,480 A | 2/1987 | Mort | |
| 4,797,169 A | 1/1989 | Aizawa et al. | |
| 4,872,299 A | 10/1989 | Troutner | |
| 4,879,752 A | 11/1989 | Aune et al. | |
| 4,893,961 A | 1/1990 | O'Sullivan et al. | |
| 4,942,084 A | 7/1990 | Prince | |
| 4,967,534 A | 11/1990 | Lines | |
| 5,892,808 A | 4/1999 | Goulding et al. | |
| 5,960,104 A | 9/1999 | Conners et al. | |
| 6,495,833 B1 | 12/2002 | Alfano et al. | |
| 6,525,319 B2 * | 2/2003 | Meglen .............. | G01N 21/3563 250/339.05 |
| 6,543,604 B1 | 4/2003 | Pung et al. | |
| 9,164,029 B2 | 10/2015 | Tsuchikawa et al. | |
| 10,260,232 B1 * | 4/2019 | Conboy .................... | B32B 7/12 |
| 10,580,126 B1 | 3/2020 | Weinschenk | |
| 10,825,164 B1 | 11/2020 | Bolton et al. | |
| 10,933,556 B2 | 3/2021 | Bolton et al. | |
| 10,933,557 B2 | 3/2021 | Bolton et al. | |
| 11,090,833 B2 | 8/2021 | Bolton et al. | |
| 11,200,663 B1 | 12/2021 | Bolton et al. | |
| 11,222,419 B1 * | 1/2022 | Bolton ...................... | G06T 7/90 |
| 11,442,006 B2 | 9/2022 | Bolton et al. | |
| 11,442,007 B2 | 9/2022 | Bolton et al. | |
| 11,453,211 B2 | 9/2022 | Bolton et al. | |
| 2002/0057838 A1 | 5/2002 | Steger | |
| 2002/0113212 A1 | 8/2002 | Meglen et al. | |
| 2003/0030002 A1 | 2/2003 | Safai | |
| 2003/0042180 A1 * | 3/2003 | Kairi ....................... | B07C 5/342 209/587 |
| 2004/0146615 A1 | 7/2004 | McDonald et al. | |
| 2004/0206676 A1 | 10/2004 | Dai et al. | |
| 2005/0098728 A1 | 5/2005 | Alfano et al. | |
| 2005/0147286 A1 | 7/2005 | Lee et al. | |
| 2005/0161118 A1 | 7/2005 | Carman et al. | |
| 2005/0202226 A1 | 9/2005 | Alfonso | |
| 2007/0102108 A1 | 5/2007 | Zheng et al. | |
| 2007/0131862 A1 | 6/2007 | Cowan et al. | |
| 2007/0137323 A1 | 6/2007 | Stanley et al. | |
| 2007/0143066 A1 | 6/2007 | Stanley et al. | |
| 2007/0143075 A1 | 6/2007 | Stanley et al. | |
| 2007/0222100 A1 | 9/2007 | Husted et al. | |
| 2007/0246125 A1 | 10/2007 | Latos | |
| 2008/0243424 A1 | 10/2008 | Jones et al. | |
| 2009/0279773 A1 | 11/2009 | Gan et al. | |
| 2010/0141754 A1 | 6/2010 | Hiraoka | |
| 2011/0200231 A1 | 8/2011 | Vedova et al. | |
| 2012/0301601 A1 | 11/2012 | Jewell et al. | |
| 2013/0333805 A1 | 12/2013 | Gagnon et al. | |
| 2014/0046471 A1 | 2/2014 | Bamford et al. | |
| 2014/0202345 A1 | 7/2014 | Wood | |
| 2014/0238546 A1 | 8/2014 | Barker | |
| 2016/0040933 A1 | 2/2016 | Stanish | |
| 2016/0067879 A1 | 3/2016 | Capps | |
| 2016/0103115 A1 | 4/2016 | Hamby | |
| 2016/0123871 A1 | 5/2016 | Kalwa et al. | |
| 2016/0274022 A1 | 9/2016 | Gagne | |
| 2017/0018071 A1 | 1/2017 | Voyer et al. | |
| 2017/0023489 A1 | 1/2017 | Lizuka et al. | |
| 2017/0050334 A1 | 2/2017 | Aylsworth | |
| 2017/0074805 A1 | 3/2017 | Paul et al. | |
| 2018/0059014 A1 | 3/2018 | Ruback et al. | |
| 2019/0168413 A1 | 6/2019 | Conboy | |
| 2020/0173914 A1 | 6/2020 | Bolton et al. | |
| 2020/0234427 A1 | 7/2020 | Cui et al. | |
| 2020/0254615 A1 | 8/2020 | Bryner et al. | |
| 2020/0269439 A1 | 8/2020 | Telleria et al. | |
| 2021/0319548 A1 | 10/2021 | Bolton et al. | |
| 2021/0327049 A1 | 10/2021 | Bolton et al. | |
| 2021/0362483 A1 | 11/2021 | Hass et al. | |
| 2021/0398269 A1 | 12/2021 | Bolton et al. | |
| 2021/0398270 A1 | 12/2021 | Bolton et al. | |
| 2022/0236176 A1 | 7/2022 | Bolton et al. | |

FOREIGN PATENT DOCUMENTS

| | | |
|---|---|---|
| CN | 110948613 | 4/2020 |
| DE | 102019125608 | 3/2021 |
| EP | 2631644 | 12/2014 |
| JP | 2014/205306 | 10/2014 |
| JP | 2014/205338 | 10/2014 |
| JP | 2014205306 A * | 10/2014 |
| JP | 2014/125233 | 11/2017 |
| JP | 2019/166657 | 10/2019 |
| KR | 1020190070756 | 6/2019 |
| WO | WO 2016/201553 | 12/2016 |
| WO | WO 2018/178846 | 10/2018 |
| WO | WO 2020/153848 | 7/2020 |

OTHER PUBLICATIONS

V. O. Tormanen and A. J. Makynen, "Determination of wood moisture content using angularly, spatially and spectrally resolved reflectance," 2011 IEEE International Instrumentation and Measurement Technology Conference, 2011, pp. 1-5, doi: 10.1109/IMTC .2011.5944140. (Year: 2011).

Cognex Vision Software, "GigE Vision Cameras User's Guide," Published 2011.

Nieminen et al., "Laser transillumination imaging for determining wood defects and grain angle," 2013, Measurement Science and Technology, vol. 24, No. 125401, 7 pages. (Year: 2013).

Cognex, "Vision Controller Installation Manual," 2014.

Tsuchikawa et al., "A review of recent application of near infrared spectroscopy to wood science and technology," 2015, Journal of Wood Science, vol. 61, pp. 213-220. (Year: 2015).

Colares et al., "Near infrared hyperspectral imaging and MCR-ALS applied for mapping chemical composition of the wood specie Swietenia Macrophylla King (Mahogany) at microscopic level," 2016, Microchemical Journal, vol. 124, pp. 356-363. (Year: 2016).

Cognex, "Vision Product Guide," 2018.

USNR Transverse High Grader information sheet, copyright 2019; retrieved May 23, 2019 from https://www.usnr.com/en/product/THGLM.

USNR Lineal High Grader information sheet, copyright 2019; retrieved May 23, 2019 from https://www.usnr.com/en/product/LHGLM.

Usnr Lhg E-Valuator Module, copyright 2019; retrieved May 23, 2019 from https://www.usnr.com/en/product/LHGEValuatorLM.

USNR Planer/Dry Mill Optimization information sheet, copyright 2019; retrieved May 23, 2019 from https://www.usnr.com/en/product/mktoptplanermilllm.

Mecano Advantages information sheet, copyright 2019; retrieved May 23, 2019 from http://www.raute.com/mecano-advantages.

(56) References Cited

OTHER PUBLICATIONS

Mecano Solutions information sheet, copyright 2019; retrieved May 23, 2019 from http://www.raute.com/mecano-solutions.
Mecano Products information sheet, copyright 2019; retrieved May 23, 2019 from http://www.raute.com/264.
Drying Lines information sheets, copyright 2019; retrieved May 23, 2019 from http://www.raute.com/mecano-drying-lines?redirect=http%3A%2F%2Fwww.raute.com%2Flvl%3Fp_p_id%3%26p_plifecycle%3D0%26p_p_state% . . .
Layup Lines information sheet, copyright 2019; retrieved May 23, 2019 from http://www.raute.com/mecano-layup-lines.
Veneer Handling Lines information sheet, copyright 2019; retrieved May 23, 2019 from http://www.raute.com/mecano-veneer-handling-lines.
Panel Handling Lines information sheet, copyright 2019; retrieved May 23, 2019 from http://www.raute.com/mecano-panel-handling-lines.
Peeling Lines information sheet, copyright 2019; retrieved May 23, 2019 from http://www.raute.com/268.
Smart Mill Concept information sheet, copyright 2019; retrieved May 23, 2019 from http://www.raute.com/smart-mill-concept.

* cited by examiner

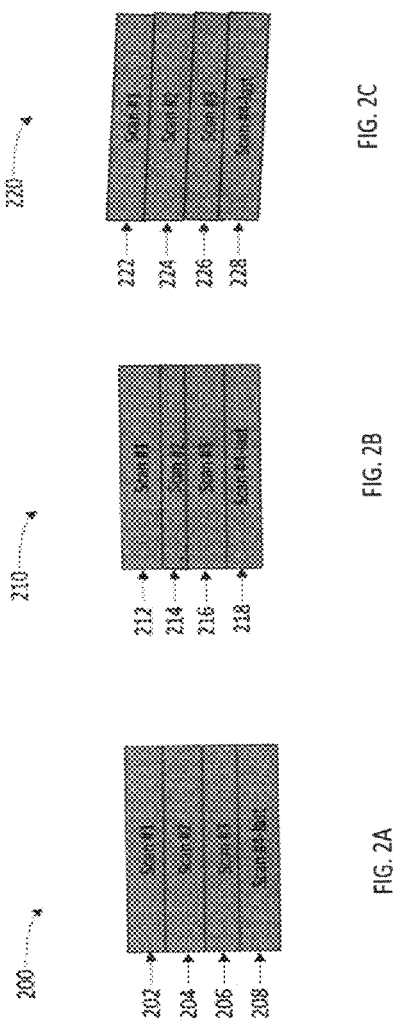

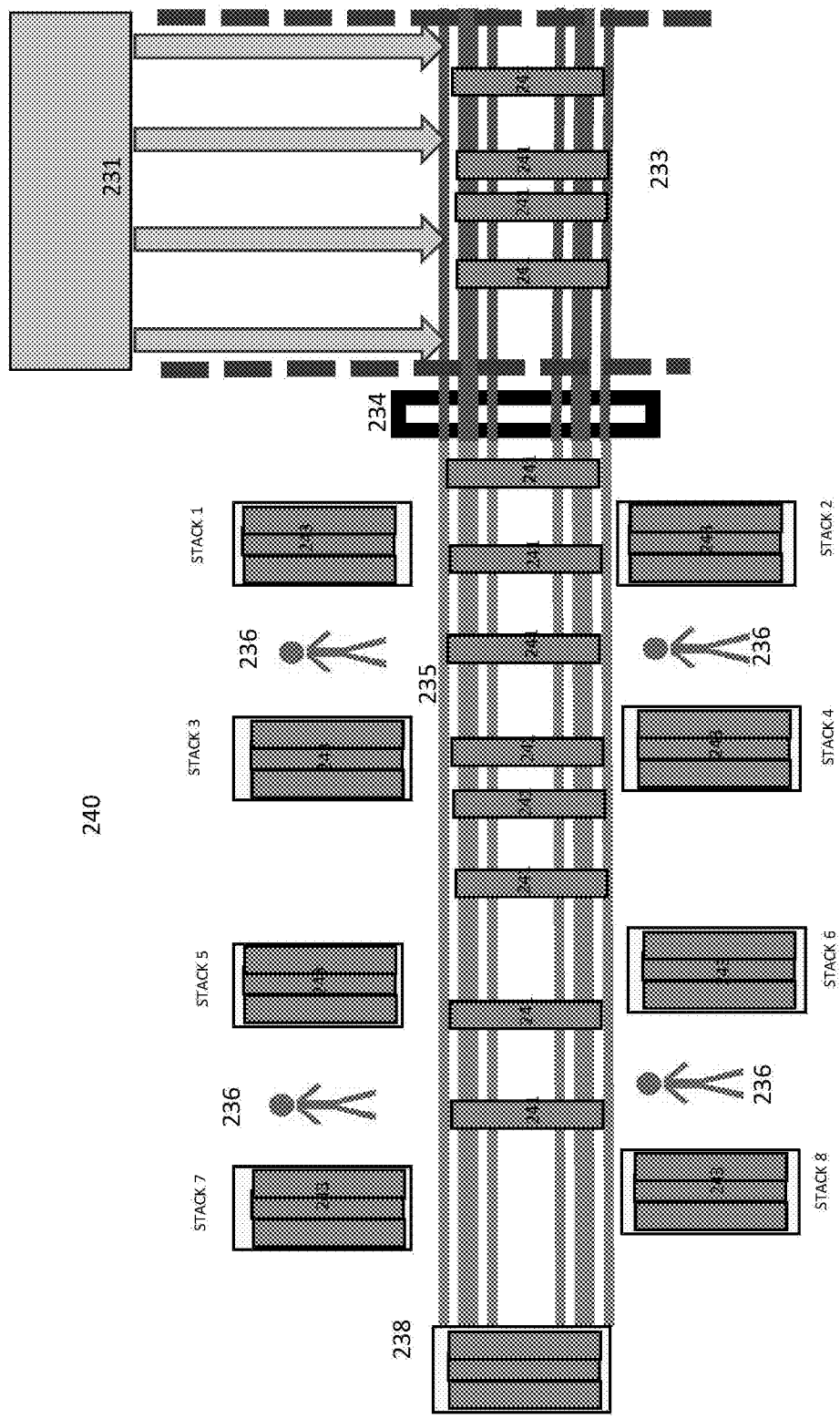

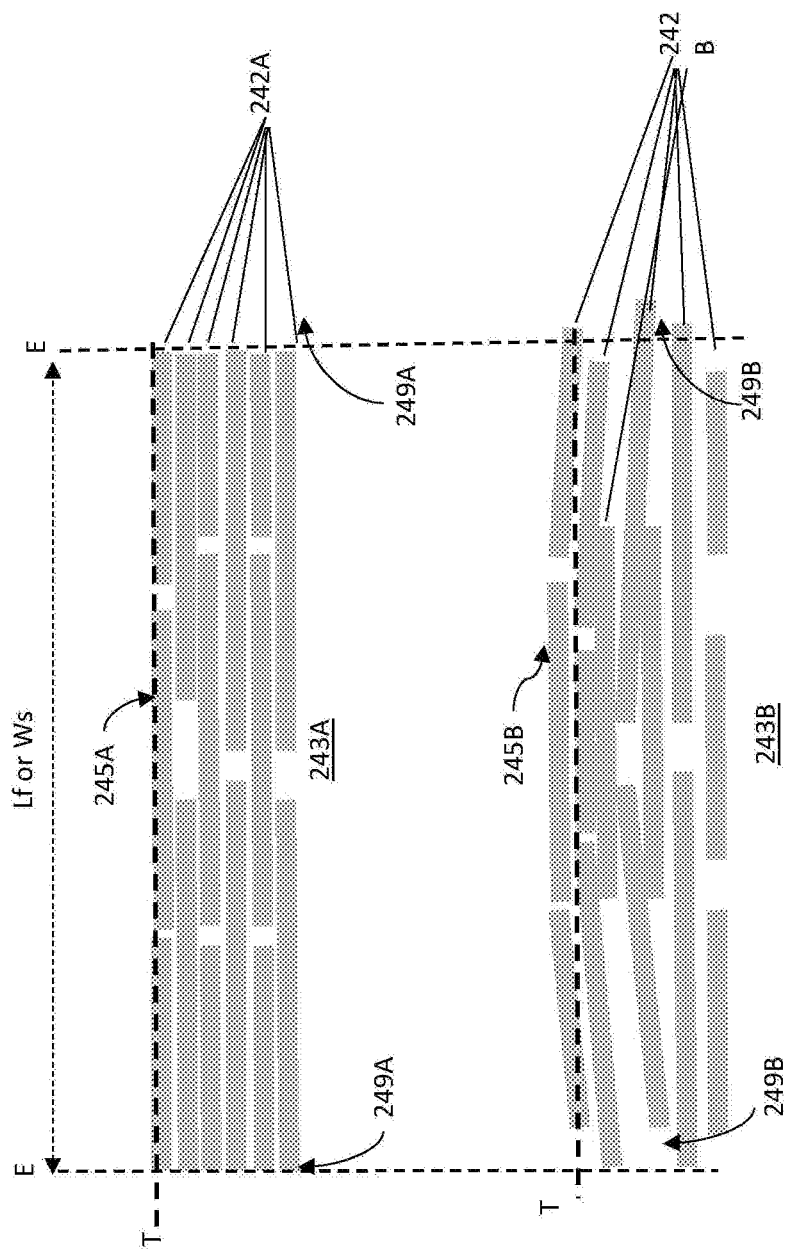

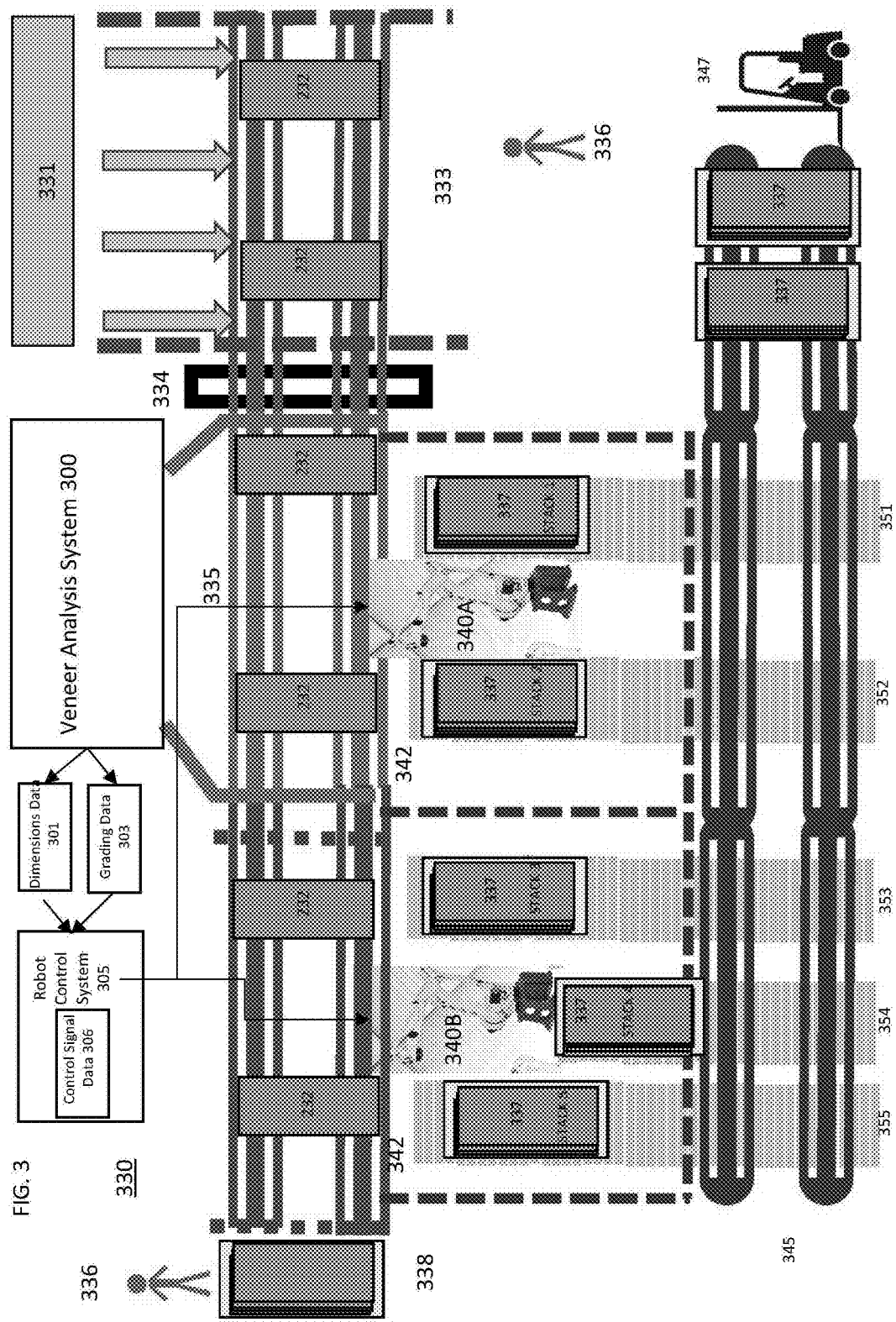

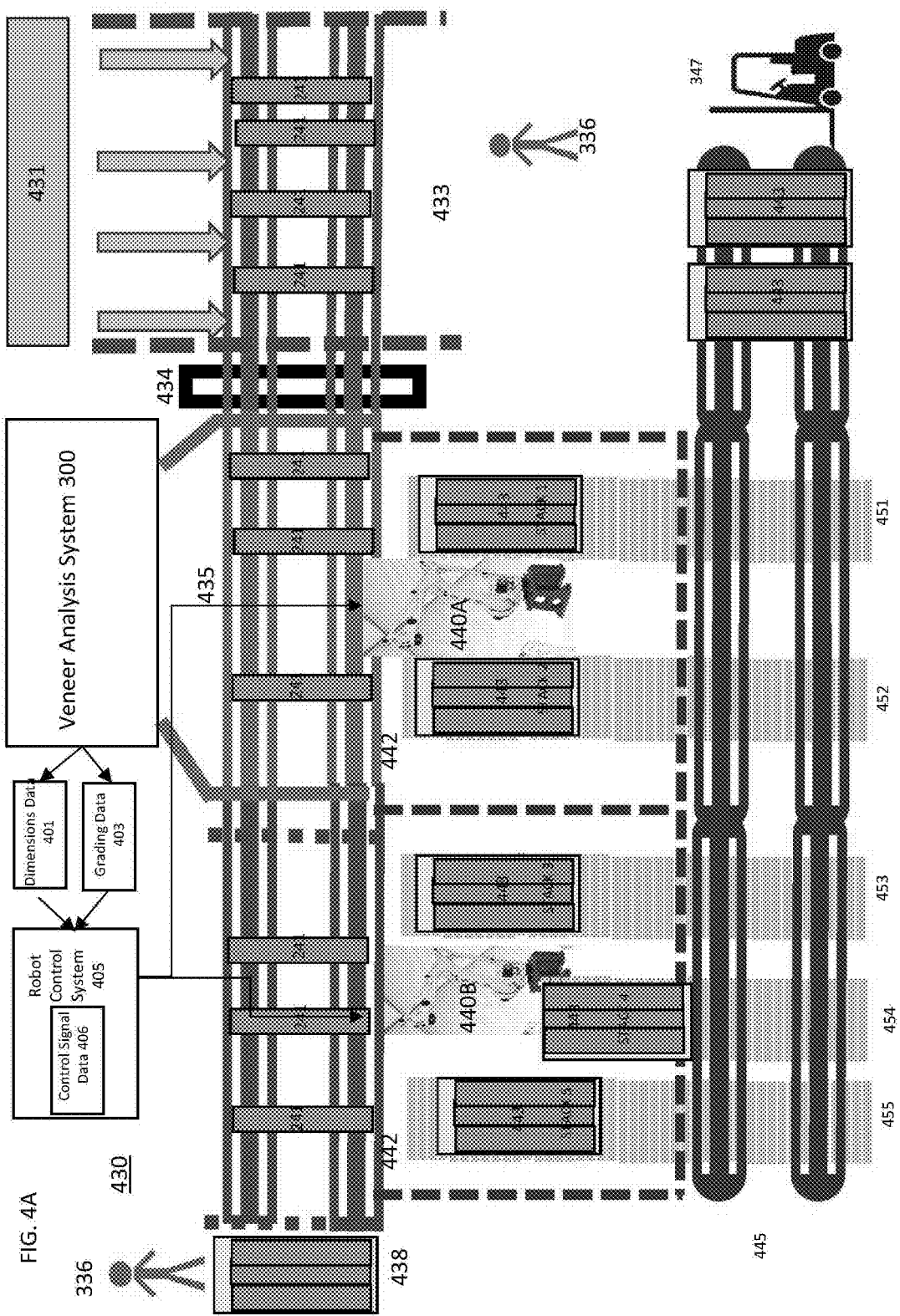

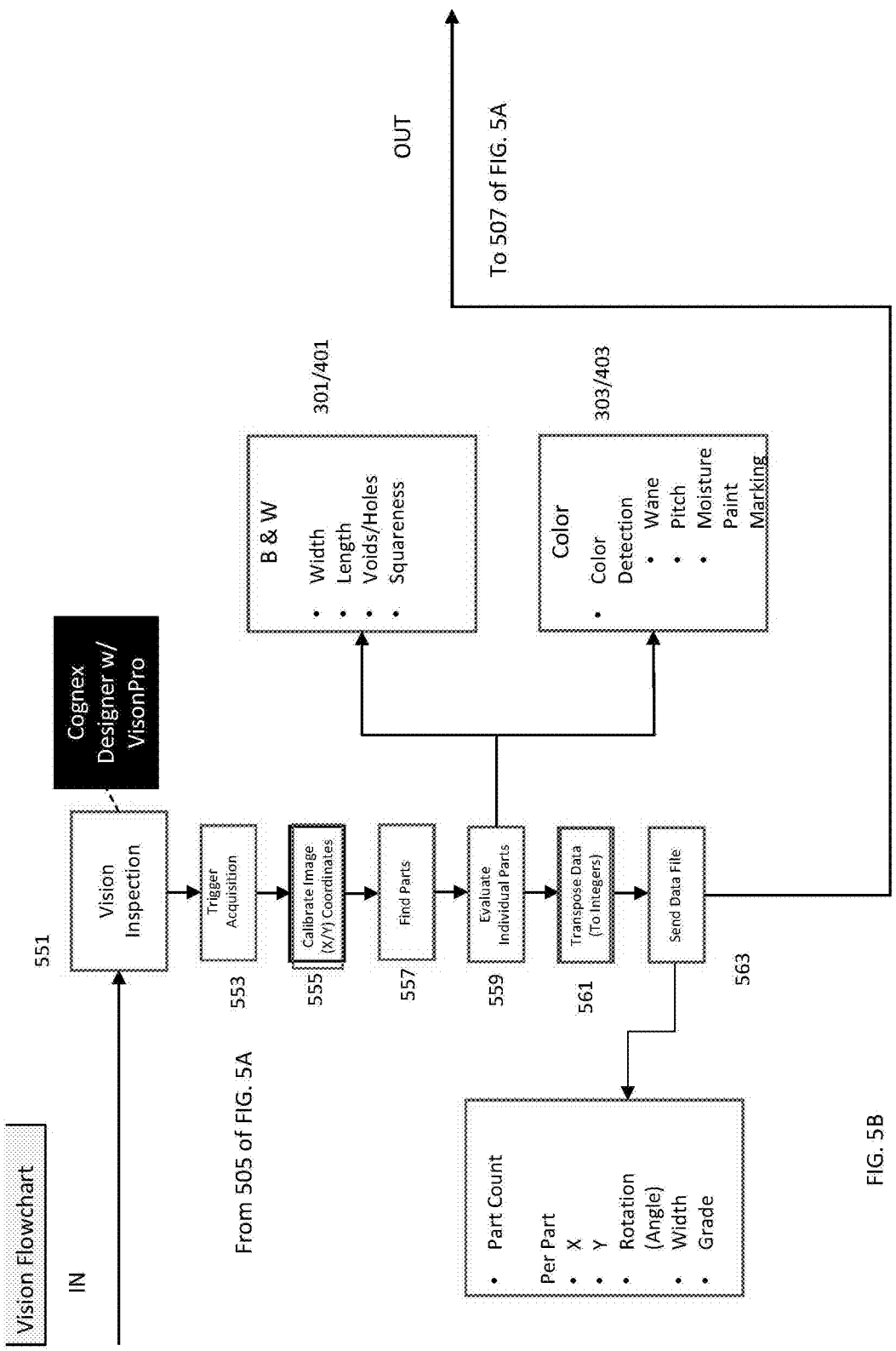

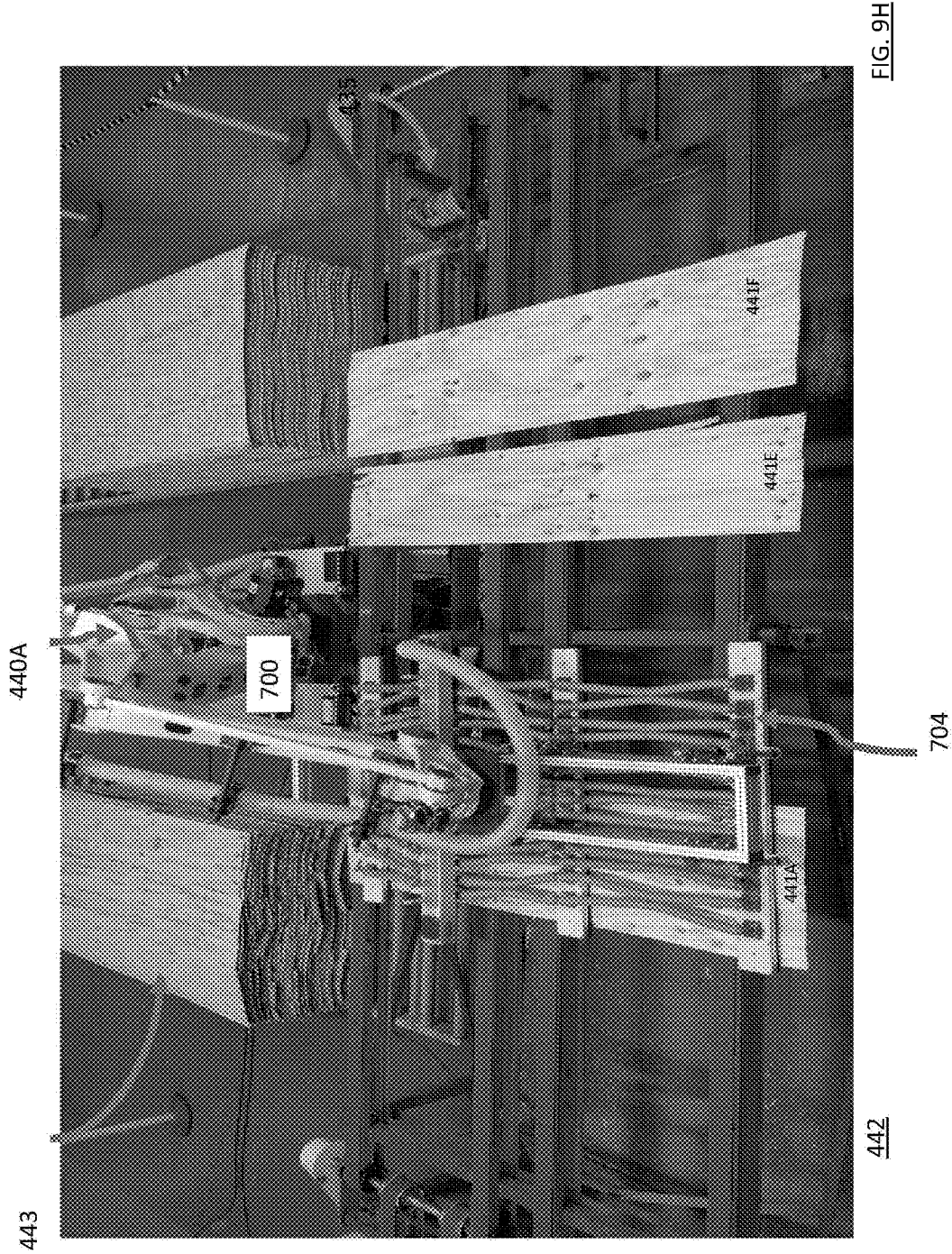

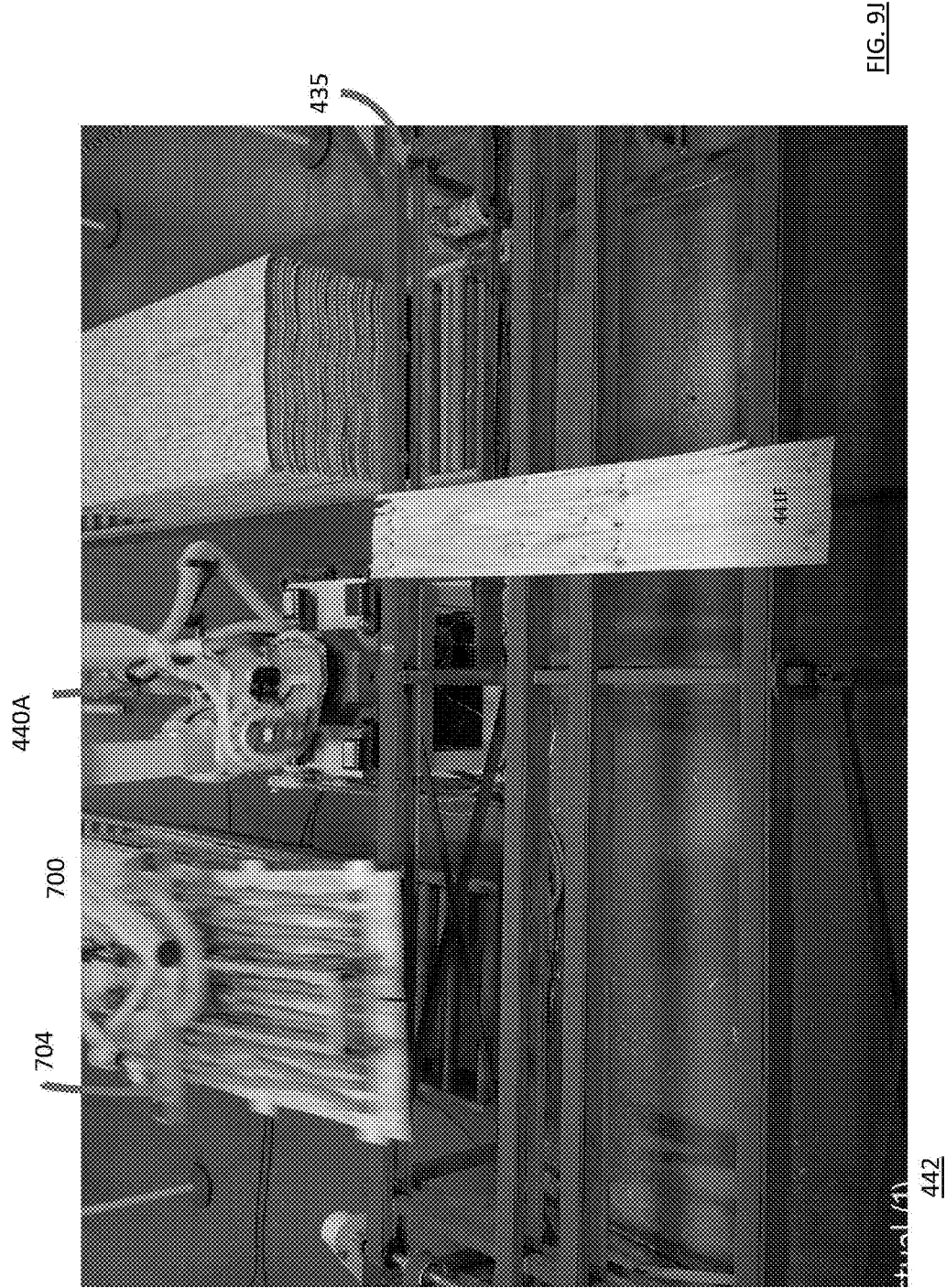

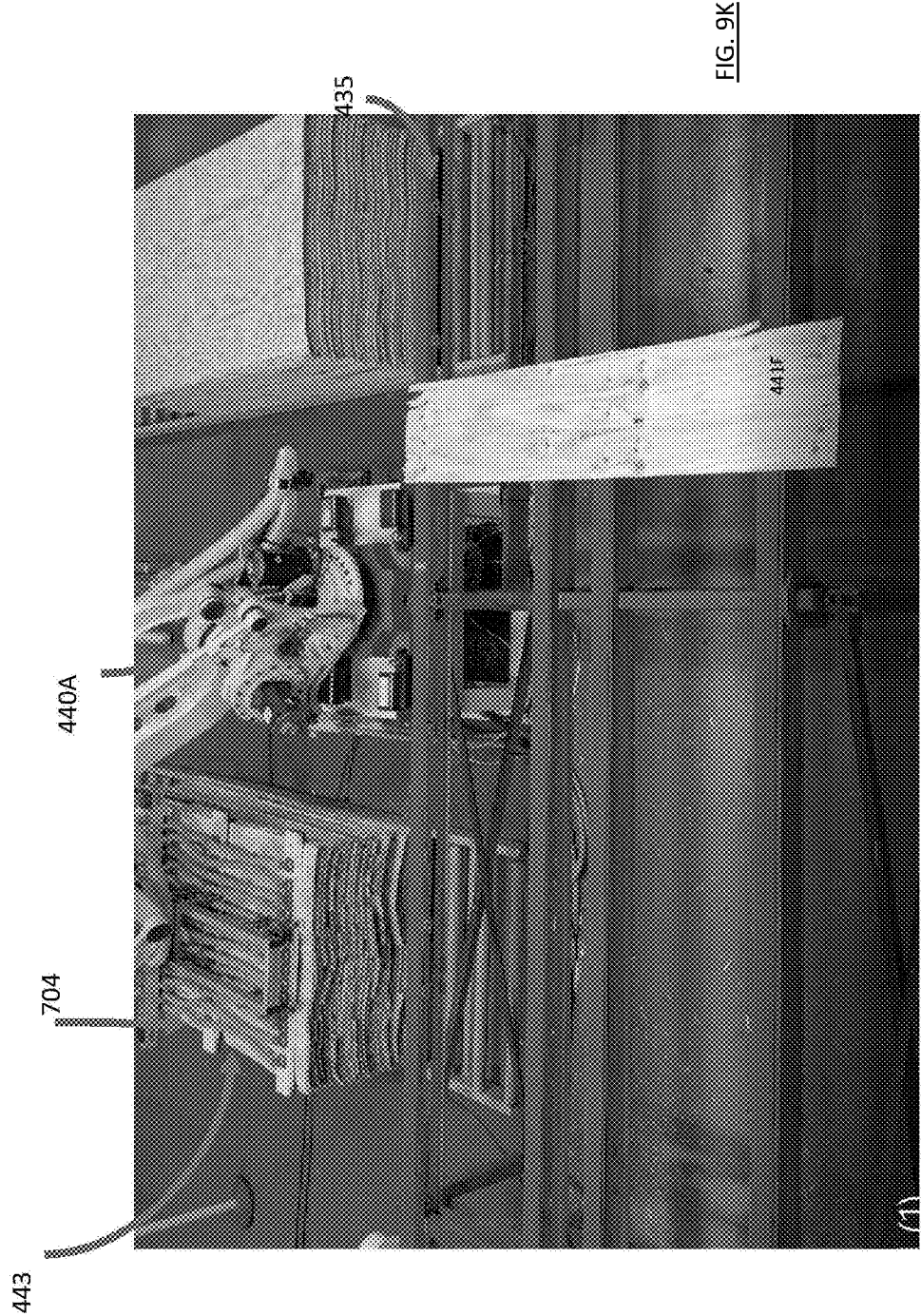

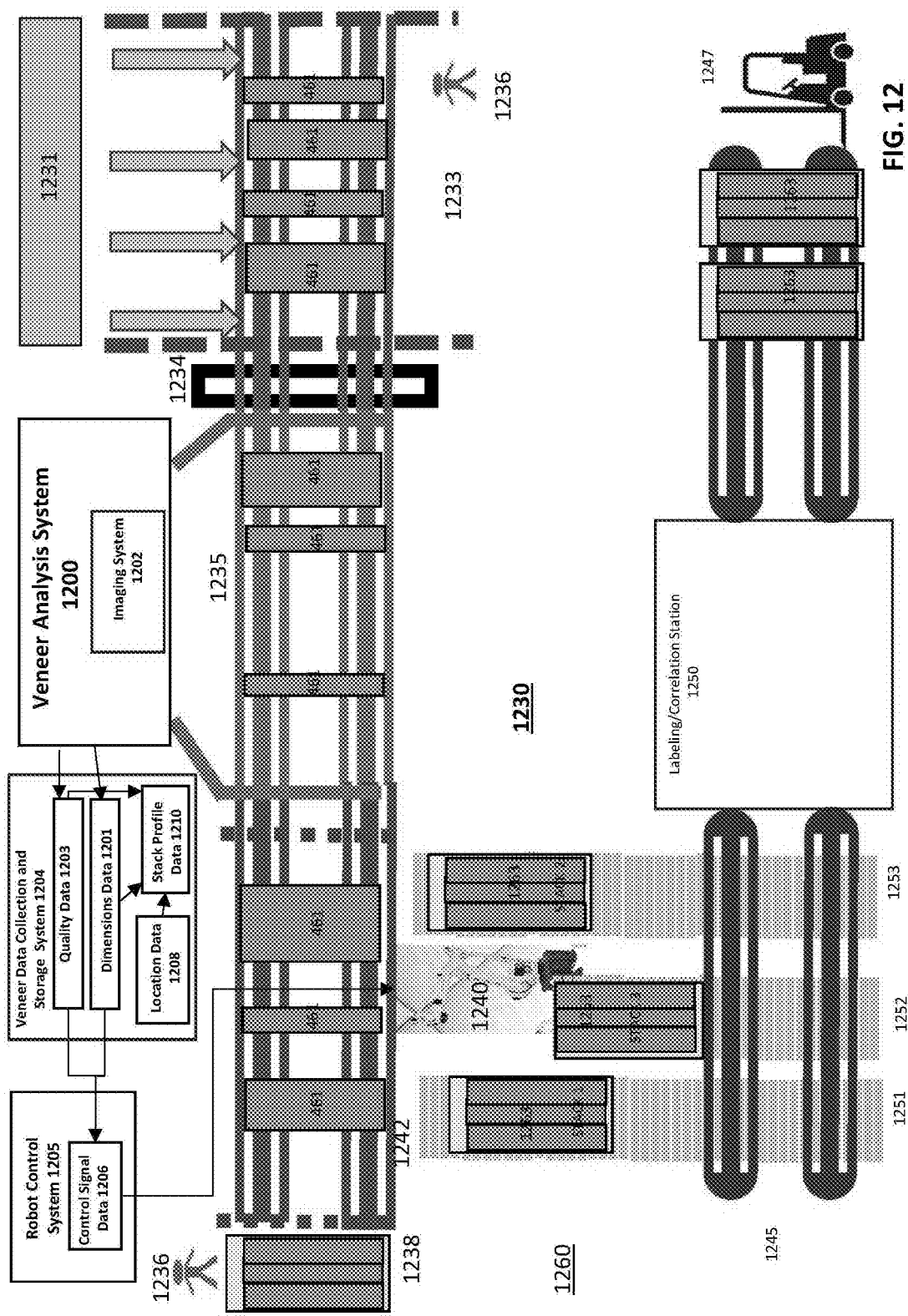

METHOD AND SYSTEM FOR VENEER SHEET PORTION STACKING AND UNSTACKING

RELATED APPLICATIONS

This application is a continuation-in-part of Bolton et al., U.S. patent application Ser. No. 17/513,416, filed Oct. 28, 2021, entitled "METHOD AND SYSTEM FOR PARTIAL VENEER SHEET GRADING AND STACKING," which is a continuation-in-part of Bolton et al., U.S. patent application Ser. No. 17/230,474, filed Apr. 14, 2021, both of which are incorporated by reference in their entirety as if they were fully set forth herein.

This application is related to Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which claims the benefit of David Bolton, U.S. Provisional Patent Application No. 62/595,489, filed on Dec. 6, 2017, entitled "IMAGING SYSTEM FOR ANALYSIS OF WOOD PRODUCTS," which is hereby incorporated by reference in its entirety as if it were fully set forth herein.

This application is related to Bolton et al., U.S. patent application Ser. No. 17/230,497, filed on Apr. 14, 2021, entitled "METHOD AND SYSTEM FOR VENEER STRIP GRADING AND STACKING," which is hereby incorporated by reference in its entirety as if it were fully set forth herein.

BACKGROUND

There are numerous classes and types of wood products currently used in a virtually limitless variety of construction and other applications. Wood product types include but are not limited to raw wood products such as logs, debarked blocks, green or dry veneer, and dimensional lumber; intermediate wood components, such as wood I-beam flanges and webs; and layered wood products such as laminated beams, plywood panels, Engineered Wood Products (EWP), Parallel Laminated Veneer (PLV) products, and Laminated Veneer Lumber (LVL) products.

Layered wood products such as EWP, plywood, PLV, and LVL are composite products constructed in a factory from both natural wood and one or more chemically blended glues or resins. They are manufactured on a product assembly line and are typically fabricated from multiple layers of thin wood, e.g., full veneer sheets, partial veneer sheets, and veneer strips, herein collectively referred to as veneer (discussed below), assembled with one or more layers of adhesives bonding the layers together.

Herein the term "full veneer sheet" includes a continuous sheet of veneer of a defined width "Wf" and a defined length "Lf." Width "Wf" can be any width desired or needed for processing. As a specific illustrative example, in various embodiments, the defined width "Wf" can be 49 to 54 inches, with 54 inches being the ideal average value of width "Wf." In the wood products industry full veneer sheets both green and dried are commonly called 54's because 54 inches is an average width "Wf" of a full veneer sheet. Length "Lf" can be any length desired or needed for processing. In various embodiments, the defined length "Lf" can be 97 to 102 inches, with 102 inches being the preferred average value for "Lf."

Full veneer sheets are typically used for outer layers and/or inner layers of a layered wood product and define the dimensions, i.e., length and width, of the layered wood product panels being created. Therefore, it is critical that the length "Lf" and width "Wf" of the full veneer sheets be consistent for each full veneer sheet.

FIG. 1A shows one illustrative example of a full veneer sheet 1F having the desired length "Lf" and desired width "Wf."

In addition to full veneer sheets, many layered wood products include layers made up of irregularly shaped veneer or "veneer sheet fractions that are not of consistent length "Lf" and/or width "Wf." These irregularly shaped veneer or "veneer sheet fractions are typically used for inner cross plies of the layered wood products and are commonly referred to as "core material." Core material is typically derived from veneer sheets that do not meet the full sheet criteria of the Lf dimension and/or Wf dimension.

In addition to full veneer sheets, veneer can also be in the form of veneer strips and/or partial veneer sheets, herein collectively referred to as "irregularly shaped veneer" or "veneer sheet fractions."

Herein the term "veneer strip" includes a veneer sheet fraction that is of the defined length "Lf" of a full veneer sheet, but which has a width "Ws" that is less than the defined width "Wf" of a full veneer sheet. It should be noted that any veneer fraction that has less than the defined length "Lf" of a full veneer sheet is considered a partial sheet.

Any veneer sheet fraction narrower in width than the typical full sheet width of "49-54," depending on company specifications, while retaining the length of a full sheet Lf, is referred to herein as a "veneer strip," This is very important as veneer strips can be joined together by a variety of processes commonly called composing or stringing, that involves joining veneer strips with adhesives along the length "Lf" axis to produce a ribbon of continuous wood, that can then be cut into the desired full sheet width "Wf", typically 54".

FIG. 1B shows one illustrative example of a veneer strip 1S having the defined length "Lf" and a width "Ws" that is less than the width "Wf" of FIG. 1A.

Herein the terms "partial veneer sheet" "veneer short sheet," and "veneer short strip" are used interchangeably and include a veneer sheet fraction that has a length "Lp" that not of the defined length "Lf" of a full veneer sheet. In addition, as used herein, partial veneer sheets can also have any width "Wp" that is less than or equal to the defined full veneer sheet width "Wf." It should be noted that any veneer sheet portion that has any length "Lp" that is not of the defined length "Lf" and a width "Wp" less than or equal to the width "Wf" of a full veneer sheet is considered a partial veneer sheet, even if each partial veneer sheet has a different length "Lp" and width "Wp" from other partial veneer sheets.

If a veneer sheet fraction is less than full length, typically 102", then it is not usable as a full veneer sheet, or veneer strip. In this case, these partial veneer sheets are typically stacked with a clean trimmed edge in vertical alignment in a stack as are full veneer sheets and/or veneer strips. However, these partial veneer sheet stacks are commonly sent to a large saw where they are sawn to the length dimension (typically 51") to be used as the cross ply, or core, in plywood. This process can result in 49% waste of partial veneer sheets. While not an ideal efficiency, this 49% waste is better than 100% waste. These partial veneer sheets can also be composed to produce a continuous ribbon of core material that can then be cut into full size cross ply sheets. So instead of an individual feeding by hand, multiple individual strips, a 51"×51" core sheet can be manually, or machine laid as a single piece of composed core. The 51"×51" is common in the industry but may vary in dimension based on specific manufacturers criteria for core sizes.

FIG. 1C shows one illustrative example of a partial veneer sheet 1P having the length "Lp" less than length "Lf" of FIG. 1A and a width "Wp" less than or equal to width "Wf" of FIG. 1A.

Layered wood products, sometimes referred to as "man-made" but more commonly referred to as "Engineered Wood Products," (EWP), made up of full veneer sheets, and veneer strips and/or partial veneer sheets offer several advantages over typical milled lumber. For instance, since layered wood products are fabricated and assembled in a factory under controlled conditions to a set of specific product specifications, they can be stronger, straighter, and more uniform than traditional sawn lumber. In addition, due to their composite nature, layered wood products are much less likely to warp, twist, bow, or shrink than traditional sawn lumber. Many layered wood products also benefit from the multiple grain orientations of the layers and typically can also have a higher allowable stress than a comparable milled lumber product. However, as discussed below, to achieve this potential it is often critical that the full veneer sheets, partial veneer sheets, and veneer strips, making up the layered wood products are inspected and graded in a consistent and accurate manner to have the correct physical characteristics such as physical dimensions, strength, consistent surface texture, and moisture content, combined with the proper application of glue and pressing actions to produce a panel of desired size, strength, thickness, and visual appearance.

The use of veneer, and particularly veneer that has uniform qualities such as consistent surface texture and moisture content, allows layered wood products of various dimensions to be created without milling a board of the desired thickness or dimension from a single log or single piece of lumber. This, in turn, allows for much more efficient use of natural resources. Indeed, without the use of various layered wood technologies, the forests of the planet would have been depleted long ago simply to meet the construction needs of the ever-increasing world population. In addition, since layered wood products are fabricated in a factory under controlled specifications, layered wood products can be manufactured to virtually any dimensions desired, including dimensions such as length, width, and height well beyond dimensions that can be provided by milling from even the largest trees.

The use of veneer layers in some layered wood products can also allow for better structural integrity since any imperfections in a given veneer layer, such as a knot hole, can be mitigated by rotating and/or exchanging layers of veneer so that the imperfection is only one layer deep and is supported by layers of veneer below and above the imperfection in the layered wood product's structure. However, these advantages are again dependent on the veneer layers being accurately and consistently inspected for surface texture, strength, and moisture content and then being accurately and consistently graded, and properly placed in the panel to provide consistent strength by separating defects sufficiently.

As noted, the versatility and potential increased structural integrity and uniformity of layered wood products has resulted in the wide use of these products and there is little question that layered wood products are a critical component of construction worldwide. However, the currently used methods and systems for veneer inspection, grading, and stacking of veneer for use with layered wood products are antiquated and extremely inefficient in terms of the amount and type of equipment required, the amount of factory production space required, the amount of human interaction and coordination required, and the amount of wasted and/or inefficiently used material and human resources.

As one example, in some known prior art systems, veneer grading is performed using line-scan cameras that capture only a small portion of the length of the sheet of veneer. In these systems, a sheet of veneer is moved along a conveyor belt and a series of images are captured by the line-scan camera. Each captured image shows the entire length of the veneer sheet but only a small portion of the width of the sheet. These multiple images are then digitally stitched together lengthwise to form a composite image of the entire veneer sheet and the veneer sheet is graded based on this composite image.

FIG. 1D shows a block diagram of one such line-scan system 100 for grading veneer. A sheet of veneer 102 is moved along conveyor 104 in direction 106 shown by the arrow. In the example of FIG. 1D, the veneer sheet 102 is passed through an anti-skew device 108 on the way to the field of view 110 of a line-scan camera (not shown) to attempt to align the sheet properly before any images are captured.

After the veneer sheet 102 passes through the anti-skew device 108, it passes through the field of view 110 of a line-scan camera (not shown) and a series of snapshots of the veneer sheet are captured by the camera. In order for these multiple images to be formed into a single composite image, the speed of the veneer sheet and the timing of when each image is captured must be accurately managed. In some systems, the camera can be triggered by an encoder driven by the conveyor mechanism that causes each image to be captured after the veneer sheet 102 has moved a certain distance. Any deviations can result in a less accurate composite image being generated.

FIGS. 2A-2C show various example composite images formed from multiple line-scans of a veneer sheet such as veneer sheet 102 of FIG. 1. FIG. 2A shows composite image 200 made up of snapshots 202, 204, 206, 208. In FIG. 2A, the snapshots are properly spaced and aligned and composite image 200 accurately shows the veneer sheet. FIG. 2B shows composite image 210 formed from snapshots 212, 214, 216, 218. FIG. 2B shows what can happen when the veneer sheet slips on the conveyor belt as it moves through the cameras field of view. In this example, the slippage caused the veneer sheet to be in the wrong position when snapshot 214 was taken, thereby presenting an inaccurate composite image when the individual snapshots are spliced together. FIG. 2C shows composite image 220 formed from snapshots 222, 224, 226, 228. In this example, the veneer sheet was misaligned when the images were captured, again resulting in an inaccurate composite image.

As discussed above and illustrated in FIGS. 2B and 2C, this type of prior art system can be error prone and lead to inaccurate images of veneer sheets being taken, which can result in the system improperly grading veneer sheets. In addition, as seen above, the inaccurate images of veneer sheets generated using prior art systems often results in an inability to determine dimensional data, such as length and width, associated with veneer sheets accurately/correctly. As discussed in more detail below, this, in turn can lead to problems when attempting to create and process stacks of veneer because incorrectly stacked veneer represents a safety hazard to the human workers attempting to grade, stack, and transport full veneer sheet and partial veneer sheet stacks using currently employed methods.

In addition, as discussed in more detail below, stacks of veneer created using prior art methods and systems vary in volume, surface area, and quality of the veneer in the stack. Consequently, there is currently no way to accurately determine the volume, surface area, and quality of the veneer in a given stack of veneer created using prior art methods and systems.

In addition to the issues discussed above with respect to grading veneer using prior art line-scan systems, such as line-scan system 100, the methods and systems currently used to process and stack full veneer sheets, strips of veneer, and/or partial veneer sheets for use in the production of layered wood products are also antiquated and extremely inefficient in terms of the amount and type of equipment required, the amount of factory production space required, the amount of human interaction and coordination required, and the amount of wasted and/or inefficiently used material.

As noted, layered wood products, such as plywood, EWP, PLV, and LVL are made of thin layers of veneer. Typically, the veneer is obtained manually from stacks or bins of full veneer sheets, veneer strips, and/or partial veneer sheets. In theory, the veneer sheets making up each of the stacks or bins of veneer should be of consistent grade.

Consequently, ideally, stacks of full veneer sheets, veneer strips, and/or partial veneer sheets should include full veneer sheets, veneer strips, and/or partial veneer sheets, respectfully, that are of the same grade with respect to appearance, moisture levels, surface regularity, and strength. However, as discussed above, prior art line-scan systems, such as line-scan system 100, are often deemed too problematic and inefficient for use with stacking systems. In addition, as discussed above, even if prior art line-scan systems, such as line-scan system 100, were used, the results would be inconsistent and inaccurate.

In the example of plywood, the alternating layers of oriented grain material increase the structural rigidity of the panel. Typically, a first full veneer sheet is obtained from a first full veneer sheet stack of the appropriate grade and one side (top) of the first full veneer sheet is coated with an adhesive, e.g., glue, and then a layer of core material made up of partial veneer sheets is manually obtained from a stack of veneer/bin of partial veneer sheets of the appropriate grade and is placed on the first full veneer sheet. Glue is then applied to the layer of partial veneer sheets and a second full veneer sheet is obtained from a full veneer sheet stack of the appropriate grade and is applied to the layer of partial veneer sheets. The resulting three-ply structure made up of a first full veneer sheet (the first ply), glue, a layer of partial veneer sheets (the second ply), glue, and a second full veneer sheet (the third ply) is referred to as a three-ply "green" panel, with each individual layer of construction, e.g., full veneer sheets, or partial veneer sheets layer, within the panel commonly referred to as a "ply". Typically, plywood panels are made up of multiple plys with three to eleven plys or more being common. Once the green panel is created, there remain additional processes that are required to transform the green panel into a cured, or finished, panel. Typically, the first process downstream is to "pre-press" the green panel product. This is typically performed on a stack of green panels with 12-40 panel stacks being common. The typical pre-press is a single opening press into which the entire stack of green panels is conveyed. The press closes, pressing the green panels between an upper and lower rigid surface. This pressing or "compaction" process is at ambient temperature and ensures all the air gaps between plys in each green panel are eliminated and a quality glue to wood contact is formed throughout the panel. After this pre-pressing action is completed, the resulting "pre-pressed panel" has increased rigidity and the stack of panels is ready for the next process, "Hot Pressing".

The stack of pre-pressed green panels is then conveyed into an unstacking mechanism at the hot press. This mechanism sequentially loads a single pre-pressed green panel from the stack into individual separate heating chambers in the hot press. Essentially sandwiching each pre-pressed green panel between two heated metal plates, commonly referred to as heating platens. When each of the individual heating chambers "Platens" have a pre-pressed green panel loaded, the press closes applying pressure and heat to the pre-pressed green panel. The combination of heat and pressure cures the glue and creates a rigid "cured" panel. In this way a continuous material assembly and processing routine is created.

The production of PLV is similar to plywood production except that cross plies of core material made up of partial veneer sheets is typically not used so that each layer, e.g., ply, of PLV is a full veneer sheet. In this process, a first full veneer sheet is obtained from a first stack of veneer of the appropriate grade and one side (top) of the first full veneer sheet is coated with an adhesive, e.g., glue. Then a second full veneer sheet is obtained from a second stack of veneer of the appropriate grade and glue is applied to the second full veneer sheet. A third full veneer sheet is obtained from a third stack of veneer of the appropriate grade and is applied to the second full veneer sheet. This process is repeated until the desired number of full veneer sheets, e.g., plys, is achieved. The resulting multiple full veneer sheet ply structure is called a PLV panel. As with plywood production, the resulting PLV panel is still a green panel, that must be "pre-pressed" to flatten out the veneer layer components and create the wood to glue bond, and then cured using a "hot press" where both pressure and heat are applied to cure the glue and create a cured panel. As with the plywood example discussed above, multiple green panels are produced, stacked, and sent to the pre-press. Then these pre-pressed panel stacks are sent to the hot press. In this way a continuous material assembly and processing routine is created.

Prior art layered wood product assembly methods and systems use a conveyor to move material progressively past multiple feeder stations where human workers obtain full veneer sheets or partial veneer sheets from stacks of veneer. At the various feeder stations successive layers of full veneer sheets are obtained from full veneer sheet stacks, glue, and partial veneer sheets layers (if required) are obtained from partial veneer sheet stacks to build a panel of a desired number of plys. This system of conveyor, feeder stations, glue applicators, etc. is commonly referred to as a "Layup Line." When the multi-ply panel reaches the end of the layup line, it is discharged to form "green panel stack."

From the layup line the green panel stacks are conveyed, typically by a second conveying system, to a pressing area and pressing stations. Typical plants utilize multiple press lines with two press lines being commonly used for small plants and up to eight press lines in large plants.

As discussed above, in the pressing area, the green veneer panel stacks are conveyed to a single opening pre-press machine center typically utilizing upper and lower platens positioned by mechanical or hydraulic rams to compact the green panel stack, eliminating air between layers of wood, and promoting an even spread of the glue between layers of veneer. After pre-pressing, the now pre-pressed layered wood product stacks are conveyed into an unstacking mechanism which feeds one pre-pressed layered wood product panel at a time from the stack into a multi-opening hot press. Typically, hot presses contain between 12 and 40 individual openings, each of which can process one pre-pressed layered wood product panel. When the hot press is loaded with panels, mechanical or hydraulic systems close the press and heat is applied to cure the glue. It is this combination of heat and pressure that causes the full veneer sheets and/or partial veneer sheets to bond and become cured plywood, PLV, or LVL panels.

As shown above, the production of layered wood products is both material and manpower intensive. Consequently, it is critical to make sure the full veneer sheets, and/or veneer strips, and/or partial veneer sheets used to make the layered wood products are of the proper grade and are stacked so that they can be manipulated and processed without undue damage to the veneer, the machinery involved, and the human workers.

As also discussed above, virtually every form of layered wood product production would benefit greatly from properly graded and uniformly stacked full veneer sheets, and/or veneer strips, and/or partial veneer sheets. However, as noted above, prior art line-scan systems, such as line-scan system 100, are often deemed too problematic and inefficient for use with stacking systems. In addition, as discussed above, even if prior art line-scan systems, such as line-scan system 100, were used, the results would be inconsistent and inaccurate. As a result, using current methods, the stacks of full veneer sheets, and/or veneer strips, and/or partial veneer sheets are typically graded by human workers visually/manually and then stacked, in theory, according to grade by the same human workers. Indeed, using currently available methods and systems, not only are the stacks of veneer created by manual operations, but the workers are also typically tasked with visually and manually grading the full veneer sheets, and/or veneer strips, and/or partial veneer sheets as the stacks of veneer are created. As discussed in detail below, this use of human workers to simultaneously grade and stack veneer represents a weak link in the production chain that often results in virtually ungraded veneer, poorly stacked veneer, wasted, or inefficiently used materials, safety issues, repetitive motion injuries, and worker fatigue/burnout.

FIG. 2D shows a prior art full veneer sheet stacking system 230. Prior art full veneer sheet stacking system 230 includes dryer outfeed 231 where individual full veneer sheets 232 are dropped onto dryer outfeed conveyor 233. Full veneer sheets 232 can be created to almost any size desired. However, as discussed above, in one illustrative example, an average length "Lf" of approximately 102 inches and an average width "Wf" of approximately 54 inches are typical dimensions for each full veneer sheet 232. As will be discussed below, for safety reasons and for production efficiency, the dimensions of the stacks of full veneer sheets 232 to be created should ideally be as close to the dimensions of the individual full veneer sheets 232 as possible. However, as also discussed below, using currently available systems, this is rarely the case.

From dryer outfeed conveyor 233 the individual full veneer sheets 232 pass through moisture meter 234 where the moisture content of the individual full veneer sheets 232 is determined. In some cases, if the moisture content of an individual full veneer sheet 232 is determined to be unacceptable, that specific individual full veneer sheet 232 is so marked by moisture meter 234 and that individual full veneer sheet 232 is processed, or removed from processing, accordingly. In some cases, the moisture level of individual full veneer sheets 232 can be used in part to determine a rough grade of the individual full veneer sheet 232.

From moisture meter 234, the individual full veneer sheets 232 are passed to hand sort conveyor 235. At hand sort conveyor 235, human workers 236 are tasked with creating stacks of veneer 237 of individual full veneer sheets 232. The size of the stacks of veneer 237, e.g., the number of individual full veneer sheets 232 in each stack of veneer 237, is typically predetermined. In some embodiments, the height of the stacks of veneer 237 is typically 38 inches and each stack contains approximately 185 individual sheets or layers.

In operation, as individual full veneer sheets 232 move along hand sort conveyor 235, human workers 236 are tasked with quickly visually grading each full veneer sheet 232 and then manually moving each full veneer sheet 232 into an appropriate one of the stacks of veneer 237. Which one of stacks of veneer 237 to which a given full veneer sheet 232 is moved is, in theory, dependent on the grade the human workers 236 assign to the full veneer sheet 232. For instance, as seen in FIG. 2D, there are, in one specific illustrative example, eight stacks of veneer, e.g., stack of veneer 1 through stack of veneer 8, and each of these stacks of veneer could be associated with a different grade of full veneer sheets 232. Consequently, in theory, human workers 236 must manually and visually examine each full veneer sheet 232 as it moves along hand sort conveyor 235, make a determination as the grade of the full veneer sheet 232, then manually move the full veneer sheet 232 from hand sort conveyor 235 to the appropriate stack of veneer 237.

As might be anticipated, it is extremely difficult for human workers 236 to perform this visual grading of full veneer sheets 232 consistently and accurately for any reasonable amount of time, even under conditions where the speed of hand sort conveyor 235 is very slow. However, since the speed of hand sort conveyor 235 determines the amount of product made, hand sort conveyor 235 is not ideally operating at a very slow speed, in fact, the faster the better from a production standpoint. Consequently, to make this process economically viable, hand sort conveyor 235 typically moves at a speed that virtually ensures no effective or consistent grading of full veneer sheets 232 is actually performed by human workers 236.

In addition, whenever hand sort conveyor 235 is operating at an economically viable speed, it is very difficult for human workers 236 to manually move the full veneer sheets 232 from hand sort conveyor 235 to the appropriate stacks of veneer 237 without damaging the relatively thin and fragile veneer sheets 232 by tearing, folding, or otherwise deforming the individual full veneer sheets 232. This, in turn, often results in damaged product and wasted, or at least non-optimal use of, full veneer sheets 232.

In addition to being given the virtually impossible task of grading and manually moving each full veneer sheet 232 from hand sort conveyor 235 to the appropriate grade stack of veneer without damaging the full veneer sheets 232, using prior art systems and methods human workers 236 are further tasked with adding full veneer sheets 232 to the appropriate stack of veneer 237 in such a way that the dimensions of the stacks of veneer 237 are consistent and that the edges of each stack of veneer are as even as possible. In other words, each individual full veneer sheet 232 should be laid on the appropriate stack of veneer carefully and precisely so that the edges of each full veneer sheet 232 are aligned and the resulting stacks of veneer 237 have relatively even sides with no jagged surfaces or individual full veneer sheet 232 edges extending beyond the edge of the stacks of veneer 237.

This is important for several reasons. First, jagged edges are a safety hazard to human workers 236 and other processing workers (not shown) who can readily be cut or receive splinters by handing or rubbing up against any jagged edges. In addition, transporting stacks of veneer 237 with jagged edges to the production site for the layered wood products, typically via forklift, is also prone to cause further edge damage by contact with the forklift mechanism or downstream production equipment. This handling damage on the misaligned sheets often results in breakage that reduces the dimensions from a full sheet to a strip or partial sheet. In addition, if the stacks of veneer 237 are not well aligned, e.g., they have jagged edges and or misaligned full veneer sheets 232, the stacks of veneer 237 can be unstable and/or unsuitable for use with automated or manual systems down the line, such as feeder stations or layup lines.

While, as noted, it is important and ideal that the edges of each full veneer sheet 232 are aligned and the resulting stacks of veneer 237 have relatively even sides with no jagged surfaces or individual full veneer sheet 232 edges extending beyond the edge of the stacks of veneer 237, given the number of tasks assigned to human workers 236, it is most often the case that the resulting stacks of veneer do include numerous full veneer sheets 232 that are not aligned. Consequently, using prior art methods and systems, the resulting stacks of veneer do not have even sides and therefore do have jagged edges. In addition, the time pressure and repetitive nature of the tasks placed on human workers represents a significant safety issue and a major source of repetitive motion injuries and worker burnout. This, in turn, results in high worker turnaround and often inexperienced human workers on the line.

Referring back to FIG. 2D, prior art full veneer sheet stacking system 230 includes overflow bin 238. In operation, any full veneer sheets 232 that are unacceptable, damaged, or simply were not processed by human workers 236 fast enough, are passed from hand sort conveyor 235 to overflow bin 238 for recycling and/or repurposing.

As discussed above, using prior art full veneer sheet stacking methods and systems, human workers are assigned an unrealistic set of tasks to be performed in an unrealistic amount of time. These include performing visual grading of full veneer sheets 232 as they move along the hand sort conveyor 235, manually moving full veneer sheets 232 from hand sort conveyor 235 to the appropriate stack of veneer 237 associated with the visual and manual grading of the full veneer sheets 232 (without damaging the relatively fragile full veneer sheets 232), and then adding full veneer sheets 232 to the appropriate stack of veneer 237 in such a way that the dimensions of the stacks of veneer 237 are consistent and that the edges of each stack of veneer are as even as possible.

As also discussed above, this is not realistic and the result is that full veneer sheets 232 are inconsistently and/or inaccurately graded, many full veneer sheets 232 are damaged, and the resulting stacks of veneer 237 more often than not include numerous full veneer sheets 232 that are not aligned. Consequently, the resulting stacks of veneer 237 do not have even sides and therefore have jagged edges. In addition, as noted above, the time pressure and repetitive nature of the tasks placed on human workers represents a significant safety issue and a major source of repetitive motion injuries and worker burnout. This, in turn, results in high worker turnaround and often inexperienced human workers on the line.

FIG. 2E shows an ideal full veneer sheet stack 237A and a typical full veneer sheet stack 237B created using prior art full veneer sheet stacking methods and systems. As seen in FIG. 2E ideal full veneer sheet stack 237A has edges 239A that are even and do not fall short of, or extend beyond, the dotted lines E. As noted above, edges 239A result when the veneer sheets 232A making up ideal full veneer sheet stack 237A are lined up evenly along lines E. The result is an ideal full veneer sheet stack 237A of a consistent length dimension equal to the full veneer sheet length "Lf" and a consistent width dimension equal to the full veneer sheet width "Wf," i.e., the situation illustrated in FIG. 2E applies to both length and width dimensions. So, in addition to ideal full veneer sheet stack 237A having edges 239A that are even and do not fall short of, or extend beyond, the dotted lines E, it is also desirable that ideal full veneer sheet stack 237A has edges (not shown in FIG. 2E) at 90 degrees to edges 239A that are even and do not fall short of, or extend beyond, lines similar to dotted lines E (not shown) that are at 90 degrees dotted lines E.

In contrast, typical full veneer sheet stack 237B created using prior art full veneer sheet stacking methods and systems has edges 239B that are uneven and do fall short of, or extend beyond, the dotted lines E. Therefore, using prior art full veneer sheet stacking methods and systems, the result is a full veneer sheet stack 237B of an inconsistent consistent length dimension, i.e., not equal to the full veneer sheet length "Lf" and an in consistent width dimension, i.e., not equal to the full veneer sheet width "Wf." As noted above, edges 239B result when the veneer sheets 232B making up typical full veneer sheet stack 237B created using prior art full veneer sheet stacking methods and systems are not lined up evenly along lines E. As discussed above, this non-alignment occurs for both length and width dimensions and edges. Consequently, typical full veneer sheet stack 237B created using prior art full veneer sheet stacking methods and systems has edges (not shown) perpendicular to edges 239B that are also often uneven and do fall short of, or extend beyond lines (not shown), perpendicular to the dotted lines E, as a result of the veneer sheets 232B making up typical full veneer sheet stack 237B being created using prior art full veneer sheet stacking methods and systems. As noted, full veneer sheet stack 237B of FIG. 2E is typical of the stacks of veneer created using prior art full veneer sheet stacking methods and systems and therefore represents efficiency issues, effectiveness issues, and significant safety issues, as discussed above.

As noted above, irregularly shaped veneer or veneer sheet fractions, such as veneer strip and/or partial veneer sheets, are also used in layer wood product production.

FIG. 2F shows a prior art veneer strip stacking system 240. Prior art veneer strip stacking system 240 includes dryer outfeed 231 where individual veneer strips 241 are dropped onto dryer outfeed conveyor 233. Veneer strips 241, being strips of veneer, can be almost any width (Ws in FIG. 1B). However, veneer strips 241 typically have approximately the same length dimension (Lf of FIGS. 1A and 1B) as a full veneer sheet with around 102 inches being common. As will be discussed below, for safety reasons and for production efficiency, the dimensions of the stacks 243 of veneer strips 241 to be created would ideally be consistent in both height and width dimensions. However, as also discussed below, using currently available systems, this is rarely the case.

From dryer outfeed conveyor 233 the individual veneer strips 241 pass through moisture meter 234 where the moisture content of the individual veneer strips 241 is determined. In some cases, if the moisture content of an individual veneer strip 241 is determined to be unacceptable, that specific individual veneer strip 241 is so marked by moisture meter 234 and that individual veneer strip 241 is processed, or removed from processing, accordingly. In some cases, the moisture level of individual veneer strips 241 can be used to determine a rough grade of the individual veneer strip 241.

From moisture meter 234, the individual veneer strips 241 are passed to hand sort conveyor 235. At hand sort conveyor 235, human workers 236 are tasked with creating stacks of veneer 243 of layered individual veneer strips 241. In some embodiments, the height of the stacks of veneer 243 is typically 38 inches and each stack contain approximately 185 individual veneer strip layers.

In operation, as individual veneer strips 241 move along hand sort conveyor 235, human workers 236 are tasked with quickly visually grading each individual veneer strip 241 and then manually moving each veneer strip 241 into an appropriate one of the stacks of veneer 243. Which one of stacks of veneer 243 to which a given veneer strip 241 is moved is, in theory, dependent on the grade the human workers 236 assign to the veneer strips 241. For instance, as seen in FIG. 2F, there are, in one specific illustrative example, eight stacks of veneer 243, e.g., stack of veneer 1 through stack of veneer 8, and each of these stacks of veneer 243 could be associated with a different grade of veneer strips 241. Consequently, in theory, human workers 236 must manually and visually examine each veneer strip 241 as it moves along hand sort conveyor 235, make a determination as to the grade of the veneer strip 241, then manually move the veneer strip 241 from hand sort conveyor 235 to the appropriate stack of veneer 243.

As can be anticipated, it is extremely difficult, virtually impossible in fact, for human workers 236 to perform this visual grading of veneer strips 241 consistently and accurately for any reasonable amount of time, even under conditions where the speed of hand sort conveyor 235 is very slow. However, since the speed of hand sort conveyor 235 determines the amount of product made, hand sort conveyor 235 is not ideally operating at a very slow speed, in fact, the faster the better from a production standpoint. Consequently, to make this process economically viable, hand sort conveyor 235 typically moves at a speed that virtually ensures no effective or consistent grading of veneer strips 241 is actually performed.

In addition, whenever hand sort conveyor 235 is operating at an economically viable speed, it is very difficult for human workers 236 to manually move the veneer strips 241 from hand sort conveyor 235 to the appropriate stack of veneer 243, without damaging the relatively thin and fragile veneer by tearing, folding, or otherwise deforming the individual veneer strips 241. This, in turn, often results in damaged product and wasted, or at least non-optimal use of veneer strips 241. In addition, as noted above, the time pressure and repetitive nature of the tasks placed on human workers represents a significant safety issue and a major source of repetitive motion injuries and worker burnout. This, in turn, results in high worker turnaround and often inexperienced human workers on the line.

In addition to being given the virtually impossible task of grading and manually moving each veneer strip 241 from hand sort conveyor 235 to the appropriate grade stack of veneer without damaging the veneer strips 241, using prior art systems and methods human workers 236 are further tasked with adding veneer strips 241 to the appropriate stack of veneer 243 in layers in such a way that the dimensions of resulting layers of veneer strips 241 making up the stacks of veneer 243 are consistent and that the edges of each stack of veneer, are as even as possible, and that no bulges are created in the resulting stacks of veneer 243. In other words, each individual veneer strip 241 should be laid on the appropriate stack of veneer carefully and precisely to create a layer of veneer strips 241 that is as uniform as possible so that the edges of each layer of veneer strips 241 are aligned so the resulting stacks of veneer 243 have the desired dimension and relatively even sides with no jagged surfaces or individual veneer strip 241 edges extending beyond the edge of the stacks of veneer 243.

In some cases the ideal stack of veneer, regardless of whether the stack of veneer is a stack of full sheets of veneer, strips of veneer, or partial sheets of veneer, would have the dimensions of a full sheet, in one illustrative example, an average length "Lf" of approximately 102 inches and an average width "Wf" of approximately 54 inches and a height of approximately 38 inches. As will be discussed below, for safety reasons and for production efficiency, the dimensions of the stacks of full veneer sheets 232 to be created should ideally be as close to the dimensions of the individual full veneer sheets 232 as possible. However, as also discussed below, using currently available systems, this is rarely the case.

This is important for several reasons. First, jagged edges are a safety hazard to human workers 236 and other processing workers (not shown) who can readily be cut or receive splinters by handing or rubbing up against any jagged edges. In addition, transporting stacks of veneer 243 with jagged edges to the production site for the layered wood products, typically via forklift, is also prone to cause further edge damage by contact with the forklift mechanism or downstream production equipment. This handling damage on the misaligned sheets often results in breakage that reduces the dimensions from a full sheet to a strip or partial sheet. In addition, if the stacks of veneer 243 are not well aligned, e.g., they have jagged edges and or misaligned veneer strips 241, the stacks of veneer can be unstable and/or unsuitable for use with automated or manual systems such as layup lines.

It is also desirable to stack the layers of individual veneer strips 241 such that any gaps between individual veneer strips 241 in the layers of individual veneer strips 241 are staggered so that no bulges of low and high points are created. If layers with bulges of high and low points are created in stacks of veneer 243 due to repeatedly stacking veneer strips 241 in the same pattern, then the resultant stack of veneer 243 will be unbalanced and potentially dangerous and difficult to process.

As noted, it is important and ideal that the edges of each layer of veneer strips 241 are aligned and the resulting stacks of veneer 243 have relatively even sides with no jagged surfaces or individual veneer strip 241 edges extending beyond the edge of the stacks of veneer 243, and the resulting stacks of veneer 243 are bulge free. However, given the number of tasks assigned to human workers 236 it is most often the case that the resulting stacks of veneer do include numerous layers veneer strips 241 that are not aligned and also have bugles. Consequently, as discussed below, using prior art methods and systems, the resulting stacks of veneer 243 do not have even sides, have jagged edges, and have bulges of high and low points. As also noted above, the issue of jagged edges and bulges applies to both a length and width dimension of stacks of veneer 243. Consequently, ideally, each layer of veneer strips 241 are aligned and the resulting stacks of veneer 243 have relatively even sides and minimal bulging on all four sides of stacks of veneer 243 with no jagged surfaces or individual veneer strip 241 edges extending beyond the edge of the stacks of veneer 243, and the resulting stacks of veneer 243 are bulge free.

Referring back to FIG. 2F, prior art veneer strip stacking system 240 includes overflow bin 238. In operation, any veneer strips 241 that are unacceptable, damaged, or simply were not processed by human workers 236 fast enough, are passed from hand sort conveyor 235 to overflow bin 238 for recycling and/or repurposing.

As discussed above, using prior art veneer strip stacking methods and systems, human workers are assigned an unrealistic set of tasks to be performed in an unrealistic amount of time. These include performing visual grading of veneer strips 241 as they move along the hand sort conveyor 235, manually moving veneer strips 241 from hand sort conveyor 235 to the stack of veneer 243 associated with the visual and manual grading of the veneer strips 241 (without damaging the relatively fragile veneer strips 241), and then adding veneer strips 241 to the appropriate stack of veneer 243 in layers in such a way that the dimensions of the stacks of veneer 243 are consistent, that the edges of each stack of veneer 243 are as even as possible, and the resulting stacks of veneer are bulge free.

As also discussed above, this is not realistic and the result is that veneer strips 241 are inconsistently and/or inaccurately graded, many veneer strips 241 are damaged, and the resulting stacks of veneer 243 more often than not do include numerous veneer strips 241 that are not aligned and the stacks of veneer 243, do not have even sides, have jagged edges, and have bulges. In addition, as noted above, the time pressure and repetitive nature of the tasks placed on human workers represents a significant safety issue and a major source of repetitive motion injuries and worker burnout. This, in turn, results in high worker turnaround and often inexperienced human workers on the line.

FIG. 2H shows an ideal veneer strip stack 243A and a typical veneer strip stack 243B created using prior art veneer strip stacking methods and systems. As seen in FIG. 2H ideal veneer strip stack 243A has edges 249A that are even and do not fall short of, or extend beyond, the dotted lines E. Consequently, in one embodiment, ideal veneer strip stack 243A has a length dimension approximately equal to full veneer sheet length Lf and a width dimension approximately equal to full veneer sheet width Wf. As noted above, edges 249A result when the layers 242B of veneer sheets 241A making up ideal veneer strip stack 243A are lined up evenly along lines E to a stack width approximately equal the full veneer sheet width Wf of FIG. 1A and a stack length approximately equal the full veneer sheet length Lf of FIG. 1A. In addition, in ideal veneer strip stack 243A any gaps in the layers 242B alternate. When any gaps in the layers 242A alternate as in ideal veneer strip stack 243A, the result is a relatively even top surface 245A as evidenced by line T and no stack of veneer bulges.

In contrast, typical veneer strip stack 243B created using prior art veneer strip stacking methods and systems has edges 249B that are uneven and do extend short of, and beyond the dotted lines E. Consequently, in one embodiment, typical veneer strip stack 243B does not have a consistent length dimension, e.g., not approximately equal to full veneer sheet length Lf, nor a consistent width dimension, e.g., not approximately equal to full veneer sheet width Wf. As noted above, edges 249B result when the veneer sheet layers 242B making up typical veneer strip stack 243B created using prior art veneer strip stacking methods and systems are not lined up evenly along lines E. In addition, in typical veneer strip stack 243B created using prior art veneer strip stacking methods and systems, gaps in the layers 242B do not alternate and there is a material buildup in the stack of veneer creating a bulge. The result is a relatively uneven and bulged top surface 245B as evidenced by line T.

As also noted above, the issue of jagged edges and bulges applies to both a length and width dimension of stack of veneer 243B. Consequently, typical veneer strip stack 243B created using prior art veneer strip stacking methods and systems typically has edges (not shown) perpendicular to edges 249B that are uneven and do extend short of, and beyond the lines (not shown) perpendicular to lines E. As noted, stack of veneer 243B of FIG. 2H is typical of the stacks of veneer created using prior art veneer strip stacking methods and systems and therefore represents efficiency issues, effectiveness issues, and significant safety issues as discussed above.

FIG. 2I shows a prior art partial veneer sheet stacking system 260. Prior art partial veneer sheet stacking system 260 includes dryer outfeed 231 where individual partial veneer sheets 261 are dropped onto dryer outfeed conveyor 233. Partial veneer sheets 261, being partial sheets of veneer, can be almost any width (Wp in FIG. 1C). However, having been sawn as discussed above, partial veneer sheets 261 typically have approximately the same length dimension (Lp of FIG. 1C) that is different from length Lf of a full veneer sheet with around 51 inches being common. As will be discussed below, for safety reasons and for production efficiency, the dimensions of the stacks 263 of partial veneer sheets 261 to be created would ideally be consistent in both height, length, and width dimensions. In some cases the ideal stack of veneer, regardless of whether the stack of veneer is a stack of full sheets of veneer, strips of veneer, or partial sheets of veneer, would have the dimensions of a full sheet, in one illustrative example, an average length "Lf" of approximately 102 inches and an average width "Wf" of approximately 54 inches and a height of approximately 38 inches. This is not only important for safety reasons but is also critical for the proper storage and/or processing of the veneer stacks.

From dryer outfeed conveyor 233 the individual partial veneer sheets 261 pass through moisture meter 234 where the moisture content of the individual partial veneer sheets 261 is determined. In some cases, if the moisture content of an individual partial veneer sheet 261 is determined to be unacceptable, that specific individual partial veneer sheet 261 is so marked by moisture meter 234 and that individual partial veneer sheet 261 is processed, or removed from processing, accordingly. In some cases, the moisture level of individual partial veneer sheets 261 can be used to determine a rough grade of the individual partial veneer sheet 261.

From moisture meter 234, the individual partial veneer sheets 261 are passed to hand sort conveyor 235. At hand sort conveyor 235, human workers 236 are tasked with creating stacks of veneer 263 of layered individual partial veneer sheets 261. In some embodiments, the height of the stacks of veneer 263 is typically 38 inches and each stack contains approximately 185 individual partial veneer sheet layers.

In operation, as individual partial veneer sheets 261 move along hand sort conveyor 235, human workers 236 are tasked with quickly visually grading each individual partial veneer sheet 261 and then manually moving each partial veneer sheet 261 into an appropriate one of the stacks of veneer 263. Which one of stacks of veneer 263 to which a given partial veneer sheet 261 is moved is, in theory, dependent on the grade the human workers 236 assign to the partial veneer sheets 261. For instance, as seen in FIG. 2I, there are, in one specific illustrative example, eight stacks of veneer 263, e.g., stack of veneer 1 through stack of veneer 8, and each of these stacks of veneer 263 could be associated with a different grade of partial veneer sheets 261. Consequently, in theory, human workers 236 must manually and visually examine each partial veneer sheet 261 as it moves along hand sort conveyor 235, make a determination as to the grade of the partial veneer sheet 261, then manually move the partial veneer sheet 261 from hand sort conveyor 235 to the appropriate stack of veneer 263.

As can be anticipated, it is extremely difficult, virtually impossible in fact, for human workers 236 to perform this visual grading of partial veneer sheets 261 consistently and accurately for any reasonable amount of time, even under conditions where the speed of hand sort conveyor 235 is very slow. However, since the speed of hand sort conveyor 235 determines the amount of product made, hand sort conveyor 235 is not ideally operating at a very slow speed, in fact, the faster the better from a production standpoint. Consequently, to make this process economically viable, hand sort conveyor 235 typically moves at a speed that virtually ensures no effective or consistent grading of partial veneer sheets 261 is actually performed.

In addition, whenever hand sort conveyor 235 is operating at an economically viable speed, it is very difficult for human workers 236 to manually move the partial veneer sheets 261 from hand sort conveyor 235 to the appropriate stack of veneer 263, without damaging the relatively thin and fragile veneer by tearing, folding, or otherwise deforming the individual partial veneer sheets 261. This, in turn, often results in damaged product and wasted, or at least non-optimal use of, partial veneer sheets 261. In addition, as noted above, the time pressure and repetitive nature of the tasks placed on human workers represents a significant safety issue and a major source of repetitive motion injuries and worker burnout. This, in turn, results in high worker turnaround and often inexperienced human workers on the line.

In addition to being given the virtually impossible task of grading and manually moving each partial veneer sheet 261 from hand sort conveyor 235 to the appropriate grade stack of veneer without damaging the partial veneer sheets 261, using prior art systems and methods human workers 236 are further tasked with adding partial veneer sheets 261 to the appropriate stack of veneer 263 in layers in such a way that the dimensions of resulting layers of partial veneer sheets 261 making up the stacks of veneer 263 are consistent and that the edges of each stack of veneer, are as even as possible, and that no bulges are created in the resulting stacks of veneer 263. In other words, each individual partial veneer sheet 261 should be laid on the appropriate stack of veneer carefully and precisely to create a layer of partial veneer sheets 261 that is as uniform as possible so that the edges of each layer of partial veneer sheets 261 are aligned so the resulting stacks of veneer 263 have the desired dimension and relatively even sides with no jagged surfaces or individual partial veneer sheet 261 edges extending beyond the edge of the stacks of veneer 263.

This is important for several reasons. First, jagged edges are a safety hazard to human workers 236 and other processing workers (not shown) who can readily be cut or receive splinters by handing or rubbing up against any jagged edges. In addition, transporting stacks of veneer 263 with jagged edges to the production site for the layered wood products, typically via forklift, is also prone to cause further edge damage by contact with the forklift mechanism or downstream production equipment. This handling damage on the misaligned sheets often results in breakage that reduces the dimensions from a full sheet to a strip or partial sheet. In addition, if the stacks of veneer 263 are not well aligned, e.g., they have jagged edges and or misaligned partial veneer sheets 261, the stacks of veneer can be unstable and/or unsuitable for use with automated or manual systems such as layup lines.

It is also desirable to stack the layers of individual partial veneer sheets 261 such that any gaps between individual partial veneer sheets 261 in the layers of individual partial veneer sheets 261 are staggered so that no bulges of low and high points are created. If layers with bulges of high and low points are created in stacks of veneer 263 due to repeatedly stacking partial veneer sheets 261 in the same pattern, then the resultant stack of veneer 263 will be unbalanced and potentially dangerous and difficult to process.

As noted, it is important and ideal that the edges of each layer of partial veneer sheets 261 are aligned and the resulting stacks of veneer 263 have relatively even sides with no jagged surfaces or individual partial veneer sheet 261 edges extending beyond the edge of the stacks of veneer 263, and the resulting stacks of veneer 263 are bulge free. However, given the number of tasks assigned to human workers 236 it is most often the case that the resulting stacks of veneer do include numerous layers of partial veneer sheets 261 that are not aligned and also have bugles. Consequently, as discussed below, using prior art methods and systems, the resulting stacks of veneer 263 do not have even sides, have jagged edges, and have bulges of high and low points. As also noted above, the issue of jagged edges and bulges applies to both a length and width dimension of stacks of veneer 263. Consequently, ideally, each layer of partial veneer sheets 261 are aligned and the resulting stacks of veneer 263 have relatively even sides and minimal bulging on all four sides of stacks of veneer 263 with no jagged surfaces or individual partial veneer sheet 261 edges extending beyond the edge of the stacks of veneer 263, and the resulting stacks of veneer 263 are bulge free.

As also seen in FIG. 2I, prior art partial veneer sheet stacking system 260 includes overflow bin 238. In operation, any partial veneer sheets 261 that are unacceptable, damaged, or simply were not processed by human workers 236 fast enough, are passed from hand sort conveyor 235 to overflow bin 238 for recycling and/or repurposing.

As discussed above, using prior art partial veneer sheet stacking methods and systems, human workers are assigned an unrealistic set of tasks to be performed in an unrealistic amount of time. These include performing visual grading of partial veneer sheets 261 as they move along the hand sort conveyor 235, manually moving partial veneer sheets 261 from hand sort conveyor 235 to the stack of veneer 263 associated with the visual and manual grading of the partial veneer sheets 261 (without damaging the relatively fragile partial veneer sheets 261), and then adding partial veneer sheets 261 to the appropriate stack of veneer 263 in layers in such a way that the dimensions of the stacks of veneer 263 are consistent, that the edges of each stack of veneer 263 are as even as possible, and the resulting stacks of veneer are bulge free.

As also discussed above, this is not realistic and the result is that partial veneer sheets 261 are inconsistently and/or inaccurately graded, many partial veneer sheets 261 are damaged, and the resulting stacks of veneer 263 more often than not do include numerous partial veneer sheets 261 that are not aligned and the stacks of veneer 263, do not have even sides, have jagged edges, and have bulges. In addition, as noted above, the time pressure and repetitive nature of the tasks placed on human workers represents a significant safety issue and a major source of repetitive motion injuries and worker burnout. This, in turn, results in high worker turnaround and often inexperienced human workers on the line.

FIG. 2J shows an ideal partial veneer sheet stack 263A and a typical partial veneer sheet stack 263B created using prior art partial veneer sheet stacking methods and systems. As seen in FIG. 2J, ideal partial veneer sheet stack 263A has edges 269A that are even and do not fall short of, or extend beyond, the dotted lines E. Consequently, in one embodiment, ideal partial veneer sheet stack 263A has a length dimension approximately equal to sawn partial veneer sheet length Lp and a width dimension Wp. As noted above, edges 269A result when the layers 262B of veneer sheets 261A making up ideal partial veneer sheet stack 263A are lined up evenly along lines E to a stack width approximately equal the full veneer sheet width Wf of FIG. 1A and a stack length approximately equal the partial veneer sheet length Lp of FIG. 1C. In addition, in ideal partial veneer sheet stack 263A any gaps in the layers 262B alternate. When any gaps in the layers 262A alternate as in ideal partial veneer sheet stack 263A, the result is a relatively even top surface 265A as evidenced by line T and no stack of veneer bulges.

In contrast, typical partial veneer sheet stack 263B created using prior art partial veneer sheet stacking methods and systems has edges 269B that are uneven and do extend beyond and/or fall short of, the dotted lines E. Consequently, in one embodiment, typical partial veneer sheet stack 263B does not have a consistent length dimension, e.g., not approximately equal to sawn partial veneer sheet length Lp, nor a consistent width dimension Wp. As noted above, edges 269B result when the veneer sheet layers 262B making up typical partial veneer sheet stack 263B created using prior art partial veneer sheet stacking methods and systems are not lined up evenly along lines E. In addition, in typical partial veneer sheet stack 263B created using prior art partial veneer sheet stacking methods and systems, gaps in the layers 262B do not alternate and there is a material buildup in the stack of veneer creating a bulge. The result is a relatively uneven and bulged top surface 265B as evidenced by line T.

As also noted above, the issue of jagged edges and bulges applies to both a length and width dimension of stack of veneer 263B. Consequently, typical partial veneer sheet stack 263B created using prior art partial veneer sheet stacking methods and systems typically has edges (not shown) perpendicular to edges 269B that are uneven and do extend short of, and beyond the lines (not shown) perpendicular to lines E. As noted, stack of veneer 263B of FIG. 2J is typical of the stacks of veneer created using prior art partial veneer sheet stacking methods and systems and therefore represents efficiency issues, effectiveness issues, and significant safety issues as discussed above.

As discussed above, prior art full veneer sheet, veneer strip, and partial veneer sheet stacking methods and systems suffer from several serious drawbacks. For instance, using prior art methods and systems for producing layered wood products, the quality of veneer fed into process is often not efficiently and effectively inspected and graded during the stacking of veneer operation. Therefore, undetected defects can cause products created using the stacks of veneer to be rejected downstream after significant time and energy has already been devoted to the panels, e.g., pressing is complete and panel quality is analyzed.

In addition, as noted above and discussed in more detail below, even if prior art inspection and grading systems, such as prior art line-scan systems, were employed, prior art inspection and grading systems can be error prone and lead to inaccurate images of veneer sheets being taken, which can result in the system improperly grading veneer sheets.

In addition, using prior art full veneer sheet stacking methods and systems, human workers are assigned an unrealistic set of tasks to be performed in an unrealistic amount of time. These include performing visual grading of full veneer sheets as they move along the hand sort conveyor, manually moving full veneer sheets from hand sort conveyor to the stack of veneer associated with the visual and manual grading of the full veneer sheets, without damaging the relatively fragile full veneer sheets, and then adding full veneer sheets to the appropriate stack of veneer in such a way that the dimensions of the stacks of veneer are consistent and that the edges of each stack of veneer are as even as possible.

This is not realistic, and the result is that full veneer sheets are inconsistently and/or inaccurately graded, many full veneer sheets are damaged, and the resulting stacks of veneer, more often than not, do include numerous full veneer sheets that are not aligned so the stacks of veneer do not have the desired dimensions, do not have even sides, and do have jagged edges. In addition, as noted above, the time pressure and repetitive nature of the tasks placed on human workers represents a significant safety issue and a major source of repetitive motion injuries and worker burnout. This, in turn, results in high worker turnaround and often inexperienced human workers on the line.

Similarly, using prior art veneer strip and partial veneer sheet stacking methods and systems, human workers are assigned an unrealistic set of tasks to be performed in an unrealistic amount of time. These include performing visual grading of veneer strips and/or partial veneer sheets as they move along the hand sort conveyor, manually moving veneer strips and/or partial veneer sheets from hand sort conveyor to the stack of veneer associated with the visual and manual grading of the veneer strips and/or partial veneer sheets, without damaging the relatively fragile veneer strips and/or partial veneer sheets, and then adding veneer strips and/or partial veneer sheets to the appropriate stack of veneer in layers in such a way that the dimensions of the stacks of veneer are consistent, that the edges of each stack of veneer are as even as possible, and that the stack of veneer is bulge free.

This is also not realistic, and the result is that veneer strips and/or partial veneer sheets are inconsistently and/or inaccurately graded, many veneer strips and/or partial veneer sheets are damaged, and the resulting stacks of veneer, more often than not, do include numerous veneer strips and/or partial veneer sheets that are not aligned, the stacks of veneer do not have the desired dimensions or even sides, and do have jagged edges, and the stacks of veneer have bulges of low and high spots. In addition, as noted above, the time pressure and repetitive nature of the tasks placed on human workers represents a significant safety issue and a major source of repetitive motion injuries and worker burnout. This, in turn, results in high worker turnaround and often inexperienced human workers on the line.

As shown above, stacks of full veneer sheets, veneer strips, and/or partial veneer sheets, herein collectively referred to as "stacks of veneer" or "veneer stacks" are an important part of layered wood product production, as well as virtually every form of engineered wood products. This is because stacks of veneer are sold and/or are used at production line locations to create numerous wood products.

For instance, stacks of veneer, such as stacks of veneer 237, 237A, 237B, 243, 243A, 243B, 263, 263A, and 263B are created and then used as a convenient and efficient way to move large amounts of veneer to locations where the veneer is needed, e.g., to various locations as needed on a layered wood product production line.

In addition, stacks of veneer are an efficient way to store large amount of veneer until the veneer is needed or sold. Veneer is also typically sold to third parties in stacks of veneer and then the purchased stacks are shipped and stored as stacks of veneer by the buyer for future use in the production of various layered wood products.

Typically, once a stack of veneer is created, it is either sent directly to production, and/or is stored for future use, and/or is sold as a stack of veneer, and/or is transported to a desired location. When the stack of veneer is to be used for layered wood product production, the stacks of veneer are brought to the layered wood product production line location and the veneer layers making up the stack of veneer are removed from the stack of veneer as needed; i.e., the stack of veneer is unstacked layer-by-layer as needed.

A significant long standing issue with stacks of veneer created using prior art methods is that the quality and quantity of veneer making up the stacks of veneer is typically not accurately known and varies considerably from stack to stack. This is because, using prior art methods of stacking and unstacking veneer, there is no accurate method used for determining the dimensions and grade/quality of the veneer in the stack, nor is data available indicating exactly how the veneer was stacked, i.e., what size and type of veneer makes up each individual layer of veneer in the stack and its orientation, how the veneer is oriented in the stack, or the location of the veneer in the stack.

As discussed, the use of stacks of veneer, and the stacking and unstacking of veneer in a stack form, is critical to the efficient use of the veneer and virtually every type of layered wood product production. However, despite the many uses for stacks of veneer, and the fact that stacks of veneer are critical components to the storage, sale, and use of veneer, stacks of veneer are typically created by the same manual processes that have been used for decades. As a result, stacking of veneer and unstacking of veneer is currently very labor intensive, highly inefficient, a potential danger to workers handling the layers of veneer making up the stack of veneer, and extremely inconsistent both in terms of the quality of the veneer layers making up the stack and the quantity of veneer in a given stack. Consequently, it is nearly impossible to determine the volume, surface area, or quality of stacks of veneer created using prior art methods and systems.

In addition, there are currently no methods or systems for knowing where a given layer or piece of veneer is located in the stack or the orientation of that piece of veneer. This makes unstacking of a veneer stack, and the use of individual layer of veneer somewhat random and inefficient.

Ideally, a given stack of veneer should have the same volume and/or surface area of veneer contained in the stack. However, given the largely manual methods currently used to create stacks of veneer, there is no effective way to efficiently control the quality or quantity of veneer in a given stack of veneer, much less create stacks of veneer of consistent quality, volume, or surface area. Consequently, the quality, volume of veneer, and surface area of veneer contained in prior art stacks of veneer is largely unknown until the stack of veneer is unstacked.

The inability to accurately determine the quality and/or quantity of veneer in prior art stacks of veneer creates several significant issues. First, a user of a stack of veneer created using prior art methods and systems does not know the quality or quantity of the veneer in a that stack. Thus, it is virtually impossible to ensure a given layer of veneer in the stack of veneer is put to the best, i.e., most cost effective use.

In addition, for stacks of irregularly shaped veneer or veneer sheet fractions, there is currently no way to accurately know the volume or surface area of the veneer making up a prior art stack of veneer. Consequently, it is typically unknown how many layers of veneer are in a given stack and the composition of those layers. Thus, there is no way to accurately determine how many stacks of veneer will be needed or when a new stack will be needed on the production line. This clearly results in inefficient inventory, inefficient use of veneer, inefficient use of production floor area since extra stacks of veneer must often be placed in the production area before they are needed to ensure production is not interrupted.

In addition, using prior art stacking of veneer and unstacking of veneer methods, when stacks of veneer are stored, the actual quantity and quality of the veneer stored is again not known. This again results in inefficient inventory processes, inefficient use of veneer, and inefficient production line operations.

In addition, using prior art stacking of veneer and unstacking of veneer methods, a buyer of a stack of veneer does not know to any reasonable degree of certainty the quality or amount of veneer that is included in the stack, nor the actual volume and surface area of veneer included in a stack of veneer. This not only results in inefficient use of veneer and inefficient production line operations, but it also precludes fair and efficient pricing of the stacks of veneer. This is particularly true for stacks of irregularly shaped veneer or veneer sheet fractions.

It would be highly desirable to automate both the stacking and unstacking processes for stacks of veneer. This is would most readily accomplish using robots, e.g., robotic arms and control systems. However, the potential automation of the stacking of veneer and unstacking of veneer presents several challenges.

As one example, when the stacks of veneer are stacks of irregularly shaped veneer or veneer sheet fractions, e.g., stacks of veneer strips and/or partial veneer sheets, such as stacks of veneer 243, 243A, 243B, 263, 263A, and 263B, discussed above with respect to FIGS. 2H and 2J, it is very important to correctly identify the top piece of veneer so that the top piece can be removed first. If an attempt to remove the wrong piece of veneer, i.e., not the top of stack veneer sheet fraction, or layer, is made, then veneer that is above the wrongly selected "top" piece will be displaced and likely damaged and/or lost from the stack of veneer.

This problem arises because the irregularly shaped veneer or veneer sheet fractions, e.g., layers of veneer strips and/or partial veneer sheets, can overlap one another so that identifying the "top" layer or veneer sheet fraction is very difficult, especially at typical production line speeds. As a result, in order to identify the correct "top" of stack veneer sheet fraction the production line must be significantly slowed down. However, even then, identifying the correct top of stack veneer sheet fraction requires a very good human eye and significant steady concentration.

Since slowing down the production line to the level needed to consistently identify the correct top veneer sheet fraction is economically inefficient and relying on consistent worker attention to detail and excellent eyesight is not realistic in the long term, there is currently considerable wasted veneer in the largely manual prior art unstacking process.

Attempts have been made to automate the stack of veneer unstacking process using visual systems and robotic systems such as robotic arms. However, using currently available imaging systems the needed level of accuracy and resolution to ensure the top of stack veneer sheet fraction, or layer, is consistently correctly identified is lacking. Consequently, the robotic systems cannot be accurately controlled, and the result is all too often incorrect identification of the top of stack veneer sheet fraction, or layer, which, in turn, results in unacceptable levels of damaged veneer and waste.

Referring back to FIG. 2J, FIG. 2J shows an ideal stack of irregularly shaped veneer or veneer sheet fractions, in this example, a stack of partial veneer sheets, i.e., ideal partial veneer sheet stack 263A.

However, as shown in FIG. 2K, partial veneer sheet stack 263A includes gaps, such as exemplary gaps 270A, 270, between the partial veneer sheets making up in the layers 262A. As seen in FIG. 2K, top layer, or top of stack layer 262T includes partial veneer sheet 271, partial veneer sheet 273, and partial veneer sheet 275.

Referring now to FIG. 2L, shown is partial veneer sheet stack 263A after partial veneer sheet 271 has been removed during the unstacking process. As seen in FIG. 2L, top of stack layer 262T now includes only partial veneer sheet 273 and partial veneer sheet 275 with gap 270N now between partial veneer sheet 273 and partial veneer sheet 275.

As shown in FIG. 2L, with partial veneer sheet 271 having been removed, gap 270N exposes portion 283P of partial veneer sheet 283 and portion 285P of partial veneer sheet 285. In addition, the combination of gaps 270N and 270A also exposes portion 295P of partial veneer sheet 295.

The problem arises when a robotic arm, or other automated unstacking system, and even when manual system, i.e., humans, are used to unstack. This is because, using 2D imaging systems, and often also the human eye, portion 283P of partial veneer sheet 283, or portion 285P of partial veneer sheet 285, or even portion 295P of partial veneer sheet 295 can incorrectly identified as being the top of the stack, i.e., the top of stack partial veneer sheet. This occurs quite often since veneer is typically very thin.

FIG. 2M shows what would happen if portion 283P of partial veneer sheet 283 were incorrectly identified as the top of the stack, i.e., partial veneer sheet 283 was incorrectly identified as the top of the stack partial veneer sheet and was selected for removal by a robotic arm 290. As can be seen in FIG. 2M, if partial veneer sheet 283 is incorrectly identified as the top of the stack partial veneer sheet, when robotic arm 290 attempts to remove partial veneer sheet 283 at portion 283P, partial veneer sheet 273, which actually sits above partial veneer sheet 283 is displaced and falls off of partial veneer sheet stack 263A, this typically results in damage and/or loss of partial veneer sheet 273.

Similarly, FIG. 2N shows what would happen if portion 285P of partial veneer sheet 285 were incorrectly identified as the top of the stack, i.e., partial veneer sheet 285 was incorrectly identified as the top of the stack partial veneer sheet and was selected for removal by a robotic arm 290. As can be seen in FIG. 2N, if partial veneer sheet 285 is incorrectly identified as the top of the stack partial veneer sheet, when robotic arm 290 attempts to remove partial veneer sheet 285 at portion 285P, partial veneer sheet 275, which actually sits above partial veneer sheet 285 is displaced and falls off of partial veneer sheet stack 263A. This typically results in damage and/or loss of partial veneer sheet 275.

FIG. 2O shows what would happen if portion 295P of partial veneer sheet 295 were incorrectly identified as the top of the stack, i.e., partial veneer sheet 295 was incorrectly identified as the top of the stack partial veneer sheet and was selected for removal by a robotic arm 290. As can be seen in FIG. 2O, if partial veneer sheet 295 is incorrectly identified as the top of the stack partial veneer sheet, when robotic arm 290 attempts to remove partial veneer sheet 295 at portion 295P, partial veneer sheet 273 and partial veneer sheet 275, which actually sit above partial veneer sheet 295 are displaced and fall off of partial veneer sheet stack 263A. This typically results in damage and/or loss of both partial veneer sheets 273 and 275.

As noted above, and as seen in FIGS. 2K, 2L, 2M, 2N, and 2O, identifying the "top" layer or veneer sheet fraction is critical to avoid damaging and wasting veneer. However, currently available unstacking methods and systems, such as prior art manual and visual/2D imaging systems, do not provide the accuracy or resolution necessary to address the problem.

In the illustration above, an ideal partial veneer sheet stack 263A was used to illustrate the top layer or top veneer sheet fraction identification problem using prior art methods and systems. However, the problem exists for any stack of irregular veneer sheets or veneer sheet fractions. As a specific example, the same issues arise when unstacking stacks of veneer strips such as 243, 243A, 243B, of FIG. 2H, or any irregularly sized veneer stacks. Only when the stack of veneer is a stack of full veneer sheets is the identification of the top sheet not typically an issue.

In addition, in the discussion above, FIGS. 2K, 2L, 2M, 2N, and 2O, illustrated the problem for an "ideal" partial veneer sheet stack 263A. In reality, the situation is even more difficult, i.e., it is even harder to identify the top layer or veneer sheet fraction in an actual stack of veneer such as stacks of veneer 243B of FIG. 2H or 263B of FIG. 2J. In these more realistic situations, even more veneer is typically damaged or lost.

In addition to the top veneer sheet fraction identification problem, when layers of irregularly shaped veneer or veneer sheet fractions are being unstacked using robots, it is important that the robotic arm picks up the veneer sheet fraction as close to the center of mass as possible. This distributes the weight of the irregularly shaped veneer or veneer sheet fractions evenly to avoid breaking and/or dropping the irregularly shaped veneer or veneer sheet fractions. However, when the stacks of veneer are stacks of irregularly shaped veneer or veneer sheet fractions, the dimensions of the various piece or layers of veneer varies significantly from piece to piece and layer to layer. Currently, there is no method or system to accurately determine the dimensions and/or orientation of the various irregularly shaped veneer or veneer sheet fractions.

The problem arises from the fact that currently the dimensions and orientation of the veneer sheet fractions is neither accurately determined due to the limitations of currently available imaging systems; nor is any dimension and/or orientation data regarding any specific veneer sheet fractions obtained and/or recorded. Thus, the robotic systems cannot be accurately controlled, and the result is all too often unacceptable levels of damaged veneer and waste.

As a result of the issues discussed above, prior art full veneer sheet, veneer strip, and partial veneer sheet stacking and unstacking methods and systems still require significant human interaction with complicated machines and significant human manipulation of veneer. This results in numerous injuries including significant splinter injuries, machine injuries, repetitive motion injuries, worker fatigue, and worker burnout. As a result, the turnover of human workers employed in the prior art stacking of veneer and unstacking processes is very high. This means significant worker turnaround and large numbers of inexperienced workers on the line at any given time. This further adds to the potential for injury and wasted/underutilized resources.

What is needed is a method and system for creating stacks of veneer, and unstacking stacks of veneer, that addresses the shortcoming of prior art methods and systems. In particular, what is needed is a technical solution to the long standing technical problem of accurately tracking and identifying the contents, composition, orientation, and location, e.g., quantity, quality, and position of veneer in a given stack of veneer.

What is also needed is a technical solution to the long standing technical problem of identifying the top of stack veneer sheet fraction, or layer, in a stack of irregularly shaped veneer or veneer sheet fractions.

SUMMARY

Embodiments of the present disclosure provide an effective and efficient technical solution to the long-standing technical problem of providing a method and system for stacking of veneer and unstacking of veneer that includes improved veneer scanning, grading, stacking, and tracking methods to produce more detailed information regarding stacks of veneer, more reliable stacking of veneer and unstacking of veneer, that is more efficient to operate and is far safer than currently available methods and systems for stacking of veneer and unstacking of veneer.

In particular, some embodiments of the present disclosure provide an effective and efficient technical solution to the long-standing technical problem of identifying and tracking the contents/composition of a given stack of veneer during the stacking of veneer process so that the quality and/or quantity of the veneer in the stack can be accurately determined, recorded, and correlated to the stack of veneer so created.

In one embodiment, a veneer stacking system includes a veneer analysis system for veneer inspection, the veneer analysis system including one or more imaging systems, the one or more imaging systems capturing one or more images of the individual veneer portions and generating dimensions data for each individual veneer portion.

In one embodiment, a veneer stacking system includes a veneer data collection and storage system, the veneer data collection and storage system receiving the dimensions data for each individual veneer portion, the veneer data collection and storage system correlating the dimensions data for each individual veneer portion with that individual veneer portion and storing the dimensions data for each individual veneer portion.

In one embodiment, a veneer stacking system includes a robot control system, the robot control system receiving the dimensions data for each individual veneer portion, the robot control system generating robot control signal data representing robot control signals based, at least in part, on the dimensions data for each individual veneer portion.

In one embodiment, a veneer stacking system includes at least one veneer stacking robot, the at least one veneer stacking robot receiving the robot control signals and, in response to the robot control signals, placing each individual veneer portion onto a stack of individual veneer portions.

In one embodiment, as each individual veneer portion is moved onto the stack of individual veneer portions, location data indicating the location and orientation of each individual veneer portion is collected by the veneer data collection and storage system, the veneer data collection and storage system then correlates and stores the dimensions data and the location data for each individual veneer portion moved onto the stack of individual veneer portions.

In one embodiment, when the stack of individual veneer portions is completed, the veneer data collection and storage system collects the dimensions data and the location data for each individual veneer portion moved onto the stack of individual veneer portions to generate stack profile data for the stack of individual veneer portions, the stack profile data including data indicating the dimensions data and the location data for each individual veneer portion included in the stack of individual veneer portions.

In one embodiment, a veneer stacking system includes a stack identifier mechanism, the stack identifier mechanism being assigned to the stack of individual veneer portions associating the stack profile data for the stack of individual veneer portions with the stack of individual veneer portions.

In one embodiment, the individual veneer portions are veneer strips.

In one embodiment the individual veneer portions are partial sheets of veneer.

In one embodiment the stack identifier mechanism is selected from the group of stack identifier mechanisms including a UPC code on the stack of individual veneer portions, a printed UPC code attached to the stack of individual veneer portions, a UPC code on a pallet holding the stack of individual veneer portions, an RFID tag on the stack of individual veneer portions, an RFID tag in the stack of individual veneer portions, an RFID tag on a pallet holding the stack of individual veneer portions, a visual identifier on the stack of individual veneer portions, a printed visual identifier on the stack of individual veneer portions, and a visual identifier on a pallet holding the stack of individual veneer portions.

In one embodiment, the veneer analysis system is a veneer analysis system for veneer inspection and grading, the veneer analysis system including one or more imaging systems, the one or more imaging systems capturing one or more images of the individual veneer portions and generating dimensions data and quality data for each individual veneer portion.

In one embodiment, the veneer data collection and storage system receives dimensions data and quality data for each individual veneer portion, the veneer data collection and storage system correlating the dimensions data and quality data for each individual veneer portion with that individual veneer portion and storing the dimensions data and quality data for each individual veneer portion.

In one embodiment, the robot control system receives the dimensions data and quality data for each individual veneer portion, the robot control system generating robot control signal data representing robot control signals based, at least in part, on the dimensions data and/or the quality data for each individual veneer portion.

In one embodiment, the at least one veneer stacking robot receives the robot control signals and, in response to the robot control signals, places each individual veneer portion onto a stack of individual veneer portions.

In one embodiment, as each individual veneer portion is moved onto the stack of individual veneer portions, location data indicating the location and orientation of each individual veneer portion is collected by the veneer data collection and storage system, the veneer data collection and storage system then correlating and storing the dimensions data, the quality data, and the location data for each individual veneer portion moved onto the stack of individual veneer portions.

In one embodiment, when the stack of individual veneer portions is completed, the veneer data collection and storage system collects the dimensions data, the quality data, and the location data for each individual veneer portion moved onto the stack of individual veneer portions to generate stack profile data for the stack of individual veneer portions, the stack profile data including the dimensions data, the quality data, and the location data for each individual veneer portion included in the stack of individual veneer portions.

In one embodiment, the individual veneer portions are selected from the group of individual veneer portions including strips of veneer, partial sheets of veneer, and full sheets of veneer.

In one embodiment, a veneer stacking method includes capturing one or more images of individual veneer portions.

In one embodiment, a veneer stacking method includes generating dimensions data for each individual veneer portion.

In one embodiment, a veneer stacking method includes correlating the dimensions data for each individual veneer portion with that individual veneer portion.

In one embodiment, a veneer stacking method includes generating robot control signal data representing robot control signals based, at least in part, on the dimensions data for each individual veneer portion.

In one embodiment, a veneer stacking method includes sending the robot control signals to at least one veneer stacking robot.

In one embodiment, a veneer stacking method includes using the at least one veneer stacking robot to place each individual veneer portion onto a stack of individual veneer portions in response to the robot control signals.

In one embodiment, a veneer stacking method includes generating location data indicating the location and orientation of each individual veneer portion as each individual veneer portion is moved onto the stack of individual veneer portions.

In one embodiment, a veneer stacking method includes collecting the dimensions data and the location data for each individual veneer portion moved onto the stack of individual veneer portions when the stack of individual veneer portions is completed to generate stack profile data for the stack of individual veneer portions, the stack profile data including the dimensions data and the location data for each individual veneer portion included in the stack of individual veneer portions.

In one embodiment, a veneer stacking method includes assigning a stack identifier to the stack of individual veneer portions, the stack identifier associating the stack profile data for the stack of individual veneer portions with the stack of individual veneer portions.

In one embodiment of the disclosed veneer stacking method the individual veneer portions are veneer strips.

In one embodiment of the disclosed veneer stacking method the individual veneer portions are partial sheets of veneer.

In one embodiment of the disclosed veneer stacking method the stack identifier is selected from the group of stack identifiers including a UPC code on the stack of individual veneer portions, a printed UPC code attached to the stack of individual veneer portions, a UPC code on a pallet holding the stack of individual veneer portions, an RFID tag on the stack of individual veneer portions, an RFID tag in the stack of individual veneer portions, an RFID tag on a pallet holding the stack of individual veneer portions, a visual identifier on the stack of individual veneer portions, a printed visual identifier on the stack of individual veneer portions, and a visual identifier on a pallet holding the stack of individual veneer portions.

In one embodiment, a veneer stacking method includes capturing one or more images of the individual veneer portions and generating quality data for each individual veneer portion.

In one embodiment, a veneer stacking method includes correlating the dimensions data and quality data for each individual veneer portion with that individual veneer portion.

In one embodiment, a veneer stacking method includes generating robot control signal data representing robot control signals based, at least in part, on the dimensions data and/or the quality data for each individual veneer portion.

In one embodiment, a veneer stacking method includes sending the robot control signals to at least one veneer stacking robot.

In one embodiment, a veneer stacking method includes using the at least one veneer stacking robot to place each individual veneer portion onto a stack of individual veneer portions in response to the robot control signals.

In one embodiment, a veneer stacking method includes generating location data indicating the location and orientation of each individual veneer portion as each individual veneer portion is moved onto the stack of individual veneer portions.

In one embodiment, a veneer stacking method includes collecting the dimensions data, the quality data, and the location data for each individual veneer portion moved onto the stack of individual veneer portions when the stack of individual veneer portions is completed to generate stack profile data for the stack of individual veneer portions, the stack profile data including the dimensions data, the quality data, and the location data for each individual veneer portion included in the stack of individual veneer portions.

In addition, some embodiments of the present disclosure provide an effective and efficient technical solution to the long-standing technical problem of providing a method and system for identifying the top of stack veneer sheet portion, or layer, in a stack of veneer consisting of layers of irregularly shaped veneer or veneer sheet portions.

In one embodiment, a top veneer portion of a stack of veneer portions identification and unstacking system includes a three dimensional (3D) imaging system to identify a distance from the 3D imaging system to veneer portions in a stack of veneer portions.

In one embodiment, the 3D imaging system generates an image of a top surface of the stack of veneer portions, the image of the top surface of the stack of veneer portions generated by the 3D imaging system indicating the distance of veneer portions making up the top surface of the stack of veneer from the 3D imaging system.

In one embodiment, a top veneer portion of a stack of veneer portions identification and unstacking system includes a robot control system, the robot control system receiving the image of a top surface of the stack of veneer portions.

In one embodiment, the robot control system processes the image of the top surface of the stack of veneer portions to identify the veneer portion making up the top surface of the stack of veneer portions from the 3D imaging system that is closest to the 3D imaging system.

In one embodiment, the robot control system designates the veneer portion making up the top surface of the stack of veneer portions that is closest to the 3D imaging system as the veneer portion that is at the top of the stack of veneer portions.

In one embodiment, the robot control system generates robot control signal data representing robot control signals.

In one embodiment, a top veneer portion of a stack of veneer portions identification and unstacking system includes at least one veneer stacking robot, the at least one veneer stacking robot receiving the robot control signals.

In one embodiment, in response to the robot control signals, the at least one veneer stacking robot unstacks the veneer portion designated as the veneer portion that is at the top of the stack of veneer portions before unstacking any of the other veneer portions making up the top surface of the stack of veneer.

In one embodiment, the 3D imaging system is a laser profiling system.

In one embodiment, the image of the top surface of the stack of veneer portions generated by the 3D imaging system indicates the distance of veneer portions making up the top surface of the stack of veneer from the 3D imaging system using grey scale imaging.

In one embodiment, the image of the top surface of the stack of veneer portions generated by the 3D imaging system indicates the distance of veneer portions making up the top surface of the stack of veneer from the 3D imaging system using color imaging.

In one embodiment, the individual veneer portions are selected from the group of individual veneer portions including strips of veneer and partial sheets of veneer.

In one embodiment, a top veneer portion of a stack of veneer portions identification and unstacking system includes one or more imaging systems, the one or more imaging systems capturing one or more images of the individual veneer portions and generating dimensions data for each individual veneer portion.

In one embodiment, a top veneer portion of a stack of veneer portions identification and unstacking system includes a center of mass analysis system, the center of mass analysis system receiving the dimensions data for each individual veneer portion, the center of mass analysis system analyzing the dimensions data to generate center of mass data indicating a position on each individual veneer portion from which the individual veneer portion should be picked up to avoid damaging the individual veneer portion.

In one embodiment, the center of mass data is provided to the robot control system, the robot control system processing the image of the top surface of the stack of veneer portions and the center of mass data to designate the top of the stack of veneer portion and the location on the designated top of the stack of veneer portion from which the designated top of the stack of veneer portion should be picked up, the robot control system generating robot control signal data representing robot control signals.

In one embodiment, the at least one veneer stacking robot, in response to the robot control signals, picking up the veneer portion designated as the veneer portion that is at the top of the stack of veneer portions at the identified the location on the designated top of the stack of veneer portion from which the designated top of the stack of veneer portion should be picked up, the at least one veneer stacking robot then unstacking the veneer portion designated as the veneer portion that is at the top of the stack of veneer portions before unstacking any of the other veneer portions making up the top surface of the stack of veneer.

One embodiment of a method of unstacking a stack of veneer portions includes generating a three dimensional (3D) image of a top surface of the stack of veneer portions, the 3D image of the top surface of the stack of veneer portions indicating a distance of veneer portions making up the top surface of the stack of veneer from a position above the top surface of the stack of veneer.

One embodiment of a method of unstacking a stack of veneer portions includes processing the image of the top surface of the stack of veneer portions to identify the veneer portion making up the top surface of the stack of veneer portions that is closest to the position above the top surface of the stack of veneer.

One embodiment of a method of unstacking a stack of veneer portions includes designating the veneer portion making up the top surface of the stack of veneer closest to the position above the top surface of the stack of veneer as the veneer portion that is at the top of the stack of veneer portions.

One embodiment of a method of unstacking a stack of veneer portions includes generating robot control signal data representing robot control signals.

One embodiment of a method of unstacking a stack of veneer portions includes sending the robot control signals to at least one unstacking robot which, in response to the robot control signals unstacks the veneer portion designated as the veneer portion that is at the top of the stack of veneer portions before unstacking any of the other veneer portions making up the top surface of the stack of veneer.

In one embodiment, the 3D image of the top surface of the stack of veneer portions is obtained by a 3D imaging system that is a laser profiling system.

In one embodiment, the image of the top surface of the stack of veneer portions indicates the distance of veneer portions making up the top surface of the stack of veneer from a position above the top surface of the stack of veneer using grey scale imaging.

In one embodiment, the image of the top surface of the stack of veneer portions indicates the distance of veneer portions making up the top surface of the stack of veneer from a position above the top surface of the stack of veneer using color imaging.

In one embodiment, the individual veneer portions are selected from the group of individual veneer portions including strips of veneer and partial sheets of veneer.

One embodiment of a method of unstacking a stack of veneer portions includes capturing one or more images of the individual veneer portions and generating dimensions data for each individual veneer portion.

One embodiment of a method of unstacking a stack of veneer portions includes processing the dimensions data for each individual veneer portion to generate center of mass data indicating a location on each individual veneer portion from which the individual veneer portion should be picked up to avoid damaging the individual veneer portion.

One embodiment of a method of unstacking a stack of veneer portions includes processing the image of the top surface of the stack of veneer portions and the center of mass data to designate the top of the stack of veneer portion and the location on the designated top of the stack of veneer portion from which the designated top of the stack of veneer portion should be picked up.

One embodiment of a method of unstacking a stack of veneer portions includes generating robot control signal data representing robot control signals.

One embodiment of a method of unstacking a stack of veneer portions includes sending the robot control signals to at least one unstacking robot which, in response to the robot control signals, picks up the veneer portion designated as the veneer portion that is at the top of the stack of veneer portions at the identified position from which the designated top of the stack of veneer portion should be picked up and unstacks the designated top of the stack of veneer portion before unstacking any of the other veneer portions making up the top surface of the stack of veneer.

In one embodiment, individual veneer portions, e.g., full veneer sheets, and/or veneer strips, and/or partial veneer sheets are provided to one or more veneer analysis systems at one or more veneer analysis system locations along a veneer analysis and selection conveyor. The one or more veneer analysis systems are then used to generate images of the individual veneer portions, e.g., full veneer sheets, and/or veneer strips, and/or partial veneer sheets and precisely determine the dimensions of each individual veneer portion, e.g., full veneer sheet, veneer strip, and partial veneer sheet. In one embodiment, the one or more veneer analysis systems are also used to analyze the surface of each individual veneer portion, e.g., full veneer sheet, veneer strip, and partial veneer sheet, quickly and automatically, and then assign a grade to each individual veneer portion, e.g., full veneer sheet, veneer strip, and partial veneer sheet.

In accordance with the disclosed embodiments, the dimensions and assigned grade for each individual veneer portion, e.g., full veneer sheet, veneer strip, and partial veneer sheet are then used by one or more veneer selection and stacking robot control systems to control the operation of one or more veneer selection and stacking robots.

The one or more veneer selection and stacking robots are then used to independently move individual veneer portions, e.g., full veneer sheets, and/or veneer strips, and/or partial veneer sheets from the veneer analysis and selection conveyor system to an appropriate stack of veneer. In one embodiment, this is performed based, at least in part, on the grade assigned to the individual veneer portion, e.g., full veneer sheet, veneer strip, and partial veneer sheet by the one or more veneer analysis systems.

In one embodiment, the determined dimensions of each individual veneer portion, e.g., full veneer sheet, veneer strip, and partial veneer sheet are used by the one or more veneer selection and stacking robots to place the individual veneer portion, e.g., full veneer sheet, veneer strip, and partial veneer sheet on the appropriate stack of veneer such that the resulting stacks of veneer of defined dimension, have relatively uniform edges, top surfaces, and are virtually free of jagged edges and/or bulges of low and/or high areas.

In particular, in one embodiment, full veneer sheets, and/or veneer strips, and/or partial veneer sheets are passed from a dryer outfeed conveyor to a veneer analysis and selection conveyor. In one embodiment, the individual full veneer sheets, and/or veneer strips, and/or partial veneer sheets are provided to one or more veneer analysis systems at one or more veneer analysis system locations along the veneer analysis and selection conveyor. The one or more veneer analysis systems are then used to generate images of the individual full veneer sheets, and/or veneer strips, and/or partial veneer sheets and these images are processed to generate dimensions data for each individual full veneer sheet, veneer strip, and partial veneer sheet. In one embodiment, the dimensions data for each individual full veneer sheet, veneer strip, and partial veneer sheet includes data representing the relative location, center of mass, orientation, and physical dimensions of each individual full veneer sheet, veneer strip, and partial veneer sheet quickly and automatically.

In addition, in one embodiment, the one or more veneer analysis systems are used to analyze the surface of each full veneer sheet, veneer strip, and partial veneer sheet quickly and automatically. Grading data for each individual full veneer sheet, veneer strip, and partial veneer sheet is then generated representing a grade assigned to each individual full veneer sheet, veneer strip, and partial veneer sheet.

In accordance with the disclosed embodiments, the dimensions data and grading data for each individual full veneer sheet, veneer strip, and partial veneer sheet is provided to one or more veneer selection and stacking robot control systems associated with one or more local robotic stacking cells. In one embodiment, the one or more veneer selection and stacking robot control systems generate veneer selection and stacking robot control signals based on analysis of the dimensions data and grading data for each individual full veneer sheet, veneer strip, and partial veneer sheet. The generated veneer selection and stacking robot control signals are then used to control the operation of one or more veneer selection and stacking robots included in the one or more local robotic stacking cells.

In response to the received veneer selection and stacking robot control signals, the one or more veneer selection and stacking robots use robotic arms to locally and independently move each individual full veneer sheet, veneer strip, and partial veneer sheet from the veneer analysis and selection conveyor system to an appropriate stack of veneer based on the grade assigned to the individual full veneer sheet, veneer strip, and partial veneer sheet by the one or more veneer analysis systems.

In one embodiment, the dimensions data is used to generate veneer selection and stacking robot control signals that direct the robotic arms of the one or more veneer selection and stacking robots to place the individual full veneer sheet, veneer strip, and partial veneer sheet on the appropriate stack of veneer such that the resulting stacks of veneer have the desired dimensions, have relatively uniform edges, relatively level top surfaces, and are virtually free of jagged edges and/or bulges of low and/or high areas.

In contrast to prior art full veneer sheet, veneer strip, and partial veneer sheet stacking methods and systems, the disclosed embodiments use a veneer analysis system to accurately identify the dimensions of the full veneer sheets, and/or veneer strips, and/or partial veneer sheets and accurately and consistently assign a grade to the full veneer sheets, and/or veneer strips, and/or partial veneer sheets before the full veneer sheets, and/or veneer strips, and/or partial veneer sheets are placed in any stack of veneer for further processing. Consequently, using the disclosed embodiments, the quality of veneer fed into downstream processes is efficiently and effectively determined during the stacking of veneer operation. In this way defects that can cause products created using the stacks of veneer to be rejected downstream are detected before significant time and energy has been devoted to the processing of the veneer. In addition, by consistently and accurately assigning a grade to the full veneer sheets, and/or veneer strips, and/or partial veneer sheets before the full veneer sheets, and/or veneer strips, and/or partial veneer sheets are placed in any stack of veneer for further processing, individual full veneer sheets, and/or veneer strips, and/or partial veneer sheets can be used in the most effective and valuable way.

In addition, as noted above, and discussed in more detail below, even if prior art inspection and grading systems were employed, prior art inspection and grading systems can be error prone and lead to inaccurate images of veneer sheets being taken, which can result in the system improperly grading veneer sheets. In contrast, as discussed in more detail below, the disclosed embodiments use a veneer analysis system that can capture images of entire surfaces of full veneer sheets, and/or veneer strips, and/or partial veneer sheets and therefore are far less error prone, are faster, and can require less processing power.

In addition, in contrast to prior art full veneer sheet, veneer strip, and partial veneer sheet stacking methods and systems, using the disclosed embodiments, human workers are no longer assigned an unrealistic set of tasks to be performed in an unrealistic amount of time. This is because the disclosed embodiments perform the visual grading of full veneer sheets, and/or veneer strips, and/or partial veneer sheets automatically and then use veneer selection and stacking robots to move the full veneer sheets, and/or veneer strips, and/or partial veneer sheets from the conveyor to the appropriate stack of veneer. In one embodiment, the veneer selection and stacking robots use robotic arms that include selectively activated vacuum heads that are faster than humans and are far less likely to damage the relatively fragile full veneer sheets, and/or veneer strips, and/or partial veneer sheets.

In addition, the disclosed embodiments perform analysis of the dimensions data of each full veneer sheet, veneer strip, and partial veneer sheet and use this analysis to ensure the full veneer sheets, and/or veneer strips, and/or partial veneer sheets are added to the appropriate stack of veneer in such a way that the dimensions of the stacks of veneer are consistent, that the edges of each stack of veneer are as even as possible, and that the stacks of veneer are relatively bulge free.

In addition, in contrast to prior art full veneer sheet, veneer strip, and partial veneer sheet stacking methods and systems, since the disclosed embodiments do not require significant human interaction with complicated machines and significant human manual manipulation of veneer the numerous injuries associated with prior art full veneer sheet, veneer strip, and partial veneer sheet stacking methods and systems, including significant splinter injuries, machine injuries, repetitive motion injuries, worker fatigue, and worker burnout, are minimized and/or avoided completely.

Some embodiments of the present disclosure include an effective and efficient technical solution to the long-standing technical problem of identifying and tracking the contents/composition of a given stack of veneer during the stacking of veneer process so that the quality and/or quantity of the veneer in the stack can be accurately determined, recorded, and correlated to the stack of veneer so created.

In one embodiment, individual full veneer sheets, and/or veneer strips, and/or partial veneer sheets, herein collectively referred to as "veneer" or "veneer portions," are provided to one or more veneer analysis systems.

In one embodiment, the one or more veneer analysis systems include one or more imaging systems. In some embodiments the one or more imaging systems include a high resolution two-dimensional (2D) imaging system.

In some embodiments, the one or more imaging systems include all or part of a high resolution imaging system such as that set forth in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which is hereby incorporated by reference in its entirety as if it were fully set forth herein.

In some embodiments the one or more imaging systems include a three dimensional (3D) imaging system such as a laser profiling system. In some embodiments, one or more imaging systems include a three dimensional (3D) imaging system such as a Cognex IN-SIGHT 3D-L4000 system or a Cognex IN-SIGHT 3D-A5000 system.

In one embodiment, the one or more veneer analysis systems are then used to generate images of the individual full veneer sheets, and/or veneer strips, and/or partial veneer sheets.

In one embodiment, in the case of irregularly shaped veneer or veneer sheet fractions, e.g., veneer strips, and/or partial veneer sheets, the one or more veneer analysis systems are also used to precisely determine the dimensions, i.e., length and width, of each individual veneer sheet fraction, e.g., veneer strip, and/or partial veneer sheet.

In one embodiment, dimensions data indicating the dimensions of each veneer sheet fraction, e.g., veneer strip, and/or partial veneer sheet is collected, recorded, and correlated with each individual veneer sheet fraction, e.g., veneer strip, and/or partial veneer sheet.

In one embodiment, the one or more veneer analysis systems are also used to analyze the surface of each individual full veneer sheet, veneer strip, and partial veneer sheet, quickly and automatically, and then assign a grade to each individual full veneer sheet, veneer strip, and partial veneer sheet.

In one embodiment, quality data indicating the grade of each individual full veneer sheet, veneer strip, and partial veneer sheet is collected, recorded, and correlated with each individual full veneer sheet, veneer strip, or partial veneer sheet.

In accordance with some of the disclosed embodiments, the dimensions data and/or the quality data for each individual veneer sheet fraction, e.g., veneer strip, and/or partial veneer sheet, is then used by one or more veneer selection and stacking robot control systems to control the operation of one or more veneer selection and stacking robots.

As discussed in more detail below, in one embodiment, the one or more veneer selection and stacking robots are then used to independently move individual full veneer sheets, and/or veneer strips, and/or partial veneer sheets from the veneer analysis and selection system to a stacking of veneer station which creates appropriate stacks of veneer.

In one embodiment, as each individual full veneer sheet, and/or veneer strip, and/or partial veneer sheet is moved from the veneer analysis and selection system to the appropriate stack of veneer, the location of the full veneer sheets, and/or veneer strips, and/or partial veneer sheets within the stack of veneer, e.g., the placement layer or level of the individual full veneer sheet, and/or veneer strip, and/or partial veneer sheet, within the stack of veneer is recorded.

In one embodiment, as each individual full veneer sheet, and/or veneer strip, and/or partial veneer sheet is moved from the veneer analysis and selection system to the appropriate stack of veneer, the orientation of the full veneer sheets, and/or veneer strips, and/or partial veneer sheets within the stack of veneer, e.g., the geometry of the individual full veneer sheet, and/or veneer strip, and/or partial veneer sheet, within the stack of veneer is recorded.

In one embodiment, the location and orientation data for each of the full veneer sheets, and/or veneer strips, and/or partial veneer sheets within the stack of veneer, e.g., the placement layer or level and orientation of the individual full veneer sheet, and/or veneer strip, and/or partial veneer sheet, within the stack of veneer is recorded as location data for each full veneer sheet, and/or veneer strip, and/or partial veneer sheet and correlated with the respective full veneer sheet, and/or veneer strip, and/or partial veneer sheet in a veneer location database.

Then the location data, and/or the dimensions data, and/or the quality data for each individual full veneer sheet, and/or veneer strip, and/or partial veneer sheet is collected as each individual full veneer sheet, and/or veneer strip, and/or partial veneer sheet is added to the stack and added to profile data for the stack of veneer. Thus, once created, each stack of veneer has associated stack profile data that includes the location data, e.g., layer and orientation data, and/or the dimensions data, e.g., length and width data, and/or the quality data, e.g., grade data, for every individual full veneer sheet, and/or veneer strip, and/or partial veneer sheet included in the stack of veneer.

In one embodiment, once a stack of veneer is completed, the stack profile data for the stack of veneer, including the location data, the dimensions data, and the quality data for every individual full veneer sheet, and/or veneer strip, and/or partial veneer sheet, included in the stack of veneer is correlated with the stack of veneer and stored in a stack profile database.

In one embodiment, a profile identifier, such as a printed label, a UPC code or label, a QR code or label, an RFID tag, or other indicator is associated with/assigned to each stack of veneer indicating the location and/or access to the stack profile data for that stack veneer.

In this way, in one embodiment, stack profile data for each stack of veneer is created and associated with that stack of veneer so that the location data, e.g., layer and orientation data, and/or the dimensions data, e.g., length and width data, and/or the quality data, e.g., grade data, of each sheet or fraction of a full sheet, i.e., every individual full veneer sheet, and/or veneer strip, and/or partial veneer sheet, included in the stack of veneer is recorded, associated with the stack of veneer, and is available for review and processing.

In this way the composition of each stack of veneer, i.e., the volume of veneer in the stack, the surface area of the veneer in the stack of veneer, and the quality of the veneer in the stack of veneer, as well as the location, e.g., layer and orientation of each individual full veneer sheet, and/or veneer strip, and/or partial veneer sheet included in the stack of veneer can be precisely known.

In addition, since using the disclosed embodiments, the location, and/or dimensions, and/or quality of each layer of veneer, i.e., every individual full veneer sheet, and/or veneer strip, and/or partial veneer sheet, included in the stack of veneer is recorded, associated with the stack, and made available for review and processing, robots can be utilized to unstack the stack of veneer in an operation that is the opposite of how the stack of veneer was created and in a manner that puts the individual full veneer sheets, and/or veneer strips, and/or partial veneer sheets, included in the stack of veneer to the best and most effect use.

Consequently, some of the disclosed embodiments represent a technical solution to the several long standing problems associated with stacks of veneer created using prior art methods and systems. For instance, using the disclosed embodiments, even though the quality and quantity of veneer making up the stacks of veneer can still vary considerably from stack to stack, accurate data regarding the dimensions, grade, and quality of veneer in a specific stack of veneer, as well as data indicating exactly how the veneer was stacked, i.e., what makes up each individual layer of veneer in the stack and the orientation of that veneer, can be accurately determined.

As discussed above, in the prior art, stacking of veneer and unstacking is very labor intensive, highly inefficient, a potential danger to working handling the layers of veneer making up the stack. In contrast, using some of the disclosed embodiments, the stacks of veneer are created using robots and detailed data about each stack is collected as the stack is being created. Consequently, not only are the disclosed stacking of veneer methods and systems very labor efficient, but the stacks of veneer created using the disclosed embodiments include detailed volume, surface area, and quality data for each stack of veneer, and the layered contents of each stack of veneer is recorded.

This ability to efficiently and accurately determine the quality and/or quantity of veneer in stacks of veneer using the disclosed embodiments solves several significant issues encountered in the prior art. First, since using the disclosed embodiments, the quality and/or or quantity of the veneer in a given stack of veneer is known, it is possible to ensure a given layer of veneer in the stack of veneer is put to the best, i.e., most cost effective use.

In addition, using the disclosed embodiments the volume or surface area of veneer in a stack of veneer is known so a determination as to when a new stack of veneer will be needed on the production line can be readily and accurately calculated. This clearly allows for more efficient Just In Time (JIT) inventory methods, the more efficient use of production floor area, and more efficient and safer production line operations.

In addition, the ability to efficiently and accurately determine the quality and/or quantity of veneer in stacks of veneer using the disclosed embodiments results in efficient use of veneer, efficient inventory and purchasing procedures, and efficient production line operations.

In addition, the ability to efficiently and accurately determine the quality and/or quantity of veneer in stacks of veneer using the disclosed embodiments means that a buyer of a stack of veneer can know to a significant degree of certainty what quality and amount of veneer is included in a stack of veneer, including the actual volume and surface area of veneer included in a stack of fraction of full sheets of veneer. This results in efficient use of veneer, efficient production line operations, and more fair and efficient pricing of the stacks of veneer.

In addition, some embodiments of the present disclosure provides an effective and efficient technical solution to the long-standing technical problem of providing a method and system for identifying the top of stack veneer sheet fraction, or layer, in a stack of veneer consisting of layers of irregularly shaped veneer or veneer sheet fractions.

As discussed above with respect to FIGS. 2K, 2L, 2M, 2N and 2O, when a stack of veneer is a stack of irregularly shaped veneer or veneer sheet fractions, e.g., stacks of veneer strips and/or partial veneer sheets, it is extremely important to correctly identify the top of stack veneer sheet fraction in the stack of irregularly shaped veneer or veneer sheet fractions so that the top piece can be removed first. This is particularly true when the stack of irregularly shaped veneer or veneer sheet fraction is created using prior art methods and systems, or any time detailed information about the location, quality, and/or quantity of individual full veneer sheet and/or veneer strip and/or partial veneer sheet included in the stack of veneer is not known, e.g., when the disclosed methods and system for creating a stack of veneer are not used.

As again discussed above with respect to FIGS. 2K, 2L, 2M, 2N and 2O, this is because if an attempt to remove the wrong piece of veneer, i.e., not the top of stack veneer sheet fraction is made, then veneer sheet fraction(s) that is/are above the wrongly selected "top of stack" veneer sheet fraction will be displaced and likely damaged and/or lost from the stack of veneer.

As shown and discussed in FIGS. 2K, 2L, 2M, 2N and 2O, above, this problem arises because the irregularly shaped veneer or veneer sheet fractions can overlap one another so that identifying the "top" layer or veneer sheet fraction such as a veneer strip or partial sheet of veneer is very difficult, especially at typical production line speeds.

As also discussed above, to address this issue, attempts have been made to automate the unstacking process using prior art imaging systems and robotic systems such as robotic arms. However, using currently available imaging systems there is not a sufficient level of accuracy and resolution to ensure the top piece or layer is consistently correctly identified. Consequently, the robotic systems cannot be accurately controlled, and the result is all too often incorrect identification of the top piece or layer of veneer which, in turn, results in unacceptable levels of damaged veneer and waste.

In addition, when layers of irregularly shaped veneer or veneer sheet fractions are being unstacked using robots, it is important that the robotic arm picks up the veneer sheet fraction as close to the center of mass as possible. This distributes the weight of the veneer piece evenly to avoid breaking and/or dropping the veneer sheet fraction. However, when the stacks of veneer are stacks of irregularly shaped veneer or veneer sheet fractions, the dimensions of the various piece or layers of veneer varies significantly from piece to piece and layer to layer.

To address these issues, in accordance with some of the disclosed embodiments, a stack of veneer is provided to one or more top of veneer stack identification and unstacking system.

In one embodiment, the one or more veneer analysis systems includes a three-dimensional (3D) imaging system such as a laser profiling system or microwave system. In some embodiments, the 3D imaging system is positioned in a robot system, such as a robotic arm, and the top surface of the stack of veneer is scanned by the 3D imaging system using the robotic arm.

In some embodiments, the three dimensional (3D) imaging systems can be laser profiling systems such as, but not limited to, a Cognex IN-SIGHT 3D-L4000 system or a Cognex IN-SIGHT 3D-A5000 system.

In one embodiment, the 3D imaging system is used to identify the distance from the 3D imaging system to irregularly shaped veneer or veneer sheet fractions scanned. In one embodiment, the various distances from the 3D imaging system to irregularly shaped veneer or veneer sheet fractions scanned is displayed and processed as a grey scale, or color, representation of the irregularly shaped veneer or veneer sheet fractions scanned, with different shades of gray, or colors, representing different distances or depths.

In one embodiment, the veneer sheet fraction determined to be closest to the 3D imaging system is then identified as the top of stack veneer sheet fraction.

In one embodiment, a robot system, such as a robotic arm is then used to pick up the identified top of stack veneer sheet fraction and move it to a production line or other desired location. In one embodiment, the robotic arm used to pick up the identified top of stack veneer sheet fraction is the same robotic arm in which the 3D imaging system is positioned. In some embodiments, the robotic arm used to pick up the identified top of stack veneer sheet fraction is a second robotic arm, different from the robotic arm in which the 3D imaging system is positioned.

Once the identified top of stack veneer sheet fraction is removed from the stack of veneer, the 3D imaging system again scans the stack of veneer and identifies the newly revealed top of stack veneer sheet fraction which is then removed from the stack of veneer. In this way the stack of veneer is unstacked one top of stack veneer sheet fraction at a time as these top of stack veneer sheet fractions are identified.

In one embodiment, as each of the top of stack veneer sheet fractions are identified, one or more veneer analysis systems are used to precisely determine the dimensions of each top of stack veneer sheet fraction as they are identified. In one embodiment, dimensions data is then created and processed for each top of stack veneer sheet fraction and this dimensions data is used to identify the center of mass, or best location, on the top of stack veneer sheet fraction to pick up the top of stack veneer sheet fraction to avoid damage to the top of stack veneer sheet fraction.

In one embodiment, the one or more veneer analysis systems includes one or more high resolution 2D imaging systems.

In some embodiments, the one or more imaging systems include all or part of a high resolution imaging system such as that set forth in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which is hereby incorporated by reference in its entirety as if it were fully set forth herein.

In one embodiment, the one or more high resolution 2D imaging systems are positioned in a robotic arm.

In one embodiment, data indicating the center of mass, or best location, on the top of stack veneer sheet fraction to pick up the top of stack veneer sheet fraction to avoid damage to the top of stack veneer sheet fraction is then used to control a robotic arm used to pick up the identified top of stack veneer sheet fraction and directs it to pick up the top of stack veneer sheet fraction at the center of mass, or best location, on the top of stack veneer sheet fraction.

Consequently, using some of the disclosed embodiments, a top of stack veneer sheet fraction in a stack of irregularly shaped veneer or veneer sheet fractions can be accurately and consistently identified. In addition, in one embodiment, the center of mass, or best location, on the identified top of stack veneer sheet fraction to pick up the top of stack veneer sheet fraction to avoid damage to the top of stack veneer sheet fraction is identified.

Then, using the disclosed embodiments, a robotic system is controlled to pick up the identified top of stack veneer sheet fraction, in one embodiment, at the center of mass, or best location, on the identified top of stack veneer sheet fraction and move the identified top of stack veneer sheet fraction to a desired location. Then this process is repeated until the entire stack of veneer is unstacked.

Consequently, some embodiments of the present disclosure provide an effective and efficient technical solution to the long-standing technical problem of providing a method and system for identifying the top of stack veneer sheet fraction, or layer in a stack of veneer consisting of layers of irregularly shaped veneer or veneer sheet fractions.

As shown above, the disclosed embodiments provide an effective and efficient technical solution to the long-standing technical problem of providing a method and system for full veneer sheet, veneer strip, and partial veneer sheet stacking that includes improved wood product scanning and grading methods, produces more consistent and safer stacks of veneer, is less expensive to operate, and is far safer than currently available methods and systems for full veneer sheet, veneer strip, and partial veneer sheet stacking.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2C show illustrations of a prior art line scans.

FIG. 2F is a block diagram of a prior art veneer strip stacking system.

FIG. 2H shows an ideal veneer strip stack and a typical veneer strip stack created using a prior art veneer strip stacking system.

FIGS. 2K, 2L, 2M, 2N, and 2O, illustrate the problem of identifying the top layer or veneer sheet fraction in a stack of veneer sheet fractions, as well as the results when the top layer or veneer sheet fraction in a stack of veneer sheet fractions is incorrectly identified using prior art methods and systems.

FIG. 3 is a block diagram of a full veneer sheet grading and stacking system in accordance with one embodiment.

FIG. 4A is a block diagram of a veneer strip grading and stacking system in accordance with one embodiment.

FIGS. 5A, 5B, and 5C together are a process flow chart for a full veneer sheet, veneer strip, and partial veneer sheet grading and stacking system in accordance with one embodiment.

FIG. 12 is a block diagram of a partial veneer sheet stack of veneer creation system in accordance with one embodiment.

Figure 1A:
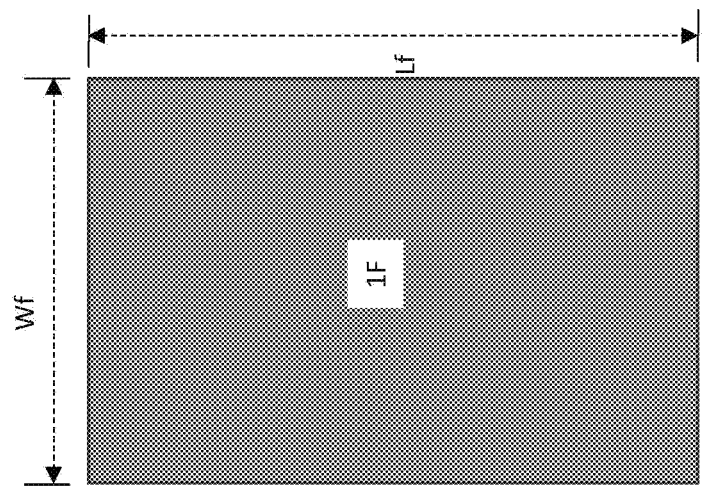
FIG. 1A shows one illustrative example of a full veneer sheet having the desired length "Lf" and desired width "Wf."

Common reference numerals are used throughout the figures and the detailed description to indicate like elements. One skilled in the art will readily recognize that the above figures are merely illustrative examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, or described below. Rather, these exemplary embodiments are provided to allow a complete disclosure that conveys the principles of the invention, as set forth in the claims, to those of skill in the art.

FIG. 3 is a block diagram of a full veneer sheet grading and stacking system 330 in accordance with one embodiment. Full veneer sheet grading and stacking system 330 includes dryer outfeed 331 where individual full veneer sheets 232 are dropped onto dryer outfeed conveyor 333. Full veneer sheets 232 can be created to almost any size desired. However, as one illustrative example, and as shown in FIG. 1A, full veneer sheets can have an average length (Lf in FIG. 1A) of approximately 102 inches and a width (Wf in FIG. 1A) of approximately 54 inches. As discussed, for safety reasons and for production efficiency, the dimensions of the stacks of full veneer sheets 232 to be created should ideally be as close to the dimensions of the individual full veneer sheets 232 as possible. As discussed below, unlike currently available systems, full veneer sheet grading and stacking system 330 is well suited by design to accomplish this task.

From dryer outfeed conveyor 333 the individual full veneer sheets 232 pass through moisture meter 334 where the moisture content of the individual full veneer sheets 232 is determined. In some cases, if the moisture content of an individual full veneer sheet 232 is determined to be unacceptable, that specific individual full veneer sheet 232 is so marked by moisture meter 334 and that individual full veneer sheet 232 is processed, or removed from processing, accordingly. In some cases, the moisture level of individual full veneer sheets 232 can be used in part to determine a grade of the individual full veneer sheet 232.

From moisture meter 334, the individual full veneer sheets 232 are passed to veneer analysis and selection conveyor 335. In one embodiment, the individual full veneer sheets 232 are conveyed by veneer analysis and selection conveyor 335 to veneer analysis system 300. Veneer analysis system 300 is representative of one or more veneer analysis systems at one or more veneer analysis system locations/positions along veneer analysis and selection conveyor 335 and therefore the inclusion of the single veneer analysis system 300 in FIG. 3 is not limiting.

As discussed in more detail below, in one embodiment, veneer analysis system 300 is used to generate image data associated with each of the individual full veneer sheets 232. As also discussed in more detail below, this image data is then processed to generate dimensions data 301 for each individual full veneer sheet 232. In one embodiment, the dimensions data 301 for each individual full veneer sheet 232 includes data representing the relative location, center of mass, orientation, and physical dimensions, i.e., length and width, of each individual full veneer sheet 232.

In addition, as discussed in more detail below, in one embodiment, veneer analysis system 300 is also used to analyze the surface of each individual full veneer sheet quickly, consistently, and automatically 232 to generate grading data 303 for each individual full veneer sheet 232. Grading data 303 represents a grade assigned to each individual full veneer sheet 232.

In accordance with the disclosed embodiments, the dimensions data 301 and grading data 303 for each individual full veneer sheet 232 is provided to robot control system 305. Robot control system 305 is representative of one or more veneer selection and stacking robot control systems associated with one or more local robotic stacking cells 342. Therefore, the number of robot control systems is not limited to the single robot control system 305 shown. In one embodiment, robot control system 305 generates veneer selection and stacking robot control signal data 306 representing veneer selection and stacking robot control signals based on analysis of the dimensions data 301 and grading data 303 for each individual full veneer sheet 232.

The generated veneer selection and stacking robot control signals represented by veneer selection and stacking robot control signal data 306 are then provided to local robotic stacking cells 342 where they are used to control the operation of one or more veneer selection and stacking robots 340A and 340B included in the one or more local robotic stacking cells 342. In various embodiments, the number of local robotic stacking cells and veneer selection and stacking robots can be any number desired. Consequently, the two local robotic stacking cells 342 and veneer selection and stacking robots 340A and 340B shown in FIG. 3 is not limiting.

In one embodiment, in response to the veneer selection and stacking robot control signals represented by veneer selection and stacking robot control signal data 306, veneer selection and stacking robots 340A and 340B use robotic arms to select specific full veneer sheets 232 from veneer analysis and selection conveyor 335 and move the selected full veneer sheets 232 from veneer analysis and selection conveyor 335 to the appropriate stacks of veneer 337. In this way, stacks of veneer 337 of individual full veneer sheets 232 are created that are stacks of veneer 337 of the respectively consistent grade of individual full veneer sheets 232. In some embodiments, the height of the stacks of veneer 337 is typically 38 inches and each stack contains approximately 185 individual sheets or layers.

As discussed above, veneer is a type of wood product that is manufactured into full veneer sheets, veneer strips, and partial veneer sheets. As they are manufactured, various defects may exist in the full veneer sheets, veneer strips, and partial veneer sheets. Consequently, depending on the number and type of defects on a particular full veneer sheet 232, that full veneer sheet 232 may be unsatisfactory for use in particular applications.

Accordingly, is important that full veneer sheets 232 are accurately and consistently graded following manufacture because this grade determines the value and the possible uses for which a full veneer sheet 232 is suitable. A grade assigned to a full veneer sheet 232 can also be used to determine its best use; for example, whether it is suitable as a face sheet for plywood, whether it is suitable for clipping and edge gluing to form a sheet, whether it is suitable for use in laminated wood beams, should be discarded, or is suitable for other uses.

As also discussed above, prior art full veneer sheet, veneer strip, and/or partial veneer sheet stacking methods and systems suffer from several serious drawbacks. For instance, using prior art methods and systems for producing layered wood products, the quality of veneer fed into process is often not efficiently and effectively inspected and graded during the stacking of veneer operation. Therefore, undetected defects can cause products created using the full veneer sheets in prior art stacks of veneer to be rejected downstream after significant time and energy has already been devoted to the panels, e.g., pressing is complete and panel quality is analyzed.

Indeed, as pointed out above, using typical prior art full veneer sheet stacking methods and systems human workers are assigned an unrealistic set of tasks to be performed in an unrealistic amount of time. These include performing visual grading of full veneer sheets as they move along the hand sort conveyor, manually moving full veneer sheets from hand sort conveyor to the stack of veneer associated with the visual and manual grading of the full veneer sheets, without damaging the relatively fragile full veneer sheets, and then adding full veneer sheets to the appropriate stack of veneer in such a way that the dimensions of the stacks of veneer are consistent and that the edges of each stack of veneer are as even as possible.

This is not realistic, and the result is that full veneer sheets were inconsistently and/or inaccurately graded, many full veneer sheets were damaged, and the resulting stacks of veneer, more often than not, did include numerous full veneer sheets that were not aligned so the stacks of veneer did not have even sides and did have jagged edges.

To address this issue, and in contrast to prior art full veneer sheet stacking methods and systems, full veneer sheet grading and stacking system 330 utilizes robot control systems, such as robot control system 305, to control veneer selection and stacking robots, such as veneer selection and stacking robots 340A and 340B, to create stacks of veneer 337 such that each of stacks of veneer 337, e.g., stack of veneer 1 through stack of veneer 5, is associated with a different grade of full veneer sheets 232. In addition, in one embodiment, veneer selection and stacking robots 340A and 340B are directed by the veneer selection and stacking robot control signals represented by veneer selection and stacking robot control signal data 306 to select different full veneer sheets 232, to remove the full veneer sheets 232 from veneer analysis and selection conveyor 335, and to place the full veneer sheets 232 in a specific stack of veneer 337, e.g., stack of veneer 1 through stack of veneer 5, using robotic arms based, at least in part on the grade indicated by the grading data 303 associated with the individual full veneer sheets 232. Consequently, stacks of veneer 337, e.g., stack of veneer 1 through stack of veneer 5, are made up of full veneer sheets 232 accurately and consistently determined to be of the specific grade associated with that stack of veneer 337, e.g., stack of veneer 1 through stack of veneer 5.

Figure 2D:
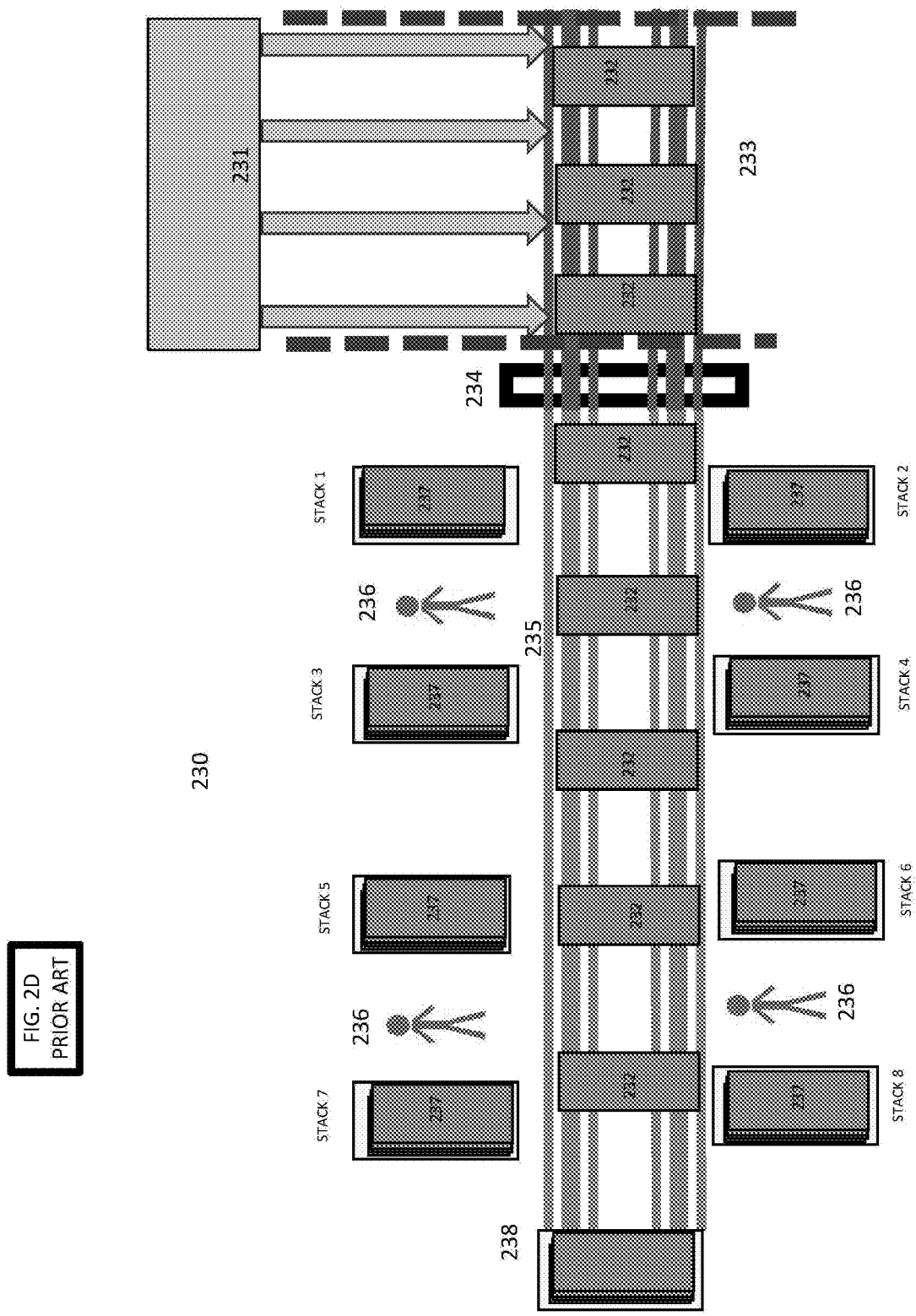
FIG. 2D is a block diagram of a prior art full veneer sheet stacking system.
Figure 2E:
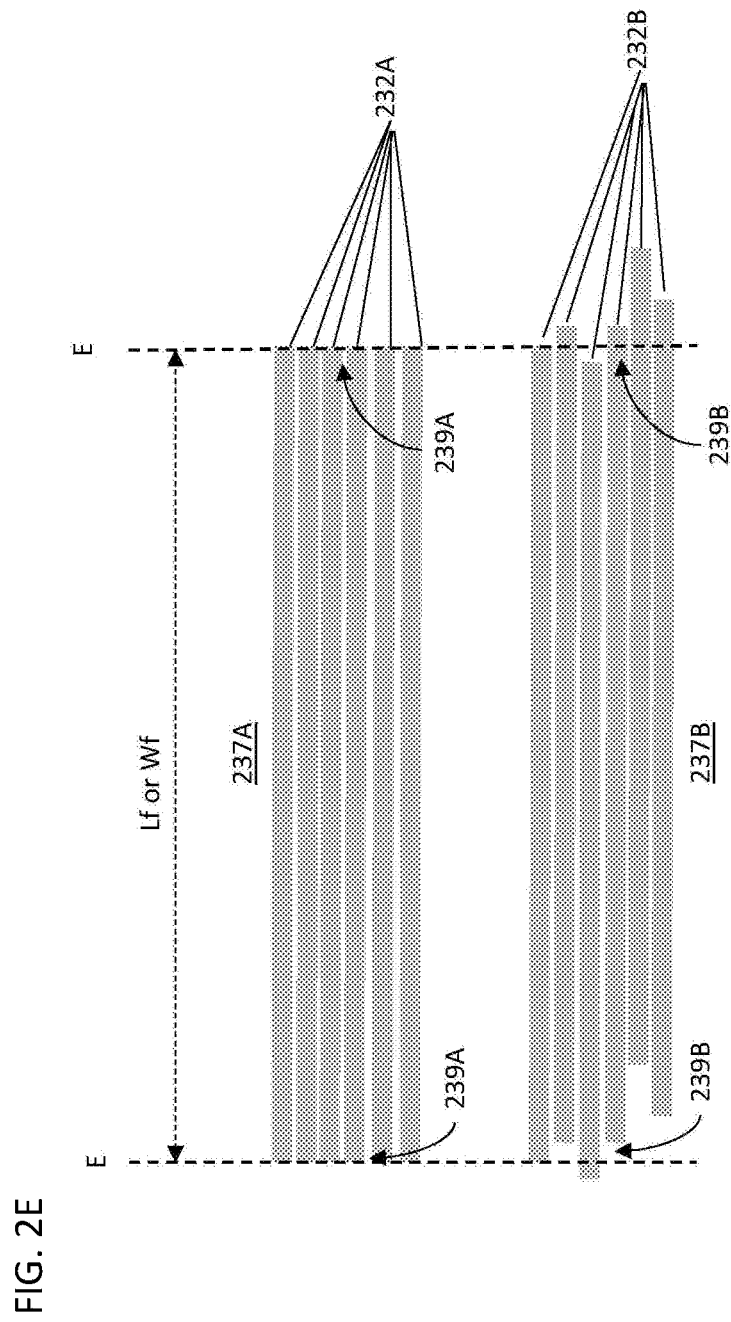
FIG. 2E shows an ideal full veneer sheet stack and a typical full veneer sheet stack created using a prior art full veneer sheet stacking system.

Dimensions data 301 includes data indicating the length and width of the full veneer sheets 232. In this way, it is assured that each full veneer sheet 232 has the desired length (Lf in FIG. 1A) and width (Wf in FIG. 1A) to within defined tolerances. In addition, as discussed below, the dimensions data 301 for each individual full veneer sheet 232 is used to generate veneer selection and stacking robot control signals represented by veneer selection and stacking robot control signal data 306 that direct robotic arms of veneer selection and stacking robots 340A and 340B to add each individual full veneer sheet 232 to its appropriate specific stack of veneer 337, e.g., stack of veneer 1 through stack of veneer 5, so that all four edges of the individual full veneer sheets 232 are aligned. Consequently, the resulting stacks of veneer 337 are aligned to have the desired dimensions and have even edges/sides and do not have jagged edges. The result is that stacks of veneer 337 are not only made up of sheets of veneer 232 accurately determined to be of the correct grade and correct dimensions, but that the sheets of veneer 232 are stacked such that stacks of veneer 337 resemble ideal stack of veneer 237A of FIG. 2E rather than typical prior art stack of veneer 237B of FIG. 2E.

This is in contrast to prior art full veneer sheet stacking methods and systems, where, in addition to being given the virtually impossible task of grading and manually moving each full veneer sheet from the conveyor to the appropriate grade stack of veneer without damaging the full veneer sheets, human workers were further tasked with adding full veneer sheets to the appropriate stack of veneer in such a way that the dimensions of the stacks of veneer were consistent and that the edges of each stack of veneer are as even as possible. As noted, this prior art requirement of human workers was not realistic and resulted in full veneer sheets that were not only inconsistently and/or inaccurately graded, but that were often damaged and stacked such that numerous full veneer sheets that were not aligned so the stacks of veneer did not have even sides and included jagged edges.

Returning to FIG. 3, full veneer sheet grading and stacking system 330 includes overflow bin 338. Like overflow bin 238 of FIG. 2D, in operation, any full veneer sheets 232 that are of unacceptable dimensions, grade, or moisture content, are passed from full veneer sheets 232 to overflow bin 338 for recycling and/or repurposing. However, unlike prior art full veneer sheet stacking system 230 of FIG. 2D, using full veneer sheet grading and stacking system 330 overflow bin 338 does not typically contain significant amounts of veneer that has been damaged, or simply not processed fast enough. This is because full veneer sheet grading and stacking system 330 uses veneer selection and stacking robots 340A and 340B and robotic arms rather than human workers so that there is minimal damage to full veneer sheets 232 and processing time is not an issue.

As discussed in more detail below, one way the use of veneer selection and stacking robots 340A and 340B avoids damaging full veneer sheets 232 is by utilizing robotic arms with selectively activated vacuum heads to move the full veneer sheets 232 from veneer analysis and selection conveyor 335 and to place the full veneer sheets 232 in a specific stack of veneer 337.

In addition, as seen in FIG. 3, by employing veneer selection and stacking robots 340A and 340B rather than human workers, full veneer sheet grading and stacking system 330 requires the use of as few as two human workers 336; one to position full veneer sheets 232 onto dryer outfeed conveyor 333 and one to control the use of overflow bin 338.

As also seen in FIG. 3, in one embodiment, once stacks of veneer 337, e.g., stack of veneer 1, stack of veneer, 2, stack of veneer 3, stack of veneer 4, and stack of veneer 5 in FIG. 3, are created, stack of veneer 1, stack of veneer, 2, stack of veneer 3, stack of veneer 4, and stack of veneer 5 are relayed to output conveyor 345 via relay conveyors/rollers 351, 352, 353, 354, and 355, respectively. At the end of output conveyor 345, stacks of veneer 337 are picked up by forklift 347 which moves stacks of veneer 337 to the location in the processing plant where they are needed.

As shown above, in contrast to prior art full veneer sheet stacking methods and systems, full veneer sheet grading and stacking system 330 uses a veneer analysis system 300 to accurately identify the dimensions of the full veneer sheets 232 and accurately and consistently assign a grade to the full veneer sheets 232 before the full veneer sheets 232 are placed in any stack of veneer 337 for further processing. Consequently, using full veneer sheet grading and stacking system 330, the quality of veneer fed into process is efficiently and effectively determined during the stacking of veneer operation. In this way defects that can cause products created using the veneer to be rejected downstream are detected before significant time and energy has been devoted to the processing of the veneer. In addition, by consistently and accurately assigning a grade to the full veneer sheets 232 before the full veneer sheets 232 are placed in any stack of veneer 337 for further processing, individual full veneer sheets 232 can be used in the most effective and valuable way.

In addition, as noted above, and discussed in more detail below, even if prior art inspection and grading systems were employed, prior art inspection and grading systems can be error prone and lead to inaccurate images of veneer sheets being taken, which can result in the system improperly grading veneer sheets. In contrast, in various embodiments, full veneer sheet grading and stacking system 330 uses a veneer analysis system 300 that can capture images of entire surfaces of full veneer sheets 232 and therefore are far less error prone, are faster, and can require less processing power.

In addition, in contrast to prior art full veneer sheet stacking methods and systems, using full veneer sheet grading and stacking system 330, human workers are no longer assigned an unrealistic set of tasks to be performed in an unrealistic amount of time. This is because using full veneer sheet grading and stacking system 330 veneer selection and stacking robots 340A and 340B perform the grading of full veneer sheets, and/or veneer strips, and/or partial veneer sheets 232 automatically and use robotic arms to move the full veneer sheets 232 from veneer analysis and selection conveyor 335 to the appropriate stack of veneer 337. As discussed in more detail below, in one embodiment, veneer selection and stacking robots 340A and 340B use selectively activated vacuum heads that are faster than humans and are far less likely to damage the relatively fragile full veneer sheets 232.

In addition, in contrast to prior art full veneer sheet stacking methods and systems, full veneer sheet grading and stacking system 330 performs analysis of the dimensions data 301 of each full veneer sheet 232 and uses this analysis to ensure the full veneer sheets 232 are of the correct and consistent defined dimensions, e.g., length Lf and width Wf of FIG. 1A, and are added to the appropriate stack of veneer 337 in such a way that the dimensions of the stacks of veneer 337 are consistent, e.g., length Lf and width Wf of FIG. 1A, that the edges of each stack of veneer 337 are as even as possible, and that the stacks of veneer 337 are relatively bulge free.

In addition, in contrast to prior art full veneer sheet stacking methods and systems, full veneer sheet grading and stacking system 330 does not require significant human interaction with complicated machines and significant human manual manipulation of veneer. Consequently, the numerous injuries associated with prior art full veneer sheet, veneer strip, and/or partial veneer sheet stacking methods and systems, including significant splinter injuries, machine injuries, repetitive motion injuries, fatigue, and worker burnout, are minimized and/or avoided completely using full veneer sheet grading and stacking system 330.

Consequently, full veneer sheet grading and stacking system 330 provides an effective and efficient technical solution to the long-standing technical problem of providing a method and system for full veneer sheet stacking that includes improved wood product scanning and grading methods, produces more consistent and safer stacks of veneer, is less expensive to operate, and is far safer than currently available methods and systems for full veneer sheet stacking.

Figure 1B:
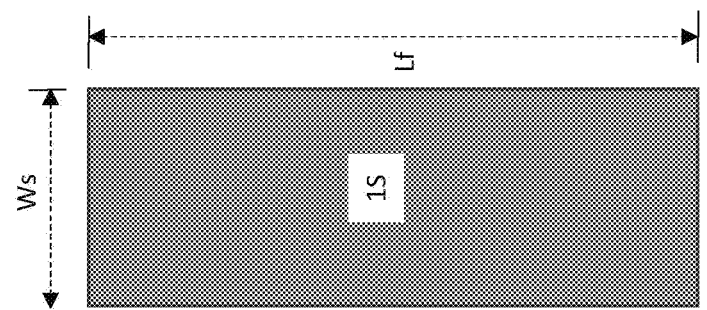
FIG. 1B shows one illustrative example of a veneer strip having the defined length "Lf" and a width "Ws" that is less than the width "Wf" of FIG. 1A.

FIG. 4A is a block diagram of a veneer strip grading and stacking system 430 in accordance with one embodiment. Veneer strip grading and stacking system 430 includes dryer outfeed 431 where individual veneer strips 241 are dropped onto dryer outfeed conveyor 433. Veneer strips 241, being partial portions of full veneer sheets, can be almost any width, such as width Ws in FIG. 1A. However, veneer strips 241 typically have approximately the same length dimension as full veneer sheets, e.g., length Lf in FIGS. 1A and 1B. As noted above, in one illustrative example, the average length Lf of each of veneer strips 241 is approximately 102 inches.

As will be discussed below, for safety reasons and for production efficiency, the dimensions of the stacks of veneer 443 of veneer strips 241 to be created would ideally be consistent in both length and width dimensions. In one illustrative embodiment, the length of a stacks of veneer 443 is approximately length Lf of a full veneer sheet (FIG. 1A) and the width of stacks of veneer 443 is approximately width Wf of a full veneer sheet (FIG. 1A). In addition, as discussed above, it is desirable to have as few bulges in the layers of the stacks of veneer 443. As discussed below, unlike currently available systems, veneer strip grading and stacking system 430 is well suited by design to accomplish this task.

From dryer outfeed conveyor 433 the individual veneer strips 241 pass through moisture meter 434 where the moisture content of the individual veneer strips 241 is determined. In some cases, if the moisture content of an individual veneer strip 241 is determined to be unacceptable, that specific individual veneer strip 241 is so marked by moisture meter 434 and that individual veneer strip 241 is processed, or removed from processing, accordingly. In some cases, the moisture level of individual veneer strips 241 can be used in part to determine a grade of the individual veneer strip 241.

From moisture meter 434, the individual veneer strips 241 are passed to veneer analysis and selection conveyor 435. In one embodiment, the individual veneer strips 241 are conveyed by veneer analysis and selection conveyor 435 to veneer analysis system 300. Veneer analysis system 300 is representative of one or more veneer analysis systems at one or more veneer analysis system locations/positions along veneer analysis and selection conveyor 435 and therefore the inclusion of the single veneer analysis system 300 in FIG. 4A is not limiting.

As discussed in more detail below, in one embodiment, veneer analysis system 300 is used to generate image data associated with each of the individual veneer strips 241. As also discussed in more detail below, this image data is then processed to generate dimensions data 401 for each individual veneer strip 241. In one embodiment, the dimensions data 401 for each individual veneer strip 241 includes length data that can be processed to ensure each individual veneer strip 241 is of the desired length (Lf in FIGS. 1A and 1B) to within defined tolerances. In dimensions data 401 for each individual veneer strip 241 includes width data indicating the precise width (Ws in FIG. 1B) of each individual veneer strip 241. In one embodiment, the dimensions data 401 for each individual veneer strip 241 also includes data representing the relative location, center of mass, orientation, and physical dimensions of each individual veneer strip 241.

In addition, as discussed in more detail below, in one embodiment, veneer analysis system 300 is also used to analyze the surface of each individual veneer strip 241 quickly, consistently, and automatically and generate grading data 403 for each individual veneer strip 241. Grading data 403 represents a grade assigned to each individual veneer strip 241.

In accordance with the disclosed embodiments, the dimensions data 401 and grading data 403 for each individual veneer strip 241 is provided to robot control system 405. Robot control system 405 is representative of one or more veneer selection and stacking robot control systems, associated with one or more local robotic stacking cells 442. Therefore, the number of robot control systems is not limited to the single robot control system 405 shown. In one embodiment, robot control system 405 generates veneer selection and stacking robot control signal data 406 representing veneer selection and stacking robot control signals based on analysis of the dimensions data 401 and grading data 403 for each individual veneer strip 241.

The generated veneer selection and stacking robot control signals represented by veneer selection and stacking robot control signal data 406 are then provided to local robotic stacking cells 442 where they are used to control the operation of one or more veneer selection and stacking robots 440A and 440B included in the one or more local robotic stacking cells 442. In various embodiments, the number of local robotic stacking cells and veneer selection and stacking robots can be any number desired. Consequently, the two local robotic stacking cells 442 and veneer selection and stacking robots 440A and 440B shown in FIG. 4A is not limiting.

In one embodiment, in response to the veneer selection and stacking robot control signals represented by veneer selection and stacking robot control signal data 406, veneer selection and stacking robots 440A and 440B use robotic arms to select specific veneer strips 241 from veneer analysis and selection conveyor 435 and move the selected veneer strips 241 from veneer analysis and selection conveyor 435 to the appropriate stacks of veneer 443 to create layers of selected veneer strips 241 making up stacks of veneer 443. In this way, stacks of veneer 443 of layers of individual veneer strips 241 are created that are stacks of veneer of the same grade of individual veneer strips 241. In some embodiments, the height of the stacks of veneer 237 is typically 38 inches and each stack contains approximately 185 individual sheets or layers.

As discussed above, veneer is a type of wood product that is manufactured into full veneer sheet, veneer strip, and partial veneer sheets. As they are manufactured, various defects may exist in the full or partial veneer sheets. Consequently, depending on the number and type of defects on a particular veneer strip 241, that veneer strip 241 may be unsatisfactory for use in particular applications.

Accordingly, is important that veneer strips 241 are accurately and consistently graded following manufacture because this grade determines the value and the possible uses for which a veneer strip 241 is suitable. A grade assigned to a veneer strip 241 can also be used to determine its best use.

As also discussed above, prior art veneer strip stacking methods and systems suffer from several serious drawbacks. For instance, using prior art methods and systems for producing layered wood products, the quality of veneer fed into process is often not efficiently and effectively inspected and graded during the stacking of veneer operation. Therefore, undetected defects can cause products created using the stacks of veneer to be rejected downstream after significant time and energy has already been devoted to the panels, e.g., pressing is complete and panel quality is analyzed.

Indeed, as pointed out above, using typical prior art veneer strip stacking methods and systems human workers are assigned an unrealistic set of tasks to be performed in an unrealistic amount of time. These include performing visual grading of veneer strips and/or partial veneer sheets as they move along the hand sort conveyor, manually moving veneer strips and/or partial veneer sheets from hand sort conveyor to the stack of veneer associated with the visual and manual grading of the veneer strips and/or partial veneer sheets, without damaging the relatively fragile veneer strips and/or partial veneer sheets, and then adding veneer strips and/or partial veneer sheets to the appropriate stack of veneer in such a way that the dimensions of the stacks of veneer are consistent and that the edges of each stack of veneer are as even as possible.

It is also desirable to stack the layers of individual veneer strips 241 such that any gaps between individual veneer strips 241 in the layers of individual veneer strips 241 are staggered so that no bulges of low and high points are created in stacks of veneer 443. If layers with bulges of high and low points are created in stacks of veneer 443 due to repeatedly stacking veneer strips 241 in the same pattern, then the resultant stack of veneer 443 will be unbalanced and potentially dangerous and difficult to process.

This is not realistic, and the result was that veneer strips and/or partial veneer sheets were inconsistently and/or inaccurately graded, many veneer strips and/or partial veneer sheets were damaged, the resulting stacks of veneer, more often than not, did include numerous veneer strips and/or partial veneer sheets that were not aligned so the stacks of veneer did not have even sides and did have jagged edges, and the resulting stacks of veneer 443 did have bulges of high and low points.

To address this issue, and in contrast to prior art veneer strip stacking methods and systems, veneer strip grading and stacking system 430 utilizes robot control systems, such as robot control system 405, to control veneer selection and stacking robots, such as veneer selection and stacking robots 440A and 440B to create stacks of veneer 443 such that each of stacks of veneer 443, e.g., stack of veneer 1 through stack of veneer 5, is associated with a different grade of veneer strips 241. In addition, in one embodiment, veneer selection and stacking robots 440A and 440B are directed by the veneer selection and stacking robot control signals represented by veneer selection and stacking robot control signal data 406 to use robotic arms to select different veneer strips 241, to remove the veneer strips 241 from veneer analysis and selection conveyor 435, and to place the veneer strips 241 in a specific stack of veneer 443, e.g., stack of veneer 1 through stack of veneer 5, based, at least in part on the grade indicated by the grading data 403 associated with that individual veneer strip 241. Consequently, stacks of veneer 443, e.g., stack of veneer 1 through stack of veneer 5, are made up of layers of veneer strips 241 accurately and consistently determined to be of the specific grade associated with that stack of veneer 443, e.g., stack of veneer 1 through stack of veneer 5.

In addition, as discussed below, the dimensions data 401 for each individual veneer strip 241 is used to generate veneer selection and stacking robot control signals represented by veneer selection and stacking robot control signal data 406 that direct robotic arms of veneer selection and stacking robots 440A and 440B to add each individual veneer strip 241 in layers to its appropriate specific stack of veneer 443, e.g., stack of veneer 1 through stack of veneer 5, so that the edges of the individual layers of veneer strips 241 are aligned and the resulting stacks of veneer 443 have both the desired length, e.g., length Lf of FIG. 1A, and the desired width, e.g., width Wf of FIG. 1A. Consequently, the resulting stacks of veneer 443 are made up of layers of veneer strips 241 that are of the desired length and width, e.g., length Lf and width WF in FIG. 1A, and are aligned to have even edges/sides with no jagged edges. The result is that stacks of veneer 443 are not only made up of veneer strips 241 accurately determined to be of the correct dimension and grade, but that the layers of veneer strips 241 are stacked such that stacks of veneer 443 resemble ideal stack of veneer 243A of FIG. 2H rather than typical prior art stack of veneer 243B of FIG. 2H.

This is in contrast to prior art veneer strip stacking methods and systems, where, in addition to being given the virtually impossible task of grading and manually moving each veneer strip and/or partial veneer sheet from the conveyor to the appropriate grade stack of veneer without damaging the veneer strips and/or partial veneer sheets, human workers were further tasked with adding layers of veneer strips and/or partial veneer sheets to the appropriate stack of veneer in such a way that the dimensions of the stacks of veneer were consistent and that the edges of each stack of veneer are as even as possible. In addition, using prior art veneer strip stacking methods and systems, the human workers were also required to stack the layers of individual veneer strips and/or partial veneer sheets such that any gaps between individual veneer strips and/or partial veneer sheets in the layers of individual veneer strips and/or partial veneer sheets are staggered so that no bulges of low and high points are created in stacks of veneer.

As noted, this prior art requirement of human workers was not realistic and resulted in veneer strips and/or partial veneer sheets that were not only inconsistently and/or inaccurately graded, but that were often damaged and stacked such that numerous veneer strips and/or partial veneer sheets that were not aligned so the stacks of veneer did not have even sides and included jagged edges.

Returning to FIG. 4A, veneer strip grading and stacking system 430 includes overflow bin 438. Like overflow bin 238 of FIG. 2F, in operation, any veneer strips 241 that are of unacceptable dimensions, grade, or moisture content, are passed from veneer analysis and selection conveyor 435 to overflow bin 438 for recycling and/or repurposing. However, unlike prior art veneer strip stacking system 240 of FIG. 2F, using veneer strip grading and stacking system 430 overflow bin 438 does not typically contain significant amounts of veneer that has been damaged, or simply not processed fast enough. This is because veneer strip grading and stacking system 430 uses robotic arms of veneer selection and stacking robots 440A and 440B rather than human workers so that there is minimal damage to partial veneer sheets 241 and processing time is not an issue.

As discussed in more detail below, one way the use of veneer selection and stacking robots 440A and 440B avoids damaging veneer strips 241 is by utilizing robotic arms with selectively activated vacuum heads to move the veneer strips 241 from veneer analysis and selection conveyor 435 and to place the layers of veneer strips 241 in a specific stack of veneer 443.

In addition, as seen in FIG. 4A, by employing veneer selection and stacking robots 440A and 440B rather than human workers, veneer strip grading and stacking system 430 requires the use of as few as two human workers 336; one to position veneer strips 241 onto dryer outfeed conveyor 433 and one to control the use of overflow bin 438.

As also seen in FIG. 4A, once stacks of veneer 443, e.g., stack of veneer 1, stack of veneer, 2, stack of veneer 3, stack of veneer 4, and stack of veneer 5 in FIG. 4A, are created, stack of veneer 1, stack of veneer, 2, stack of veneer 3, stack of veneer 4, and stack of veneer 5 are relayed to output conveyor 445 via relay conveyors/rollers 451, 452, 453, 454, and 455, respectively. At the end of output conveyor 445, stacks of veneer 443 are picked up by forklift 347 which moves stacks of veneer 443 to the location in the processing plant where they are needed.

As shown above, in contrast to prior art veneer strip stacking methods and systems, veneer strip grading and stacking system 430 uses a veneer analysis system 300 to accurately identify the dimensions of the veneer strips 241 and accurately and consistently assign a grade to the veneer strips 241 before the veneer strips 241 are placed in any stack of veneer 443 for further processing. Consequently, using veneer strip grading and stacking system 430, the quality of veneer fed into process is efficiently and effectively determined during the stacking of veneer operation. In this way defects that can cause products created using the veneer to be rejected downstream are detected before significant time and energy has been devoted to the processing of the veneer. In addition, by consistently and accurately assigning a grade to the veneer strips 241 before the veneer strips 241 are placed in any stack of veneer 443 for further processing, individual veneer strips 241 can be used in the most effective and valuable way.

In addition, as noted above and discussed in more detail below, even if prior art inspection and grading systems were employed, prior art inspection and grading systems can be error prone and lead to inaccurate images of veneer sheets being taken, which can result in the system improperly grading veneer sheets. In contrast, veneer strip grading and stacking system 430 uses a veneer analysis system that can capture images of entire surfaces of veneer strips 241 and therefore is far less error prone, is faster, and can require less processing power.

In addition, in contrast to prior art veneer strip stacking methods and systems, using veneer strip grading and stacking system 430, human workers are no longer assigned an unrealistic set of tasks to be performed in an unrealistic amount of time. This is because using veneer strip grading and stacking system 430 robotic arms of veneer selection and stacking robots 440A and 440B perform the grading of veneer strips and/or partial veneer sheets automatically and move the veneer strips 241 from veneer analysis and selection conveyor 435 to the appropriate stack of veneer 443 in layers. In one embodiment, veneer selection and stacking robots 440A and 440B use robotic arms with selectively activated vacuum heads that are faster than humans and are far less likely to damage the relatively fragile veneer strips 241.

In addition, in contrast to prior art veneer strip stacking methods and systems, veneer strip grading and stacking system 430 performs analysis of the dimensions data 401 of each veneer strip 241 and uses this analysis to ensure the veneer strips 241 are added to the appropriate stack of veneer 443 in layers such that the dimensions of the stacks of veneer 443 are consistent, that the edges of each stack of veneer 443 are as even as possible, and that the stacks of veneer 443 are relatively bulge free.

In addition, in contrast to prior art veneer strip stacking methods and systems, veneer strip grading and stacking system 430 does not require significant human interaction with complicated machines and significant human manual manipulation of veneer. Consequently, the numerous injuries associated with prior art full veneer sheet, veneer strip, and/or partial veneer sheet stacking methods and systems, including significant splinter injuries, machine injuries, repetitive motion injuries, worker fatigue, and worker burnout, are minimized and/or avoided completely using veneer strip grading and stacking system 430.

Consequently, veneer strip grading and stacking system 430 provides an effective and efficient technical solution to the long-standing technical problem of providing a method and system for veneer strip stacking that includes improved wood product scanning and grading methods, produces more consistent and safer stacks of veneer, is less expensive to operate, and is far safer than currently available methods and systems for full veneer sheet, veneer strip, and/or partial veneer sheet stacking.

Figure 4B:
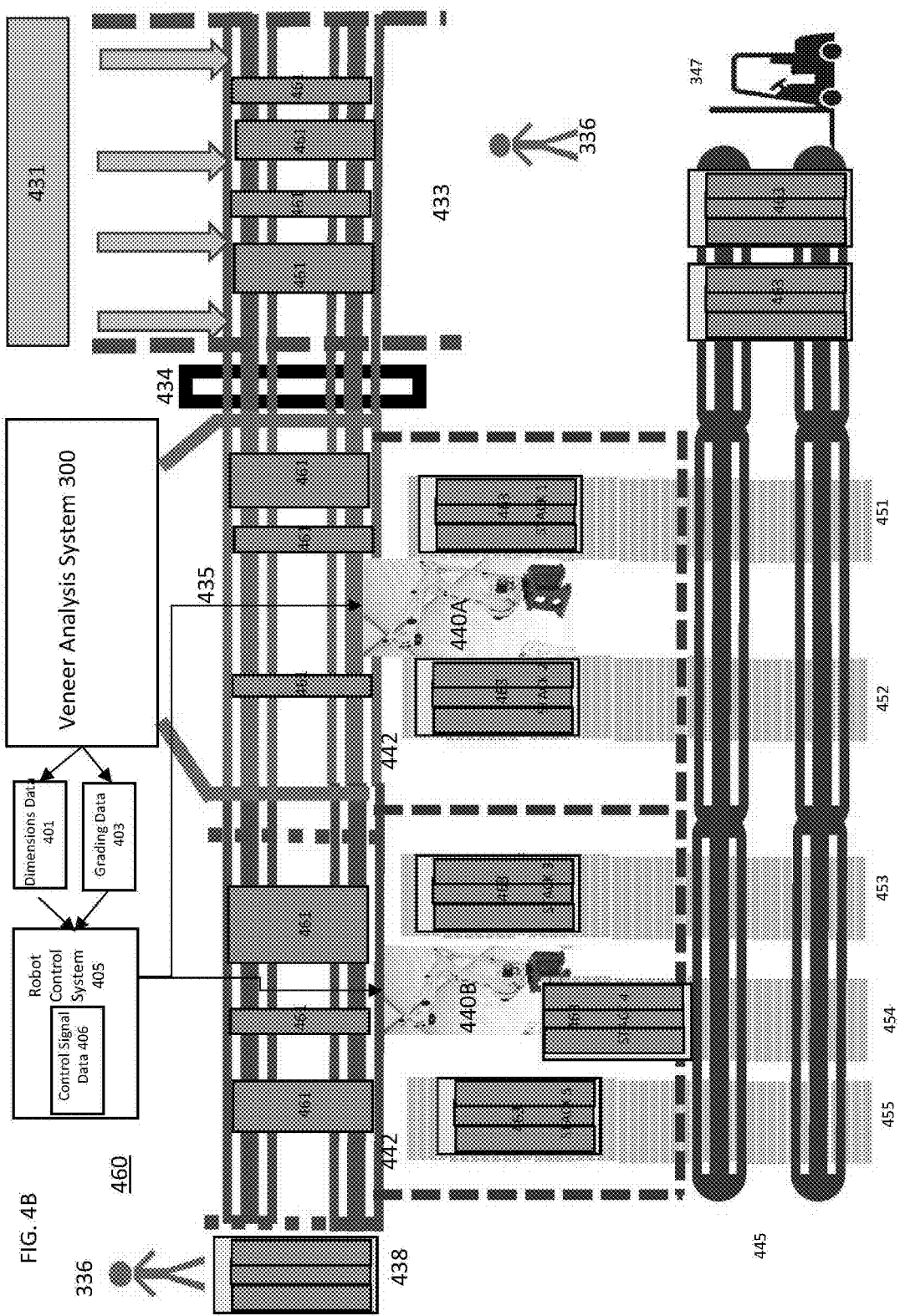
FIG. 4B is a block diagram of a partial veneer sheet grading and stacking system in accordance with one embodiment.

FIG. 4B is a block diagram of a partial veneer sheet grading and stacking system 460 in accordance with one embodiment.

As noted above, herein the terms "partial veneer sheet" "veneer short sheet," and "veneer short strip" are used interchangeably and include a veneer sheet portion that has a length "Lp" that not of the defined length "Lf" of a full veneer sheet. In addition, as used herein, partial veneer sheets can also have any width "Wp" that is less than or equal to the defined full veneer sheet width "Wf." It should be noted that any veneer portion that has any length "Lp" that is not of the defined length "Lf" and a width "Wp" less than or equal to the width "Wf" of a full veneer sheet is considered a partial veneer sheet, even if each partial veneer sheet has a different length "Lp" and width "Wp" from other partial veneer sheets.

If a veneer sheet fraction is less than full length, typically 102", then it is not usable as a full veneer sheet, or veneer strip. In this case, these partial veneer sheets are typically stacked with a clean trimmed edge in vertical alignment in a stack as are full veneer sheets and/or veneer strips. However, these partial veneer sheet stacks are commonly sent to a large saw where they are sawn to the length dimension (typically 51") to be used as the cross ply, or core, in plywood. This process can result in 49% waste of partial veneer sheets. While not an ideal efficiency, this 49% waste is better than 100% waste. These partial veneer sheets can also be composed to produce a continuous ribbon of core material that can then be cut into full size cross ply sheets. So instead of an individual feeding by hand, multiple individual partial sheets, a 51"×51" core sheet can be manually, or machine laid as a single piece of composed core. The 51"×51" is common in the industry but may vary in dimension based on specific manufacturers criteria for core sizes.

As discussed above, FIG. 1C shows one illustrative example of a partial veneer sheet 1P having the length "Lp" less than length "Lf" of FIG. 1A and a width "Wp" less than or equal to width "Wf" of FIG. 1A.

Returning to FIG. 4B, partial veneer sheets 461, being partial portions of full veneer sheets, can be almost any width, such as width Ws in FIG. 1A. However, once sawn, partial veneer sheets 461 typically have approximately the same length dimension although, as noted above, this length dimension is typically not the same length Lf in FIGS. 1A and 1B as full veneer sheets. As discussed above, partial veneer sheets, such as partial veneer sheets 461, typically initially have a differing lengths, such as Lp in FIG. 1C that is not only different from length LF but also is different from partial veneer sheet to partial veneer sheet. As also discussed above, partial veneer sheets 461 are commonly stacked and sent to a large saw where they are sawn to the length dimension (typically 51") prior to being sent to partial veneer sheet grading and stacking system 460.

Returning to FIG. 4B, partial veneer sheet grading and stacking system 460 includes dryer outfeed 431 where individual partial veneer sheets 461 are dropped onto dryer outfeed conveyor 433.

As will be discussed below, for safety reasons and for production efficiency, the dimensions of the stacks of veneer 463 of partial veneer sheets 461 to be created would ideally be consistent in both length and width dimensions. In one illustrative embodiment, the length of a stacks of veneer 463 is approximately a consistent length Lp of a sawn partial veneer sheet (FIG. 1C) and the width of stacks of veneer 463 is approximately width Wf of a full veneer sheet (FIG. 1A). However, the width of the partial veneer sheets in stacks of veneer 463 can be any width desired. In addition, as discussed above, it is desirable to have as few bulges in the layers of the stacks of veneer 463. As discussed below, unlike currently available systems, partial veneer sheet grading and stacking system 460 is well suited by design to accomplish this task.

From dryer outfeed conveyor 433 the individual partial veneer sheets 461 pass through moisture meter 434 where the moisture content of the individual partial veneer sheets 461 is determined. In some cases, if the moisture content of an individual partial veneer sheet 461 is determined to be unacceptable, that specific individual partial veneer sheet 461 is so marked by moisture meter 434 and that individual partial veneer sheet 461 is processed, or removed from processing, accordingly. In some cases, the moisture level of individual partial veneer sheets 461 can be used in part to determine a grade of the individual partial veneer sheet 461.

From moisture meter 434, the individual partial veneer sheets 461 are passed to veneer analysis and selection conveyor 435. In one embodiment, the individual partial veneer sheets 461 are conveyed by veneer analysis and selection conveyor 435 to veneer analysis system 300. Veneer analysis system 300 is representative of one or more veneer analysis systems at one or more veneer analysis system locations/positions along veneer analysis and selection conveyor 435 and therefore the inclusion of the single veneer analysis system 300 in FIG. 4B is not limiting.

As discussed in more detail below, in one embodiment, veneer analysis system 300 is used to generate image data associated with each of the individual partial veneer sheets 461. As also discussed in more detail below, this image data is then processed to generate dimensions data 401 for each individual partial veneer sheet 461. In one embodiment, the dimensions data 401 for each individual partial veneer sheet 461 includes length data that can be processed to ensure each individual partial veneer sheet 461 is of the desired length (Lp in FIG. 1C) to within defined tolerances. In dimensions data 401 for each individual partial veneer sheet 461 includes width data indicating the precise width (Wp in FIG. 1C) of each individual partial veneer sheet 461. In one embodiment, the dimensions data 401 for each individual partial veneer sheet 461 also includes data representing the relative location, center of mass, orientation, and physical dimensions of each individual partial veneer sheet 461.

In addition, as discussed in more detail below, in one embodiment, veneer analysis system 300 is also used to analyze the surface of each individual partial veneer sheet 461 quickly, consistently, and automatically and generate grading data 403 for each individual partial veneer sheet 461. Grading data 403 represents a grade assigned to each individual partial veneer sheet 461.

In accordance with the disclosed embodiments, the dimensions data 401 and grading data 403 for each individual partial veneer sheet 461 is provided to robot control system 405. Robot control system 405 is representative of one or more veneer selection and stacking robot control systems, associated with one or more local robotic stacking cells 442. Therefore, the number of robot control systems is not limited to the single robot control system 405 shown. In one embodiment, robot control system 405 generates veneer selection and stacking robot control signal data 406 representing veneer selection and stacking robot control signals based on analysis of the dimensions data 401 and grading data 403 for each individual partial veneer sheet 461.

The generated veneer selection and stacking robot control signals represented by veneer selection and stacking robot control signal data 406 are then provided to local robotic stacking cells 442 where they are used to control the operation of one or more veneer selection and stacking robots 440A and 440B included in the one or more local robotic stacking cells 442. In various embodiments, the number of local robotic stacking cells and veneer selection and stacking robots can be any number desired. Consequently, the two local robotic stacking cells 442 and veneer selection and stacking robots 440A and 440B shown in FIG. 4B is not limiting.

In one embodiment, in response to the veneer selection and stacking robot control signals represented by veneer selection and stacking robot control signal data 406, veneer selection and stacking robots 440A and 440B use robotic arms to select specific partial veneer sheets 461 from veneer analysis and selection conveyor 435 and move the selected partial veneer sheets 461 from veneer analysis and selection conveyor 435 to the appropriate stacks of veneer 463 to create layers of selected partial veneer sheets 461 making up stacks of veneer 463. In this way, stacks of veneer 463 of layers of individual partial veneer sheets 461 are created that are stacks of veneer of the same grade of individual partial veneer sheets 461. In some embodiments, the height of the stacks of veneer 463 is typically 38 inches and each stack contains approximately 185 individual partial sheets or layers.

As discussed above, veneer is a type of wood product that is manufactured into full veneer sheet, veneer strip, and partial veneer sheets. As they are manufactured, various defects may exist in the partial veneer sheets. Consequently, depending on the number and type of defects on a particular partial veneer sheet 461, that partial veneer sheet 461 may be unsatisfactory for use in particular applications.

Accordingly, is important that partial veneer sheets 461 are accurately and consistently graded following manufacture because this grade determines the value and the possible uses for which a partial veneer sheet 461 is suitable. A grade assigned to a partial veneer sheet 461 can also be used to determine its best use.

As also discussed above, prior art partial veneer sheet stacking methods and systems suffer from several serious drawbacks. For instance, using prior art methods and systems for producing layered wood products, the quality of veneer fed into process is often not efficiently and effectively inspected and graded during the stacking of veneer operation. Therefore, undetected defects can cause products created using the stacks of veneer to be rejected downstream after significant time and energy has already been devoted to the panels, e.g., pressing is complete and panel quality is analyzed.

Indeed, as pointed out above, using typical prior art partial veneer sheet stacking methods and systems human workers are assigned an unrealistic set of tasks to be performed in an unrealistic amount of time. These include performing visual grading of partial veneer sheets as they move along the hand sort conveyor, manually moving partial veneer sheets from hand sort conveyor to the stack of veneer associated with the visual and manual grading of the partial veneer sheets, without damaging the relatively fragile partial veneer sheets, and then adding partial veneer sheets to the appropriate stack of veneer in such a way that the dimensions of the stacks of veneer are consistent and that the edges of each stack of veneer are as even as possible.

It is also desirable to stack the layers of individual partial veneer sheets 461 such that any gaps between individual partial veneer sheets 461 in the layers of individual partial veneer sheets 461 are staggered so that no bulges of low and high points are created in stacks of veneer 463. If layers with bulges of high and low points are created in stacks of veneer 463 due to repeatedly stacking partial veneer sheets 461 in the same pattern, then the resultant stack of veneer 463 will be unbalanced and potentially dangerous and difficult to process.

This is not realistic, and the result was that partial veneer sheets were inconsistently and/or inaccurately graded, many partial veneer sheets were damaged, the resulting stacks of veneer, more often than not, did include numerous partial veneer sheets that were not aligned so the stacks of veneer did not have even sides and did have jagged edges, and the resulting stacks of veneer 463 did have bulges of high and low points.

To address this issue, and in contrast to prior art partial veneer sheet stacking methods and systems, partial veneer sheet grading and stacking system 460 utilizes robot control systems, such as robot control system 405, to control veneer selection and stacking robots, such as veneer selection and stacking robots 440A and 440B to create stacks of veneer 463 such that each of stacks of veneer 463, e.g., stack of veneer 1 through stack of veneer 5, is associated with a different grade of partial veneer sheets 461. In addition, in one embodiment, veneer selection and stacking robots 440A and 440B are directed by the veneer selection and stacking robot control signals represented by veneer selection and stacking robot control signal data 406 to use robotic arms to select different partial veneer sheets 461, to remove the partial veneer sheets 461 from veneer analysis and selection conveyor 435, and to place the partial veneer sheets 461 in a specific stack of veneer 463, e.g., stack of veneer 1 through stack of veneer 5, based, at least in part on the grade indicated by the grading data 403 associated with that individual partial veneer sheet 461. Consequently, stacks of veneer 463, e.g., stack of veneer 1 through stack of veneer 5, are made up of layers of partial veneer sheets 461 accurately and consistently determined to be of the specific grade associated with that stack of veneer 463, e.g., stack of veneer 1 through stack of veneer 5.

Figure 1C:
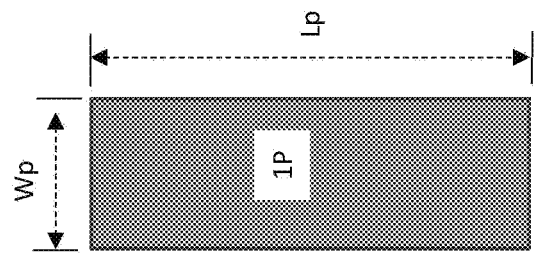
FIG. 1C shows one illustrative example of a partial veneer sheet having the length "Lp" less than length "Lf" of FIG. 1A and a width "Wp" less than or equal to width "Wf" of FIG. 1A.
Figure 1D:
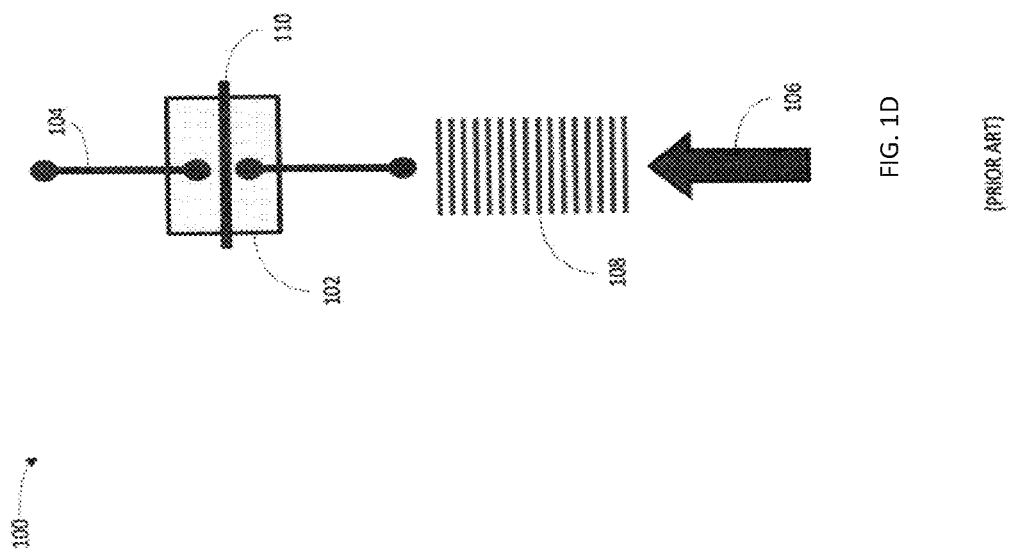
FIG. 1D shows a block diagram of a prior art system for grading veneer.
Figure 2I:
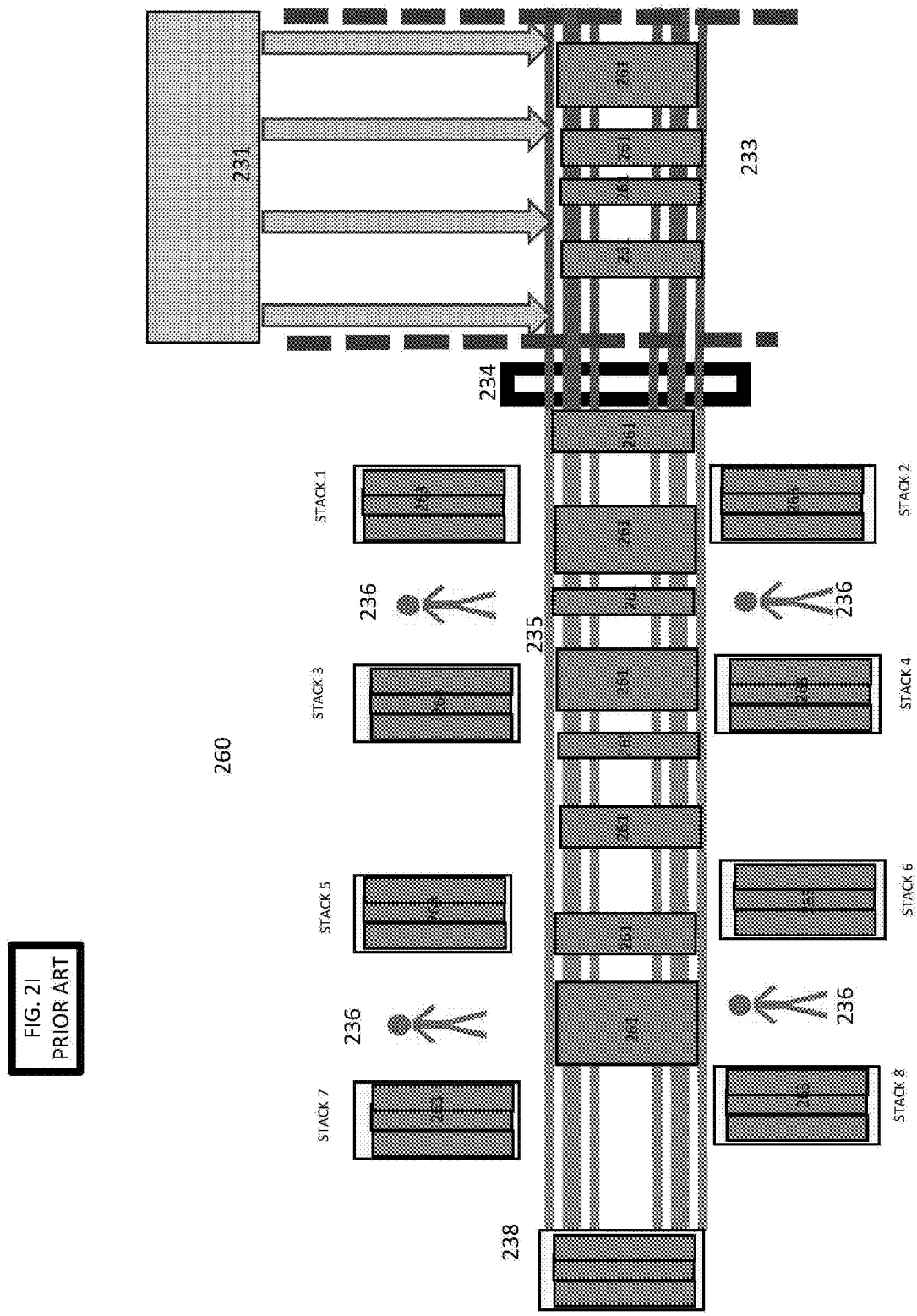
FIG. 2I is a block diagram of a prior art partial veneer sheet stacking system.
Figure 2J:
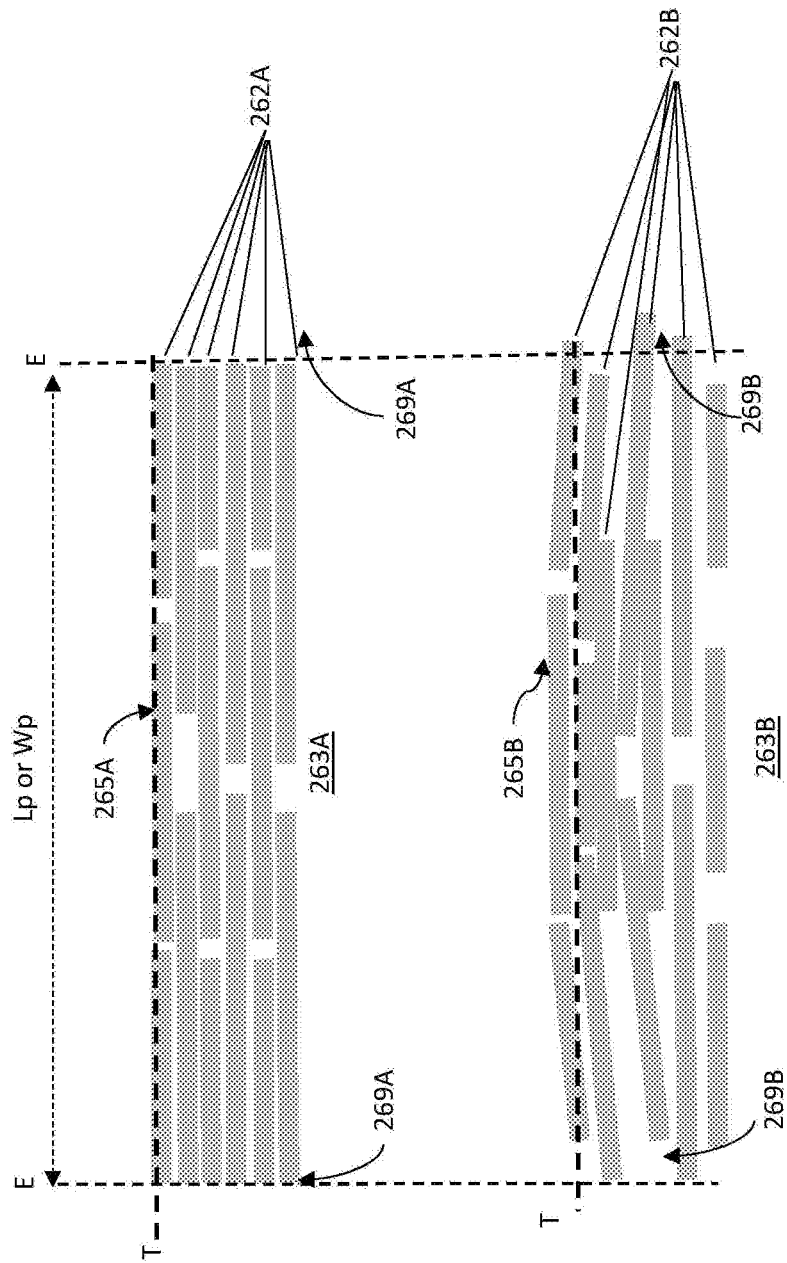
FIG. 2J shows an ideal partial veneer sheet stack and a typical partial veneer sheet stack created using a prior art partial veneer sheet stacking system.
Figure 2K:
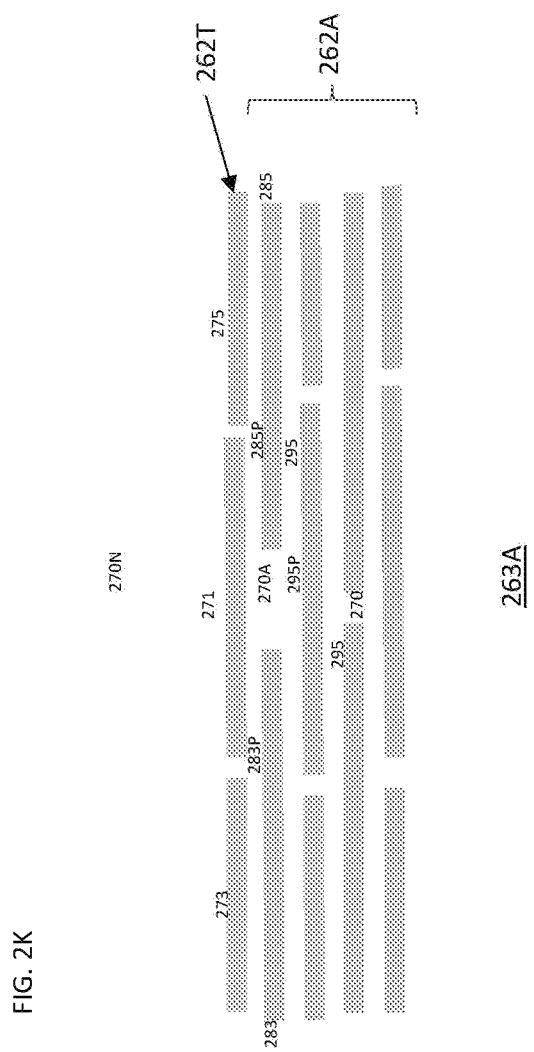
Figure 2L:
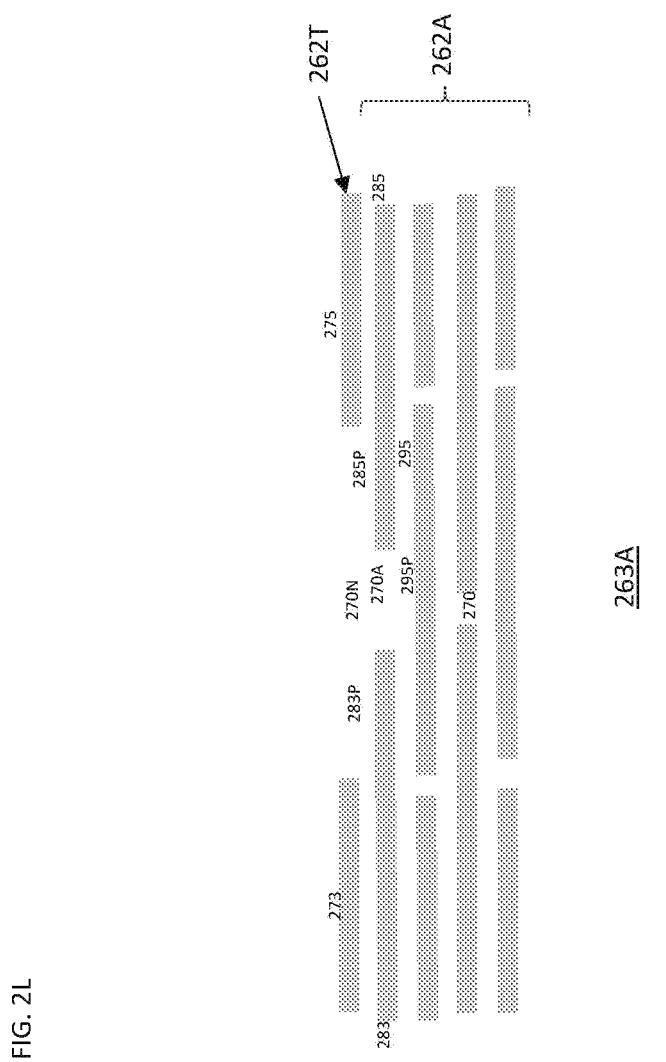
Figure 2M:
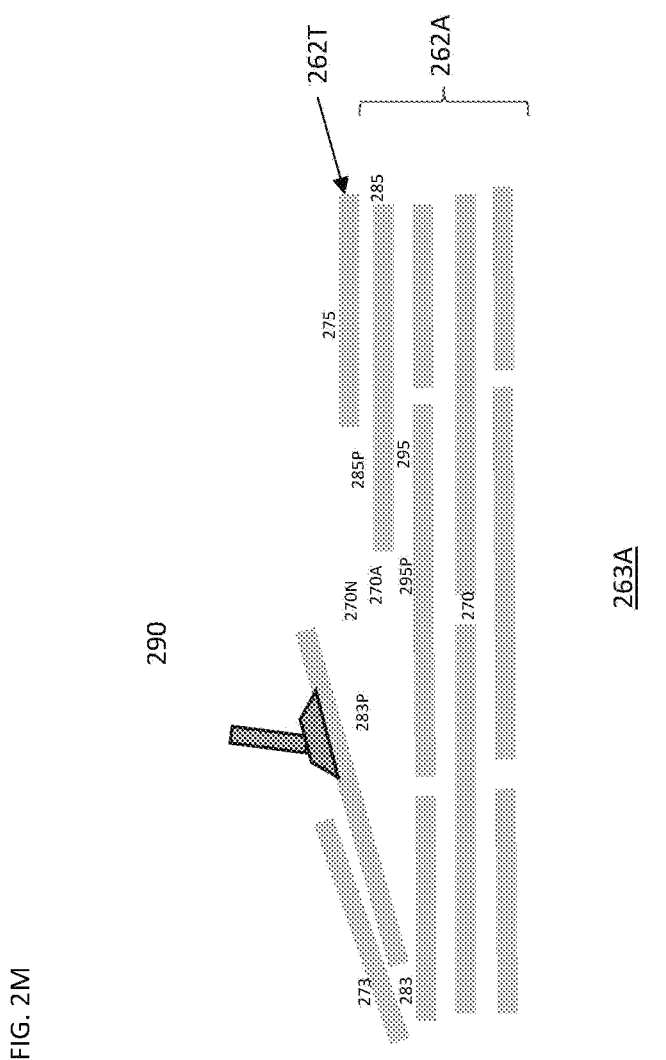
Figure 2N:
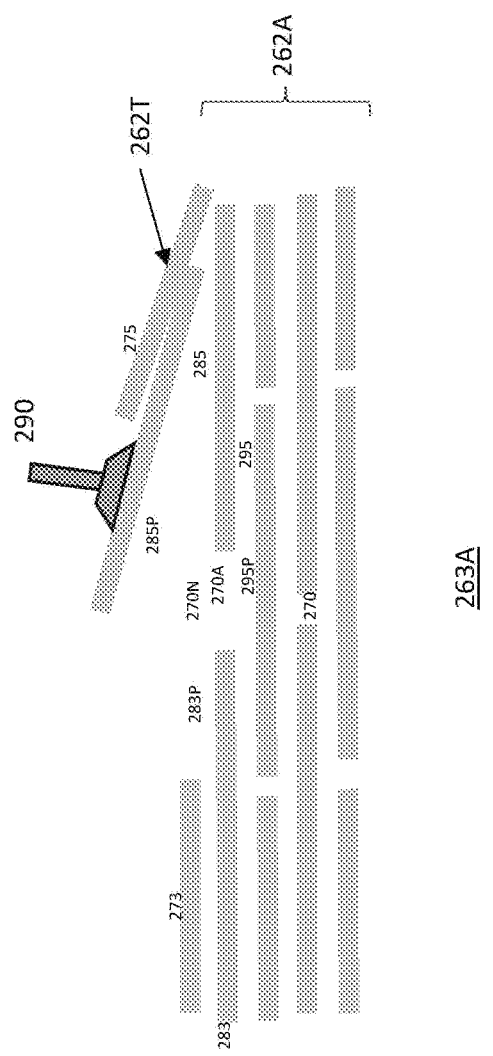
Figure 20:
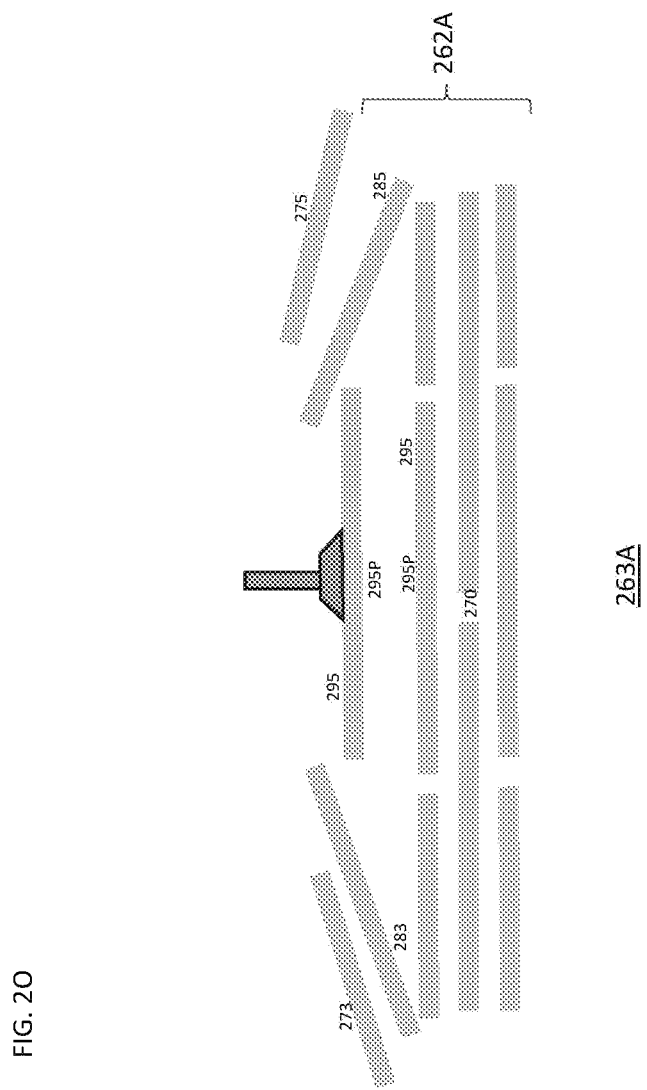

In addition, as discussed below, the dimensions data 401 for each individual partial veneer sheet 461 is used to generate veneer selection and stacking robot control signals represented by veneer selection and stacking robot control signal data 406 that direct robotic arms of veneer selection and stacking robots 440A and 440B to add each individual partial veneer sheet 461 in layers to its appropriate specific stack of veneer 463, e.g., stack of veneer 1 through stack of veneer 5, so that the edges of the individual layers of partial veneer sheets 461 are aligned and the resulting stacks of veneer 463 have both the desired length, e.g., length Lp of FIG. 1C, and the desired width, e.g., width Wf of FIG. 1A. Consequently, the resulting stacks of veneer 463 are made up of layers of partial veneer sheets 461 that are of the desired length and width, e.g., length Lp and width Wp in FIG. 1C, and are aligned to have even edges/sides with no jagged edges. The result is that stacks of veneer 463 are not only made up of partial veneer sheets 461 accurately determined to be of the correct dimension and grade, but that the layers of partial veneer sheets 461 are stacked such that stacks of veneer 463 resemble ideal stack of veneer 263A of FIG. 2J rather than typical prior art stack of veneer 263B of FIG. 2J.

This is in contrast to prior art partial veneer sheet stacking methods and systems, where, in addition to being given the virtually impossible task of grading and manually moving each partial veneer sheet from the conveyor to the appropriate grade stack of veneer without damaging the partial veneer sheets, human workers were further tasked with adding layers of partial veneer sheets to the appropriate stack of veneer in such a way that the dimensions of the stacks of veneer were consistent and that the edges of each stack of veneer are as even as possible. In addition, using prior art partial veneer sheet stacking methods and systems, the human workers were also required to stack the layers of individual partial veneer sheets such that any gaps between individual partial veneer sheets in the layers of individual partial veneer sheets are staggered so that no bulges of low and high points are created in stacks of veneer.

As noted, this prior art requirement of human workers was not realistic and resulted in partial veneer sheets that were not only inconsistently and/or inaccurately graded, but that were often damaged and stacked such that numerous partial veneer sheets that were not aligned so the stacks of veneer did not have even sides and included jagged edges.

Returning to FIG. 4B, partial veneer sheet grading and stacking system 460 includes overflow bin 438. Like overflow bin 238 of FIG. 2I, in operation, any partial veneer sheets 461 that are of unacceptable dimensions, grade, or moisture content, are passed from veneer analysis and selection conveyor 435 to overflow bin 438 for recycling and/or repurposing. However, unlike prior art partial veneer sheet stacking system 260 of FIG. 2I, using partial veneer sheet grading and stacking system 460 overflow bin 438 does not typically contain significant amounts of veneer that has been damaged, or simply not processed fast enough. This is because partial veneer sheet grading and stacking system 460 uses robotic arms of veneer selection and stacking robots 440A and 440B rather than human workers so that there is minimal damage to partial veneer sheets 461 and processing time is not an issue.

As discussed in more detail below, one way the use of veneer selection and stacking robots 440A and 440B avoids damaging partial veneer sheets 461 is by utilizing robotic arms with selectively activated vacuum heads to move the partial veneer sheets 461 from veneer analysis and selection conveyor 435 and to place the layers of partial veneer sheets 461 in a specific stack of veneer 463.

In addition, as seen in FIG. 4B, by employing veneer selection and stacking robots 440A and 440B rather than human workers, partial veneer sheet grading and stacking system 460 requires the use of as few as two human workers 336; one to position partial veneer sheets 461 onto dryer outfeed conveyor 433 and one to control the use of overflow bin 438.

As also seen in FIG. 4B, once stacks of veneer 463, e.g., stack of veneer 1, stack of veneer, 2, stack of veneer 3, stack of veneer 4, and stack of veneer 5 in FIG. 4B, are created, stack of veneer 1, stack of veneer, 2, stack of veneer 3, stack of veneer 4, and stack of veneer 5 are relayed to output conveyor 445 via relay conveyors/rollers 451, 452, 453, 454, and 455, respectively. At the end of output conveyor 445, stacks of veneer 463 are picked up by forklift 347 which moves stacks of veneer 463 to the location in the processing plant where they are needed.

As shown above, in contrast to prior art partial veneer sheet stacking methods and systems, partial veneer sheet grading and stacking system 460 uses a veneer analysis system 300 to accurately identify the dimensions of the partial veneer sheets 461 and accurately and consistently assign a grade to the partial veneer sheets 461 before the partial veneer sheets 461 are placed in any stack of veneer 463 for further processing. Consequently, using partial veneer sheet grading and stacking system 460, the quality of veneer fed into process is efficiently and effectively determined during the stacking of veneer operation. In this way defects that can cause products created using the veneer to be rejected downstream are detected before significant time and energy has been devoted to the processing of the veneer. In addition, by consistently and accurately assigning a grade to the partial veneer sheets 461 before the partial veneer sheets 461 are placed in any stack of veneer 463 for further processing, individual partial veneer sheets 461 can be used in the most effective and valuable way.

In addition, as noted above, even if prior art inspection and grading systems were employed, prior art inspection and grading systems can be error prone and lead to inaccurate images of veneer sheets being taken, which can result in the system improperly grading veneer sheets. In contrast, in one embodiment, partial veneer sheet grading and stacking system 460 uses a veneer analysis system that can capture images of entire surfaces of partial veneer sheets 461 and therefore is far less error prone, is faster, and can require less processing power.

In addition, in contrast to prior art partial veneer sheet stacking methods and systems, using partial veneer sheet grading and stacking system 460, human workers are no longer assigned an unrealistic set of tasks to be performed in an unrealistic amount of time. This is because using partial veneer sheet grading and stacking system 460 robotic arms of veneer selection and stacking robots 440A and 440B perform the grading of partial veneer sheets automatically and move the partial veneer sheets 461 from veneer analysis and selection conveyor 435 to the appropriate stack of veneer 463 in layers. In one embodiment, veneer selection and stacking robots 440A and 440B use robotic arms with selectively activated vacuum heads that are faster than humans and are far less likely to damage the relatively fragile partial veneer sheets 461.

In addition, in contrast to prior art partial veneer sheet stacking methods and systems, partial veneer sheet grading and stacking system 460 performs analysis of the dimensions data 401 of each partial veneer sheet 461 and uses this analysis to ensure the partial veneer sheets 461 are added to the appropriate stack of veneer 463 in layers such that the dimensions of the stacks of veneer 463 are consistent, that the edges of each stack of veneer 463 are as even as possible, and that the stacks of veneer 463 are relatively bulge free.

In addition, in contrast to prior art partial veneer sheet stacking methods and systems, partial veneer sheet grading and stacking system 460 does not require significant human interaction with complicated machines and significant human manual manipulation of veneer. Consequently, the numerous injuries associated with prior art partial veneer sheet stacking methods and systems, including significant splinter injuries, machine injuries, repetitive motion injuries, worker fatigue, and worker burnout, are minimized and/or avoided completely using partial veneer sheet grading and stacking system 460.

Consequently, partial veneer sheet grading and stacking system 460 provides an effective and efficient technical solution to the long-standing technical problem of providing a method and system for partial veneer sheet stacking that includes improved wood product scanning and grading methods, produces more consistent and safer stacks of veneer, is less expensive to operate, and is far safer than currently available methods and systems for full veneer sheet, partial veneer sheet stacking.

As seen in the discussion above, full veneer sheet grading and stacking system 330, veneer strip grading and stacking system 430, and partial veneer sheet grading and stacking system 460 use dimensions data and grading data generated by the veneer analysis systems 300 for each individual full veneer sheet, veneer strip, and partial veneer sheet. This dimensions data and grading data is then provided to one or more veneer selection and stacking robot control systems associated with one or more local robotic stacking cells. In one embodiment, the one or more veneer selection and stacking robot control systems generate veneer selection and stacking robot control signals based on analysis of the dimensions data and grading data for each individual full veneer sheet, veneer strip, and partial veneer sheet. The generated veneer selection and stacking robot control signals are then used to control the operation of one or more veneer selection and stacking robots included in the one or more local robotic stacking cells.

In response to the received veneer selection and stacking robot control signals, the one or more veneer selection and stacking robots are then used to move each individual full veneer sheet, veneer strip, and partial veneer sheet locally and independently from the veneer analysis and selection conveyor system to an appropriate stack of veneer based on the grade assigned to the individual full veneer sheet, veneer strip, and partial veneer sheet by the one or more veneer analysis systems.

In one embodiment, the dimensions data is used to generate veneer selection and stacking robot control signals that direct robotic arms of the one or more veneer selection and stacking robots to place the individual full veneer sheet, veneer strip, and partial veneer sheet on the appropriate stack of veneer such that the resulting stacks of veneer have relatively uniform edges, top surfaces, and are virtually free of jagged edges and/or bulges of low and/or high areas.

In various embodiments, the dimensions data and grading data for each individual full veneer sheet, veneer strip, and partial veneer sheet is generated by one or more veneer analysis systems 300.

In various embodiments, the one or more veneer analysis systems 300 can include all or part of the veneer analysis systems 300 described in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which claims the benefit of David Bolton, U.S. Provisional Patent Application No. 62/595,489, filed on Dec. 6, 2017, entitled "IMAGING SYSTEM FOR ANALYSIS OF WOOD PRODUCTS," which is hereby incorporated by reference in its entirety as if it were fully set forth herein.

In various embodiments, the one or more veneer analysis systems 300 can include all or part of the veneer analysis systems 300 described in Bolton et al., U.S. patent application Ser. No. 16/687,311, filed Nov. 18, 2019, entitled "METHOD AND SYSTEM FOR DETECTING MOISTURE LEVELS IN WOOD PRODUCTS USING NEAR INFRARED IMAGING," which claims the benefit of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

In various embodiments, the one or more veneer analysis systems 300 can include all or part of the veneer analysis systems 300 described in Bolton et al., U.S. patent application Ser. No. 16/687,342, filed on Nov. 18, 2019, entitled "METHOD AND SYSTEM FOR DETECTING MOISTURE LEVELS IN WOOD PRODUCTS USING NEAR INFRARED IMAGING AND MACHINE LEARNING," which claims the benefit of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

In various embodiments, the one or more veneer analysis systems 300 can include all or part of the veneer analysis systems 300 described in Bolton et al., U.S. patent application Ser. No. 16/687,369, filed on Nov. 18, 2019, entitled "METHOD AND SYSTEM FOR MOISTURE GRADING WOOD PRODUCTS USING SUPERIMPOSED NEAR INFRARED AND VISUAL IMAGES," which claims the benefit of David Bolton, U.S. Provisional Patent Application No. 62/774,029, filed on Nov. 30, 2018, entitled "NEAR-INFRARED MOISTURE DETECTION IN WOOD PRODUCTS," which is hereby incorporated by reference in its entirety as if it were fully set forth herein.

In various embodiments, the one or more veneer analysis systems 300 can include all or part of the veneer analysis systems 300 described in Bolton et al., U.S. patent application Ser. No. 16/697,458, filed Nov. 27, 2019, now issued as U.S. Pat. No. 11,090,833 on Aug. 17, 2021, entitled "METHOD AND SYSTEM FOR ENSURING THE QUALITY OF A WOOD PRODUCT BASED ON SURFACE IRREGULARITIES USING NEAR INFRARED IMAGING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

In various embodiments, the one or more veneer analysis systems 300 can include all or part of the veneer analysis systems 300 described in Bolton et al., U.S. patent application Ser. No. 16/697,461, filed on Nov. 27, 2019, now issued as U.S. Pat. No. 10,933,556 on Mar. 2, 2021, entitled "METHOD AND SYSTEM FOR ENSURING THE QUALITY OF A WOOD PRODUCT BASED ON SURFACE IRREGULARITIES USING NEAR INFRARED IMAGING AND MACHINE LEARNING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

In various embodiments, the one or more veneer analysis systems 300 can include all or part of the veneer analysis systems 300 described in Bolton et al., U.S. patent application Ser. No. 16/697,466, filed on Nov. 27, 2019, now issued as U.S. Pat. No. 10,933,557 on Mar. 2, 2021, entitled "METHOD AND SYSTEM FOR ADJUSTING THE PRODUCTION PROCESS OF A WOOD PRODUCT BASED ON A LEVEL OF IRREGULARITY OF A SURFACE OF THE WOOD PRODUCT USING NEAR INFRARED IMAGING," which claims the benefit of David Bolton, U.S. Provisional Patent Application No. 62/773,992, filed on Nov. 30, 2018, entitled "NEAR-INFRARED SURFACE TEXTURE DETECTION IN WOOD PRODUCTS," which is hereby incorporated by reference in its entirety as if it were fully set forth herein.

In various embodiments, the one or more veneer analysis systems 300 can include all or part of the two or more or the veneer analysis systems 300 described in the related applications set forth above which are hereby incorporated by reference in their entirety as if it were fully set forth herein.

Specific Illustrative Example of One Embodiment Employing all or Part of the Veneer Analysis Systems 300 Described in Bolton et al., U.S. Pat. No. 10,825,164

In one specific illustrative example of one embodiment, the veneer analysis system 300 is a vision system using all or part of the veneer analysis systems 300 described in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which claims the benefit of David Bolton, U.S. Provisional Patent Application No. 62/595,489, filed on Dec. 6, 2017, entitled "IMAGING SYSTEM FOR ANALYSIS OF WOOD PRODUCTS."

In one specific illustrative example of one embodiment, veneer analysis system 300 is a vision system that can include two or more cameras for capturing a black and white image of a full veneer sheet, veneer strip, and partial veneer sheet, with a first camera, capturing a color image of the full veneer sheet, veneer strip, and partial veneer sheet, with a second camera, determining from computer processing of the black and white image one or more of the dimensions of the full veneer sheet, veneer strip, and partial veneer sheet, the existence of voids within the full veneer sheet, veneer strip, and partial veneer sheet, and the presence of debris on the full veneer sheet, veneer strip, and partial veneer sheet, determining from computer processing of the color image whether colored defects are present in the full veneer sheet, veneer strip, and partial veneer sheet, and assigning a grade to the full veneer sheet, veneer strip, and partial veneer sheet based at least in part on the computer processing of the black and white image and the computer processing of the color image.

In one specific illustrative example of one embodiment, veneer analysis system 300 is a vision system and the colored defects can comprise one or more of the presence of closed knots, the position of closed knots, the size and spacing of closed knots, the presence of pitch, the size and position of pitch, the presence of wane, the size and position of wane, and the presence of blue mold.

In one specific illustrative example of one embodiment, veneer analysis system 300 is a vision system and the full veneer sheet, veneer strip, and partial veneer sheet can travel along a veneer analysis and selection conveyor of a production line and the first and second cameras can capture the black and white and color images of the full veneer sheet, veneer strip, and partial veneer sheet at a first location along the veneer analysis and selection conveyor.

In one specific illustrative example of one embodiment, veneer analysis system 300 is a vision system and the first camera can capture a black and white image of an entire surface of the full veneer sheet, veneer strip, and partial veneer sheet facing the first camera and the second camera can capture a color image of the entire surface of the full veneer sheet, veneer strip, and partial veneer sheet facing the second camera.

In one specific illustrative example of one embodiment, veneer analysis system 300 is a vision system and the first camera can capture a black and white image of a portion of the full veneer sheet, veneer strip, and partial veneer sheet without digitally stitching together multiple images and the second camera can capture a color image of the portion of the full veneer sheet, veneer strip, and partial veneer sheet without digitally stitching together multiple images.

In one specific illustrative example of one embodiment, veneer analysis system 300 is a vision system and the full veneer sheet, veneer strip, and partial veneer sheet can be assigned an associated void or undersized grade based on the determination from the computer processing of the black and white image that one or more of the dimensions of the full veneer sheet, veneer strip, and partial veneer sheet are undersized in comparison to a reference or that voids exist in the full veneer sheet, veneer strip, and partial veneer sheet. The full veneer sheet, veneer strip, and partial veneer sheet can be sorted based on this grade.

In one specific illustrative example of one embodiment, veneer analysis system 300 is a vision system where an associated void or undersized grade has not been assigned to the full veneer sheet, veneer strip, and partial veneer sheet, a grade can be assigned to the full veneer sheet, veneer strip, and partial veneer sheet based on one or more of the presence of closed knots, the position, size and spacing of closed knots, the presence of pitch, the size and position of pitch, the presence of wane, the size and position of wane, and the presence of blue mold as determined from the computer processing of the color image. The full veneer sheet, veneer strip, and partial veneer sheet can be sorted based upon this grade. In some embodiments, the full veneer sheet, veneer strip, and partial veneer sheet can be a sheet of wood veneer.

In one specific illustrative example of one embodiment, veneer analysis system 300 is a vision system and the computer processing of the black and white image can comprise performing a comparison between the black and white image and a reference image. In some embodiments, the computer processing of the color image can comprise performing a comparison between the color image and a reference image. In one specific illustrative example of one embodiment, veneer analysis system 300 is a vision system, the computer processing of the color image can comprise comparing data of the color image to reference data.

In one specific illustrative example of one embodiment, veneer analysis system 300 is a vision system and the method and system can comprise determining a scaling factor between the full veneer sheet, veneer strip, and partial veneer sheet and the black and white image based at least in part on known dimensions of a reference image.

In one specific illustrative example of one embodiment, veneer analysis system 300 is a vision system and the method and system can comprise auto-rotating the black and white image such that it is parallel with respect to a reference direction before performing the computer processing of the black and white image and auto-rotating the color image such that it is parallel with respect to the reference direction before performing the computer processing of the color image.

In one specific illustrative example of one embodiment, veneer analysis system 300 is a vision system and the method and system can comprise translating the black and white image such that it has the same horizontal spacing as a reference image before performing the computer processing of the black and white image and translating the color image such that it has same horizontal spacing as the reference image before performing the computer processing of the color image.

In one specific illustrative example of one embodiment, veneer analysis system 300 is a vision system and the method and system can further comprise determining from computer processing of the color image whether critical areas containing multiple defects are present in the full veneer sheet, veneer strip, and partial veneer sheet.

In one specific illustrative example of one embodiment, veneer analysis system 300 is a vision system and the method or system can comprise storing a plurality of first images of full veneer sheets, and/or veneer strips, and/or partial veneer sheets having a first grade in computer memory, storing a plurality of second images of full veneer sheets, and/or veneer strips, and/or partial veneer sheets having a second grade in computer memory, capturing a black and white image of a full veneer sheet, veneer strip, and partial veneer sheet with a first camera, capturing a color image of a full veneer sheet, veneer strip, and partial veneer sheet with a second camera, performing a first series of comparisons between the plurality of first images and the black and white image with a computer, performing a second series of comparisons between the plurality of second images and the black and white image with the computer, performing a third series of comparisons between the plurality of first images and the color image with the computer, performing a fourth series of comparisons between the plurality of second images and the color image with the computer, and assigning one of the first grade or the second grade to the full veneer sheet, veneer strip, and partial veneer sheet based at least in part on one or more of the first series of comparisons, the second series of comparisons, the third series of comparisons, and the fourth series of comparisons.

In one specific illustrative example of one embodiment, veneer analysis system 300 is a vision system and the method or system can comprise capturing a black and white image of a full veneer sheet, veneer strip, and partial veneer sheet with a first camera, capturing a color image of the full veneer sheet, veneer strip, and partial veneer sheet with a second camera, auto-rotating the black and white image such that it has the same orientation as a reference image, auto-rotating the color image such that it has the same orientation as the reference image, translating the black and white image such that it has the same horizontal spacing as the reference image, translating the color image such that it has the same horizontal spacing as the reference image, determining from computer processing of the black and white image one or more of the dimensions of the full veneer sheet, veneer strip, and partial veneer sheet, the existence of voids within the full veneer sheet, veneer strip, and partial veneer sheet, and the presence of debris on the full veneer sheet, veneer strip, and partial veneer sheet, determining from computer processing of the color image whether colored defects are present in the full veneer sheet, veneer strip, and partial veneer sheet, and assigning a grade to the full veneer sheet, veneer strip, and partial veneer sheet based at least in part on the computer processing of the black and white image and the computer processing of the color image.

In one specific illustrative example of one embodiment, veneer analysis system 300 is a vision system and the method or system can comprise determining a scaling factor between the full veneer sheet, veneer strip, and partial veneer sheet and one of the black and white image or the color image based at least in part on known dimensions of the reference image.

In one specific illustrative example of one embodiment, veneer analysis system 300 is a vision system, and the first camera can capture a black and white image of an entire surface of the full veneer sheet, veneer strip, and partial veneer sheet facing the first camera and the second camera can capture a color images of the entire surface of the full veneer sheet, veneer strip, and partial veneer sheet facing the second camera.

In one specific illustrative example of one embodiment, veneer analysis system 300 is a vision system and the first camera can capture a black and white image of a portion of the full veneer sheet, veneer strip, and partial veneer sheet without digitally stitching together multiple images and the second camera can capture a color image of the portion of the full veneer sheet, veneer strip, and partial veneer sheet without digitally stitching together multiple images.

In one specific illustrative example of one embodiment, veneer analysis system 300 is a vision system and an apparatus can comprise a first camera to capture a black and white image of a full veneer sheet, veneer strip, and partial veneer sheet, a second camera to capture a color image of the full veneer sheet, veneer strip, and partial veneer sheet, and a veneer analysis system controller. The veneer analysis system controller can perform computer processing of the black and white image to determine one or more of the dimensions of the full veneer sheet, veneer strip, and partial veneer sheet, the existence of voids within the full veneer sheet, veneer strip, and partial veneer sheet, and the presence of debris on the full veneer sheet, veneer strip, and partial veneer sheet. The veneer analysis system controller can perform computer processing of the color image to determine whether colored defects are present in the full veneer sheet, veneer strip, and partial veneer sheet. The veneer analysis system controller can assign a grade to the full veneer sheet, veneer strip, and partial veneer sheet based at least in part on the computer processing of the black and white image and the computer processing of the color image.

In one specific illustrative example of one embodiment, veneer analysis system 300 is a vision system and the first and second cameras can be mounted above a veneer analysis and selection conveyor of a production line in a position to capture respective black and white and color images of the full veneer sheet, veneer strip, and partial veneer sheet at a first location of the full veneer sheet, veneer strip, and partial veneer sheet along the veneer analysis and selection conveyor.

In one specific illustrative example of one embodiment, veneer analysis system 300 is a vision system and the first camera can be configured to capture a black and white image of an entire surface of the full veneer sheet, veneer strip, and partial veneer sheet facing the first camera and the second camera can be configured to capture a color image of the entire surface of the full veneer sheet, veneer strip, and partial veneer sheet.

In one specific illustrative example of one embodiment, veneer analysis system 300 is a vision system and the veneer analysis system controller can be configured to determine a scaling factor between the full veneer sheet, veneer strip, and partial veneer sheet and the black and white image based at least in part on known dimensions of a reference image.

In one specific illustrative example of one embodiment, veneer analysis system 300 is a vision system and the first camera can be configured to capture a black and white image of an entire surface of the full veneer sheet, veneer strip, and partial veneer sheet facing the camera and the second camera can be configured to capture a color image of the entire surface of the full veneer sheet, veneer strip, and partial veneer sheet.

In one specific illustrative example of one embodiment, veneer analysis system 300 is a vision system and the veneer analysis system controller can be configured to auto rotate the black and white image and the color image such that the black and white image and the color image have the same orientation as a reference image.

In one specific illustrative example of one embodiment, veneer analysis system 300 is a vision system and the veneer analysis system controller can be configured to translate the black and white image and the color image such that the black and white image and the color image are each oriented to match the orientation of the reference image.

As noted, the discussion above is directed to but one illustrative example or one embodiment of a veneer analysis system 300 which, in that one specific illustrative example is a vision system. However, as also noted herein, in various embodiments, the one or more veneer analysis systems 300 can include all or part of the one or more or the veneer analysis systems 300 described in the related applications set forth above which are hereby incorporated by reference in its entirety as if fully set forth herein. Consequently, the discussion above is not limiting. In addition, in various embodiments, veneer analysis system 300 can be any system capable of generating accurate dimensions data 301 and/or any grading data 303, as discussed herein, and/or as known in the art at the time of filing, and/or as made developed/made known after the time of filing.

As noted, as disclosed herein veneer analysis systems are used to generate images of the individual full veneer sheets, and/or veneer strips, and/or partial veneer sheets and these images are processed to generate dimensions data for each individual full veneer sheet, veneer strip, and partial veneer sheet. In one embodiment, the dimensions data for each individual full veneer sheet, veneer strip, and partial veneer sheet includes data representing the relative location, center of mass, orientation, and physical dimensions of each individual full veneer sheet, veneer strip, and partial veneer sheet quickly and automatically.

In addition, in one embodiment, the one or more veneer analysis systems are also used to analyze the surface of each individual full veneer sheet, veneer strip, and partial veneer sheet and generate grading data for each individual full veneer sheet, veneer strip, and partial veneer sheet representing a grade assigned to each individual full veneer sheet, veneer strip, and partial veneer sheet quickly and automatically.

Figure 5A:
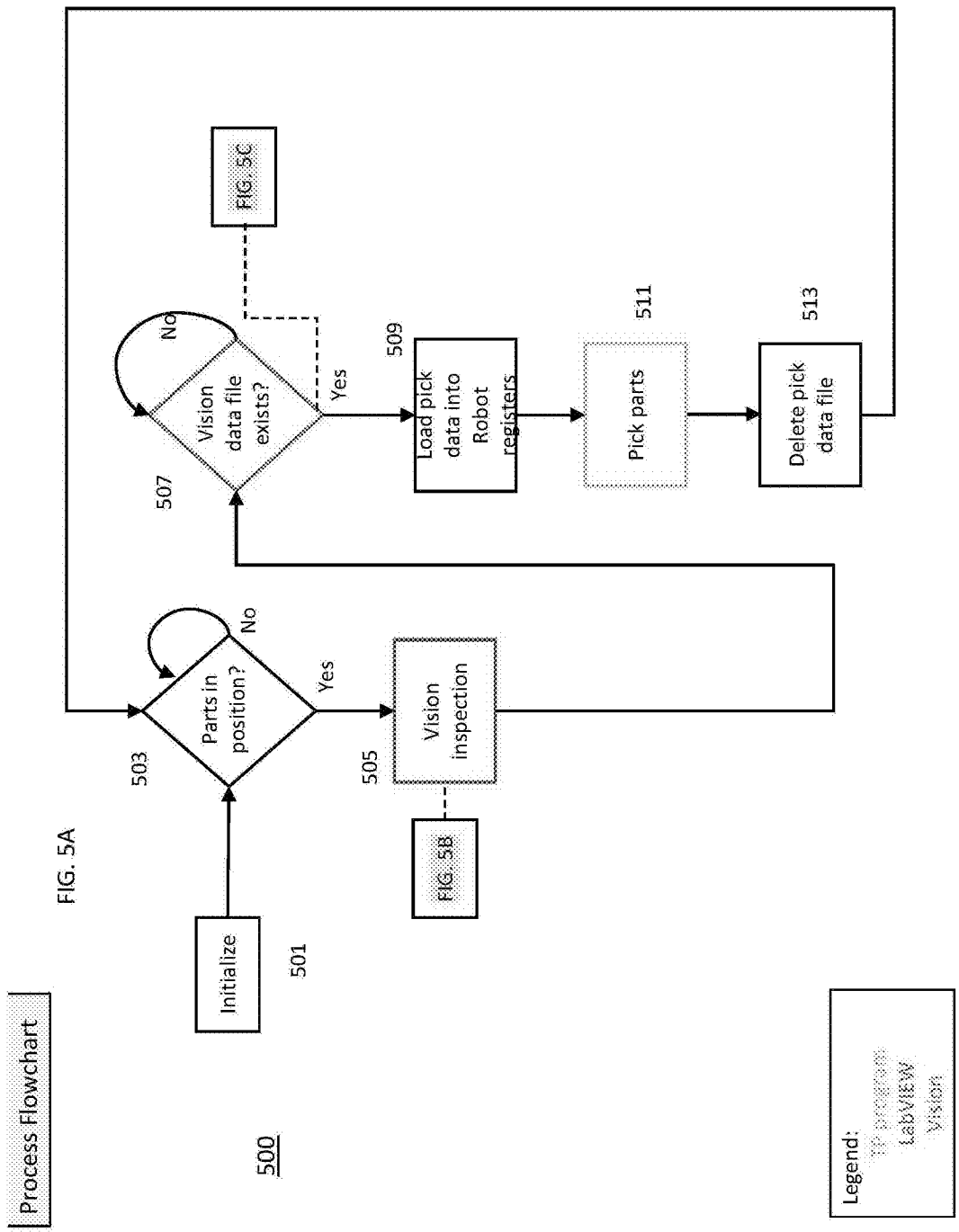
Figure 5C:
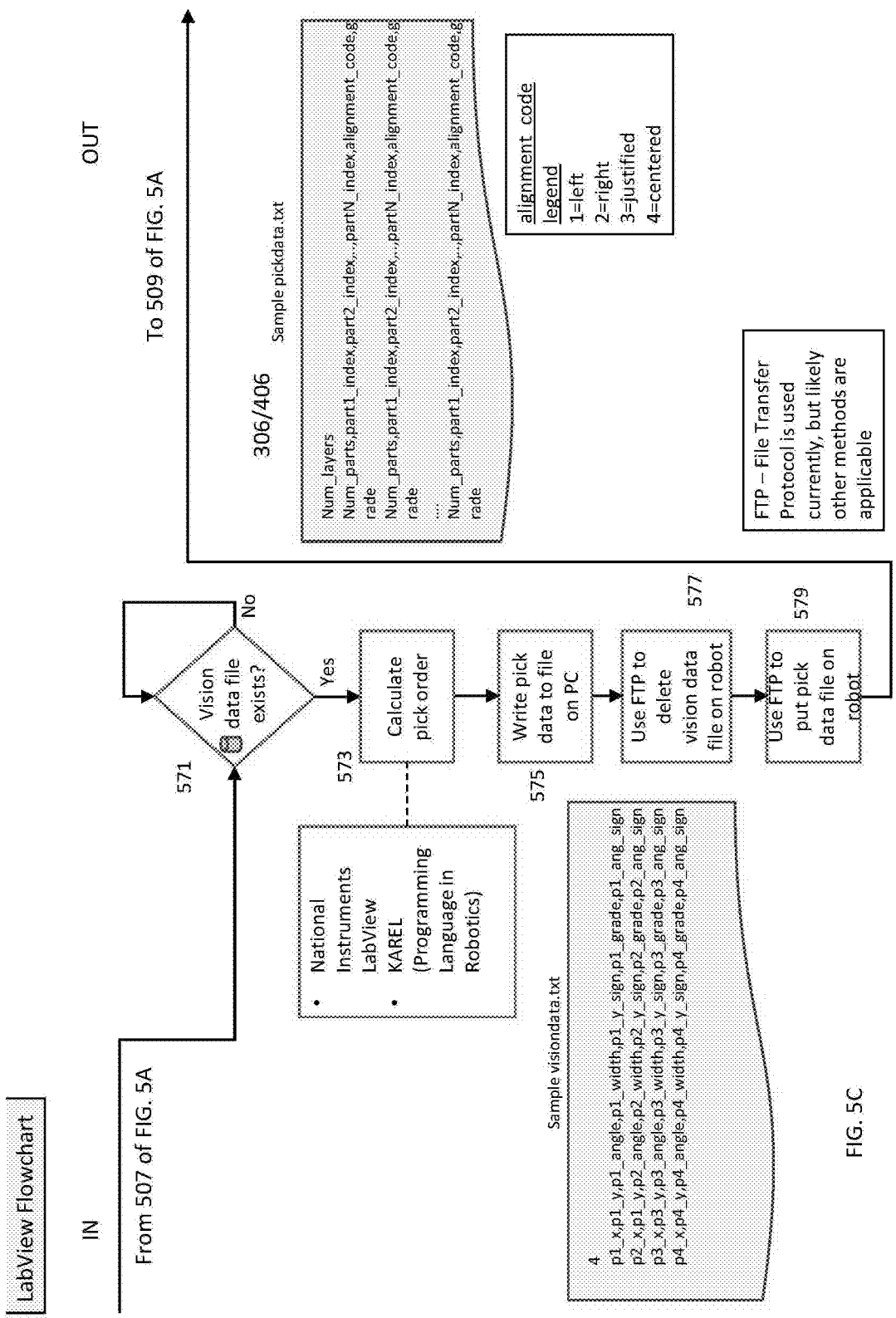

FIGS. 5A, 5B, and 5C together are a flow chart of a process 500 for full veneer sheet, veneer strip, and partial veneer sheet grading and stacking in accordance with one embodiment. Referring to FIGS. 3, 4, 5A, 5B, and 5C, process 500 begins at initialize 501 and proceeds to 503. At 503, a determination is made as to whether the parts, e.g., the full veneer sheets, and/or veneer strips, and/or partial veneer sheets 232 or 241, are in the correct position on the veneer analysis and selection conveyor 335 or 435. As noted above, in one embodiment, the veneer analysis station location(s) along conveyor 335 or 445 of FIGS. 3 and 4 are marked with origin markers and predetermined X and Y coordinate makers. Using this system, the locations, center of mass, orientation, and dimensions data for each full veneer sheet, veneer strip, and partial veneer sheet 232 or 241 can be determined with respect to these markers when the full veneer sheets, and/or veneer strips, and/or partial veneer sheets 232 or 241 are properly positioned on the veneer analysis and selection conveyor 345 or 445. If the full veneer sheets, and/or veneer strips, and/or partial veneer sheets 232 or 241 are not in the correct position process flow proceeds back to 503 until the full veneer sheets, and/or veneer strips, and/or partial veneer sheets 232 or 241 are determined to be in the correct position. Process flow then proceeds to 505.

At 505, process flow proceeds to FIG. 5B and vision inspection is performed by the veneer analysis system 300. Referring to FIG. 5B, at 551 the vision inspection of the full veneer sheets, and/or veneer strips, and/or partial veneer sheets 232 or 241 is performed. At 553 a trigger is provided to capture black and white and/or color and/or NIR images of the sheets of veneer 232 or 241. Then at 555 calibration of the images is performed using defined origin and X and Y coordinates/markers at the veneer analysis system location of the veneer analysis and selection conveyor 335 or 435.

At 557 individual parts, e.g., full veneer sheets, and/or veneer strips, and/or partial veneer sheets 232 or 241, are identified and at 559 the individual parts, e.g., full veneer sheets, and/or veneer strips, and/or partial veneer sheets 232 or 241, are evaluated as described above, using black and white images to determine dimensions data 301 or 401 and color images to generate grading data 303 or 403. At 561, the dimensions data 301 or 401 and grading data 303 or 403 is transposed into integers.

At 563, the integer-based dimensions data 301 or 401 and grading data 303 or 403 for each full veneer sheet, veneer strip, and partial veneer sheet is sent to a dimensions data and grading data file for each full veneer sheets, and/or veneer strips, and/or partial veneer sheets 232 or 241. The dimensions data and grading data file for each full veneer sheets, and/or veneer strips, and/or partial veneer sheets 232 or 241 is then sent to 507 of FIG. 5A.

At 507 of FIG. 5A, a determination is made as to whether the dimensions data and grading data file for each full veneer sheet, veneer strip, and partial veneer sheet 232 or 241 exists. If not, the process returns to 505 and FIG. 5B to generate or find the dimensions data and grading data file for the full veneer sheet, veneer strip, and partial veneer sheet 232 or 241. If it is determined at 507 that the dimensions data and grading data file for the full veneer sheet, veneer strip, and partial veneer sheet 232 or 241 exists, process flow proceeds to FIG. 5C and 571.

At 571, a determination is again made as to whether the dimensions data and grading data file for the full veneer sheet, veneer strip, and partial veneer sheet 232 or 241 exists. If the dimensions data and grading data file for the full veneer sheet, veneer strip, and partial veneer sheet 232 or 241 exists, process flow proceeds to 573. At 573, the order in which the full veneer sheets, and/or veneer strips, and/or partial veneer sheets 232 or 241 are to be selected is determined based on the dimensions data 301 or 401 and grading data 303 or 403 for the full veneer sheet, veneer strip, and partial veneer sheet 232 or 241.

In the case of full veneer sheets 232, the order in which the full veneer sheets 232 are selected is determined primarily based on the grading data 303 for the full veneer sheets 232 and which stack of veneer 337 is to receive the full veneer sheets 232.

However, in the case of veneer strips 241, not only is the grading data 403 for the veneer strips 241 used, but also the dimensions data 401 is of particular use. This is because, as discussed above, the dimensions data 401 for each individual veneer strip 241 is used to generate veneer selection and stacking robot control signals represented by veneer selection and stacking robot control signal data 406 that direct veneer selection and stacking robots 440A and 440B to add one or more individual veneer strips 241 in layers of veneer strips 241 to appropriate specific stacks of veneer 443, e.g., stack of veneer 1 through stack of veneer 5, so that the layers of veneer strips 241 have the desired length, e.g., length Lf of FIG. 1A and desired width, e.g., width Wf of FIG. 1A. As a result, the edges of the individual layers of veneer strips 241 are of the desired dimensions and aligned. Consequently, the resulting stacks of veneer 443 are made up of layers of veneer strips 241 that are of the desired dimensions, e.g., length Lf and width Wf, are aligned and have even edges/sides with no jagged edges. The result is that stacks of veneer 443 are not only made up of sheets of veneer 232 accurately determined to be of the desired dimensions and correct grade, but that the layers of sheets of veneer 232 are stacked such that stacks of veneer 443 resemble ideal stack of veneer 243A of FIG. 2H rather than typical prior art stack of veneer 243B of FIG. 2H.

To achieve this goal, veneer strips 241 must be selected in sets of one or more veneer strips 241 to create layers of veneer strips 241 having the desired dimensions, e.g., length Lf and width Wf. In this process, the sometimes-multiple veneer strips 241 making up the in layers are aligned and have even edges/sides and do not have jagged edges. In addition, the veneer strips 241 must be selected so that any gaps between the veneer strips 241 occurring in a given layer are staggered to avoid creating bulges in the resulting stacks of veneer 443. Consequently, when veneer strips 241 are being processed, the order in which the veneer strips and/or partial veneer sheets 232 or 241 are selected at 573 is determined based on both dimensions data 401 and grading data 403 for the veneer strip 241.

From 573, process proceeds to 575 where pick data indicating the order in which the full veneer sheets, and/or veneer strips, and/or partial veneer sheets 232 or 241 are to be selected is transferred to a file and sent to the robot control system 305 or 405. At 577 robot control system 305 or 405 converts the pick data into veneer selection and stacking robot control signal data 306 or 406. Then any previous veneer selection and stacking robot control signal data 306/406 is deleted from the veneer selection and stacking robots 340A and 340B or 440A and 440B. At 579, and the current veneer selection and stacking robot control signal data 306 or 406 is then transferred to the veneer selection and stacking robots 340A and 340B or 440A and 440B. Process then returns to FIG. 5A and 509.

At 509, the veneer selection and stacking robot control signal data 306 or 406 is loaded into memory registers on veneer selection and stacking robots 340A and 340B or 440A and 440B. At 511, in response to the veneer selection and stacking robot control signal data 306 or 406, veneer selection and stacking robots 340A and 340B or 440A and 440B use robotic arms to select the correct parts and move them onto the appropriate stacks of veneer 237 or 241.

At 513, the veneer selection and stacking robot control signal data 306 or 406 is then deleted and the process reverts to 503 to await new data for the next pick.

Figure 6:
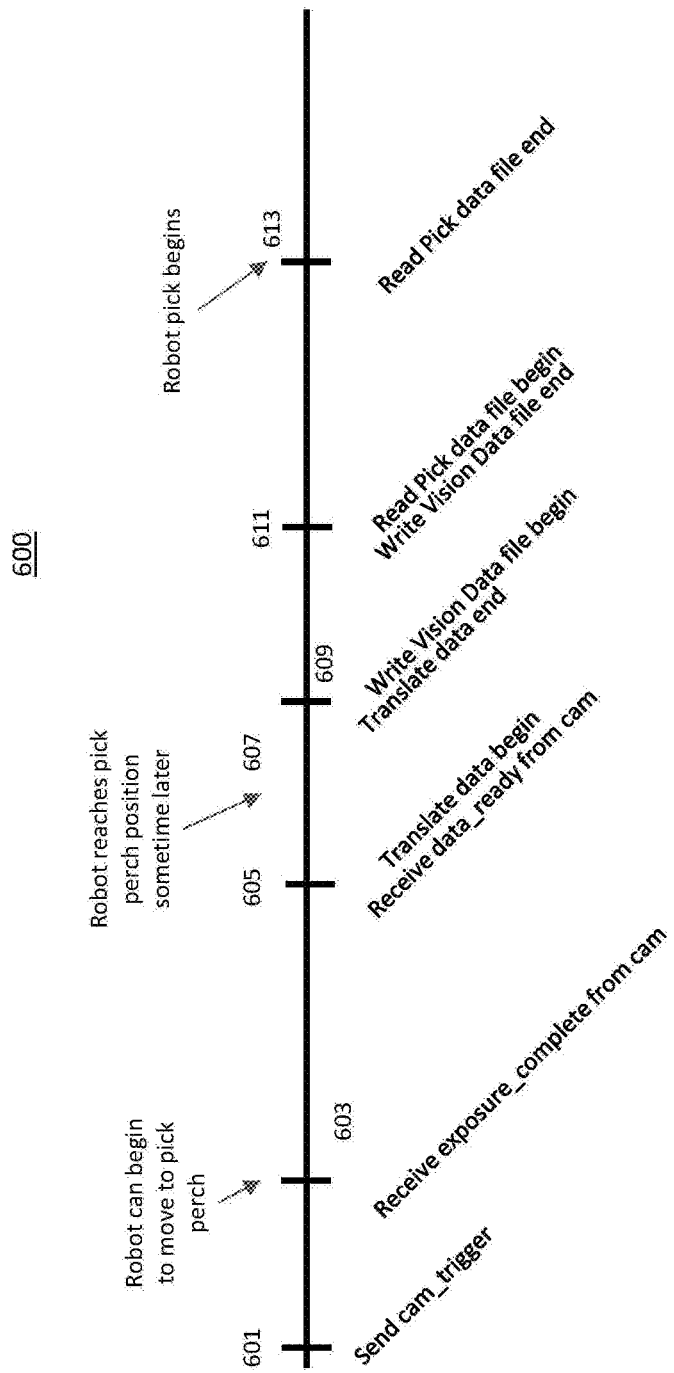
FIG. 6 is a timing diagram of a process for a full veneer sheet, veneer strip, and/or partial veneer sheet grading and stacking system in accordance with one embodiment.

FIG. 6 is a timing diagram 600 of a process for a full veneer sheet, veneer strip, and/or partial veneer sheet grading and stacking system in accordance with one embodiment. Referring to FIGS. 3, 4, and 6, at 601 the cameras of the veneer analysis system 300 are triggered. At 603 the image data from the cameras is received and the veneer selection and stacking robots 340A and 340B or 440A and 440B can begin move into their pre-position stance.

At 605, the transmission of the image data is begun and at 607 the veneer selection and stacking robots 340A and 340B or 440A and 440B robotic arms reach their pre-positions, also referred to herein as "perch positions."

At 609, the image data is processed, the dimensions data 301/401 and grading data 303/403 is generated, and at 611 veneer selection and stacking robot control signal data 306/406 is generated.

At 613, the veneer selection and stacking robot control signal data 306/406 is received by the veneer selection and stacking robots 340A and 340B or 440A and 440B and the veneer selection and stacking robots 340A and 340B or 440A and 440B move to select the correct parts and move them onto the appropriate stacks of veneer 237 or 241.

Figure 7:
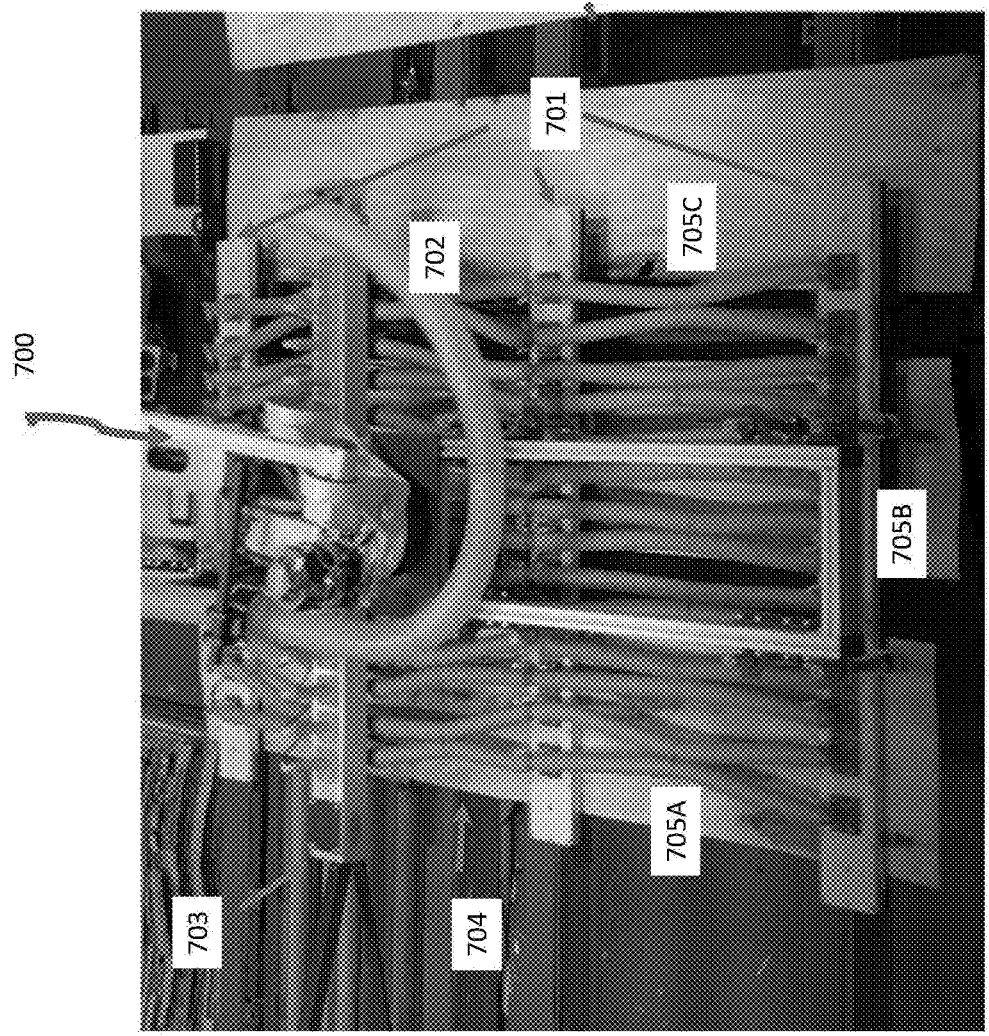
FIG. 7 is an illustration of a selectively activated vacuum head in accordance with one embodiment.

As noted above, in some embodiments, the veneer selection and stacking robots use robotic arms having selectively activated vacuum heads that are faster than humans and are far less likely to damage the relatively fragile full veneer sheets, and/or veneer strips, and/or partial veneer sheets. FIG. 7 is an illustration of a robotic arm 700 with selectively activated vacuum head 704 in accordance with one embodiment.

As seen in FIG. 7, selectively activated vacuum head 704 includes main vacuum hose 702, vacuum hose sets 705A, 705B, and 705C, vacuum port bars 701, and vacuum actuator bar 703.

Referring to FIGS. 3, 4, 5, 6, and 7, in operation, main vacuum hose 702 provides suction to vacuum actuator bar 703. Then, in response to the veneer selection and stacking robot control signal data 306 or 406, vacuum actuator bar 703 selectively provides suction to vacuum ports (not shown) on the underside of vacuum port bars 701 via vacuum hose sets 705A, 705B, and 705C. In this way, selectively activated vacuum head 704 can pick up selected full veneer sheets, and/or veneer strips, and/or partial veneer sheets 232 or 241 using vacuum suction and move selected full veneer sheets, and/or veneer strips, and/or partial veneer sheets 232 or 241 to the appropriate stack of veneer 337 or 443. Since only vacuum suction is used to select and move full veneer sheets, and/or veneer strips, and/or partial veneer sheets 232 or 241, there is minimal chance of damage to full veneer sheets, and/or veneer strips, and/or partial veneer sheets 232 or 241.

Figure 8:
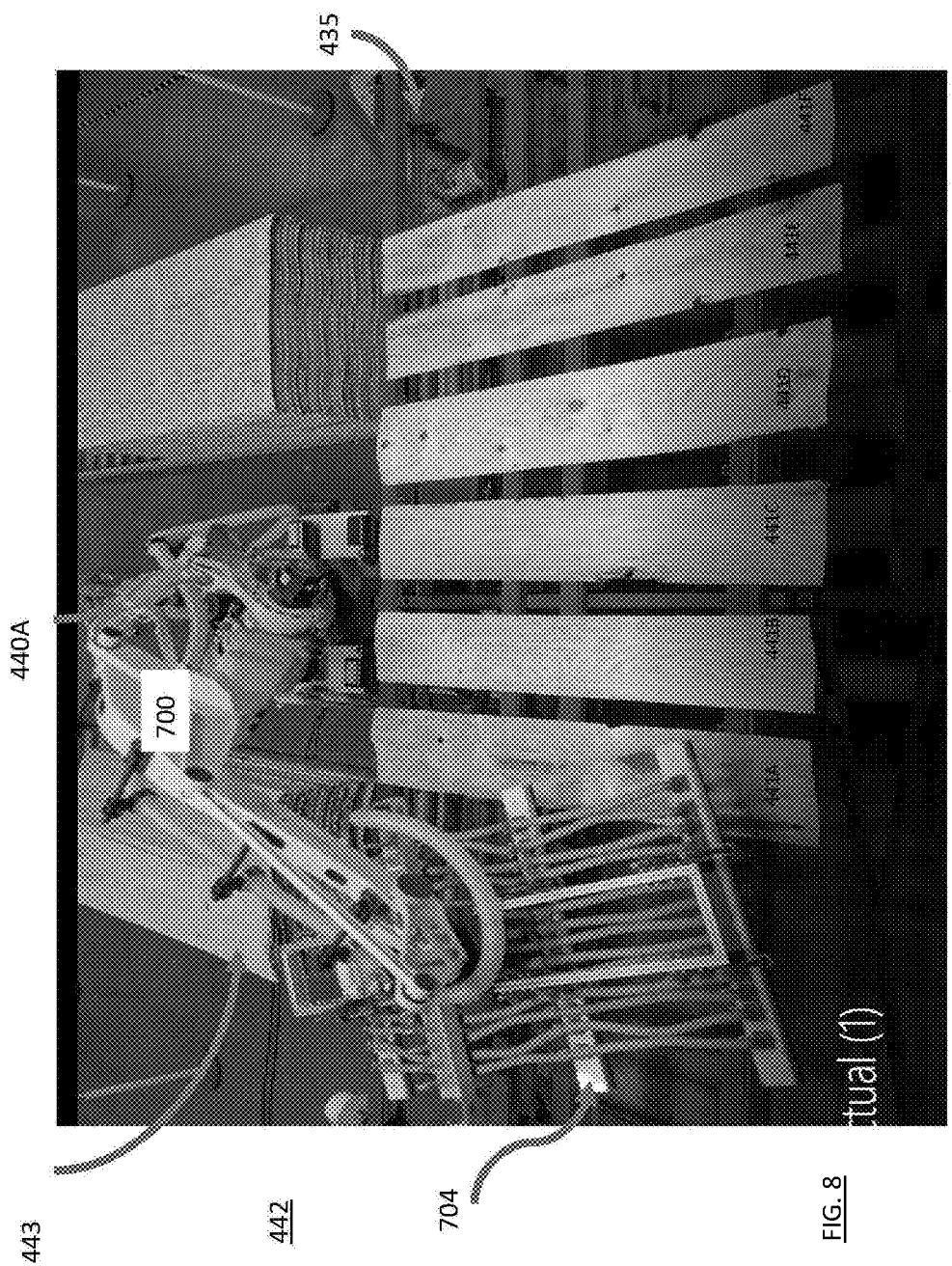
FIG. 8 is local robotic veneer strip and/or partial veneer sheet stacking cell in accordance with one embodiment.

FIG. 8 is local robotic veneer strip and/or partial veneer sheet stacking cell 442 in accordance with one embodiment. Referring to FIGS. 3, 4, and 8, as seen in FIG. 8, in this specific embodiment, local robotic veneer strip and/or partial veneer sheet stacking cell 442 includes: veneer selection and stacking robot 440A, robotic arm 700 including selectively activated vacuum head 704; veneer analysis and selection conveyor 435; stack of veneer 443, and veneer strips and/or partial veneer sheets 441A, 441B, 441C, 441D, 441E, and 441F.

Figure 9A:
FIGS. 9A through 9N show the use of the local robotic veneer strip stacking cell of FIG. 8 to create a layer of veneer strip and/or partial veneer sheet in a veneer strip stack and/or partial veneer sheet in accordance with one embodiment.
Figure 9B:
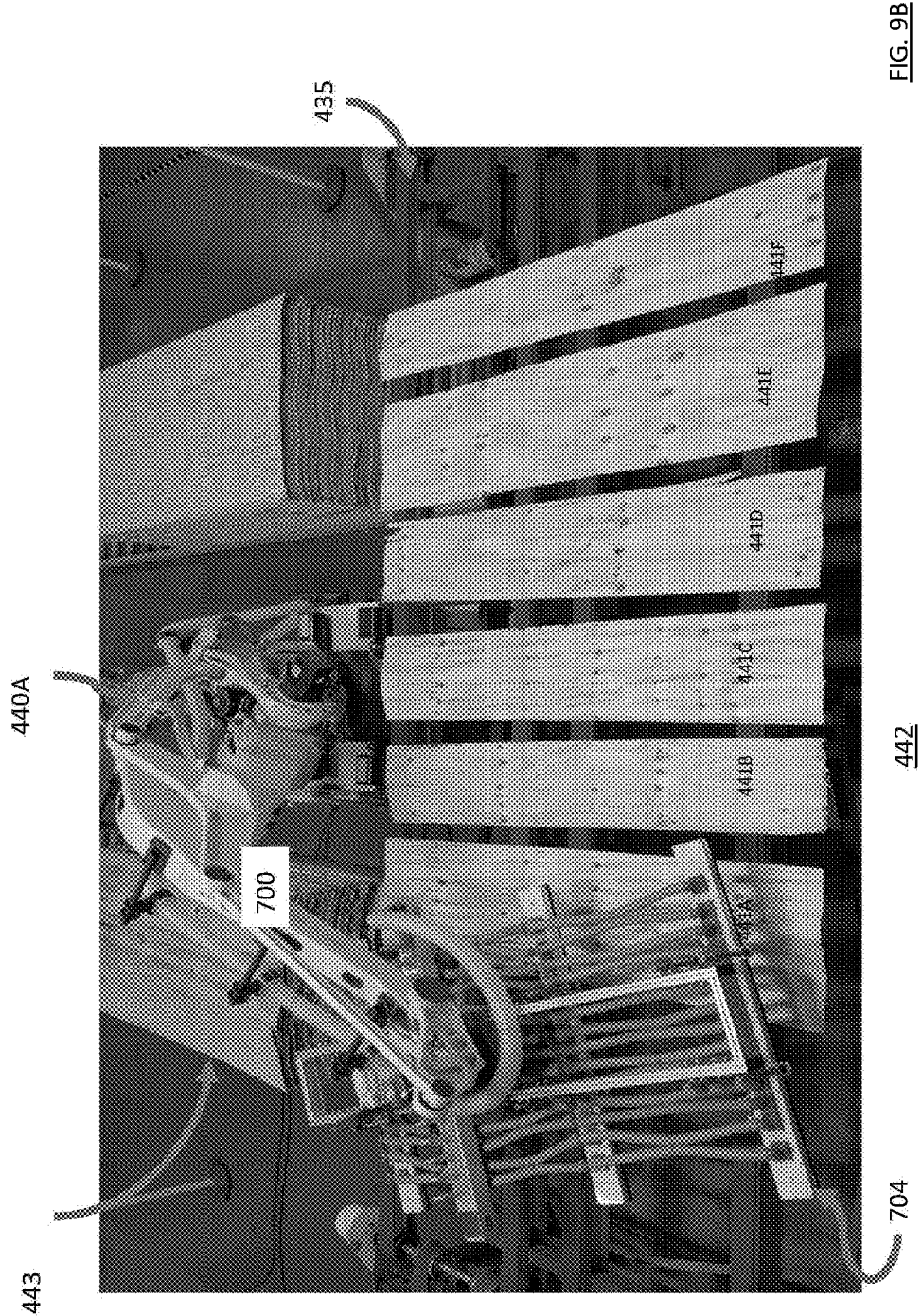
Figure 9C:
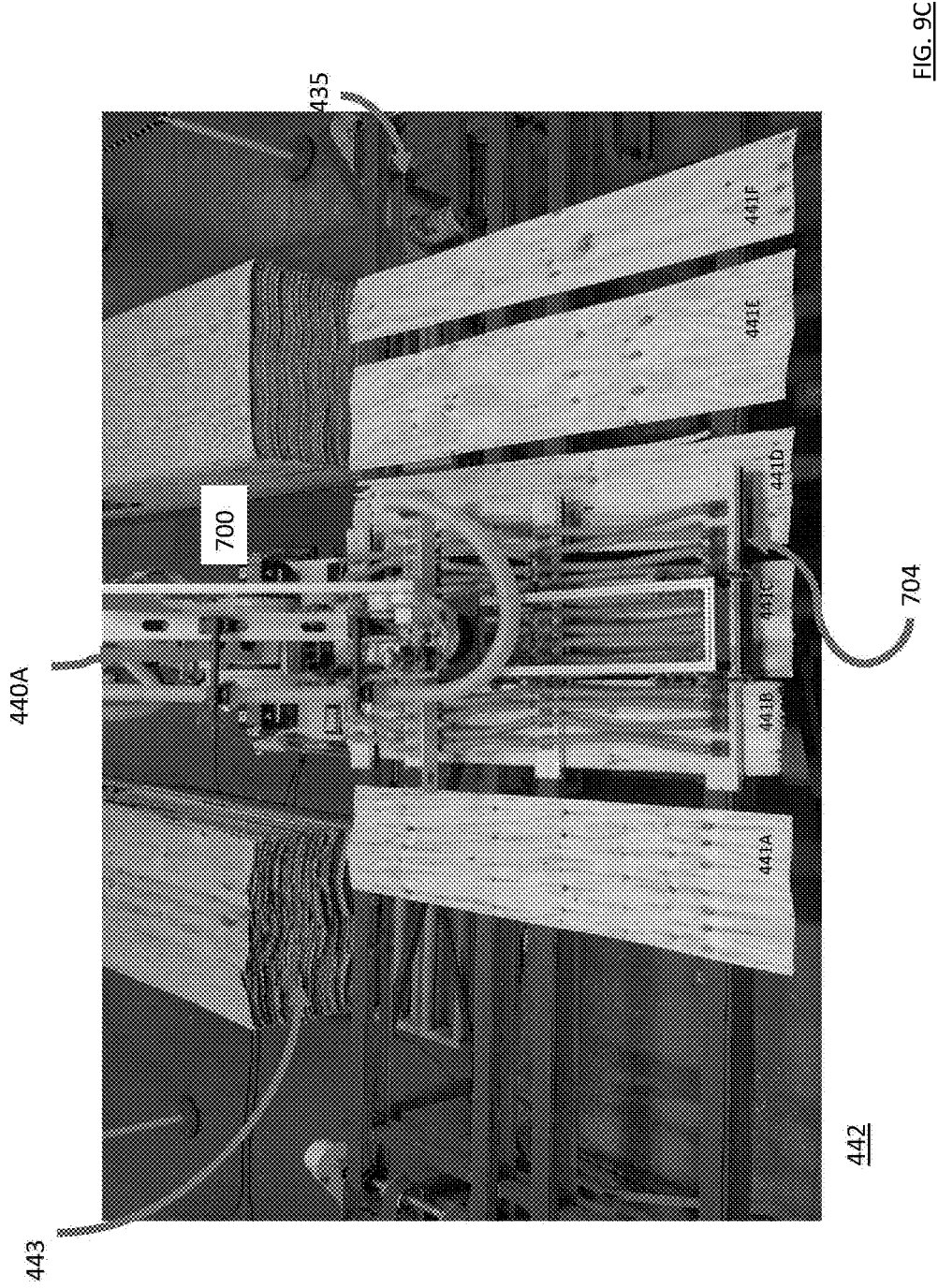
Figure 9D:
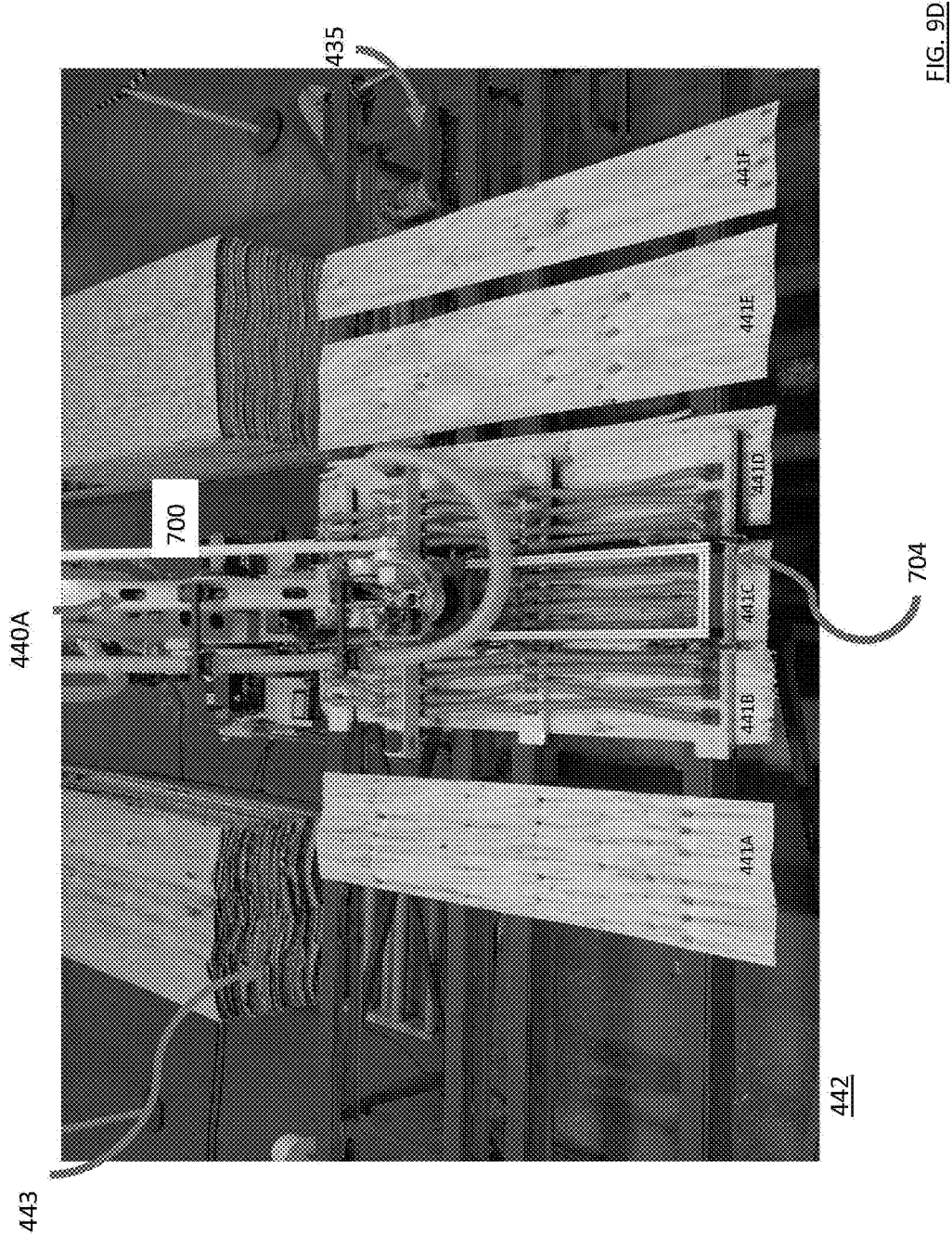
Figure 9E:
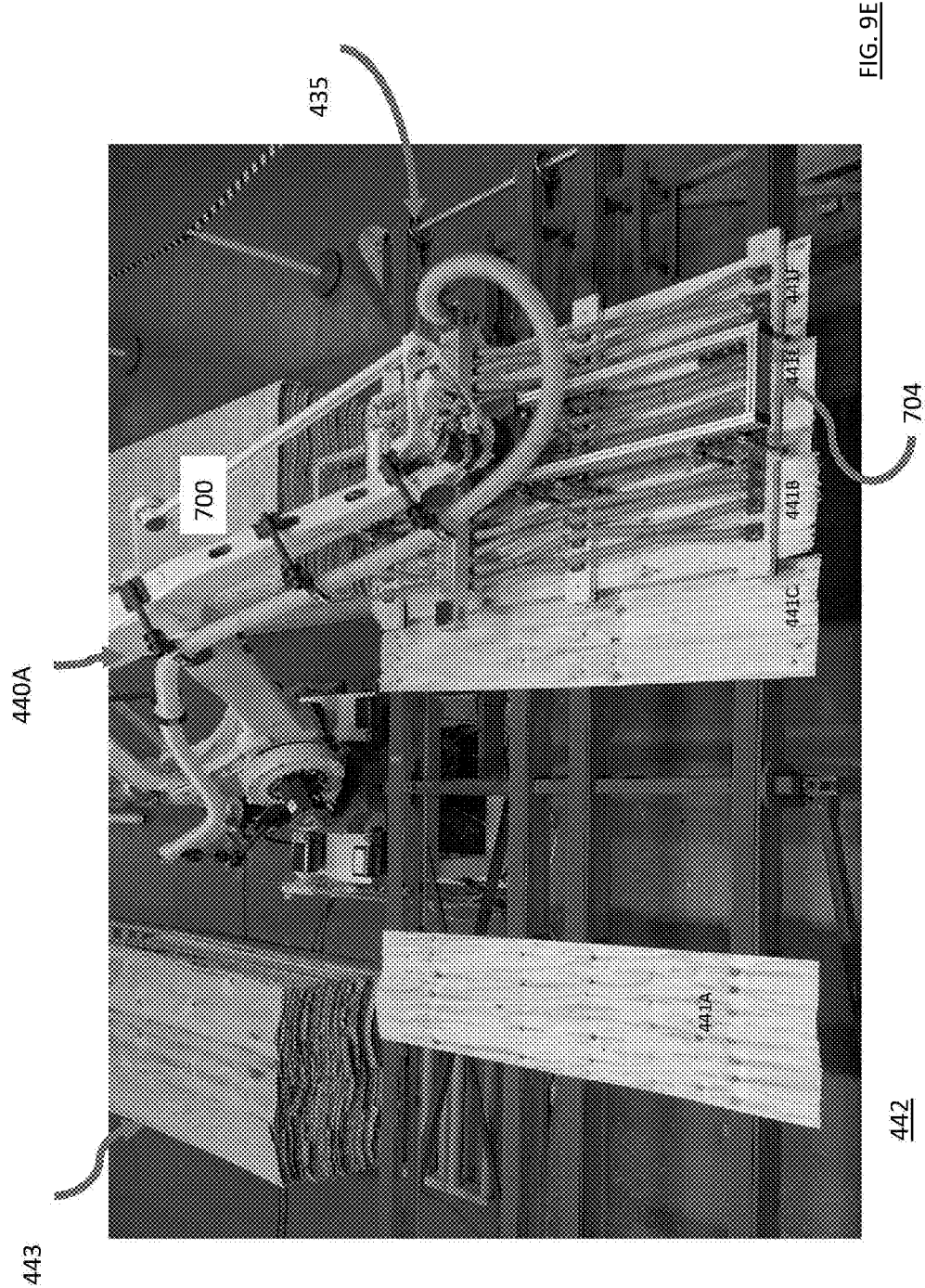
Figure 9F:
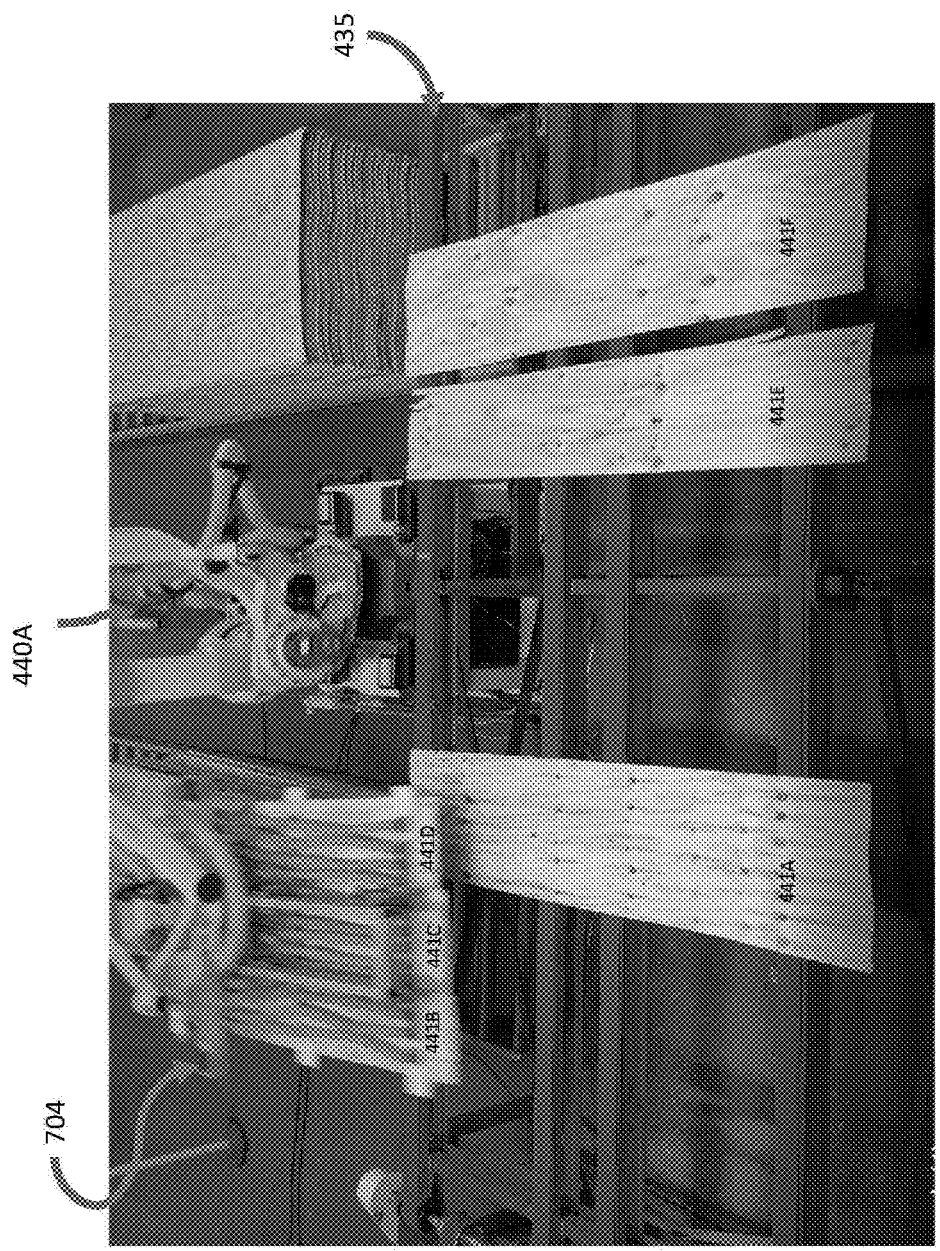
Figure 9G:
Figure 9I:
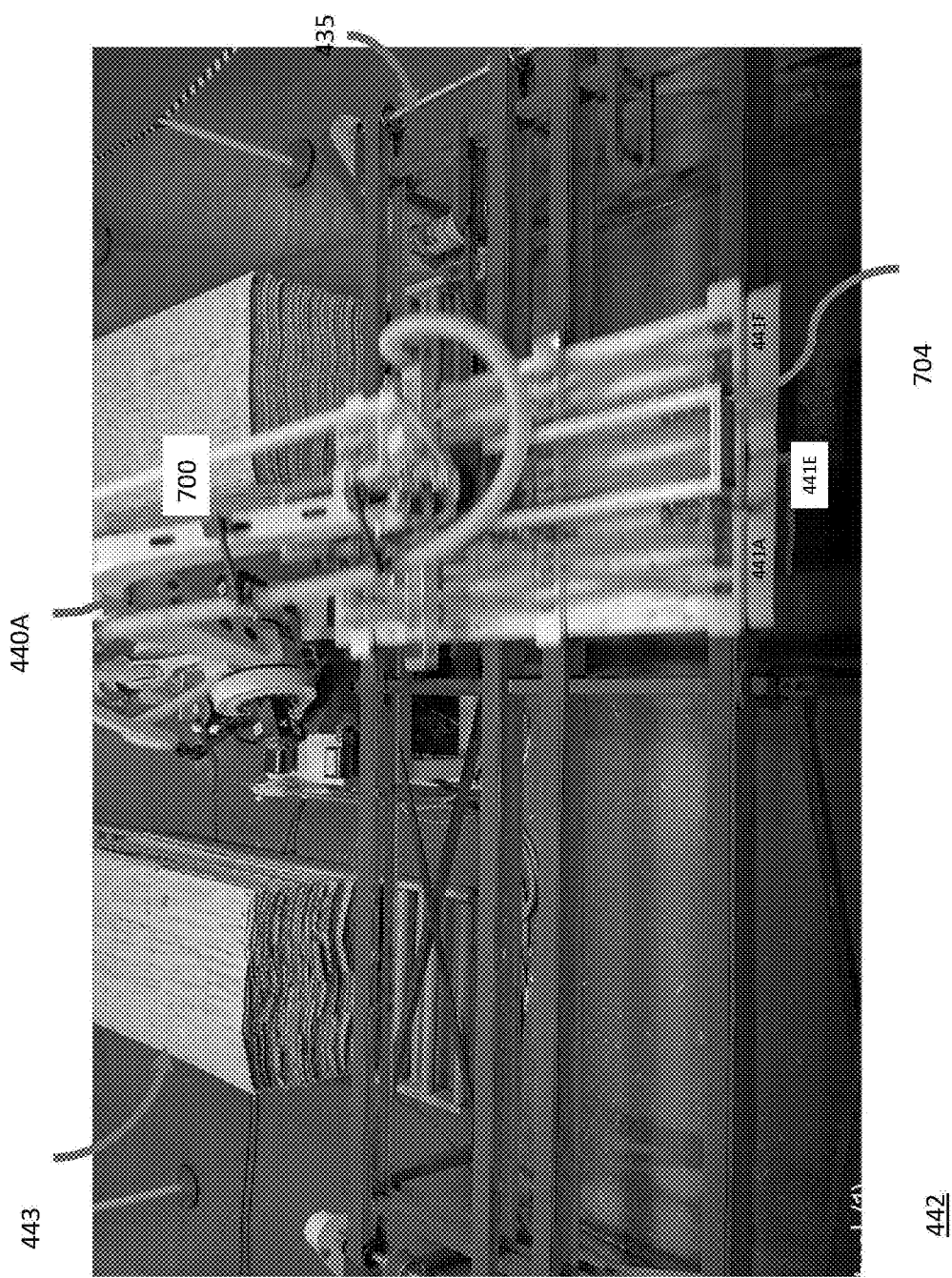
Figure 9L:
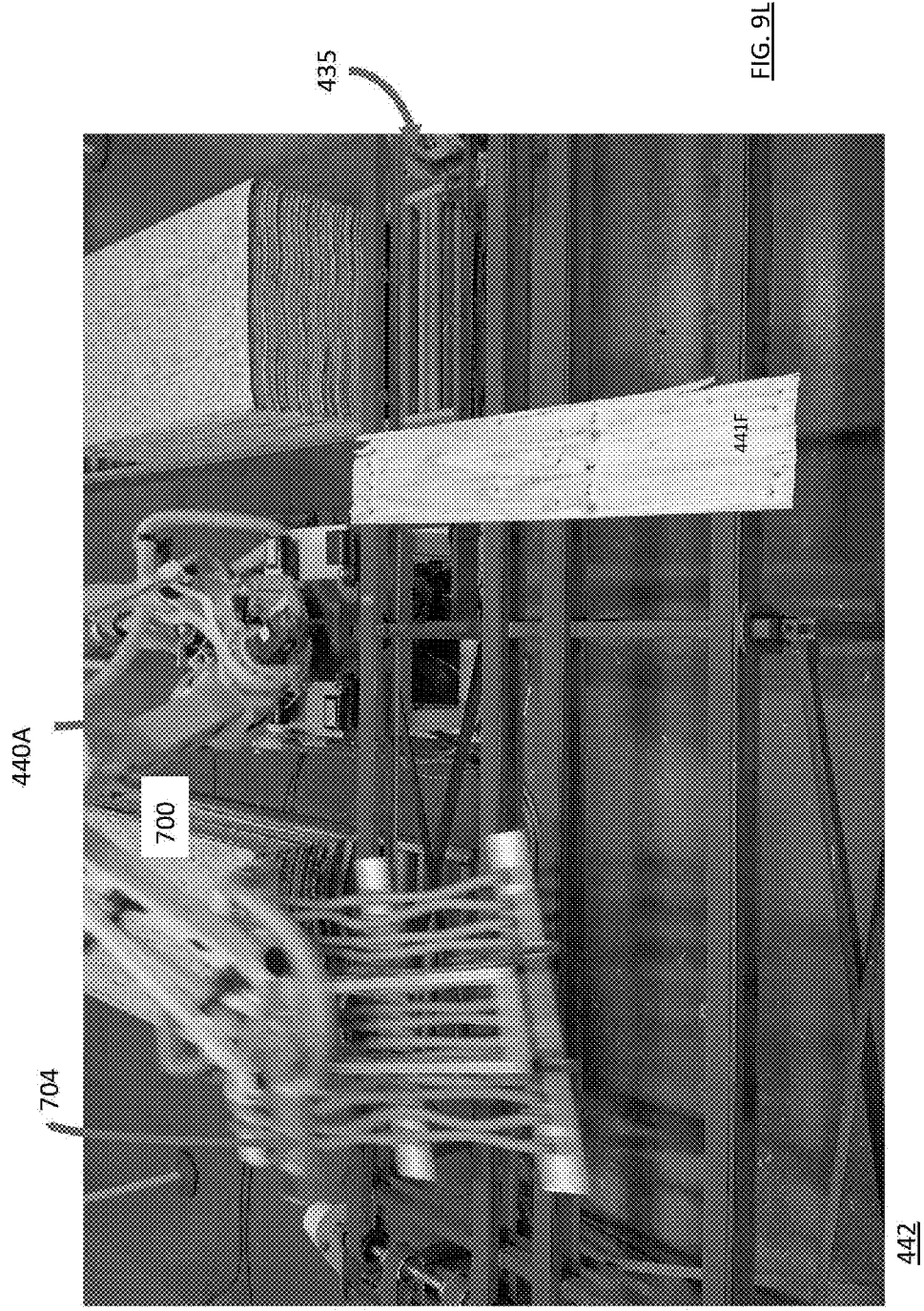
Figure 9M:
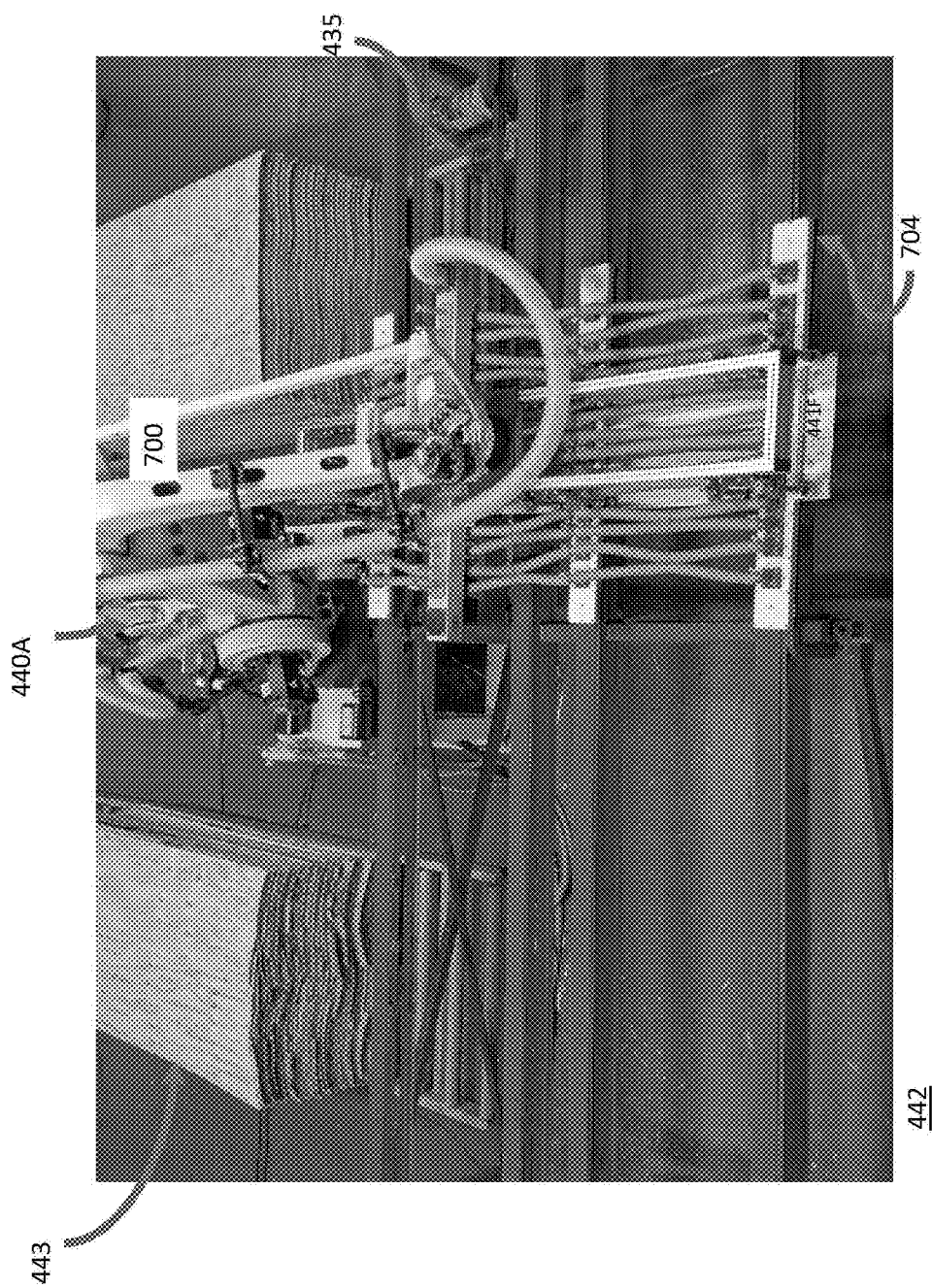
Figure 9N:
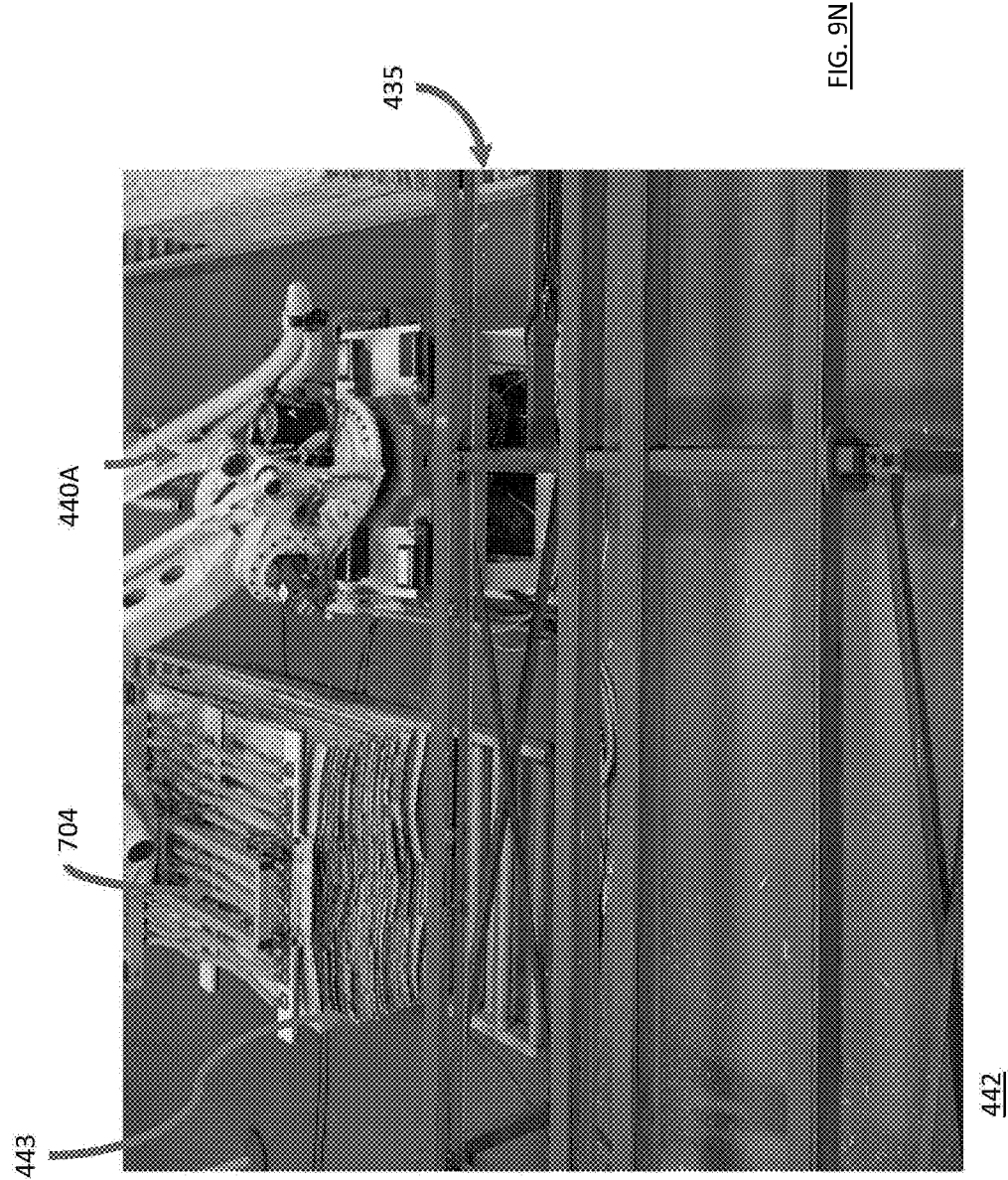

FIGS. 9A through 9N show the use of the local robotic veneer strip stacking cell 442 of FIG. 8 to create a layer of veneer strips or partial veneer sheets in partial stack of veneer 443 in accordance with one embodiment.

Referring to FIGS. 4, 7, 8, and 9A through 9N, as discussed above, in the case of veneer strips 241, not only is the grading data 403 for the veneer strips 241 used, but also the dimensions data 401. This is because, as discussed above, the dimensions data 401 for each individual veneer strip 241 is used to generate veneer selection and stacking robot control signals represented by veneer selection and stacking robot control signal data 406 that direct veneer selection and stacking robots 440A and 440B to add individual veneer strips 241 in layers of veneer strips 241 to the appropriate specific stack of veneer 443, e.g., stack of veneer 1 through stack of veneer 5, so that the edges of the individual layers of veneer strips 241 are aligned. Consequently, the resulting stacks of veneer 443 are made up of layers of veneer strips 241 that have the desired dimensions, e.g., length Lf and width Wf of FIG. 1A, are aligned and have even edges/sides and do not have jagged edges. The result is that stacks of veneer 443 are not only made up of sheets of veneer 232 accurately determined to be of the desired dimensions and correct grade, but that the layers of sheets of veneer 232 are stacked such that stacks of veneer 443 resemble ideal stack of veneer 243A of FIG. 2H rather than typical prior art stack of veneer 243B of FIG. 2H.

To achieve this goal, veneer strips 241 must be selected in sets or layers so that the sometimes-multiple veneer strips 241 selected in layers have the desired dimensions, e.g., length Lf and width Wf of FIG. 1A, are aligned and have even edges/sides, and that do not have jagged edges. In addition, the veneer strips 241 must be selected so that any gaps between the veneer strips 241, and therefore in the layers of veneer strips 241, are staggered to avoid creating bulges in the resulting stacks of veneer 443. Consequently, when veneer strips 241 are being processed, the order in which the veneer strips and/or partial veneer sheets 232 or 241 are selected is determined based on the dimensions data 401 and grading data 403 for the partial veneer sheet 232 or 241.

Referring to FIGS. 3, 4, 7, 8, and 9A through 9N, as seen in FIG. 9A, veneer strips and/or partial veneer sheets 441A, 441B, 441C, 441D, 441E, and 441F are brought into position beside veneer selection and stacking robot 440A by veneer analysis and selection conveyor 435. As seen in FIG. 9B, in response to veneer selection and stacking robot control signal data 406, robotic arm 700 of veneer selection and stacking robot 440A then begins to position selectively activated vacuum head 704 over veneer strips and/or partial veneer sheets 441A, 441B, 441C, 441D, 441E, and 441F.

As seen in FIG. 9C, in response to veneer selection and stacking robot control signal data 406, veneer selection and stacking robot 440A positions robotic arm 700 and selectively activated vacuum head 704 over veneer strips and/or partial veneer sheets 441B, 441C, and 441D and as seen in FIGS. 9D and 9E, in response to veneer selection and stacking robot control signal data 406, selectively activated vacuum head 704 of veneer selection and stacking robot 440A selects veneer strips and/or partial veneer sheets 441B, 441C and 441D as a layer of veneer strips and/or partial veneer sheets.

As seen in FIGS. 9F and 9G, in response to veneer selection and stacking robot control signal data 406, robotic arm 700 and selectively activated vacuum head 704 of veneer selection and stacking robot 440A adds veneer strips and/or partial veneer sheets 441B, 441C and 441D as a layer of veneer strips and/or partial veneer sheets to stack of veneer 443.

As seen in FIG. 9H, in response to veneer selection and stacking robot control signal data 406, robotic arm 700 of veneer selection and stacking robot 440A then returns selectively activated vacuum head 704 to a position over partial veneer sheet 441A and selects partial veneer sheet 441A. Then, as seen in FIG. 9I, in response to veneer selection and stacking robot control signal data 406, robotic arm 700 and selectively activated vacuum head 704 of veneer selection and stacking robot 440A also selects partial veneer sheet 441E. Then, as seen in FIGS. 9J and 9K, in response to veneer selection and stacking robot control signal data 406, robotic arm 700 and selectively activated vacuum head 704 of veneer selection and stacking robot 440A adds veneer strips and/or partial veneer sheets 441A and 441E as a layer of veneer strips and/or partial veneer sheets to stack of veneer 443.

As seen in FIGS. 9K and 9L, after creating two layers of veneer strips and/or partial veneer sheets to stack of veneer 443, only partial veneer sheet 441F remains on veneer analysis and selection conveyor 435. As seen in FIG. 9L in response to veneer selection and stacking robot control signal data 406, robotic arm 700 of veneer selection and stacking robot 440A then returns selectively activated vacuum head 704 to a position over partial veneer sheet 441F. As seen in FIG. 9M, in response to veneer selection and stacking robot control signal data 406, robotic arm 700 and selectively activated vacuum head 704 of veneer selection and stacking robot 440A selects partial veneer sheet 441F and, as seen in FIG. 9N, in response to veneer selection and stacking robot control signal data 406, robotic arm 700 and selectively activated vacuum head 704 of veneer selection and stacking robot 440A adds partial veneer sheet 441F to stack of veneer 443 as a third layer of veneer strips and/or partial veneer sheets.

Of note is the fact that, in one embodiment, in response to veneer selection and stacking robot control signal data 406, robotic arm 700 and selectively activated vacuum head 704 of veneer selection and stacking robot 440A adds layers of veneer strips and/or partial veneer sheets to stack of veneer 443, such as veneer strips and/or partial veneer sheets 441A and 441E of FIGS. 9J and 9K, such that any gaps between individual veneer strips and/or partial veneer sheets 441 in the layers of individual veneer strips and/or partial veneer sheets 441 are staggered so that no bulges of low and high points are created. Likewise, in response to veneer selection and stacking robot control signal data 406, robotic arm 700 and selectively activated vacuum head 704 of veneer selection and stacking robot 440A adds layers of single veneer strips and/or partial veneer sheets, such as partial veneer sheet 441F of FIGS. 9M and 9N, to stack of veneer 443 such that single veneer strips and/or partial veneer sheets layers rotate from a left of center position of stack of veneer 443 to the center position of stack of veneer 443 to a right of center position of stack of veneer 443 and then back to a left of center position of stack of veneer 443 and so on cycling through the three positions of stack of veneer 443. In this way the formation of bulges in stack of veneer 443 are also avoided.

Some embodiments of the present disclosure include an effective and efficient technical solution to the long-standing technical problem of identifying and tracking the contents/composition of a given stack of veneer during the stacking of veneer process so that the quality and/or quantity of the veneer in the stack can be accurately determined, recorded, and correlated to the stack of veneer so created.

Some embodiments of the present disclosure include an effective and efficient technical solution to the long-standing technical problem of identifying and tracking the contents/composition of a given stack of veneer during the stacking of veneer process so that the quality and/or quantity of the veneer in the stack can be accurately determined, recorded, and correlated to the stack of veneer so created.

In one embodiment, individual full veneer sheets, and/or veneer strips, and/or partial veneer sheets, herein collectively referred to as veneer, are provided to one or more veneer analysis systems.

In one embodiment, the one or more veneer analysis systems include one or more imaging systems. In some embodiments the one or more imaging systems include a high resolution two-dimensional (2D) imaging system.

In some embodiments, the one or more imaging systems include all or part of a high resolution imaging system such as that set forth in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which is hereby incorporated by reference in its entirety as if it were fully set forth herein.

In some embodiments the one or more imaging systems include a three dimensional (3D) imaging system such as a laser profiling system. In some embodiments, one or more imaging systems include a three dimensional (3D) imaging system such as a Cognex IN-SIGHT 3D-L4000 system or a Cognex IN-SIGHT 3D-A5000 system.

In one embodiment, the one or more veneer analysis systems are then used to generate images of the individual full veneer sheets, and/or veneer strips, and/or partial veneer sheets.

In one embodiment, in the case of irregularly shaped veneer or veneer sheet fractions, e.g., veneer strips, and/or partial veneer sheets, the one or more veneer analysis systems are also used to precisely determine the dimensions, i.e., length and width, of each individual veneer sheet fraction, e.g., veneer strip, and/or partial veneer sheet.

In one embodiment, dimensions data indicating the dimensions of each veneer sheet fraction, e.g., veneer strip, and/or partial veneer sheet is collected, recorded, and correlated with each individual veneer sheet fraction, e.g., veneer strip, and/or partial veneer sheet.

In one embodiment, the one or more veneer analysis systems are also used to analyze the surface of each individual full veneer sheet, veneer strip, and partial veneer sheet, quickly and automatically, and then assign a grade to each individual full veneer sheet, veneer strip, and partial veneer sheet.

In one embodiment, quality data indicating the grade of each individual full veneer sheet, veneer strip, and partial veneer sheet is collected, recorded, and correlated with each individual full veneer sheet, veneer strip, or partial veneer sheet.

In accordance with some of the disclosed embodiments, the dimensions data and/or the quality data for each individual veneer sheet fraction, e.g., veneer strip, and/or partial veneer sheet, is then used by one or more veneer selection and stacking robot control systems to control the operation of one or more veneer selection and stacking robots.

As discussed in more detail below, in one embodiment, the one or more veneer selection and stacking robots are then used to independently move individual full veneer sheets, and/or veneer strips, and/or partial veneer sheets from the veneer analysis and selection system to a stacking of veneer station which creates appropriate stacks of veneer.

In one embodiment, as each individual full veneer sheet, and/or veneer strip, and/or partial veneer sheet is moved from the veneer analysis and selection system to the appropriate stack of veneer, the location of the full veneer sheets, and/or veneer strips, and/or partial veneer sheets within the stack of veneer, e.g., the placement layer or level of the individual full veneer sheet, and/or veneer strip, and/or partial veneer sheet, within the stack of veneer is recorded.

In one embodiment, as each individual full veneer sheet, and/or veneer strip, and/or partial veneer sheet is moved from the veneer analysis and selection system to the appropriate stack of veneer, the orientation of the full veneer sheets, and/or veneer strips, and/or partial veneer sheets within the stack of veneer, e.g., the geometry of the individual full veneer sheet, and/or veneer strip, and/or partial veneer sheet, within the stack of veneer is recorded.

In one embodiment, the location and orientation data for each of the full veneer sheets, and/or veneer strips, and/or partial veneer sheets within the stack of veneer, e.g., the placement layer or level and orientation of the individual full veneer sheet, and/or veneer strip, and/or partial veneer sheet, within the stack of veneer is recorded as location data for each full veneer sheet, and/or veneer strip, and/or partial veneer sheet and correlated with the respective full veneer sheet, and/or veneer strip, and/or partial veneer sheet in a veneer location database.

Then the location data, and/or the dimensions data, and/or the quality data for each individual full veneer sheet, and/or veneer strip, and/or partial veneer sheet is collected as each individual full veneer sheet, and/or veneer strip, and/or partial veneer sheet is added to the stack and added to profile data for the stack of veneer. Thus, once created, each stack of veneer has associated stack profile data that includes the location data, e.g., layer and orientation data, and/or the dimensions data, e.g., length and width data, and/or the quality data, e.g., grade data, for every individual full veneer sheet, and/or veneer strip, and/or partial veneer sheet included in the stack of veneer.

In one embodiment, once a stack of veneer is completed, the stack profile data for the stack of veneer, including the location data, the dimensions data, and the quality data for every individual full veneer sheet, and/or veneer strip, and/or partial veneer sheet, included in the stack of veneer is correlated with the stack of veneer and stored in a stack profile database.

In one embodiment, a profile identifier, such as a printed label, a UPC code or label, a QR code or label, an RFID tag, or other indicator is associated with/assigned to each stack of veneer indicating the location and/or access to the stack profile data for that stack veneer.

In this way, in one embodiment, stack profile data for each stack of veneer is created and associated with that stack of veneer so that the location data, e.g., layer and orientation data, and/or the dimensions data, e.g., length and width data, and/or the quality data, e.g., grade data, of each sheet or fraction of a full sheet, i.e., every individual full veneer sheet, and/or veneer strip, and/or partial veneer sheet, included in the stack of veneer is recorded, associated with the stack of veneer, and is available for review and processing.

In this way the composition of each stack of veneer, i.e., the volume of veneer in the stack, the surface area of the veneer in the stack of veneer, and the quality of the veneer in the stack of veneer, as well as the location, e.g., layer and orientation of each individual full veneer sheet, and/or veneer strip, and/or partial veneer sheet included in the stack of veneer can be precisely known.

In addition, since using the disclosed embodiments, the location, and/or dimensions, and/or quality of each layer of veneer, i.e., every individual full veneer sheet, and/or veneer strip, and/or partial veneer sheet, included in the stack of veneer is recorded, associated with the stack, and made available for review and processing, robots can be utilized to unstack the stack of veneer in an operation that is the opposite of how the stack of veneer was created and in a manner that puts the individual full veneer sheets, and/or veneer strips, and/or partial veneer sheets, included in the stack of veneer to the best and most effect use.

Consequently, some of the disclosed embodiments represent a technical solution to the several long standing problems associated with stacks of veneer created using prior art methods and systems. For instance, using the disclosed embodiments, even though the quality and quantity of veneer making up the stacks of veneer can still vary considerably from stack to stack, accurate data regarding the dimensions, grade, and quality of veneer in a specific stack of veneer, as well as data indicating exactly how the veneer was stacked, i.e., what makes up each individual layer of veneer in the stack and the orientation of that veneer, can be accurately determined.

Figure 10:
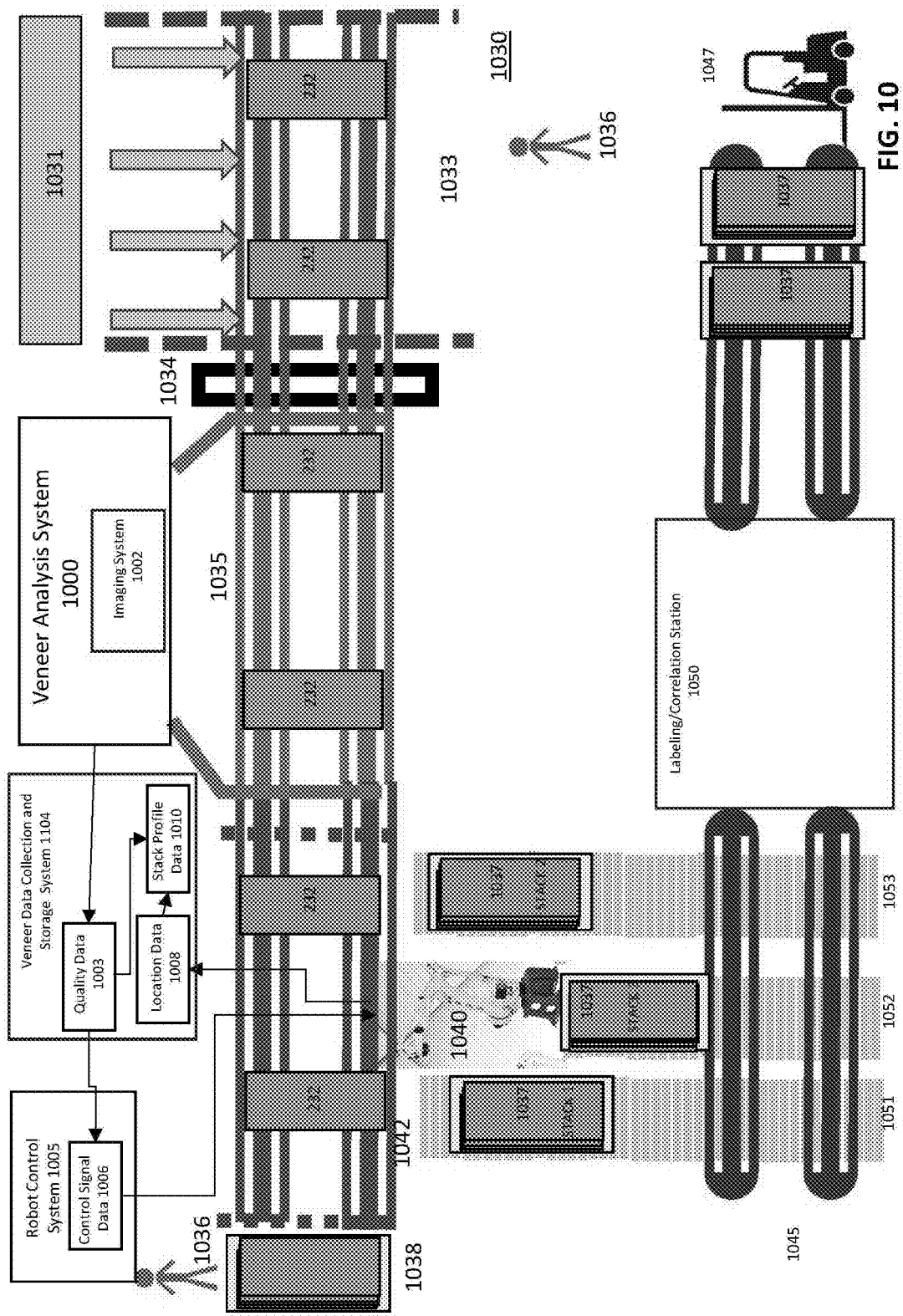
FIG. 10 is a block diagram of a full veneer sheet stack of veneer creation system in accordance with one embodiment.

FIG. 10 is a block diagram of a stack of full sheets of veneer creation system 1030 in accordance with one embodiment. Stack of full sheets of veneer creation system 1030 includes dryer outfeed 1031 where individual full veneer sheets 232 are dropped onto dryer outfeed conveyor 1033. Full veneer sheets 232 can be created to almost any size desired. However, as one illustrative example, and as shown in FIG. 1A, full veneer sheets can have an average length (Lf in FIG. 1A) of approximately 102 inches and a width (Wf in FIG. 1A) of approximately 54 inches. As discussed, for safety reasons and for production efficiency, the dimensions of the stacks of full veneer sheets 232 to be created should ideally be as close to the dimensions of the individual full veneer sheets 232 as possible. As discussed below, unlike currently available systems, stack of full sheets of veneer creation system 1030 is well suited by design to accomplish this task.

From dryer outfeed conveyor 1033 the individual full veneer sheets 232 pass through moisture meter 1034 where the moisture content of the individual full veneer sheets 232 is determined. In some cases, if the moisture content of an individual full veneer sheet 232 is determined to be unacceptable, that specific individual full veneer sheet 232 is so marked by moisture meter 1034 and that individual full veneer sheet 232 is processed, or removed from processing, accordingly. In some cases, the moisture level of individual full veneer sheets 232 can be used in part to determine a grade of the individual full veneer sheet 232.

From moisture meter 1034, the individual full veneer sheets 232 are passed to veneer analysis and selection conveyor 1035. In one embodiment, the individual full veneer sheets 232 are conveyed by veneer analysis and selection conveyor 1035 to veneer analysis system 1000. Veneer analysis system 1000 is representative of one or more veneer analysis systems at one or more veneer analysis system locations/positions along veneer analysis and selection conveyor 1035 and therefore the inclusion of the single veneer analysis system 1000 in FIG. 10 is not limiting.

In one embodiment, veneer analysis system 1000 includes imaging system 1002. In one embodiment, imaging system 1002 includes a high resolution two-dimensional (2D) imaging system. In some embodiments imaging system 1002 includes a three dimensional (3D) imaging system such as a laser profiling system.

In some embodiments, the imaging system 1002 includes all or part of a high resolution imaging system such as that set forth in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which is hereby incorporated by reference in its entirety as if it were fully set forth herein.

In some embodiments the imaging system 1002 includes a three dimensional (3D) imaging system such as a laser profiling system. In some embodiments, one or more imaging systems include a three dimensional (3D) imaging system such as a Cognex IN-SIGHT 3D-L4000 system or a Cognex IN-SIGHT 3D-A5000 system.

In one embodiment, veneer analysis system 1000 is used to analyze the surface of each individual full veneer sheet quickly, consistently, and automatically 232 to generate quality data 1003 for each individual full veneer sheet 232. IN one embodiment, quality data 1003 represents a grade assigned to each individual full veneer sheet 232.

In one embodiment, quality data 1003 representing the grade of each individual full veneer sheet 232 is collected, recorded, and correlated with each individual full veneer sheet 232 at veneer data collection and storage system 1004.

In accordance with the disclosed embodiments, the quality data 1003 for each individual full veneer sheet 232 is provided to robot control system 1005. Robot control system 1005 is representative of one or more veneer selection and stacking robot control systems associated with one or more local robotic stacking cells 1042. Therefore, the number of robot control systems is not limited to the single robot control system 1005 shown. In one embodiment, robot control system 1005 generates veneer selection and stacking robot control signal data 1006 representing veneer selection and stacking robot control signals based on analysis of the quality data 1003 for each individual full veneer sheet 232.

The generated veneer selection and stacking robot control signals represented by veneer selection and stacking robot control signal data 1006 are then provided to local robotic stacking cell 1042 where they are used to control the operation of veneer selection and stacking robot 1040 included local robotic stacking cell 1042. In various embodiments, the number of local robotic stacking cells and veneer selection and stacking robots can be any number desired. Consequently, the single local robotic stacking cell 1042 and veneer selection and stacking robot 1040 shown in FIG. 10 is not limiting.

In one embodiment, in response to the veneer selection and stacking robot control signals represented by veneer selection and stacking robot control signal data 1006, veneer selection and stacking robot 1040 uses a robotic arm to select specific full veneer sheets 232 from output conveyor 1045 to move the selected full veneer sheets 232 from output conveyor 1045 to the appropriate stacks of veneer 1037.

In one embodiment, as each individual full veneer sheet 232 is moved from veneer analysis and selection conveyor 1035 to the appropriate stack of stacks of veneer 1037, the location of the placement of the full veneer sheet 232 within the appropriate stack of stacks of veneer 1037, e.g., the placement layer or level of the individual full veneer sheet 232 within the appropriate stack of stacks of veneer 1037, is recorded as location data 1008 for each full veneer sheet 232. The location data for each full veneer sheet 232 correlated with the respective full veneer sheet 232 in a veneer data collection and storage system 1004.

Therefore, in one embodiment, the location data 1008 and the quality data 1003 for each individual full veneer sheet 232 is collected and correlated the respective individual full veneer sheet 232 as each individual full veneer sheet 232 is added to appropriate stack of stacks of veneer 1037. As discussed in more detail below, once the appropriate stack of stacks of veneer 1037 is completed, the correlated location data 1008 and the quality data 1003 for each individual full veneer sheet 232 that was added to the appropriate stack of stacks of veneer 1037 is compiled as stack profile data 1010.

As discussed above, depending on the number and type of defects on a particular full veneer sheet 232, that full veneer sheet 232 may be unsatisfactory for use in particular applications. Accordingly, is important that full veneer sheets 232 are accurately and consistently graded following manufacture because this grade determines the value and the possible uses for which a full veneer sheet 232 is suitable. A grade assigned to a full veneer sheet 232 can also be used to determine its best use; for example, whether it is suitable as a face sheet for plywood, whether it is suitable for clipping and edge gluing to form a sheet, whether it is suitable for use in laminated wood beams, should be discarded, or is suitable for other uses.

Thus, using stack of full sheets of veneer creation system 1030, quality data 1003 for each individual full veneer sheet 232 is collected and correlated with the respective individual full sheet of veneer 232. Then, as each individual full veneer sheet 232 is moved from veneer analysis and selection conveyor 1035 to the appropriate stack of stacks of veneer 1037, the location of the placement of the full veneer sheet 232 within the appropriate stack of stacks of veneer 1037, e.g., the placement layer or level of the individual full veneer sheet 232 within the appropriate stack of stacks of veneer 1037, is recorded as location data 1008 for each full veneer sheet 232. Finally, once the appropriate stack of stacks of veneer 1037 is completed, the correlated location data 1008 and the quality data 1003 for each individual full veneer sheet 232 that was added to the appropriate stack of stacks of veneer 1037 is compiled as stack profile data 1010.

Consequently, using stack of full sheets of veneer creation system 1030, the detailed composition of each stack of full sheets of veneer 1037 created, e.g., stacks of full sheets of veneer 1 through 3 in FIG. 10, is precisely known. In this way the number of full sheets of veneer in a given stack of full sheets of veneer 1037 and their grades is known as is the location of each full sheet of veneer.

Therefore, using stack of full sheets of veneer creation system 1030 the total number of sheets of veneer 232 of a given grade or quality in a given stack of full sheets of veneer 1037 is known. This makes inventory of veneer more accurate and can be used to effectively and fairly price stack of full sheets of veneer 1037.

In addition, as each full sheet of veneer 232 is unstacked, the grade of that full sheet of veneer 232 is known. As a result, a given full sheet of veneer 232 can be taken straight off the stack of full sheets of veneer 1037 and provided to the location for its most effective use.

Returning to FIG. 10, stack of full sheets of veneer creation system 1030 includes overflow bin 1038. Like overflow bin 238 of FIG. 2D, in operation, any full veneer sheets 232 that are of unacceptable dimensions, grade, or moisture content, are passed from full veneer sheets 232 to overflow bin 1038 for recycling and/or repurposing. However, unlike prior art full veneer sheet stacking system 230 of FIG. 2D, using stack of full sheets of veneer creation system 1030 overflow bin 1038 does not typically contain significant amounts of veneer that has been damaged, or simply not processed fast enough. This is because stack of full sheets of veneer creation system 1030 uses veneer selection and stacking robot 1040 and robotic arms rather than human workers so that there is minimal damage to full veneer sheets 232 and processing time is not an issue.

One way the use of veneer selection and stacking robot 1040 avoids damaging full veneer sheets 232 is by utilizing robotic arms with selectively activated vacuum heads to move the full veneer sheets 232 from veneer analysis and selection conveyor 1035 and to place the full veneer sheets 232 in a specific stack of full sheets of veneer 1037.

In addition, as seen in FIG. 10, by employing veneer selection and stacking robot 1040 rather than human workers, stack of full sheets of veneer creation system 1030 requires the use of as few as two human workers 1036; one to position full veneer sheets 232 onto dryer outfeed conveyor 1033 and one to control the use of overflow bin 1038.

In one embodiment, once stacks of veneer 1037, e.g., stack of veneer 1, stack of veneer, 2, stack of veneer 3, in FIG. 10, are created, the correlated location data 1008 and the quality data 1003 for each individual full veneer sheet 232 that was added to the appropriate stack of stacks of veneer 1037 is compiled to create stack profile data 1010 for stack of full sheets of veneer 1037 by veneer data collection and storage system 1004.

Consequently, in contrast to prior art methods, using stack of full sheets of veneer creation system 1030, quality data 1003 for each individual full veneer sheet 232 is collected and correlated with the respective individual full sheet of veneer 232. Then, as each individual full veneer sheet 232 is moved from veneer analysis and selection conveyor 1035 to the appropriate stack of stacks of veneer 1037, the location of the placement of the full veneer sheet 232 within the appropriate stack of stacks of veneer 1037, e.g., the placement layer or level of the individual full veneer sheet 232 within the appropriate stack of stacks of veneer 1037, is recorded as location data 1008 for each full veneer sheet 232. Finally, once the appropriate stack of stacks of veneer 1037 is completed, the correlated location data 1008 and the quality data 1003 for each individual full veneer sheet 232 that was added to the appropriate stack of stacks of veneer 1037 is compiled as stack profile data 1010.

In one embodiment, once stacks of veneer 1037, e.g., stack of veneer 1, stack of veneer, 2, stack of veneer 3, in FIG. 10, are created, stack of veneer 1, stack of veneer 2, and stack of veneer 3, are relayed to output conveyor 1045 via relay conveyors/rollers 1051, 1052, and 1053.

In one embodiment, output conveyor 1045 relays stacks of veneer 1037, e.g., stack of veneer 1, stack of veneer, 2, stack of veneer 3, to labeling station 1050 where each stack of full sheets of veneer 1037, e.g., stack of veneer 1, stack of veneer, 2, stack of veneer 3, is associated with the respective profile data of stack profile data 1010 for that stack of full sheets of veneer 1037.

In one embodiment, at labeling station 1050 a profile identifier, such as a printed label, a UPC code or label, a QR code or label, an RFID tag, or other indicator is associated with/assigned to each stack of full sheets of veneer 1037, e.g., stack of veneer 1, stack of veneer, 2, stack of veneer 3, indicating the location and/or access to the respective profile data of stack profile data 1010 for that stack of full sheets of veneer 1037.

In one embodiment, once a profile identifier, such as a printed label, a UPC code or label, a QR code or label, an RFID tag, or other indicator is associated with/assigned to each stack of full veneer sheets 1037, e.g., stack of veneer 1, stack of veneer, 2, stack of veneer 3, indicating the location and/or access to the respective profile data of stack profile data 1010 for that stack of full sheets of veneer 1037, the now labeled stacks of full veneer sheets 1037 are picked up by forklift 1047 which moves labeled stacks of veneer 1037 to the location in the processing plant where they are needed, or to storage.

Using stack of full sheets of veneer creation system 1030, the detailed composition of each stack of full sheets of veneer 1037 created, e.g., stacks of full sheets of veneer 1 through 3 in FIG. 10, is precisely known. In this way the number of full sheets of veneer in a given stack of full sheets of veneer 1037 and their grades is known as is the location of each full sheet of veneer.

Therefore, using stack of full sheets of veneer creation system 1030 the total number of sheets of veneer 232 of a given grade or quality in a given stack of full sheets of veneer 1037 is known. This makes inventory of veneer more accurate and can be used to effectively and fairly price the stacks of full sheets of veneer 1037.

In addition, as each full sheet of veneer 232 is unstacked, the grade of that full sheet of veneer 232 is known. As a result, a given full sheet of veneer 232 can be taken straight off the stack of full sheets of veneer 1037 and provided to the location for its most effective use.

As shown above, stack of full sheets of veneer creation system 1030 effective and efficient technical solution to the long-standing technical problem of identifying and tracking the contents/composition of a given stack of veneer during the stacking of veneer process so that the quality and/or quantity of the veneer in the stack can be accurately determined, recorded, and correlated to the stack of veneer so created.

Figure 11:
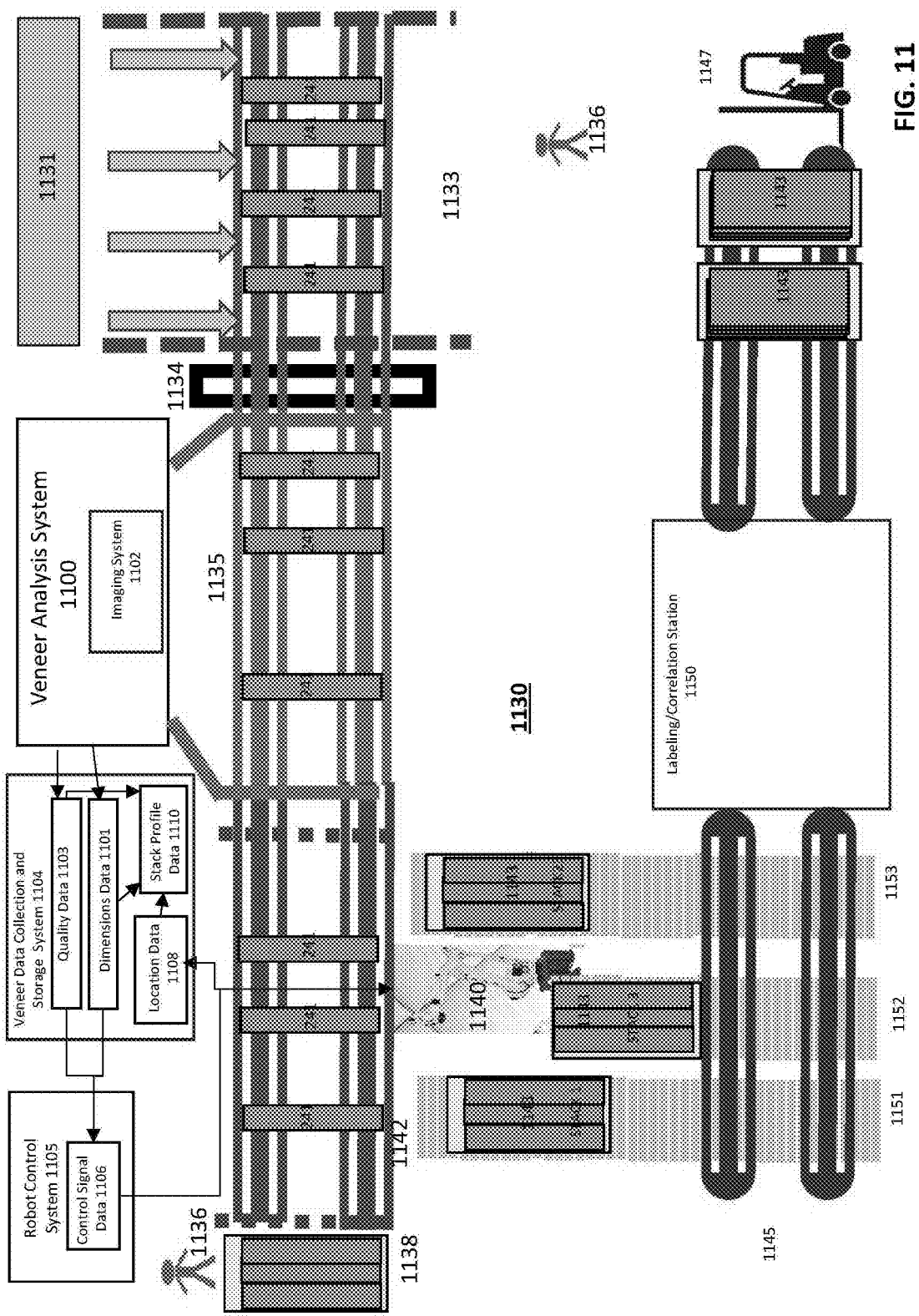
FIG. 11 is a block diagram of a veneer strip stack of veneer creation system in accordance with one embodiment.

FIG. 11 is a block diagram of a stack of veneer strips creation system 1130 in accordance with one embodiment. Stack of veneer strips creation system 1130 includes dryer outfeed 1131 where individual veneer strips 241 are dropped onto dryer outfeed conveyor 1133. Veneer strips 241, being fractions of veneer strips, can be almost any width, such as width Ws in FIG. 1A. However, veneer strips 241 typically have approximately the same length dimension as veneer strips, e.g., length Lf in FIGS. 1A and 1B. As noted above, in one illustrative example, the average length Lf of each one of veneer strips 241 is approximately 102 inches.

For safety reasons and for production efficiency, the dimensions of the stacks of veneer strips 1143 of veneer strips 241 to be created would ideally be consistent in both length and width dimensions. In one illustrative embodiment, the length of a stacks of veneer strips 1143 is approximately length Lf of a veneer strip (FIG. 1A) and the width of stacks of veneer strips 1143 is approximately width Wf of a veneer strip (FIG. 1A). In addition, as discussed above, it is desirable to have as few bulges in the layers of the stacks of veneer strips 1143. As discussed below, unlike currently available systems, stack of veneer strips creation system 1130 is well suited by design to accomplish this task.

From dryer outfeed conveyor 1133 the individual veneer strips 241 pass through moisture meter 1134 where the moisture content of the individual veneer strips 241 is determined. In some cases, if the moisture content of an individual veneer strip 241 is determined to be unacceptable, that specific individual veneer strip 241 is so marked by moisture meter 1134 and that individual veneer strip 241 is processed, or removed from processing, accordingly. In some cases, the moisture level of individual veneer strips 241 can be used in part to determine a grade of the individual veneer strip 241.

From moisture meter 1134, the individual veneer strips 241 are passed to veneer analysis and selection conveyor 1135. In one embodiment, the individual veneer strips 241 are conveyed by veneer analysis and selection conveyor 1135 to veneer analysis system 1100. Veneer analysis system 1100 is representative of one or more veneer analysis systems at one or more veneer analysis system locations/positions along veneer analysis and selection conveyor 1135 and therefore the inclusion of the single veneer analysis system 1100 in FIG. 11 is not limiting.

In one embodiment, veneer analysis system 1100 includes imaging system 1102. In one embodiment, imaging system 1102 includes a high resolution two-dimensional (2D) imaging system. In some embodiments imaging system 1102 includes a three dimensional (3D) imaging system such as a laser profiling system.

In some embodiments, the imaging system 1102 includes all or part of a high resolution imaging system such as that set forth in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which is hereby incorporated by reference in its entirety as if it were fully set forth herein.

In some embodiments the imaging system 1102 includes a three dimensional (3D) imaging system such as a laser profiling system. In some embodiments, one or more imaging systems include a three dimensional (3D) imaging system such as a Cognex IN-SIGHT 3D-L4000 system or a Cognex IN-SIGHT 3D-A5000 system.

In one embodiment, veneer analysis system 1100 is used to generate image data associated with each of the individual veneer strips 241. In one embodiment, this image data is then processed to generate dimensions data 1101 for each individual veneer strip 241. In one embodiment, the dimensions data 1101 for each individual veneer strip 241 includes length data that can be processed to ensure each individual veneer strip 241 is of the desired length (Lf in FIGS. 1A and 1B) to within defined tolerances. In one embodiment, dimensions data 1101 for each individual veneer strip 241 includes width data indicating the precise width (Ws in FIG. 1B) of each individual veneer strip 241. In one embodiment, the dimensions data 1101 for each individual veneer strip 241 also includes data representing the relative location, center of mass, orientation, and physical dimensions of each individual veneer strip 241.

In one embodiment, dimensions data 1101 for each individual veneer strip 241 is collected, recorded, and correlated with each individual veneer strip 241 at veneer data collection and storage system 1104.

In one embodiment, veneer analysis system 1100 is also used to analyze the surface of each individual veneer strip 241 quickly, consistently, and automatically to generate quality data 1103 for each individual veneer strip 241. Quality data 1103 represents a grade assigned to each individual veneer strip 241.

In one embodiment, quality data 1103 representing the grade of each individual veneer strip 241 is collected, recorded, and correlated with each individual veneer strip 241 at veneer data collection and storage system 1104.

In accordance with the disclosed embodiments, the dimensions data 1101 and quality data 1103 for each individual veneer strip 241 is provided to robot control system 1105. Robot control system 1105 is representative of one or more veneer selection and stacking robot control systems associated with one or more local robotic stacking cells 1142. Therefore, the number of robot control systems is not limited to the single robot control system 1105 shown. In one embodiment, robot control system 1105 generates veneer selection and stacking robot control signal data 1106 representing veneer selection and stacking robot control signals based on analysis of the quality data 1103 for each individual veneer strip 241.

The generated veneer selection and stacking robot control signals represented by veneer selection and stacking robot control signal data 1106 are then provided to local robotic stacking cell 1142 where they are used to control the operation of veneer selection and stacking robot 1140 included local robotic stacking cell 1142. In various embodiments, the number of local robotic stacking cells and veneer selection and stacking robots can be any number desired. Consequently, the single local robotic stacking cell 1142 and veneer selection and stacking robot 1140 shown in FIG. 11 is not limiting.

In one embodiment, in response to the veneer selection and stacking robot control signals represented by veneer selection and stacking robot control signal data 1106, veneer selection and stacking robot 1140 uses a robotic arm to select specific veneer strips 241 from veneer analysis and selection conveyor 1135 and move the selected veneer strips 241 from veneer analysis and selection conveyor 1135 to the appropriate stacks of veneer strips 1143.

In one embodiment, as each individual veneer strip 241 is moved from veneer analysis and selection conveyor 1135 to the appropriate stack of stacks of veneer strips 1143, the location of the placement of the veneer strip 241 within the appropriate stack of stacks of veneer strips 1143, e.g., the placement layer or level of the individual veneer strip 241 within the appropriate stack of stacks of veneer strips 1143, is recorded as location data 1108 for each veneer strip 241.

In one embodiment, as each individual veneer strip 241 is moved from veneer analysis and selection conveyor 1135 to the appropriate stack of stacks of veneer strips 1143 the orientation of each individual veneer strip 241 e.g., the geometry of the veneer strip 241 within the stack of stacks of veneer strips 1143 is recorded.

In one embodiment, the layer location and orientation data for each individual veneer strip 241 within the appropriate stack of stacks of veneer strips 1143, e.g., the placement layer or level and orientation of each individual veneer strip 241 within the appropriate stack of stacks of veneer strips 1143 is recorded as location data 1108 for each individual veneer strip 241 and correlated with the respective individual veneer strip 241 in a veneer location database.

Therefore, in one embodiment, the location data 1108, e.g., the layer and orientation data, the dimensions data 1101, e.g., the length and width data, and the quality data 1103, e.g., the grading data, for each individual veneer strip 241 is collected and correlated the respective individual veneer strip 241 as each individual veneer strip 241 is added to appropriate stack of stacks of veneer strips 1143. As discussed in more detail below, once the appropriate stack of stacks of veneer strips 1143 is completed, the correlated location data 1108, the dimensions data 1101, and the quality data 1103 for each individual veneer strip 241 that was added to the appropriate stack of stacks of veneer strips 1143 is compiled as stack profile data 1110.

As discussed above, depending on the number and type of defects on a particular veneer strip 241, that veneer strip 241 may be unsatisfactory for use in particular applications. Accordingly, is important that veneer strips 241 are accurately and consistently graded following manufacture because this grade determines the value and the possible uses for which a veneer strip 241 is suitable. A grade assigned to a veneer strip 241 can also be used to determine its best use.

Using stack of veneer strips creation system 1130, dimensions data 1101 and quality data 1103 for each individual veneer strip 241 is collected and correlated with the respective individual strip of veneer 241. Then, as each individual veneer strip 241 is moved from veneer analysis and selection conveyor 1135 to the appropriate stack of stacks of veneer strips 1143, the location of the placement of the veneer strip 241 within the appropriate stack of stacks of veneer strips 1143, e.g., the placement layer or level and orientation of the individual veneer strips 241 within the appropriate stack of stacks of veneer strips 1143, is recorded as location data 1108 for each veneer strip 241. Finally, once the appropriate stack of stacks of veneer strips 1143 is completed, the location data 1108, e.g., the layer and orientation data, the dimensions data 1101, e.g., the length and width data, and the quality data 1103, e.g., the grading data, for each individual veneer strip 241 that was added to the appropriate stack of stacks of veneer strips 1143 is compiled as stack profile data 1110.

Consequently, using stack of veneer strips creation system 1130, the detailed composition of each stack of veneer strips 1143 created, e.g., stacks of veneer strips 1 through 3 in FIG. 11, is precisely known.

Therefore, using stack of veneer strips creation system 1130, the total quantity of strips of veneer 241 of a given grade or quality in a given stack of veneer strips 1143 is known. This makes inventory of veneer more accurate and can be used to effectively and fairly price stack of veneer strips 1143.

In addition, as each strip of veneer 241 is unstacked, the grade of that strip of veneer 241 is known. As a result, a given strip of veneer 241 can be taken straight off the stack of veneer strips 1143 and provided to the location for its most effective use.

Returning to FIG. 11, stack of veneer strips creation system 1130 includes overflow bin 1138. In operation, any veneer strips 241 that are of unacceptable dimensions, grade, or moisture content, are passed from veneer strips 241 to overflow bin 1138 for recycling and/or repurposing. However, unlike prior art veneer strip stacking systems, using stack of veneer strips creation system 1130 overflow bin 1138 does not typically contain significant amounts of veneer that has been damaged, or simply not processed fast enough. This is because stack of veneer strips creation system 1130 uses veneer selection and stacking robot 1140 and robotic arms rather than human workers so that there is minimal damage to veneer strips 241 and processing time is not an issue.

One way the use of veneer selection and stacking robot 1140 avoids damaging veneer strips 241 is by utilizing robotic arms with selectively activated vacuum heads to move the veneer strips 241 from veneer analysis and selection conveyor 1135 and to place the veneer strips 241 in a specific stack of veneer strips 1143.

In addition, as seen in FIG. 11, by employing veneer selection and stacking robot 1140 rather than human workers, stack of veneer strips creation system 1130 requires the use of as few as two human workers 1136; one to position veneer strips 241 onto dryer outfeed conveyor 1133 and one to control the use of overflow bin 1138.

In one embodiment, once stacks of veneer strips 1143, e.g., stack of veneer 1, stack of veneer, 2, stack of veneer 3, in FIG. 11, are created, the correlated location data 1108, dimensions data 1102, and the quality data 1103 for each individual veneer strip 241 that was added to the appropriate stack of stacks of veneer strips 1143 is compiled to create stack profile data 1110 for stack of veneer strips 1143 by veneer data collection and storage system 1104.

Consequently, in contrast to prior art methods, using stack of veneer strips creation system 1130, dimensions data 1101 and quality data 1103 for each individual veneer strip 241 is collected and correlated with the respective individual strip of veneer 241. Then, as each individual veneer strip 241 is moved from veneer analysis and selection conveyor 1135 to the appropriate stack of stacks of veneer strips 1143, the location of the placement of the veneer strip 241 within the appropriate stack of stacks of veneer strips 1143, e.g., the placement layer or level and orientation of the individual veneer strip 241 within the appropriate stack of stacks of veneer strips 1143, is recorded as location data 1108 for each veneer strip 241. Finally, once the appropriate stack of stacks of veneer strips 1143 is completed, the location data 1108, e.g., the layer and orientation data, the dimensions data 1101, e.g., the length and width data, and the quality data 1103, e.g., the grading data, for each individual veneer strip 241 that was added to the appropriate stack of stacks of veneer strips 1143 is compiled as stack profile data 1110.

In one embodiment, once stacks of veneer strips 1143, e.g., stack of veneer 1, stack of veneer, 2, stack of veneer 3, in FIG. 11, are created, stack of veneer 1, stack of veneer 2, and stack of veneer 3, are relayed to output conveyor 1145 via relay conveyors/rollers 1151, 1152, and 1153.

In one embodiment, output conveyor 1145 relays stacks of veneer strips 1143, e.g., stack of veneer 1, stack of veneer, 2, stack of veneer 3, to labeling station 1150 where each stack of veneer strips 1143, e.g., stack of veneer 1, stack of veneer, 2, stack of veneer 3, is associated with the respective profile data of stack profile data 1110 for that stack of veneer strips 1143.

In one embodiment, at labeling station 1150 a profile identifier, such as a printed label, a UPC code or label, a QR code or label, an RFID tag, or other indicator is associated with/assigned to each stack of veneer strips 1143, e.g., stack of veneer 1, stack of veneer, 2, stack of veneer 3, indicating the location and/or access to the respective profile data of stack profile data 1110 for that stack of veneer strips 1143.

In one embodiment, once a profile identifier, such as a printed label, a UPC code or label, a QR code or label, an RFID tag, or other indicator is associated with/assigned to each stack of veneer strips 1143, e.g., stack of veneer 1, stack of veneer, 2, stack of veneer 3, indicating the location and/or access to the respective profile data of stack profile data 1110 for that stack of veneer strips 1143, the now labeled stacks of veneer strips 1143 are picked up by forklift 1147 which moves labeled stacks of veneer 1143 to the location in the processing plant where they are needed, or to storage.

Using stack of veneer strips creation system 1130, the detailed composition of each stack of veneer strips 1143 created, e.g., stacks of veneer strips 1 through 3 in FIG. 11, is precisely known. In this way the amount of veneer strips in a given stack of veneer strips 1143 grades is known as is the layer, orientation, and grade of each veneer strip.

Therefore, using stack of veneer strips creation system 1130 the number of strips of veneer 241 of a given grade or quality in a given stack of veneer strips 1143 is known. This makes inventory of veneer more accurate and can be used to effectively and fairly price stack of veneer strips 1143.

In addition, using stack of veneer strips creation system 1130, the precise volume of each stack of veneer strips 1143 created can be determined. In addition, using stack of veneer strips creation system 1130, the precise surface area of veneer contained in each stack of veneer strips 1143 created can be determined.

In addition, as each strip of veneer 241 is unstacked, the grade and dimensions of that strip of veneer 241 is known. As a result, a given strip of veneer 241 can be taken straight off the stack of veneer strips 1143 and provided to a location for its most effective use.

As shown above, stack of veneer strips creation system 1130 provides an effective and efficient technical solution to the long-standing technical problem of identifying and tracking the contents/composition of a given stack of veneer during the stacking of veneer process so that the quality and/or quantity of the veneer in the stack can be accurately determined, recorded, and correlated to the stack of veneer so created.

FIG. 12 is a block diagram of a stack of partial veneer sheets creation system 1230 in accordance with one embodiment. Stack of partial veneer sheets creation system 1230 includes dryer outfeed 1231 where individual partial veneer sheets 461 are dropped onto dryer outfeed conveyor 1233.

As noted above, herein the terms "partial veneer sheet" "veneer short sheet," and "veneer short strip" are used interchangeably and include a veneer sheet portion that has a length "Lp" that not of the defined length "Lf" of a partial veneer sheet. In addition, as used herein, partial veneer sheets can also have any width "Wp" that is less than or equal to the defined partial veneer sheet width "Wf." It should be noted that any veneer sheet fraction that has any length "Lp" that is not of the defined length "Lf" and a width "Wp" less than or equal to the width "Wf" of a partial veneer sheet is considered a partial veneer sheet, even if each partial veneer sheet has a different length "Lp" and width "Wp" from other partial veneer sheets.

If a veneer sheet fraction is less than full length, typically 102", then it is not usable as a partial veneer sheet, or partial veneer sheet. In this case, these partial veneer sheets are typically stacked with a clean trimmed edge in vertical alignment in a stack as are partial veneer sheets and/or partial veneer sheets. However, these partial veneer sheet stacks are commonly sent to a large saw where they are sawn to the length dimension (typically 51") to be used as the cross ply, or core, in plywood. This process can result in 49% waste of partial veneer sheets. While not an ideal efficiency, this 49% waste is better than 100% waste. These partial veneer sheets can also be composed to produce a continuous ribbon of core material that can then be cut into full size cross ply sheets. So instead of an individual feeding by hand, multiple individual partial sheets, a 51"×51" core sheet can be manually, or machine laid as a single piece of composed core. The 51"×51" is common in the industry but may vary in dimension based on specific manufacturers criteria for core sizes.

As discussed above, FIG. 1C shows one illustrative example of a partial veneer sheet 1P having the length "Lp" lees than length "Lf" of FIG. 1A and a width "Wp" less than or equal to width "Wf" of FIG. 1A.

Returning to FIG. 12, partial veneer sheets 461, being veneer sheet fractions, can be almost any width, such as width Ws in FIG. 1A. However, once sawn, partial veneer sheets 461 typically have approximately the same length dimension although, as noted above, this length dimension is typically not the same length Lf in FIGS. 1A and 1B as partial veneer sheets. As discussed above, partial veneer sheets, such as partial veneer sheets 461, typically initially have a differing lengths, such as Lp in FIG. 1C that is not only different from length LF but also is different from partial veneer sheet to partial veneer sheet. As also discussed above, partial veneer sheets 461 are commonly stacked and sent to a large saw where they are sawn to the length dimension (typically 51") prior to being sent to partial veneer sheet grading and stacking system 460.

From dryer outfeed conveyor 1233 the individual partial veneer sheets 461 pass through moisture meter 1234 where the moisture content of the individual partial veneer sheets 461 is determined. In some cases, if the moisture content of an individual partial veneer sheet 461 is determined to be unacceptable, that specific individual partial veneer sheet 461 is so marked by moisture meter 1234 and that individual partial veneer sheet 461 is processed, or removed from processing, accordingly. In some cases, the moisture level of individual partial veneer sheets 461 can be used in part to determine a grade of the individual partial veneer sheet 461.

From moisture meter 1234, the individual partial veneer sheets 461 are passed to veneer analysis and selection conveyor 1235. In one embodiment, the individual partial veneer sheets 461 are conveyed by veneer analysis and selection conveyor 1235 to veneer analysis system 1200. Veneer analysis system 1200 is representative of one or more veneer analysis systems at one or more veneer analysis system locations/positions along veneer analysis and selection conveyor 1235 and therefore the inclusion of the single veneer analysis system 1200 in FIG. 12 is not limiting.

In one embodiment, veneer analysis system 1200 includes imaging system 1202. In one embodiment, imaging system 1202 includes a high resolution two-dimensional (2D) imaging system. In some embodiments imaging system 1202 includes a three dimensional (3D) imaging system such as a laser profiling system.

In some embodiments, the imaging system 1202 includes all or part of a high resolution imaging system such as that set forth in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which is hereby incorporated by reference in its entirety as if it were fully set forth herein.

In some embodiments the imaging system 1202 includes a three dimensional (3D) imaging system such as a laser profiling system. In some embodiments, one or more imaging systems include a three dimensional (3D) imaging system such as a Cognex IN-SIGHT 3D-L4000 system or a Cognex IN-SIGHT 3D-A5000 system.

In one embodiment, veneer analysis system 1200 is used to generate image data associated with each of the individual partial veneer sheets 461. In one embodiment, this image data is then processed to generate dimensions data 1201 for each individual partial veneer sheet 461. In one embodiment, the dimensions data 1201 for each individual partial veneer sheet 461 includes length data and width data indicating the precise width of each individual partial veneer sheet 461. In one embodiment, the dimensions data 1201 for each individual partial veneer sheet 461 also includes data representing the relative location, center of mass, orientation, and physical dimensions of each individual partial veneer sheet 461.

In one embodiment, dimensions data 1201 for each individual partial veneer sheet 461 is collected, recorded, and correlated with each individual partial veneer sheet 461 at veneer data collection and storage system 1204.

In one embodiment, veneer analysis system 1200 is also used to analyze the surface of each individual partial veneer sheet 461 quickly, consistently, and automatically to generate quality data 1203 for each individual partial veneer sheet 461. Quality data 1203 represents a grade assigned to each individual partial veneer sheet 461.

In one embodiment, quality data 1203 representing the grade of each individual partial veneer sheet 461 is collected, recorded, and correlated with each individual partial veneer sheet 461 at veneer data collection and storage system 1204.

In accordance with the disclosed embodiments, the dimensions data 1201 and quality data 1203 for each individual partial veneer sheet 461 is provided to robot control system 1205. Robot control system 1205 is representative of one or more veneer selection and stacking robot control systems associated with one or more local robotic stacking cells 1242. Therefore, the number of robot control systems is not limited to the single robot control system 1205 shown. In one embodiment, robot control system 1205 generates veneer selection and stacking robot control signal data 1206 representing veneer selection and stacking robot control signals based on analysis of the quality data 1203 for each individual partial veneer sheet 461.

The generated veneer selection and stacking robot control signals represented by veneer selection and stacking robot control signal data 1206 are then provided to local robotic stacking cell 1242 where they are used to control the operation of veneer selection and stacking robot 1240 included local robotic stacking cell 1242. In various embodiments, the number of local robotic stacking cells and veneer selection and stacking robots can be any number desired. Consequently, the single local robotic stacking cell 1242 and veneer selection and stacking robot 1240 shown in FIG. 12 is not limiting.

In one embodiment, in response to the veneer selection and stacking robot control signals represented by veneer selection and stacking robot control signal data 1206, veneer selection and stacking robot 1240 uses a robotic arm to select specific partial veneer sheets 461 from veneer analysis and selection conveyor 1235 and move the selected partial veneer sheets 461 from veneer analysis and selection conveyor 1235 to the appropriate stacks of partial veneer sheets 1263.

In one embodiment, as each partial veneer sheet 461 is moved from veneer analysis and selection conveyor 1235 to the appropriate stack of stacks of partial veneer sheets 1263, the location of the placement of each partial veneer sheet 461 within the appropriate the appropriate stack of stacks of partial veneer sheets 1263, e.g., the placement layer or level of the partial veneer sheet 461 within the appropriate stack of stacks of partial veneer sheets 1263, is recorded.

In one embodiment, as each partial veneer sheet 461 is moved from veneer analysis and selection conveyor 1235 to the appropriate stack of stacks of partial veneer sheets 1263 the orientation of each individual partial veneer sheet 461 e.g., the geometry of the partial veneer sheet 461 within the appropriate stack of stacks of partial veneer sheets 1263, is recorded.

In one embodiment, the location and orientation data for each individual partial veneer sheet 461 within the appropriate the appropriate stack of stacks of partial veneer sheets 1263, e.g., the placement layer or level and orientation of each individual partial veneer sheet 461 within the appropriate stack of stacks of partial veneer sheets 1263, is recorded as location data 1208 for each individual partial veneer sheet 461 and correlated with the respective individual partial veneer sheet 461 in a veneer location database.

Therefore, in one embodiment, the location data 1208, e.g., the layer and orientation data, the dimensions data 1201, e.g., the length and width data, and the quality data 1203, e.g., the grading data, for each individual partial veneer sheet 461 is collected and correlated the respective individual partial veneer sheet 461 as each individual partial veneer sheet 461 is added to appropriate stack of stacks of partial veneer sheets 1263. As discussed in more detail below, once the appropriate stack of stacks of partial veneer sheets 1263 is completed, the correlated location data 1208, the dimensions data 1201, and the quality data 1203 for each individual partial veneer sheet 461 that was added to the appropriate stack of stacks of partial veneer sheets 1263 is compiled as stack profile data 1210.

As discussed above, depending on the number and type of defects on a particular partial veneer sheet 461, that partial veneer sheet 461 may be unsatisfactory for use in particular applications. Accordingly, is important that partial veneer sheets 461 are accurately and consistently graded following manufacture because this grade determines the value and the possible uses for which a partial veneer sheet 461 is suitable. A grade assigned to a partial veneer sheet 461 can also be used to determine its best use.

Thus, using stack of partial veneer sheets creation system 1230, dimensions data 1201 and quality data 1203 for each individual partial veneer sheet 461 is collected and correlated with the respective individual partial veneer sheet 461. Then, as each individual partial veneer sheet 461 is moved from veneer analysis and selection conveyor 1235 to the appropriate stack of stacks of partial veneer sheets 1263, the location of the placement and orientation of the partial veneer sheet 461 within the appropriate stack of stacks of partial veneer sheets 1263, e.g., the placement layer or level and geometry, of the individual partial veneer sheet 461 within the appropriate stack of stacks of partial veneer sheets 1263, is recorded as location data 1208 for each partial veneer sheet 461. Finally, once the appropriate stack of stacks of partial veneer sheets 1263 is completed, the location data 1208, e.g., the layer and orientation data, the dimensions data 1201, e.g., the length and width data, and the quality data 1203, e.g., the grading data, for each individual partial veneer sheet 461 that was added to the appropriate stack of stacks of partial veneer sheets 1263 is compiled as stack profile data 1210.

Consequently, using stack of partial veneer sheets creation system 1230, the detailed composition of each stack of partial veneer sheets 1263 created, e.g., stacks of partial veneer sheets 1 through 3 in FIG. 12, is precisely known.

Therefore, using stack of partial veneer sheets creation system 1230, the total quantity of partial veneer sheets 461 of a given grade or quality in a given stack of partial veneer sheets 1263 is known. This makes inventory of veneer more accurate and can be used to effectively and fairly price stack of partial veneer sheets 1263.

In addition, as each partial veneer sheet 461 is unstacked, the grade of that partial veneer sheet 461 is known. As a result, a given partial veneer sheet 461 can be taken straight off the stack of partial veneer sheets 1263 and provided to the location for its most effective use.

Returning to FIG. 12, stack of partial veneer sheets creation system 1230 includes overflow bin 1238. In operation, any partial veneer sheets 461 that are of unacceptable dimensions, grade, or moisture content, are passed from partial veneer sheets 461 to overflow bin 1238 for recycling and/or repurposing. However, unlike prior art partial veneer sheet stacking systems, using stack of partial veneer sheets creation system 1230 overflow bin 1238 does not typically contain significant amounts of veneer that has been damaged, or simply not processed fast enough. This is because stack of partial veneer sheets creation system 1230 uses veneer selection and stacking robot 1240 and robotic arms rather than human workers so that there is minimal damage to partial veneer sheets 461 and processing time is not an issue.

One way the use of veneer selection and stacking robot 1240 avoids damaging partial veneer sheets 461 is by utilizing robotic arms with selectively activated vacuum heads to move the partial veneer sheets 461 from veneer analysis and selection conveyor 1235 and to place the partial veneer sheets 461 in a specific stack of partial veneer sheets 1263.

In addition, as seen in FIG. 12, by employing veneer selection and stacking robot 1240 rather than human workers, stack of partial veneer sheets creation system 1230 requires the use of as few as two human workers 1236; one to position partial veneer sheets 461 onto dryer outfeed conveyor 1233 and one to control the use of overflow bin 1238.

In one embodiment, once stacks of partial veneer sheets 1263, e.g., stack of veneer 1, stack of veneer, 2, stack of veneer 3, in FIG. 12, are created, the correlated location data 1208, dimensions data 1201, and the quality data 1203 for each individual partial veneer sheet 461 that was added to the appropriate stack of stacks of partial veneer sheets 1263 is compiled to create stack profile data 1210 for each stack of partial veneer sheets 1263 by veneer data collection and storage system 1204.

Consequently, in contrast to prior art methods, using stack of partial veneer sheets creation system 1230, dimensions data 1201 and quality data 1203 for each individual partial veneer sheet 461 is collected and correlated with the respective individual partial veneer sheet 461. Then, as each individual partial veneer sheet 461 is moved from veneer analysis and selection conveyor 1235 to the appropriate stack of stacks of partial veneer sheets 1263, the location of the placement of the partial veneer sheet 461 within the appropriate stack of stacks of partial veneer sheets 1263, e.g., the placement layer or level and orientation of the individual partial veneer sheet 461 within the appropriate stack of stacks of partial veneer sheets 1263, is recorded as location data 1208 for each partial veneer sheet 461. Finally, once the appropriate stack of stacks of partial veneer sheets 1263 is completed, the correlated location data 1208 and the quality data 1203 for each individual partial veneer sheet 461 that was added to the appropriate stack of stacks of partial veneer sheets 1263 is compiled as stack profile data 1210.

In one embodiment, once stacks of partial veneer sheets 1263, e.g., stack of veneer 1, stack of veneer, 2, stack of veneer 3, in FIG. 12, are created, stack of veneer 1, stack of veneer 2, and stack of veneer 3, are relayed to output conveyor 1245 via relay conveyors/rollers 1251, 1252, and 1253.

In one embodiment, output conveyor 1245 relays stacks of partial veneer sheets 1263, e.g., stack of veneer 1, stack of veneer, 2, stack of veneer 3, to labeling station 1250 where each stack of partial veneer sheets 1263, e.g., stack of veneer 1, stack of veneer, 2, stack of veneer 3, is associated with the respective profile data of stack profile data 1210 for that stack of partial veneer sheets 1263.

In one embodiment, at labeling station 1250 a profile identifier, such as a printed label, a UPC code or label, a QR code or label, an RFID tag, or other indicator is associated with/assigned to each stack of partial veneer sheets 1263, e.g., stack of veneer 1, stack of veneer, 2, stack of veneer 3, indicating the location and/or access to the respective profile data of stack profile data 1210 for that stack of partial veneer sheets 1263.

In one embodiment, once a profile identifier, such as a printed label, a UPC code or label, a QR code or label, an RFID tag, or other indicator is associated with/assigned to each stack of partial veneer sheets 1263, e.g., stack of veneer 1, stack of veneer, 2, stack of veneer 3, indicating the location and/or access to the respective profile data of stack profile data 1210 for that stack of partial veneer sheets 1263, the now labeled stacks of partial veneer sheets 1263 are picked up by forklift 1247 which moves labeled stacks of veneer 1263 to the location in the processing plant where they are needed, or to storage.

Using stack of partial veneer sheets creation system 1230, the detailed composition of each stack of partial veneer sheets 1263 created, e.g., stacks of partial veneer sheets 1 through 3 in FIG. 12, is precisely known. In this way the amount of partial veneer sheets in a given stack of partial veneer sheets 1263 of specific grades is known as is the location and orientation of each partial veneer sheet.

Therefore, using stack of partial veneer sheets creation system 1230 the number of partial veneer sheets 461 of a given grade or quality in a given stack of partial veneer sheets 1263 is known. This makes inventory of veneer more accurate and can be used to effectively and fairly price stack of partial veneer sheets 1263.

In addition, using stack of partial veneer sheets creation system 1230, the precise volume of each stack of partial veneer sheets 1263 created can be determined. In addition, using stack of partial veneer sheets creation system 1230, the precise surface area of veneer contained in each stack of partial veneer sheets 1263 created can be determined.

In addition, as each partial veneer sheet 461 is unstacked, the grade and dimensions of that partial veneer sheet 461 is known. As a result, a given partial veneer sheet 461 can be taken straight off the stack of partial veneer sheets 1263 and provided to the location for its most effective use.

As shown above, stack of partial veneer sheets creation system 1230 provides an effective and efficient technical solution to the long-standing technical problem of identifying and tracking the contents/composition of a given stack of veneer during the stacking of veneer process so that the quality and/or quantity of the veneer in the stack can be accurately determined, recorded, and correlated to the stack of veneer so created.

Although in the discussion above a stack of full veneer sheets creation system, a stack of veneer strips creation system, and stack of partial veneer sheets creation system were discussed in detail, the methods and system discussed above can also be applied and used for any stacks of any size of veneer including but not limited to full sheets of veneer of any size, fractions of sheets of any size, and irregularly shaped veneer of any kind. Consequently, the discussion above is not limited to stacks of full veneer sheets, stacks of veneer strips, or stacks of partial veneer sheets.

As discussed above, in the prior art, stacking of veneer and unstacking is very labor intensive, highly inefficient, and a potential danger to working handling the layers of veneer making up the stack. In contrast, using some of the disclosed embodiments, the stacks of veneer are created using robots and detailed data about each stack is collected as the stack is being created.

Consequently, not only are the disclosed stacking of veneer methods and systems very labor efficient, but the stacks of veneer created using the disclosed embodiments include detailed volume, surface area, and quality data for each stack of veneer, and the layered contents of each stack of veneer is recorded.

This ability to efficiently and accurately determine the quality and/or quantity of veneer in stacks of veneer using the disclosed embodiments solves several significant issues encountered in the prior art. First, since using the disclosed embodiments, the quality and/or or quantity of the veneer in a given stack of veneer is known, it is possible to ensure a given layer of veneer in the stack of veneer is put to the best, i.e., most cost effective use.

In addition, using the disclosed embodiments the volume or surface area of veneer in a stack of veneer is known so a determination as to when a new stack of veneer will be needed on the production line can be readily and accurately calculated. This clearly allows for more efficient Just In Time (JIT) inventory methods, the more efficient use of production floor area, and more efficient and safer production line operations.

In addition, the ability to efficiently and accurately determine the quality and/or quantity of veneer in stacks of veneer using the disclosed embodiments results in efficient use of veneer, efficient inventory and purchasing procedures, and efficient production line operations.

In addition, the ability to efficiently and accurately determine the quality and/or quantity of veneer in stacks of veneer using the disclosed embodiments means that a buyer of a stack of veneer can know to a significant degree of certainty what quality and amount of veneer is included in a stack of veneer, including the actual volume and surface area of veneer included in a stack of fraction of full sheets of veneer. This results in efficient use of veneer, efficient production line operations, and more fair and efficient pricing of the stacks of veneer.

In addition, some embodiments of the present disclosure provide an effective and efficient technical solution to the long-standing technical problem of providing a method and system for identifying the top of stack veneer sheet fraction, or layer, in a stack of veneer consisting of layers of irregularly shaped veneer or veneer sheet fractions.

As discussed above with respect to FIGS. 2K, 2L, 2M, 2N and 2O, when a stack of veneer is a stack of irregularly shaped veneer or veneer sheet fractions, e.g., stacks of veneer strips and/or partial veneer sheets, it is extremely important to correctly identify the top of stack veneer sheet fraction in the stack of irregularly shaped veneer or veneer sheet fractions so that the top piece can be removed first. This is particularly true when the stack of irregularly shaped veneer or veneer sheet fraction is created using prior art methods and systems, or any time detailed information about the location, quality, and/or quantity of individual full veneer sheet and/or veneer strip and/or partial veneer sheet included in the stack of veneer is not known, e.g., when the disclosed methods and system for creating a stack of veneer are not used.

As again discussed above with respect to FIGS. 2K, 2L, 2M, 2N and 2O, this is because if an attempt to remove the wrong piece of veneer, i.e., not the top of stack veneer sheet fraction is made, then veneer sheet fraction(s) that is/are above the wrongly selected "top of stack" veneer sheet fraction will be displaced and likely damaged and/or lost from the stack of veneer.

As shown and discussed in FIGS. 2K, 2L, 2M, 2N and 2O, above, this problem arises because the irregularly shaped veneer or veneer sheet fractions can overlap one another so that identifying the "top" layer or veneer sheet fraction such as a veneer strip or partial sheet of veneer is very difficult, especially at typical production line speeds.

As also discussed above, to address this issue, attempts have been made to automate the unstacking process using prior art imaging systems and robotic systems such as robotic arms. However, using currently available imaging systems there is not a sufficient level of accuracy and resolution to ensure the top piece or layer is consistently correctly identified. Consequently, the robotic systems cannot be accurately controlled, and the result is all too often incorrect identification of the top piece or layer of veneer which, in turn, results in unacceptable levels of damaged veneer and waste.

In addition, when layers of irregularly shaped veneer or veneer sheet fractions are being unstacked using robots, it is important that the robotic arm picks up the veneer sheet fraction as close to the center of mass as possible. This distributes the weight of the veneer piece evenly to avoid breaking and/or dropping the veneer sheet fraction. However, when the stacks of veneer are stacks of irregularly shaped veneer or veneer sheet fractions, the dimensions of the various piece or layers of veneer varies significantly from piece to piece and layer to layer.

To address these issues, in accordance with some of the disclosed embodiments, a stack of veneer is provided to one or more top of veneer stack identification and unstacking system.

In one embodiment, the one or more veneer analysis systems include a three dimensional (3D) imaging system such as a laser profiling system or microwave system. In some embodiments, the 3D imaging system is positioned in a robot system, such as a robotic arm, and the top surface of the stack of veneer is scanned by the 3D imaging system using the robotic arm.

In some embodiments, the three dimensional (3D) imaging systems can be laser profiling systems such as, but not limited to, a Cognex IN-SIGHT 3D-L4000 system or a Cognex IN-SIGHT 3D-A5000 system.

In one embodiment, the 3D imaging system is used to identify the distance from the 3D imaging system to irregularly shaped veneer or veneer sheet fractions scanned. In one embodiment, the various distances from the 3D imaging system to irregularly shaped veneer or veneer sheet fractions scanned is displayed and processed as a grey scale, or color, representation of the irregularly shaped veneer or veneer sheet fractions scanned, with different shades of gray, or colors, representing different distances or depths.

In one embodiment, the veneer sheet fraction determined to be closest to the 3D imaging system is then identified as the top of stack veneer sheet fraction.

In one embodiment, a robot system, such as a robotic arm is then used to pick up the identified top of stack veneer sheet fraction and move it to a production line or other desired location. In one embodiment, the robotic arm used to pick up the identified top of stack veneer sheet fraction is the same robotic arm in which the 3D imaging system is positioned. In some embodiments, the robotic arm used to pick up the identified top of stack veneer sheet fraction is a second robotic arm, different from the robotic arm in which the 3D imaging system is positioned.

Once the identified top of stack veneer sheet fraction is removed from the stack of veneer, the 3D imaging system again scans the stack of veneer and identifies the newly revealed top of stack veneer sheet fraction which is then removed from the stack of veneer. In this way the stack of veneer is unstacked one top of stack veneer sheet fraction at a time as these top of stack veneer sheet fractions are identified.

In one embodiment, as each of the top of stack veneer sheet fractions are identified, one or more veneer analysis systems are used to precisely determine the dimensions of each top of stack veneer sheet fraction as they are identified. In one embodiment, dimensions data is then created and processed for each top of stack veneer sheet fraction and this dimensions data is used to identify the center of mass, or best location, on the top of stack veneer sheet fraction to pick up the top of stack veneer sheet fraction to avoid damage to the top of stack veneer sheet fraction.

In one embodiment, the one or more veneer analysis systems include one or more high resolution 2D imaging systems.

In some embodiments, the one or more imaging systems include all or part of a high resolution imaging system such as that set forth in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which is hereby incorporated by reference in its entirety as if it were fully set forth herein.

In one embodiment, the one or more high resolution 2D imaging systems are positioned in a robotic arm.

In one embodiment, data indicating the center of mass, or best location, on the top of stack veneer sheet fraction to pick up the top of stack veneer sheet fraction to avoid damage to the top of stack veneer sheet fraction is then used to control a robotic arm used to pick up the identified top of stack veneer sheet fraction and direct it to pick up the top of stack veneer sheet fraction at the center of mass, or best location, on the top of stack veneer sheet fraction.

Consequently, using some of the disclosed embodiments, a top of stack veneer sheet fraction in as stack of irregularly shaped veneer or veneer sheet fractions can be accurately and consistently identified. In addition, in one embodiment, the center of mass, or best location, on the identified top of stack veneer sheet fraction to pick up the top of stack veneer sheet fraction to avoid damage to the top of stack veneer sheet fraction is identified.

Then, using the disclosed embodiments, a robotic system is controlled to pick up the identified top of stack veneer sheet fraction, in one embodiment, at the center of mass, or best location, on the identified top of stack veneer sheet fraction and move the identified top of stack veneer sheet fraction to a desired location. Then this process is repeated until the entire stack of veneer is unstacked.

Consequently, some embodiments of the present disclosure provide an effective and efficient technical solution to the long-standing technical problem of providing a method and system for identifying the top of stack veneer sheet fraction, or layer in a stack of veneer consisting of layers of irregularly shaped veneer or veneer sheet fractions.

Figure 13A:
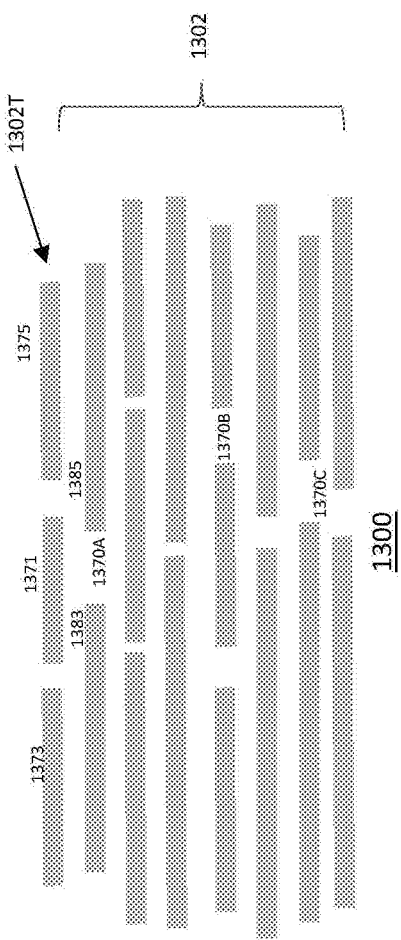
FIG. 13A shows an exemplary stack of veneer sheet fractions viewed from the side.

FIG. 13A shows an exemplary stack of veneer sheet fractions 1300 viewed from the side. As seen in FIG. 13, stack of veneer sheet fractions 1300 includes layers of veneer sheet fractions 1302. As also seen in FIG. 13, stack of veneer sheet fractions 1300 includes top of stack 1302T consisting of veneer sheet fractions 1371, 1373, and 1375.

As also seen in FIG. 13A, stack of veneer sheet fractions 1300 includes numerous gaps between veneer sheet fractions in each layer of veneer sheet fractions 1302, e.g., exemplary gaps 1370A, 1370B, 1370C. As noted above, in the prior art these gaps create serious issues when attempts are made to identify the veneer sheet fractions that is at the top of the stack of veneer sheet fractions 1300 using prior art methods and systems.

Figure 13B:
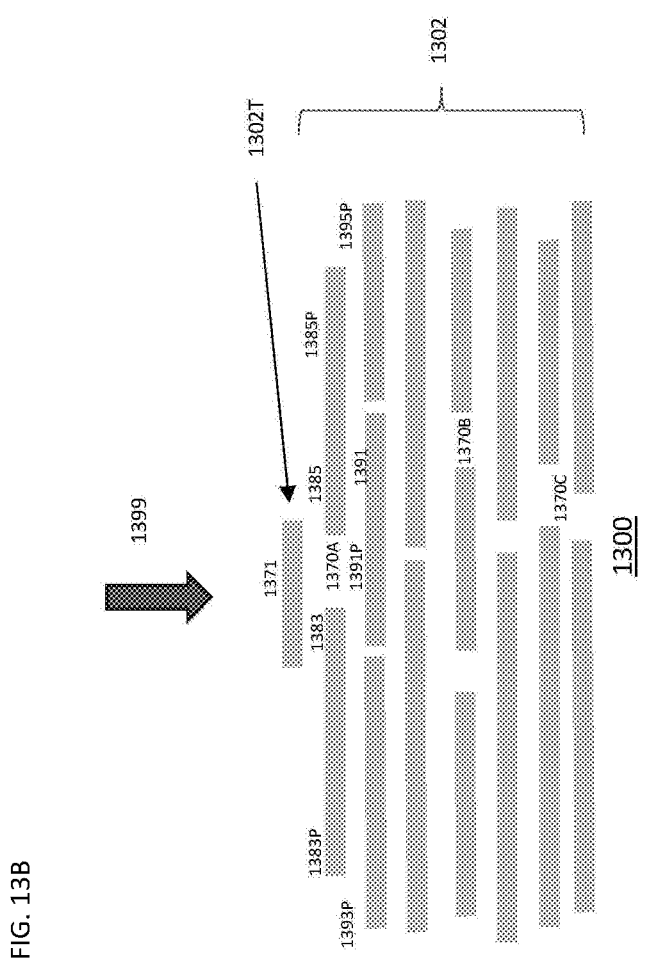
FIG. 13B shows the exemplary stack of veneer sheet fractions of FIG. 13A viewed from the side after two veneer sheet fractions have been unstacked from the top layer of the stack.

FIG. 13B shows the exemplary stack of veneer sheet fractions 1300 of FIG. 13A viewed from the side after two veneer sheet fractions, i.e., veneer sheet fractions 1373 and 1375 have been unstacked from the top layer of the stack 1302T. Thus in FIG. 13B, only veneer sheet fraction 1371 remains in top layer of veneer sheet fractions 1302T.

In the prior art, once veneer sheet fractions 1373 and 1375 have been unstacked from the top layer of the stack 1302T, portion 1383P of veneer sheet fraction 1383 and portion 1385P of veneer sheet fraction 1385 are exposed. Consequently using prior art methods and systems it would be quite likely either portion 1383P or portion 1385P could cause veneer sheet fraction 1383 and/or veneer sheet fraction 1385 to be misidentified as top of the stack veneer sheet fractions.

In this case, when either veneer sheet fraction 1383 or veneer sheet fraction 1385 is misidentified as the top of the stack veneer sheet fractions and an attempt is made to remove either veneer sheet fraction 1383 or veneer sheet fraction 1385 before the correct top of stack veneer sheet fraction 1371, veneer sheet fraction 1371 will be displaced and thereby lost from the stack of veneer sheet fractions 1300 and/or damaged.

However, the disclosed embodiments include a three dimensional (3D) imaging system such as a laser profiling system or microwave system. In some embodiments, the 3D imaging system is positioned in a robot system, such as a robotic arm, and the top surface of the stack of veneer is scanned by the 3D imaging system using the robotic arm.

As discussed in more detail below, in some embodiments, the 3D imaging system includes a three dimensional (3D) imaging system such as a laser profiling system.

Currently available 3D laser profiling systems are extremely accurate and can determine distances/depths to $\frac{1}{1000}$th of an inch.

In some embodiments, the 3D imaging system includes a three dimensional (3D) imaging system such as a Cognex IN-SIGHT 3D-L4000 system or a Cognex IN-SIGHT 3D-A5000 system.

3D imaging systems create 3D images of structures to identify the distance from the 3D imaging system to the scanned structure, such as irregularly shaped veneer or veneer sheet fractions. In one embodiment, the various distances from the 3D imaging system to irregularly shaped veneer or veneer sheet fractions scanned is displayed and processed as a grey scale, or color, representation of the irregularly shaped veneer or veneer sheet fractions scanned, with different shades of gray, or colors, representing different distances or depths. In one embodiment, the veneer sheet fraction determined to be closest to the 3D imaging system is then identified as the top of stack veneer sheet fraction.

Figure 13C:
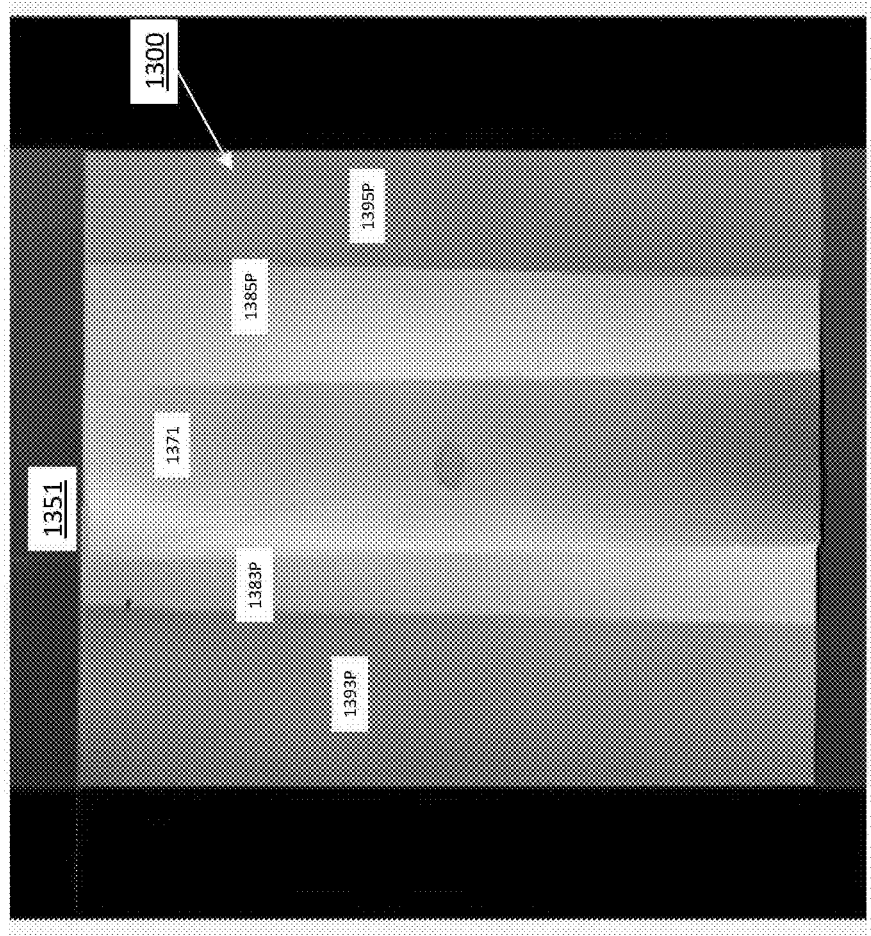
FIG. 13C is a 3D laser profile image of the top surface of the exemplary stack of veneer sheet fractions viewed of FIG. 13B, indicating the relative depth of several veneer sheet fractions and indicating the top of the stack veneer sheet fraction based on color in accordance with one embodiment.

FIG. 13C is a 3D laser profile image 1351 of the top surface of the stack of veneer sheet fractions 1300 of FIG. 13B. Laser profile image 1351 is an image taken from the viewpoint looking down at top layer of the stack 1302T in direction 1399 of FIG. 13B.

As seen in FIG. 13C, laser profile image 1351 is a color (or greyscale) representation of veneer sheet fractions 1371, 1383 (portion 1383P), 1385 (portion 1385P), 1393 (portion 1393P) and 1395 (portion 1395P) of FIG. 13B.

As also seen in FIG. 13C, each of veneer sheet fractions 1371, 1383 (portion 1383P), 1385 (portion 1385P), 1393 (portion 1393P) and 1395 (portion 1395P) has an associated color (or greyscale). As noted above, each color represents a different distance from the 3D scanner, e.g., a different depth in stack of veneer sheet fractions 1300.

In this particular example, veneer sheet fraction 1371 are orange and yellow. In this particular example, orange and yellow coloring indicates a distance closest to the 3D scanner, e.g., a top of stack depth. Of note, veneer sheet fraction 1371 varies from orange to yellow because of slight variations in thickness and/or orientation of veneer sheet fraction 1371.

As also shown in FIG. 13C, veneer sheet fractions 1383 (portion 1383P) and 1385 (portion 1385P), each have the same coloration of green and yellow. In this particular example, green and yellow coloring indicates a distance to the 3D scanner, e.g., a depth, of a second layer in stack of veneer sheet fractions 1300.

Similarly, in FIG. 13C veneer sheet fractions 1393 (portion 1393P) and 1395 (portion 1395P), each have the same coloration of light blue. In this particular example, light blue coloring indicates a distance to the 3D scanner, e.g., a depth, of a third layer in stack of veneer sheet fractions 1300.

Consequently, using the disclosed embodiments, and the disclosed 3D scanner methods, veneer sheet fraction 1371 can be readily identified as the top of stack veneer sheet fractions by its orange and yellow color. Therefore as discussed below, veneer sheet fraction 1371 is readily identified as the veneer sheet fraction that is at the top of the stack of veneer sheet fractions 1300 and therefore should be unstacked first.

Figure 13D:
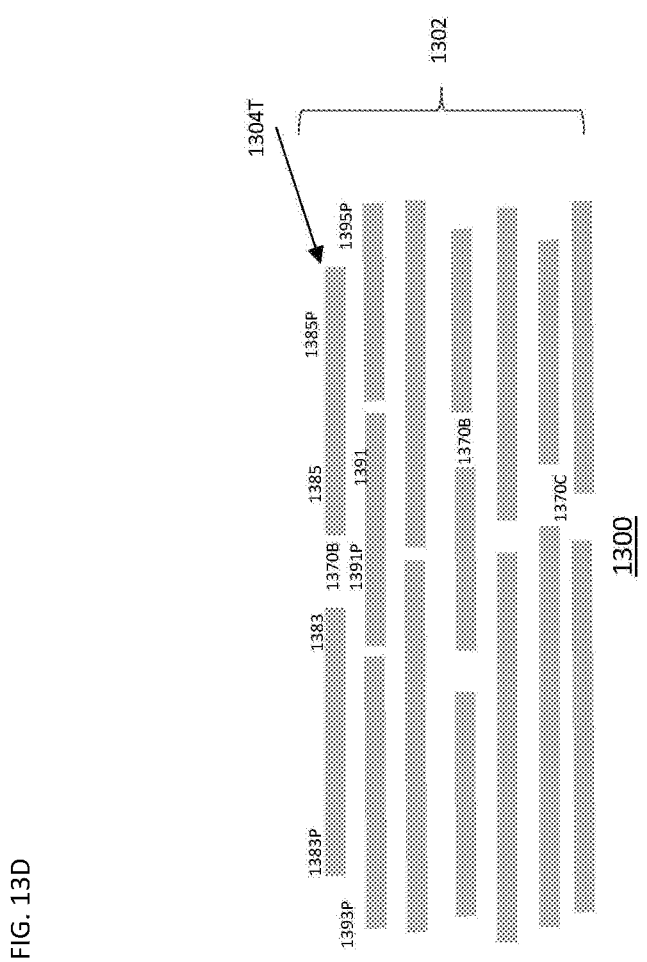
FIG. 13D shows the exemplary stack of veneer sheet fractions of FIG. 13B viewed from the side after the top of the stack veneer sheet fraction identified in FIG. 13C has been unstacked in accordance with one embodiment.

As shown in FIG. 13D, in one embodiment, once the veneer sheet fraction 1371 is identified as the veneer sheet fraction that is at the top of the stack of veneer sheet fractions 1300 and is therefore first removed, portions of full veneer sheets 1383 and 1385 become the new top layer 1304T of stack veneer sheet fractions 1300.

However, as a result of veneer sheet fraction 1371 being removed a gap 1370B is also exposed. As a result of gap 1370B, it is possible, using prior art methods and systems, that portion 1391P of veneer sheet fraction 1391 could be misidentified at the top of stack veneer sheet fraction. As seen in FIG. 13D, similarly, portion 1393P of veneer sheet fraction 1393 and/or portion 1395P of veneer sheet fraction 1395 could also be misidentified at the top of stack veneer sheet fractions.

However, using the disclosed embodiments, the method and system described above is again used to identify the top of stack veneer sheet fractions, in this example portions of full veneer sheets 1383 and 1385.

According to the disclosed embodiments, this process is then repeated until the entire stack of veneer sheet fractions 1300 is unstacked.

Figure 14:
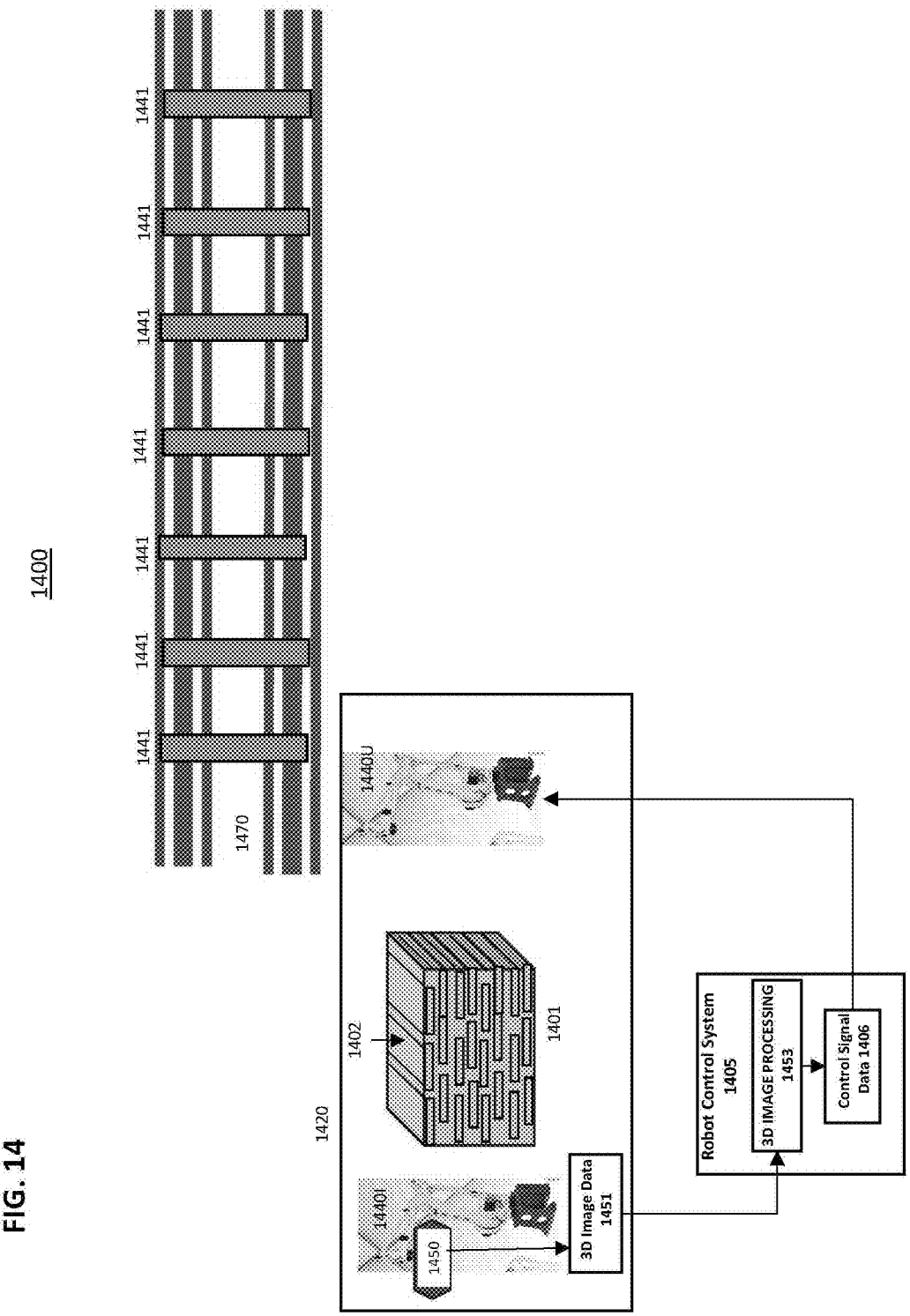
FIG. 14 shows a block diagram of a top of veneer strip stack identification and unstacking system in accordance with one embodiment.

FIG. 14 shows a block diagram of a top of veneer strip stack identification and unstacking system 1400 in accordance with one embodiment.

As seen in FIG. 14, top of veneer strip stack identification and unstacking system 1400 includes unstacking station 1420, robot control system 1405, and conveyor 1470.

In one embodiment, unstacking station 1420 includes 3D imaging system 1450. In this particular example, 3D imaging system 1450 is attached to an imaging robot 1440I. However, in other embodiments, 3D imaging system 1450 is a part of a standalone imaging station (not shown).

In some embodiments 3D imaging system 1450 includes a three dimensional (3D) imaging system such as a laser profiling system. In some embodiments, 3D imaging system 1450 is a three dimensional (3D) imaging system such as a Cognex IN-SIGHT 3D-L4000 system or a Cognex IN-SIGHT 3D-A5000 system.

In one embodiment, unstacking station 1420 also includes unstacking robot 1440U which, in one embodiment, is used to unstack stack of veneer strips 1401 in response to control signals generated by control signal data of robot control system 1405 and place the unstacked veneer strips 1441 onto conveyor 1470.

In one embodiment, imaging robot 1440I is used to scan the top surface 1402 of stack of veneer strips 1401. In one embodiment, as the result of each scan of the top surface 1402 of stack of veneer strips 1401 by imaging robot 1440I and the attached imaging system 1450, a 3D image of top surface 1402 of stack of veneer strips 1401 is generated as 3D image data 1451. In one embodiment, 3D image data 1451 represents a 3D image of top surface 1402 of stack of veneer strips 1401, such as laser profile image 1351 of FIG. 13C, that is a color or greyscale representation of the veneer strips making up top surface 1402 of stack of veneer strips 1401.

As seen in FIG. 14, in one embodiment, 3D image data 1451 is then sent to 3D image processing system 1453 where the laser profile image represented by 3D image data 1451 is processed to identify the top of stack veneer strip(s) by the process discussed above with respect to FIGS. 13A, 13B, 13C, and 13D.

Returning to FIG. 14, in one embodiment, once the top of stack veneer strip(s) are identified by image processing system 1453, image processing system 1453 generates control signal data 1406 representing control signals to direct unstacking robot 1440U which, in one embodiment, is used to unstack stack of veneer strips 1401 in response to control signals generated by control signal data 1406 of robot control system 1405 and place the unstacked veneer strips 1441 onto conveyor 1470.

Of note, in some embodiments, a single robot (not shown) can be used as both imaging robot 1440I and unstacking robot 1440U.

As noted, unstacking robot 1440U is then used to unstack stack of veneer strips 1401 in response to control signals generated by control signal data 1406 of robot control system 1405 and place the unstacked veneer strips 1441 onto conveyor 1470.

Consequently, using top of veneer strip stack identification and unstacking system 1400, stack of veneer strips 1401 is unstacked by accurately identifying the top of stack veneer strip(s) using imaging system 1450 and image processing system 1453 and then removing the identified top of stack veneer strip(s) using unstacking robot 1440U and conveyor 1470.

In various embodiments, this process is then repeated layer-by-layer until stack of veneer strips 1401 is completely unstacked.

Figure 15:
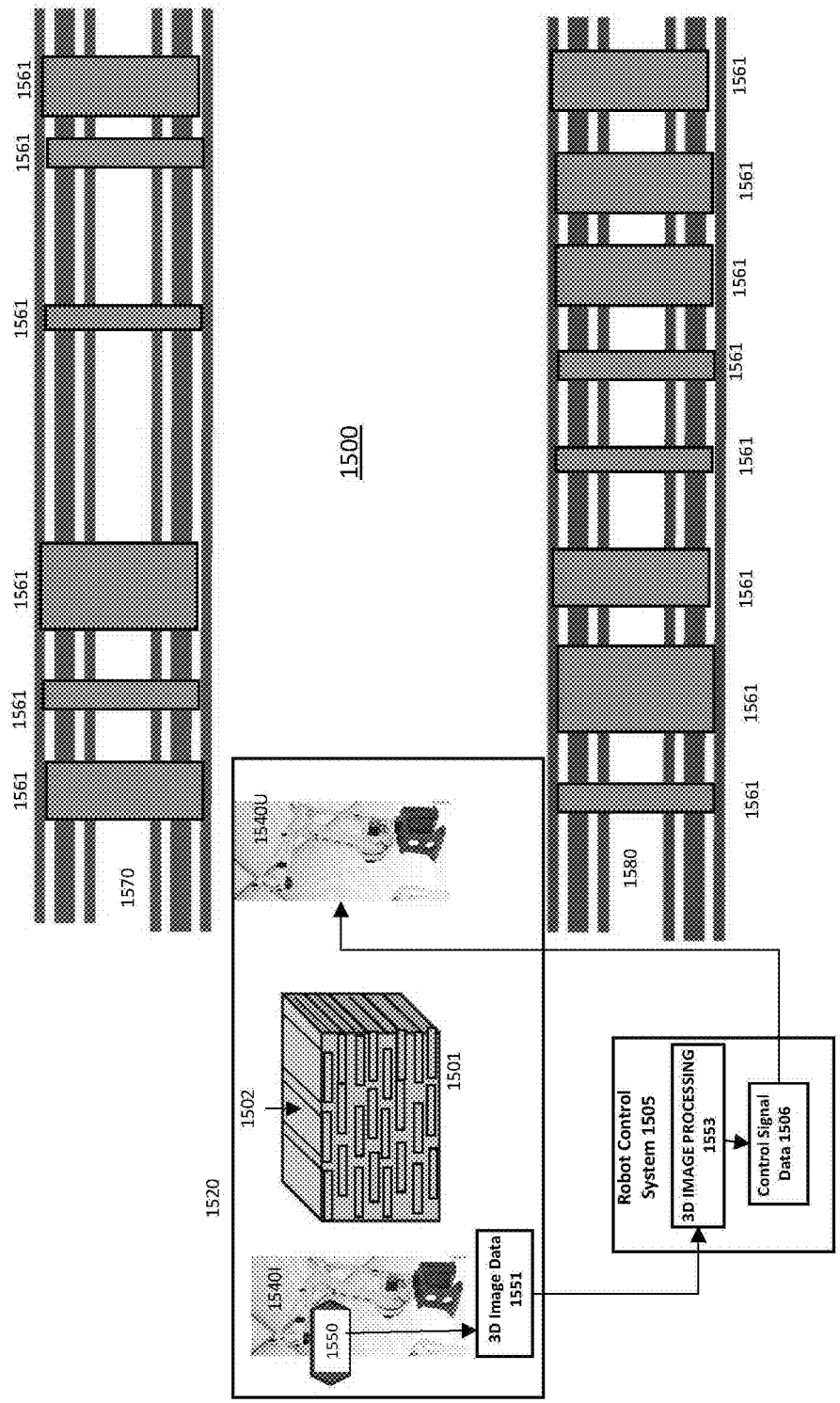
FIG. 15 shows a block diagram of a top of partial veneer sheet stack identification and unstacking system in accordance with one embodiment.

FIG. 15 shows a block diagram of a top of partial veneer sheet stack identification and unstacking system 1500 in accordance with one embodiment.

As seen in FIG. 15, top of partial veneer sheet stack identification and unstacking system 1500 includes unstacking station 1520, robot control system 1505, and conveyors 1570 and 1580.

In one embodiment, unstacking station 1520 includes 3D imaging system 1550. In this particular example, 3D imaging system 1550 is attached to an imaging robot 1540I. However, in other embodiments, 3D imaging system 1550 is a part of a standalone imaging station (not shown).

In some embodiments, 3D imaging system 1550 includes a three dimensional (3D) imaging system such as a laser profiling system. In some embodiments, one or more imaging systems include a three dimensional (3D) imaging system such as a Cognex IN-SIGHT 3D-L4000 system or a Cognex IN-SIGHT 3D-A5000 system.

In one embodiment, unstacking station 1520 also includes unstacking robot 1540U which, in one embodiment, is used to unstack stack of partial veneer sheets 1501 in response to control signals generated by control signal data 1506 of robot control system 1505 and place the unstacked partial veneer sheets 1561 onto conveyors 1570 and/or 1580.

In one embodiment, imaging robot 1540I is used to scan the top surface 1502 of stack of partial veneer sheets 1501. In one embodiment, as the result of each scan of the top surface 1502 of stack of partial veneer sheets 1501 by imaging robot 1540I and the attached imaging system 1550, a 3D image of top surface 1502 of stack of partial veneer sheets 1501 is generated as 3D image data 1551. In one embodiment, 3D image data 1551 represents a 3D image of top surface 1502 of stack of partial veneer sheets 1501, such as laser profile image 1351 of FIG. 13C that is a color or greyscale representation of the veneer strips making up top surface 1502 of stack of partial veneer sheets 1501.

As seen in FIG. 15, in one embodiment, 3D image data 1551 is then sent to 3D image processing system 1553 where the laser profile image represented by 3D image data 1551 is processed to identify the top of stack partial veneer sheet(s) by the process discussed above with respect to FIGS. 13A, 13B, 13C, and 13D.

Returning to FIG. 15, in one embodiment, once the top of stack partial veneer sheet(s) are identified by image processing system 1553, image processing system 1553 generates control signal data 1506 representing control signals to direct unstacking robot 1540U which, in one embodiment, is used to unstack stack of partial veneer sheets 1501 in response to control signals generated by control signal data 1506 of robot control system 1505 and place the unstacked partial veneer sheet(s) 1561 onto conveyors 11570 and/or 1580.

Of note, in some embodiments, a single robot (not shown) can be used as both imaging robot 1540I and unstacking robot 1540U.

As noted, unstacking robot 1540U is then used to unstack stack of partial veneer sheets 1501 in response to control signals generated by control signal data 1506 of robot control system 1505 and place the unstacked partial veneer sheets 1561 onto conveyors 1570 and/or 1580.

Consequently, using top of partial veneer sheet stack identification and unstacking system 1500, stack of partial veneer sheets 1501 is unstacked by accurately identifying the top of stack partial veneer sheet(s) using imaging system 1550 and image processing system 1553 and then removing the identified top of stack partial veneer sheet(s) using unstacking robot 1540U and conveyors 1570 and/or 1580.

In various embodiments, this process is then repeated layer-by-layer until stack of partial veneer sheets 1501 is completely unstacked.

In one embodiment, as each of the top of stack veneer sheet fraction is identified, one or more veneer 2D image systems are used to precisely determine the dimensions of each top of stack veneer sheet fraction as they are identified. In one embodiment, dimensions data is then created and processed for each top of stack veneer sheet fraction and this dimensions data is used to identify the center of mass, or best location, on the top of stack veneer sheet fraction to pick up the top of stack veneer sheet fraction at which to avoid damage to the top of stack veneer sheet fraction.

Figure 16:
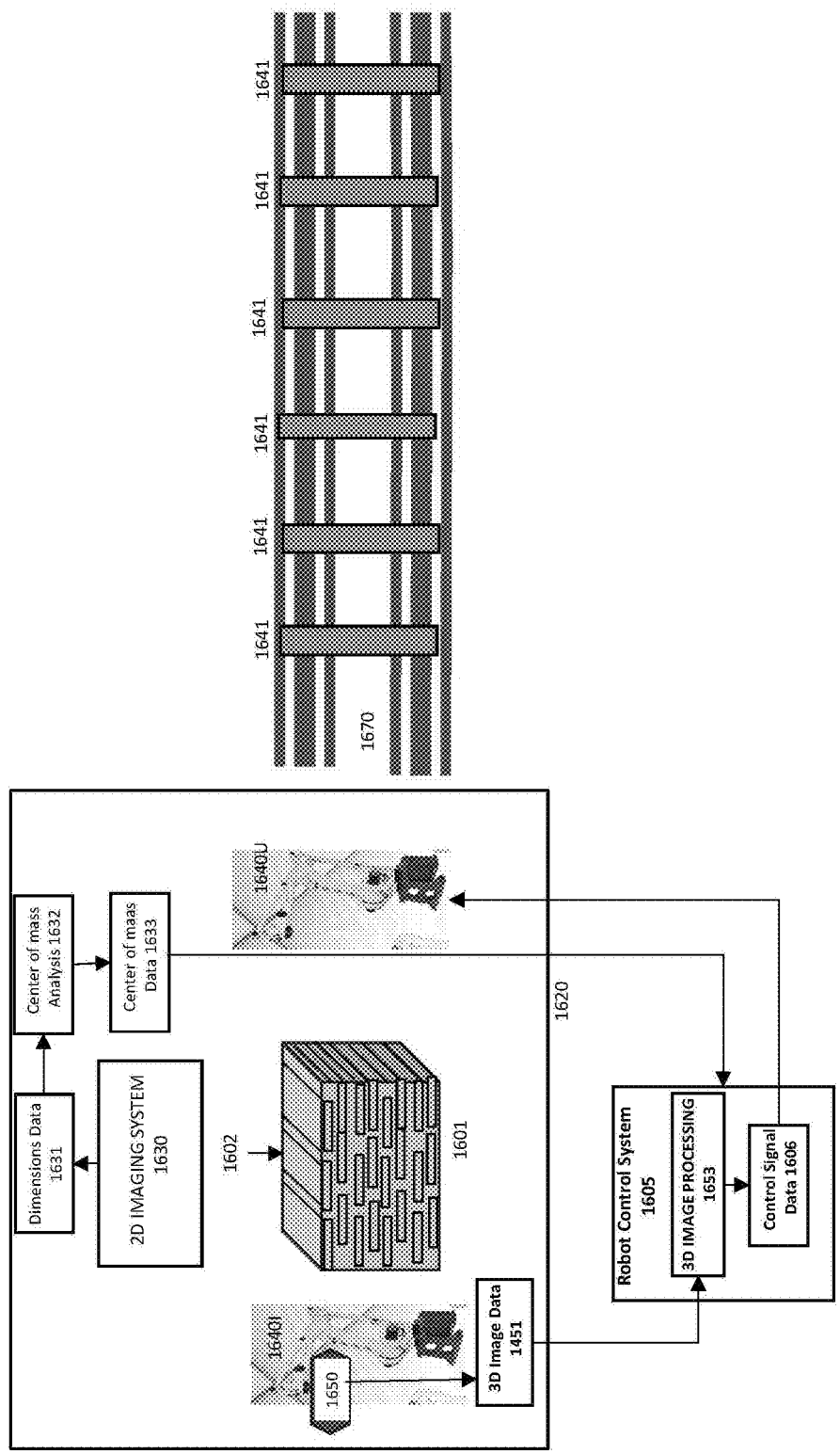
FIG. 16 shows a block diagram of a top of veneer stack identification and unstacking system including an 2D imaging system for identifying the center of mass, or best location, on the top of stack veneer sheet fraction to pick up the top of stack veneer sheet fraction to avoid damage to the top of stack veneer sheet fraction.

FIG. 16 shows a block diagram of a top of fraction of veneer sheet stack identification and unstacking system 1600 including a 2D imaging system for identifying the center of mass, or best location, on the top of stack veneer sheet fraction to pick up the top of stack veneer sheet fraction to avoid damage to the top of stack veneer sheet fraction in accordance with one embodiment.

As seen in FIG. 16, top of fraction of veneer sheet stack identification and unstacking system 1600 includes unstacking station 1620, robot control system 1605, and conveyor 1670.

In one embodiment, unstacking station 1620 includes 3D imaging system 1650. In this particular example, 3D imaging system 1650 is attached to an imaging robot 1640I. However, in other embodiments, 3D imaging system 1650 is a part of a standalone imaging station (not shown).

In some embodiments 3D imaging system 1650 includes a three dimensional (3D) imaging system such as a laser profiling system. In some embodiments, 3D imaging system 1650 includes a three dimensional (3D) imaging system such as a Cognex IN-SIGHT 3D-L4000 system or a Cognex IN-SIGHT 3D-A5000 system.

In one embodiment, imaging robot 1640I is used to scan the top surface 1602 of stack of fraction of veneer sheets 1601. In one embodiment, as the result of each scan of the top surface 1602 of stack of fraction of veneer sheets 1601 by imaging robot 1640I and the attached imaging system 1650, a 3D image of top surface 1602 of stack of fraction of veneer sheets 1601 is generated as 3D image data 1651. In one embodiment, 3D image data 1651 represents a 3D image of top surface 1602 of stack of fraction of veneer sheets 1601, such as laser profile image 1351 of FIG. 13C that is a color or greyscale representation of the veneer strips making up top surface 1602 of stack of fraction of veneer sheets 1601.

As seen in FIG. 16, in one embodiment, 3D image data 1651 is then sent to 3D image processing system 1653 where the laser profile image represented by 3D image data 1651 is processed to identify the top of stack veneer strip(s) by the process discussed above with respect to FIGS. 13A, 13B, 13C, and 13D.

In one embodiment, unstacking station 1620 also includes 2D imaging system 1630.

In one embodiment, 2D imaging system 1630 scans the individual fraction of veneer sheets identified as the top of stack fraction of veneer sheets by 3D imaging system 1650 and thereby obtains dimensions data 1631 for each top of stack fraction of veneer sheet once it is identified as the top of stack fraction of veneer sheet.

In some embodiments, 2D imaging system 1630 includes all or part of a high resolution imaging system such as that set forth in Bolton et al., U.S. patent application Ser. No. 16/205,027, filed Nov. 29, 2018, now issued as U.S. Pat. No. 10,825,164 on Nov. 3, 2020, entitled "IMAGING SYSTEM FOR ANALYSIS OF WOOD PRODUCTS," which is hereby incorporated by reference in its entirety as if it were fully set forth herein.

In one embodiment, 2D imaging system 1630 is positioned in a robotic arm (not shown in FIG. 16).

In one embodiment, once dimensions data 1631 is obtained by 2D imaging system 1630, dimensions data 1631 is processed by center of mass analysis system 1632 to determine the center of mass, or best location, on the top of stack veneer sheet fraction to pick up the top of stack veneer sheet fraction to avoid damage to the top of stack veneer sheet fraction. As a result center of mass data 1633 is thereby generated for each identified top of stack veneer sheet fraction before the identified top of stack veneer sheet fraction is unstacked.

As discussed below, center of mass data 1633 is then used to control unstacking robot 1640U to pick up the identified top of stack veneer sheet fraction and direct unstacking robot 1640U to pick up the top of stack veneer sheet fraction at the center of mass, or best location, on the top of stack veneer sheet fraction.

In one embodiment, unstacking station 1620 also includes unstacking robot 1640U which, in one embodiment, is used to unstack stack of fraction of veneer sheets 1601 in response to control signals generated by control signal data 1606 of robot control system 1605 and place the unstacked fraction of veneer sheets 1641 onto conveyor 1670.

Returning to FIG. 16, in one embodiment, once the top of stack fraction of veneer sheet(s) are identified by image processing system 1653, and center of mass data 1633 is generated, robot control system uses image processing system 1653 and center of mass data 1633 to generate control signal data 1606 representing control signals to direct unstacking robot 1640U to unstack stack of fraction of veneer sheets 1601 in response to control signals generated by control signal data 1606 of robot control system 1605.

In one embodiment, based on center of mass data 1633 unstacking robot 1640U is directed to unstack stack of fraction of veneer sheets 1601 by picking up each identified top of stack fraction of veneer sheet at its identified center of mass, or best location, as indicated by center of mass data 1633 and place the unstacked fraction of veneer sheet s 1641 onto conveyor 1670.

Of note, in some embodiments, a single robot (not shown) can be used as imaging robot 1640I, unstacking robot 1640U, and/or as a platform for 2D imaging system 1630.

As noted, unstacking robot 1640U is then used to unstack stack of fraction of veneer sheets 1601 in response to control signals generated by control signal data 1606 of robot control system 1605 and place the unstacked fraction of veneer sheets 1641 onto conveyor 1670.

Consequently, using top of veneer strip stack identification and unstacking system 1600, stacks of fraction of veneer sheets 1601 are unstacked by accurately identifying the top of stack fraction of veneer sheet(s) using imaging system 1650 and image processing system 1653, identifying the center of mass, or best location, as indicated by center of mass data 1633, and then picking up the top of stack fraction of veneer sheet(s) at the center of mass, or best location, using 2D imaging system 1630 and center of mass data 1633, and then unstacking the identified top of stack fraction of veneer sheet(s) using unstacking robot 1640U and conveyor 1670.

In various embodiments, this process is then repeated layer-by-layer until stack of fraction of veneer sheets 1601 is completely unstacked.

Consequently, using some of the disclosed embodiments, a top of stack veneer sheet fraction can be accurately and consistently identified and then unstacked by picking up the identified top of stack veneer sheet fraction at the center of mass, or best location, on the identified top of stack veneer sheet fraction to avoid damage to the top of stack veneer sheet fraction.

Consequently, some embodiments of the present disclosure provide an effective and efficient technical solution to the long-standing technical problem of providing a method and system for identifying the top of stack veneer sheet fraction, or layer in a stack of veneer consisting of layers of irregularly shaped veneer or "veneer sheet fractions.

The innovations disclosed herein are described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms may be high-level descriptions of the actual operations that are performed. The actual operations that correspond to these terms may vary depending on the particular implementation.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically, or chemically) coupled or linked and does not exclude the presence of intermediate elements between the coupled or associated items absent specific contrary language.

As used herein, operations that occur "simultaneously" or "concurrently" occur generally at the same time as one another, although delays in the occurrence of one operation relative to the other due to, for example, spacing, play or backlash between components in a mechanical linkage such as threads, gears, etc., are expressly within the scope of the above terms, absent specific contrary language.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)).

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following claims. We therefore claim all that comes within the scope of these claims.

Therefore, numerous variations, whether explicitly provided for by the specification or implied by the specification or not, may be implemented by one of skill in the art in view of this disclosure.

What is claimed is:

1. A veneer stacking system comprising:
   one or more imaging systems, the one or more imaging systems capturing one or more images of individual veneer portions and generating dimensions data for each individual veneer portion;
   a veneer data collection and storage system, the veneer data collection and storage system receiving the dimensions data for each individual veneer portion, the veneer data collection and storage system correlating the dimensions data for each individual veneer portion with that individual veneer portion and storing the dimensions data for each individual veneer portion;
   a robot control system, the robot control system receiving the dimensions data for each individual veneer portion, the robot control system generating robot control signal data representing robot control signals based, at least in part, on the dimensions data for each individual veneer portion;
   at least one veneer stacking robot, the at least one veneer stacking robot receiving the robot control signals and, in response to the robot control signals, placing each individual veneer portion onto a stack of individual veneer portions, wherein,
   as each individual veneer portion is moved onto the stack of individual veneer portions, location data indicating the location and orientation of each individual veneer portion is collected by the veneer data collection and storage system, the veneer data collection and storage system then correlating and storing the dimensions data and the location data for each individual veneer portion moved onto the stack of individual veneer portions, further wherein,
   when the stack of individual veneer portions is completed, the veneer data collection and storage system collecting the dimensions data and the location data for each individual veneer portion moved onto the stack of individual veneer portions to generate stack profile data for the stack of individual veneer portions, the stack profile data including data indicating the dimensions data and the location data for each individual veneer portion included in the stack of individual veneer portions; and a stack identifier mechanism, the stack identifier mechanism being assigned to the stack of individual veneer portions associating the stack profile data for the stack of individual veneer portions with the stack of individual veneer portions.

2. The veneer stacking system of claim 1 wherein the individual veneer portions are veneer strips.

3. The veneer stacking system of claim 1 wherein the individual veneer portions are partial sheets of veneer.

4. The veneer stacking system of claim 1 wherein the stack identifier mechanism is selected from the group of stack identifier mechanisms comprising:
   a UPC code on the stack of individual veneer portions;
   a printed UPC code attached to the stack of individual veneer portions;
   a UPC code on a pallet holding the stack of individual veneer portions;
   an RFID tag on the stack of individual veneer portions;
   an RFID tag in the stack of individual veneer portions;
   an RFID tag on a pallet holding the stack of individual veneer portions;
   a visual identifier on the stack of individual veneer portions;
   a printed visual identifier on the stack of individual veneer portions; and
   a visual identifier on a pallet holding the stack of individual veneer portions.

5. The veneer stacking system of claim 1 further comprising one or more imaging systems, the one or more imaging systems capturing one or more images of the individual veneer portions and generating dimensions data and quality data for each individual veneer portion, further wherein,
   the veneer data collection and storage system receives the dimensions data and the quality data for each individual veneer portion, the veneer data collection and storage system correlating the dimensions data and quality data for each individual veneer portion with that individual veneer portion and storing the dimensions data and quality data for each individual veneer portion, further wherein,
   the robot control system receives the dimensions data and quality data for each individual veneer portion, the robot control system generating robot control signal data representing robot control signals based, at least in part, on the dimensions data and/or the quality data for each individual veneer portion, further wherein,
   the at least one veneer stacking robot receives the robot control signals and, in response to the robot control signals, places each individual veneer portion onto a stack of individual veneer portions, further wherein,
   as each individual veneer portion is moved onto the stack of individual veneer portions, location data indicating the location and orientation of each individual veneer portion is collected by the veneer data collection and storage system, the veneer data collection and storage system then correlating and storing the dimensions data, the quality data, and the location data for each individual veneer portion moved onto the stack of individual veneer portions, further wherein,
   when the stack of individual veneer portions is completed, the veneer data collection and storage system collects the dimensions data, the quality data, and the location data for each individual veneer portion moved onto the stack of individual veneer portions to generate stack profile data for the stack of individual veneer portions, the stack profile data including the dimensions data, the quality data, and the location data for each individual veneer portion included in the stack of individual veneer portions.

6. The veneer stacking system of claim 1 wherein the individual veneer portions are selected from the group of individual veneer portions comprising:
   strips of veneer;
   partial sheets of veneer; and
   full sheets of veneer.

7. A veneer stacking method comprising:
   capturing one or more images of individual veneer portions;
   generating dimensions data for each individual veneer portion;
   correlating the dimensions data for each individual veneer portion with that individual veneer portion;
   generating robot control signal data representing robot control signals based, at least in part, on the dimensions data for each individual veneer portion;
   sending the robot control signals to at least one veneer stacking robot;
   using the at least one veneer stacking robot, in response to the robot control signals, to place each individual veneer portion onto a stack of individual veneer portions;
   generating location data indicating the location and orientation of each individual veneer portion as each individual veneer portion is moved onto the stack of individual veneer portions;
   collecting the dimensions data and the location data for each individual veneer portion moved onto the stack of individual veneer portions when the stack of individual veneer portions is completed to generate stack profile data for the stack of individual veneer portions, the stack profile data including the dimensions data and the location data for each individual veneer portion included in the stack of individual veneer portions; and
   assigning a stack identifier to the stack of individual veneer portions, the stack identifier associating the stack profile data for the stack of individual veneer portions with the stack of individual veneer portions.

8. The veneer stacking method of claim 7 wherein the individual veneer portions are veneer strips.

9. The veneer stacking method of claim 7 wherein the individual veneer portions are partial sheets of veneer.

10. The veneer stacking method of claim 7 wherein the stack identifier is selected from the group of stack identifiers comprising:
   a UPC code on the stack of individual veneer portions;
   a printed UPC code attached to the stack of individual veneer portions;
   a UPC code on a pallet holding the stack of individual veneer portions;
   an RFID tag on the stack of individual veneer portions;
   an RFID tag in the stack of individual veneer portions;
   an RFID tag on a pallet holding the stack of individual veneer portions;
   a visual identifier on the stack of individual veneer portions;
   a printed visual identifier on the stack of individual veneer portions; and a visual identifier on a pallet holding the stack of individual veneer portions.

11. The veneer stacking method of claim 7 further comprising:
- capturing one or more images of the individual veneer portions and generating quality data for each individual veneer portion;
- correlating the dimensions data and quality data for each individual veneer portion with that individual veneer portion;
- generating robot control signal data representing robot control signals based, at least in part, on the dimensions data and/or the quality data for each individual veneer portion;
- sending the robot control signals to at least one veneer stacking robot;
- using the at least one veneer stacking robot, in response to the robot control signals, to place each individual veneer portion onto a stack of individual veneer portions;
- generating location data indicating the location and orientation of each individual veneer portion as each individual veneer portion is moved onto the stack of individual veneer portions;
- collecting the dimensions data, the quality data, and the location data for each individual veneer portion moved onto the stack of individual veneer portions when the stack of individual veneer portions is completed to generate stack profile data for the stack of individual veneer portions, the stack profile data including the dimensions data, the quality data, and the location data for each individual veneer portion included in the stack of individual veneer portions.

12. A top veneer portion of a stack of veneer portions identification and unstacking system comprising;
- a three dimensional (3D) imaging system to identify a distance from the 3D imaging system to veneer portions in a stack of veneer portions, the 3D imaging system generating an image of a top surface of the stack of veneer portions, the image of the top surface of the stack of veneer portions generated by the 3D imaging system indicating the distance of veneer portions making up the top surface of the stack of veneer from the 3D imaging system;
- a robot control system, the robot control system receiving the image of a top surface of the stack of veneer portions, the robot control system processing the image of the top surface of the stack of veneer portions to identify the veneer portion making up the top surface of the stack of veneer portions from the 3D imaging system that is closest to the 3D imaging system, the robot control system designating the veneer portion making up the top surface of the stack of veneer portions that is closest to the 3D imaging system as the veneer portion that is at the top of the stack of veneer portions, the robot control system generating robot control signal data representing robot control signals;
- at least one veneer stacking robot, the at least one veneer stacking robot receiving the robot control signals and, in response to the robot control signals, unstacking the veneer portion designated as the veneer portion that is at the top of the stack of veneer portions before unstacking any of the other veneer portions making up the top surface of the stack of veneer.

13. The system of claim 12 wherein the 3D imaging system is a laser profiling system.

14. The system of claim 12 wherein the image of the top surface of the stack of veneer portions generated by the 3D imaging system indicates the distance of veneer portions making up the top surface of the stack of veneer from the 3D imaging system using grey scale imaging.

15. The system of claim 12 wherein the image of the top surface of the stack of veneer portions generated by the 3D imaging system indicates the distance of veneer portions making up the top surface of the stack of veneer from the 3D imaging system using color imaging.

16. The system of claim 12 wherein the individual veneer portions are selected from the group of individual veneer portions comprising:
- strips of veneer; and
- partial sheets of veneer.

17. The system of claim 12 further comprising:
- one or more imaging systems, the one or more imaging systems capturing one or more images of the individual veneer portions and generating dimensions data for each individual veneer portion;
- a center of mass analysis system, the center of mass analysis system receiving the dimensions data for each individual veneer portion, the center of mass analysis system analyzing the dimensions data to generate center of mass data indicating a location on each individual veneer portion from which the individual veneer portion should be picked up to avoid damaging the individual veneer portion, wherein,
- the center of mass data is provided to the robot control system, the robot control system processing the image of the top surface of the stack of veneer portions and the center of mass data to designate the top of the stack of veneer portion and the location on the designated top of the stack of veneer portion from which the designated top of the stack of veneer portion should be picked up, the robot control system generating robot control signal data representing robot control signals; and
- the at least one veneer stacking robot, in response to the robot control signals, picking up the veneer portion designated as the veneer portion that is at the top of the stack of veneer portions at the identified location on the designated top of the stack of veneer portion from which the designated top of the stack of veneer portion should be picked up, the at least one veneer stacking robot then unstacking the veneer portion designated as the veneer portion that is at the top of the stack of veneer portions before unstacking any of the other veneer portions making up the top surface of the stack of veneer.

18. A method of unstacking a stack of veneer portions comprising;
- generating a three dimensional (3D) image of a top surface of a stack of veneer portions, the 3D image of the top surface of the stack of veneer portions indicating a distance of veneer portions making up the top surface of the stack of veneer from a position above the top surface of the stack of veneer;
- processing the image of the top surface of the stack of veneer portions to identify the veneer portion making up the top surface of the stack of veneer portions that is closest to the position above the top surface of the stack of veneer;
- designating the veneer portion making up the top surface of the stack of veneer closest to the position above the top surface of the stack of veneer as the veneer portion that is at the top of the stack of veneer portions;

generating robot control signal data representing robot control signals;

sending the robot control signals to at least one unstacking robot which in response to the robot control signals unstacks the veneer portion designated as the veneer portion that is at the top of the stack of veneer portions before unstacking any of the other veneer portions making up the top surface of the stack of veneer.

19. The method of claim 18 wherein the 3D image of the top surface of the stack of veneer portions is obtained by a 3D imaging system that is a laser profiling system.

20. The method of claim 18 wherein the image of the top surface of the stack of veneer portions indicates the distance of veneer portions making up the top surface of the stack of veneer from a position above the top surface of the stack of veneer using grey scale imaging.

21. The method of claim 18 wherein the image of the top surface of the stack of veneer portions indicates the distance of veneer portions making up the top surface of the stack of veneer from a position above the top surface of the stack of veneer using color imaging.

22. The method of claim 18 wherein the individual veneer portions are selected from the group of individual veneer portions comprising:

strips of veneer; and partial sheets of veneer.

23. The method of claim 18 further comprising:

capturing one or more images of the individual veneer portions and generating dimensions data for each individual veneer portion;

processing the dimensions data for each individual veneer portion to generate center of mass data indicating a location on each individual veneer portion from which the individual veneer portion should be picked up to avoid damaging the individual veneer portion;

processing the image of the top surface of the stack of veneer portions and the center of mass data to designate the top of the stack of veneer portion and the location on the designated top of the stack of veneer portion from which the designated top of the stack of veneer portion should be picked up;

generating robot control signal data representing robot control signals; and sending the robot control signals to at least one unstacking robot which, in response to the robot control signals, picks up the veneer portion designated as the veneer portion that is at the top of the stack of veneer portions at the identified location on the designated top of the stack of veneer portion from which the designated top of the stack of veneer portion should be picked up and unstacks the designated top of the stack of veneer portion before unstacking any of the other veneer portions making up the top surface of the stack of veneer.

* * * * *